(12) United States Patent
Fleming et al.

(10) Patent No.: US 10,515,049 B1
(45) Date of Patent: Dec. 24, 2019

(54) MEMORY CIRCUITS AND METHODS FOR DISTRIBUTED MEMORY HAZARD DETECTION AND ERROR RECOVERY

(71) Applicant: Intel Corporation, Santa Clara, CA (US)

(72) Inventors: Kermin E. Fleming, Hudson, MA (US); Simon C. Steely, Hudson, NH (US); Kent D. Glossop, Merrimack, NH (US)

(73) Assignee: intel corporation, Santa Clara, CA (US)

( * ) Notice: Subject to any disclaimer, the term of this patent is extended or adjusted under 35 U.S.C. 154(b) by 216 days.

(21) Appl. No.: 15/640,541

(22) Filed: Jul. 1, 2017

(51) Int. Cl.
*G11C 15/00* (2006.01)
*G06F 15/78* (2006.01)
(Continued)

(52) U.S. Cl.
CPC ........ *G06F 15/7892* (2013.01); *G06F 9/3001* (2013.01); *G06F 9/3004* (2013.01);
(Continued)

(58) Field of Classification Search
CPC .............. G06F 15/7892; G06F 9/3001; G06F 9/30036; G06F 9/3004; G06F 9/30076; G06F 9/30145; G06F 9/38; G06F 9/3802
(Continued)

(56) References Cited

U.S. PATENT DOCUMENTS

| | | |
|---|---|---|
| 672,177 A | 4/1901 | William |
| 5,093,920 A | 3/1992 | Agrawal et al. |

(Continued)

FOREIGN PATENT DOCUMENTS

| | | |
|---|---|---|
| EP | 2660716 A1 | 11/2013 |
| EP | 2854026 A1 | 4/2015 |

(Continued)

OTHER PUBLICATIONS

Corrected Notice of Allowance from U.S. Appl. No. 15/721,802, dated Dec. 18, 2018, 8 pages.
(Continued)

*Primary Examiner* — Viet Q Nguyen
(74) *Attorney, Agent, or Firm* — Nicholson De Vos Webster & Elliott LLP

(57) ABSTRACT

Methods and apparatuses relating to distributed memory hazard detection and error recovery are described. In one embodiment, a memory circuit includes a memory interface circuit to service memory requests from a spatial array of processing elements for data stored in a plurality of cache banks; and a hazard detection circuit in each of the plurality of cache banks, wherein a first hazard detection circuit for a speculative memory load request from the memory interface circuit, that is marked with a potential dynamic data dependency, to an address within a first cache bank of the first hazard detection circuit, is to mark the address for tracking of other memory requests to the address, store data from the address in speculative completion storage, and send the data from the speculative completion storage to the spatial array of processing elements when a memory dependency token is received for the speculative memory load request.

24 Claims, 76 Drawing Sheets

(51) Int. Cl.
*G06F 9/30* (2018.01)
*G06F 9/38* (2018.01)

(52) U.S. Cl.
CPC ...... *G06F 9/30036* (2013.01); *G06F 9/30076* (2013.01); *G06F 9/38* (2013.01); *G06F 9/3802* (2013.01)

(58) Field of Classification Search
USPC .................................................... 365/49.17
See application file for complete search history.

(56) References Cited

U.S. PATENT DOCUMENTS

| | | | |
|---|---|---|---|
| 5,141,747 A | 8/1992 | Scholz | |
| 5,241,635 A | 8/1993 | Papadopoulos et al. | |
| 5,314,503 A | 5/1994 | Bobrove et al. | |
| 5,393,454 A | 2/1995 | Mondin et al. | |
| 5,393,536 A | 2/1995 | Brandt et al. | |
| 5,465,368 A | 11/1995 | Davidson et al. | |
| 5,560,032 A | 9/1996 | Nguyen et al. | |
| 5,574,944 A | 11/1996 | Stager | |
| 5,581,767 A | 12/1996 | Katsuki et al. | |
| 5,604,120 A | 2/1997 | Yano et al. | |
| 5,655,096 A | 8/1997 | Branigin | |
| 5,725,364 A | 3/1998 | Mirazita | |
| 5,787,029 A | 7/1998 | De Angel | |
| 5,790,821 A | 8/1998 | Pflum | |
| 5,805,827 A | 9/1998 | Chau et al. | |
| 5,930,484 A | 7/1999 | Tran et al. | |
| 5,933,429 A | 8/1999 | Bubenik et al. | |
| 6,020,139 A | 2/2000 | Schwartz et al. | |
| 6,088,780 A | 7/2000 | Yamada et al. | |
| 6,141,747 A | 10/2000 | Witt | |
| 6,205,533 B1 | 3/2001 | Margolus et al. | |
| 6,314,503 B1 | 11/2001 | D'Errico et al. | |
| 6,393,454 B1 | 5/2002 | Chu | |
| 6,393,536 B1 | 5/2002 | Hughes et al. | |
| 6,515,333 B1 | 2/2003 | Riccobene | |
| 6,553,482 B1 | 4/2003 | Witt | |
| 6,604,120 B1 | 8/2003 | De | |
| 6,615,333 B1 | 9/2003 | Hoogerbrugge et al. | |
| 6,721,774 B1 | 4/2004 | Lee et al. | |
| 6,725,364 B1 | 4/2004 | Crabill | |
| 7,000,072 B1 | 2/2006 | Aisaka et al. | |
| 7,181,578 B1 | 2/2007 | Guha et al. | |
| 7,257,665 B2 | 8/2007 | Niell et al. | |
| 7,290,096 B2 | 10/2007 | Jeter, Jr. et al. | |
| 7,379,067 B2 | 5/2008 | Deering et al. | |
| 7,486,678 B1 | 2/2009 | Devanagondi et al. | |
| 7,509,484 B1* | 3/2009 | Golla .................... G06F 9/3802 712/203 |
| 7,546,331 B2 | 6/2009 | Islam et al. | |
| 7,630,324 B2 | 12/2009 | Li et al. | |
| 7,660,911 B2 | 2/2010 | McDaniel | |
| 7,911,960 B1 | 3/2011 | Aydemir et al. | |
| 7,936,753 B1 | 5/2011 | Colloff et al. | |
| 7,987,479 B1 | 7/2011 | Day | |
| 8,001,510 B1 | 8/2011 | Miller et al. | |
| 8,010,766 B2 | 8/2011 | Bhattacharjee et al. | |
| 8,055,880 B2 | 11/2011 | Fujisawa et al. | |
| 8,156,284 B2 | 4/2012 | Vorbach et al. | |
| 8,160,975 B2 | 4/2012 | Tang et al. | |
| 8,225,073 B2 | 7/2012 | Master et al. | |
| 8,332,597 B1 | 12/2012 | Bennett | |
| 8,495,341 B2 | 7/2013 | Busaba et al. | |
| 8,561,194 B2 | 10/2013 | Lee | |
| 8,578,117 B2 | 11/2013 | Burda et al. | |
| 8,619,800 B1 | 12/2013 | Finney et al. | |
| 8,812,820 B2 | 8/2014 | Vorbach et al. | |
| 8,935,515 B2 | 1/2015 | Colavin et al. | |
| 8,966,457 B2* | 2/2015 | Ebcioglu .............. G06F 17/5045 717/136 |
| 8,990,452 B2 | 3/2015 | Branson et al. | |
| 9,026,769 B1 | 5/2015 | Jamil et al. | |
| 9,104,474 B2 | 8/2015 | Kaul et al. | |
| 9,110,846 B2 | 8/2015 | Buchheit et al. | |
| 9,135,051 B2 | 9/2015 | Chaplik et al. | |
| 9,135,057 B2 | 9/2015 | Branson et al. | |
| 9,170,846 B2 | 10/2015 | Delling et al. | |
| 9,213,571 B2 | 12/2015 | Ristovski et al. | |
| 9,268,528 B2 | 2/2016 | Tannenbaum et al. | |
| 9,473,144 B1 | 10/2016 | Thiagarajan et al. | |
| 9,594,521 B2 | 3/2017 | Blagodurov et al. | |
| 9,658,676 B1 | 5/2017 | Witek et al. | |
| 9,696,928 B2* | 7/2017 | Cain .................... G06F 3/0622 |
| 9,760,291 B2 | 9/2017 | Beale et al. | |
| 9,762,563 B2 | 9/2017 | Davis et al. | |
| 9,847,783 B1 | 12/2017 | Teh et al. | |
| 9,923,905 B2 | 3/2018 | Amiri et al. | |
| 9,946,718 B2 | 4/2018 | Bowman et al. | |
| 10,108,417 B2 | 10/2018 | Krishna et al. | |
| 10,187,467 B2 | 1/2019 | Nagai | |
| 10,331,583 B2 | 6/2019 | Ahsan et al. | |
| 2002/0026493 A1 | 2/2002 | Scardamalia et al. | |
| 2002/0090751 A1 | 7/2002 | Grigg et al. | |
| 2002/0103943 A1 | 8/2002 | Lo et al. | |
| 2002/0178285 A1 | 11/2002 | Donaldson et al. | |
| 2002/0184291 A1 | 12/2002 | Hogenauer | |
| 2003/0023830 A1 | 1/2003 | Hogenauer | |
| 2003/0028750 A1 | 2/2003 | Hogenauer | |
| 2003/0120802 A1 | 6/2003 | Kohno | |
| 2003/0126233 A1 | 7/2003 | Bryers et al. | |
| 2003/0163649 A1 | 8/2003 | Kapur et al. | |
| 2003/0177320 A1 | 9/2003 | Sah et al. | |
| 2003/0225814 A1 | 12/2003 | Saito et al. | |
| 2003/0233643 A1 | 12/2003 | Thompson et al. | |
| 2004/0001458 A1 | 1/2004 | Dorenbosch et al. | |
| 2004/0022094 A1 | 2/2004 | Radhakrishnan et al. | |
| 2004/0022107 A1 | 2/2004 | Zaidi et al. | |
| 2004/0124877 A1 | 7/2004 | Parkes | |
| 2004/0128401 A1 | 7/2004 | Fallon et al. | |
| 2004/0263524 A1 | 12/2004 | Lippincott | |
| 2005/0025120 A1 | 2/2005 | O'Toole et al. | |
| 2005/0076187 A1 | 4/2005 | Claydon | |
| 2005/0108776 A1 | 5/2005 | Carver et al. | |
| 2005/0134308 A1 | 6/2005 | Okada et al. | |
| 2005/0138323 A1 | 6/2005 | Snyder | |
| 2005/0166038 A1 | 7/2005 | Wang et al. | |
| 2005/0172103 A1 | 8/2005 | Inuo et al. | |
| 2006/0041872 A1 | 2/2006 | Poznanovic et al. | |
| 2006/0101237 A1 | 5/2006 | Mohl et al. | |
| 2006/0130030 A1 | 6/2006 | Kwiat et al. | |
| 2006/0179255 A1 | 8/2006 | Yamazaki | |
| 2006/0179429 A1* | 8/2006 | Eggers .................... G06F 8/458 717/151 |
| 2006/0200647 A1 | 9/2006 | Cohen | |
| 2006/0236008 A1 | 10/2006 | Asano et al. | |
| 2007/0011436 A1 | 1/2007 | Bittner, Jr. et al. | |
| 2007/0033369 A1 | 2/2007 | Kasama et al. | |
| 2007/0118332 A1 | 5/2007 | Meyers et al. | |
| 2007/0143546 A1 | 6/2007 | Narad | |
| 2007/0180315 A1 | 8/2007 | Aizawa et al. | |
| 2007/0203967 A1 | 8/2007 | Dockser et al. | |
| 2007/0204137 A1 | 8/2007 | Tran | |
| 2007/0226458 A1 | 9/2007 | Stuttard et al. | |
| 2007/0266223 A1 | 11/2007 | Nguyen | |
| 2007/0276976 A1 | 11/2007 | Gower et al. | |
| 2007/0299980 A1 | 12/2007 | Amini et al. | |
| 2008/0005392 A1 | 1/2008 | Amini et al. | |
| 2008/0072113 A1 | 3/2008 | Tsang et al. | |
| 2008/0082794 A1 | 4/2008 | Yu et al. | |
| 2008/0133889 A1 | 6/2008 | Glew | |
| 2008/0133895 A1 | 6/2008 | Sivtsov et al. | |
| 2008/0184255 A1 | 7/2008 | Watanabe et al. | |
| 2008/0218203 A1 | 9/2008 | Arriens et al. | |
| 2008/0263330 A1 | 10/2008 | May et al. | |
| 2008/0270689 A1 | 10/2008 | Gotoh | |
| 2008/0307258 A1 | 12/2008 | Challenger et al. | |
| 2009/0013329 A1 | 1/2009 | May et al. | |
| 2009/0037697 A1 | 2/2009 | Ramani et al. | |
| 2009/0063665 A1 | 3/2009 | Bagepalli et al. | |
| 2009/0113169 A1 | 4/2009 | Yang et al. | |
| 2009/0119456 A1 | 5/2009 | Park, II et al. | |
| 2009/0175444 A1 | 7/2009 | Douglis et al. | |

(56) References Cited

U.S. PATENT DOCUMENTS

| | | |
|---|---|---|
| 2009/0182993 A1 | 7/2009 | Fant |
| 2009/0300324 A1 | 12/2009 | Inuo |
| 2009/0300325 A1 | 12/2009 | Paver et al. |
| 2009/0309884 A1 | 12/2009 | Lippincott et al. |
| 2009/0328048 A1 | 12/2009 | Khan et al. |
| 2010/0017761 A1 | 1/2010 | Higuchi et al. |
| 2010/0115168 A1 | 5/2010 | Bekooij |
| 2010/0180105 A1 | 7/2010 | Asnaashari |
| 2010/0191911 A1 | 7/2010 | Heddes et al. |
| 2010/0217915 A1 | 8/2010 | O'Connor et al. |
| 2010/0228885 A1 | 9/2010 | McDaniel et al. |
| 2010/0254262 A1 | 10/2010 | Kantawala et al. |
| 2010/0262721 A1 | 10/2010 | Asnaashari et al. |
| 2010/0302946 A1 | 12/2010 | Yang et al. |
| 2011/0004742 A1 | 1/2011 | Hassan |
| 2011/0008300 A1 | 1/2011 | Wouters et al. |
| 2011/0040822 A1 | 2/2011 | Eichenberger et al. |
| 2011/0083000 A1 | 4/2011 | Rhoades et al. |
| 2011/0099295 A1 | 4/2011 | Wegener |
| 2011/0107337 A1 | 5/2011 | Cambonie et al. |
| 2011/0202747 A1 | 8/2011 | Busaba et al. |
| 2011/0302358 A1 | 12/2011 | Yu et al. |
| 2011/0314238 A1 | 12/2011 | Finkler et al. |
| 2011/0320724 A1 | 12/2011 | Mejdrich et al. |
| 2012/0017066 A1 | 1/2012 | Vorbach et al. |
| 2012/0066483 A1 | 3/2012 | Boury et al. |
| 2012/0079168 A1 | 3/2012 | Chou et al. |
| 2012/0089812 A1 | 4/2012 | Smith |
| 2012/0124117 A1 | 5/2012 | Yu et al. |
| 2012/0126851 A1 | 5/2012 | Kelem et al. |
| 2012/0144126 A1 | 6/2012 | Nimmala et al. |
| 2012/0174118 A1 | 7/2012 | Watanabe et al. |
| 2012/0239853 A1 | 9/2012 | Moshayedi |
| 2012/0260239 A1 | 10/2012 | Martinez et al. |
| 2012/0278543 A1 | 11/2012 | Yu et al. |
| 2012/0278587 A1 | 11/2012 | Caufield et al. |
| 2012/0303932 A1 | 11/2012 | Farabet et al. |
| 2012/0303933 A1 | 11/2012 | Manet et al. |
| 2012/0317388 A1* | 12/2012 | Driever ............... G06F 12/0646 711/170 |
| 2012/0324180 A1 | 12/2012 | Asnaashari et al. |
| 2012/0330701 A1 | 12/2012 | Hyder et al. |
| 2013/0024875 A1 | 1/2013 | Wang et al. |
| 2013/0036287 A1 | 2/2013 | Chu et al. |
| 2013/0067138 A1 | 3/2013 | Schuette et al. |
| 2013/0080652 A1 | 3/2013 | Cradick et al. |
| 2013/0080993 A1 | 3/2013 | Stravers et al. |
| 2013/0081042 A1 | 3/2013 | Branson et al. |
| 2013/0125127 A1 | 5/2013 | Mital et al. |
| 2013/0145203 A1 | 6/2013 | Fawcett et al. |
| 2013/0147515 A1 | 6/2013 | Wasson et al. |
| 2013/0151919 A1 | 6/2013 | Huynh |
| 2013/0166879 A1 | 6/2013 | Sun et al. |
| 2013/0315211 A1 | 11/2013 | Balan et al. |
| 2014/0032860 A1 | 1/2014 | Yamada et al. |
| 2014/0098890 A1 | 4/2014 | Sermadevi et al. |
| 2014/0115300 A1 | 4/2014 | Bodine |
| 2014/0188968 A1 | 7/2014 | Kaul et al. |
| 2014/0215189 A1 | 7/2014 | Airaud et al. |
| 2014/0281409 A1 | 9/2014 | Abdallah et al. |
| 2014/0380024 A1 | 12/2014 | Spadini et al. |
| 2015/0007182 A1 | 1/2015 | Rossbach et al. |
| 2015/0026434 A1 | 1/2015 | Basant et al. |
| 2015/0033001 A1 | 1/2015 | Ivanov |
| 2015/0067305 A1 | 3/2015 | Olson et al. |
| 2015/0082011 A1 | 3/2015 | Mellinger et al. |
| 2015/0089162 A1 | 3/2015 | Ahsan et al. |
| 2015/0089186 A1 | 3/2015 | Kim et al. |
| 2015/0100757 A1 | 4/2015 | Burger et al. |
| 2015/0106596 A1 | 4/2015 | Vorbach et al. |
| 2015/0113184 A1 | 4/2015 | Stanford-Jason et al. |
| 2015/0188847 A1 | 7/2015 | Chopra et al. |
| 2015/0261528 A1 | 9/2015 | Ho et al. |
| 2015/0317134 A1 | 11/2015 | Kim et al. |
| 2016/0077568 A1 | 3/2016 | Kandula et al. |
| 2016/0098279 A1 | 4/2016 | Glew |
| 2016/0098420 A1 | 4/2016 | Dickie et al. |
| 2016/0239265 A1 | 8/2016 | Duong et al. |
| 2017/0031866 A1 | 2/2017 | Nowatzki et al. |
| 2017/0083313 A1 | 3/2017 | Sankaralingam et al. |
| 2017/0092371 A1 | 3/2017 | Harari |
| 2017/0163543 A1 | 6/2017 | Wang et al. |
| 2017/0255414 A1 | 9/2017 | Gerhart et al. |
| 2017/0262383 A1 | 9/2017 | Lee et al. |
| 2017/0286169 A1 | 10/2017 | Ravindran et al. |
| 2017/0293766 A1 | 10/2017 | Schnjakin et al. |
| 2017/0315815 A1 | 11/2017 | Smith et al. |
| 2017/0315978 A1 | 11/2017 | Boucher et al. |
| 2017/0371836 A1 | 12/2017 | Langhammer |
| 2018/0081806 A1 | 3/2018 | Kothinti et al. |
| 2018/0081834 A1 | 3/2018 | Wang et al. |
| 2018/0088647 A1 | 3/2018 | Suryanarayanan et al. |
| 2018/0095728 A1 | 4/2018 | Hasenplaugh et al. |
| 2018/0113797 A1 | 4/2018 | Breslow et al. |
| 2018/0188983 A1 | 7/2018 | Fleming, Jr. et al. |
| 2018/0188997 A1 | 7/2018 | Fleming, Jr. et al. |
| 2018/0189063 A1 | 7/2018 | Fleming et al. |
| 2018/0189231 A1 | 7/2018 | Fleming, Jr. et al. |
| 2018/0189239 A1 | 7/2018 | Nurvitadhi et al. |
| 2018/0189675 A1 | 7/2018 | Nurvitadhi et al. |
| 2018/0218767 A1 | 8/2018 | Wolff |
| 2018/0248994 A1 | 8/2018 | Lee et al. |
| 2018/0285385 A1 | 10/2018 | West et al. |
| 2018/0293162 A1 | 10/2018 | Tsai et al. |
| 2018/0300181 A1 | 10/2018 | Hetzel et al. |
| 2018/0316760 A1 | 11/2018 | Chernin et al. |
| 2018/0332342 A1 | 11/2018 | Wu et al. |
| 2018/0365181 A1 | 12/2018 | Cottam et al. |
| 2018/0373509 A1 | 12/2018 | Zhang et al. |
| 2019/0004878 A1 | 1/2019 | Adler et al. |
| 2019/0004945 A1 | 1/2019 | Fleming et al. |
| 2019/0004955 A1* | 1/2019 | Adler ................. G06F 12/0862 |
| 2019/0004994 A1 | 1/2019 | Fleming et al. |
| 2019/0005161 A1 | 1/2019 | Fleming et al. |
| 2019/0007332 A1 | 1/2019 | Fleming et al. |
| 2019/0018815 A1 | 1/2019 | Fleming et al. |
| 2019/0042217 A1 | 2/2019 | Glossop et al. |
| 2019/0042218 A1 | 2/2019 | Zhang |
| 2019/0042513 A1* | 2/2019 | Fleming, Jr. ........ G06F 13/4027 |
| 2019/0095369 A1 | 3/2019 | Fleming et al. |
| 2019/0095383 A1 | 3/2019 | Fleming et al. |
| 2019/0101952 A1 | 4/2019 | Diamond et al. |
| 2019/0102179 A1 | 4/2019 | Fleming et al. |
| 2019/0102338 A1* | 4/2019 | Tang .................. G06F 15/7892 |
| 2019/0129720 A1 | 5/2019 | Ivanov |
| 2019/0205263 A1 | 7/2019 | Fleming et al. |
| 2019/0205269 A1 | 7/2019 | Fleming, Jr. et al. |
| 2019/0205284 A1 | 7/2019 | Fleming et al. |
| 2019/0303153 A1 | 10/2019 | Halpern et al. |
| 2019/0303168 A1 | 10/2019 | Fleming, Jr. et al. |
| 2019/0303263 A1 | 10/2019 | Fleming, Jr. et al. |
| 2019/0303297 A1 | 10/2019 | Fleming, Jr. et al. |
| 2019/0303312 A1 | 10/2019 | Ahsan et al. |

FOREIGN PATENT DOCUMENTS

| | | |
|---|---|---|
| RU | 2374684 C1 | 11/2009 |
| WO | 2007031696 A1 | 3/2007 |
| WO | 2014035449 A1 | 3/2014 |
| WO | 2015044696 A2 | 4/2015 |

OTHER PUBLICATIONS

Final Office Action from U.S. Appl. No. 15/396,049, dated Dec. 27, 2018, 38 pages.

Final Office Action from U.S. Appl. No. 15/721,809, dated Dec. 26, 2018, 46 pages.

Intel® Architecture, "Instruction Set Extensions and Future Features Programming Reference," 319433-034, May 2018, 145 pages.

Intel, "Intel® 64 and IA-32 Architectures Software Developer Manuals," Oct. 12, 2016, Updated—May 18, 2018, 19 pages.

Lewis D., et al., "The Stratix™ 10 Highly Pipelined FPGA Architecture," FPGA 2016, Altera, Feb. 23, 2016, 26 pages.

(56) References Cited

OTHER PUBLICATIONS

Lewis D., et al., "The Stratix™ 10 Highly Pipelined FPGA Architecture," FPGA'16, ACM, Feb. 21-23, 2016, pp. 159-168.
Non-Final Office Action from U.S. Appl. No. 15/640,543, dated Jan. 2, 2019, 46 pages.
Notice of Allowance from U.S. Appl. No. 15/283,295, dated Jan. 3, 2019, 7 pages.
Notice of Allowance from U.S. Appl. No. 15/640,534, dated Jan. 4, 2019, 37 pages.
Notice of Allowance from U.S. Appl. No. 15/396,395, dated Dec. 28, 2018, 36 pages.
Notice of Allowance from U.S. Appl. No. 15/719,281, dated Jan. 24, 2019, 36 pages.
Natalie E.J., et al., "On-Chip Networks," Synthesis Lectures on Computer Architecture, Morgan and Claypool Publishers, 2009, 148 pages.
Non-Final Office Action from U.S. Appl. No. 14/037,468, dated Oct. 19, 2017, 19 pages.
Non-Final Office Action from U.S. Appl. No. 15/396,402, dated Nov. 1, 2018, 22 pages.
Non-Final Office Action from U.S. Appl. No. 15/640,540, dated Oct. 26, 2018, 8 pages.
Non-Final Office Action from U.S. Appl. No. 15/396,038, dated Oct. 5, 2018, 38 pages.
Non-Final Office Action from U.S. Appl. No. 15/396,049, dated Jun. 15, 2018, 33 pages.
Non-Final Office Action from U.S. Appl. No. 15/859,473, dated Oct. 15, 2018, 10 pages.
Non-Final Office Action from U.S. Appl. No. 13/994,582, dated Mar. 23, 2017, 9 pages.
Non-Final Office Action from U.S. Appl. No. 13/994,582, dated Feb. 7, 2018, 12 pages.
Non-Final Office Action from U.S. Appl. No. 14/037,468, dated Aug. 27, 2015, 10 pages.
Non-Final Office Action from U.S. Appl. No. 14/037,468, dated Dec. 2, 2016, 16 pages.
Non-Final Office Action from U.S. Appl. No. 15/283,295, dated Apr. 30, 2018, 18 pages.
Non-Final Office Action from U.S. Appl. No. 15/396,395, dated Jul. 20, 2018, 18 pages.
Non-Final Office Action from U.S. Appl. No. 15/640,533, dated Apr. 19, 2018, 8 pages.
Non-Final Office Action from U.S. Appl. No. 15/640,534, dated Apr. 26, 2018, 8 pages.
Non-Final Office Action from U.S. Appl. No. 15/640,535, dated May 15, 2018, 13 pages.
Non-Final Office Action from U.S. Appl. No. 15/721,802, dated Mar. 8, 2018, 8 pages.
Non-Final Office Action from U.S. Appl. No. 15/721,809, dated Jun. 14, 2018, 12 pages.
Notice of Allowance from U.S. Appl. No. 15/721,802, dated Nov. 30, 2018, 30 pages.
Notice of Allowance from U.S. Appl. No. 15/640,533, dated Oct. 10, 2018, 8 pages.
Notice of Allowance from U.S. Appl. No. 15/640,535, dated Oct. 9, 2018, 7 pages.
Notice of Allowance from U.S. Appl. No. 15/640,538, dated Oct. 17, 2018, 10 pages.
Notice of Allowance from U.S. Appl. No. 13/994,582, dated Aug. 7, 2018, 8 pages.
Notice of Allowance from U.S. Appl. No. 14/037,468, dated Aug. 28, 2018, 9 pages.
Notice of Allowance from U.S. Appl. No. 15/640,534, dated Sep. 12, 2018, 7 pages.
Notice of Allowance from U.S. Appl. No. 15/721,802, dated Jul. 31, 2018, 6 pages.
Panesar G., et al., "Deterministic Parallel Processing," International Journal of Parallel Programming, Aug. 2006, vol. 34 (4), pp. 323-341.
Parashar A., et al., "Efficient Spatial Processing Element Control via Triggered Instructions," IEEE MICRO, vol. 34 (3), Mar. 10, 2014, pp. 120-137.
Parashar et al., "LEAP: A Virtual Platform Architecture for FPGAs," Intel Corporation, 2010, 6 pages.
Pellauer M., et al., "Efficient Control and Communication Paradigms for Coarse-Grained Spatial Architectures," Sep. 2015, ACM Transactions on Computer Systems, vol. 33 (3), Article 10, 32 pages.
Pellauer M., et al., "Soft Connections: Addressing the Hardware-Design Modularity Problem," 2009, In Proceedings of the 46th ACM/IEEE Design Automation Conference (DAC'09), pp. 276-281.
Raaijmakers S., "Run-Time Partial Reconfiguration on the Virtex-11 Pro," 2007, 69 pages.
Schmit H., et al., "PipeRench: A Virtualized Programmable Datapath in 0.18 Micron Technology," 2002, IEEE 2002 Custom Integrated Circuits Conference, pp. 63-66.
Shin T., et al., "Minimizing Buffer Requirements for Throughput Constrained Parallel Execution of Synchronous Dataflow Graph," ASPDAC '11 Proceedings of the 16th Asia and South Pacific Design Automation Conference, Jan. 2011, 6 pages.
Smith A., et al., "Dataflow Predication," 2006, In Proceedings of the 39th Annual IEEE/ACM International Symposium on Microarchitecture, 12 pages.
Swanson S., et al., "The WaveScalar Architecture," May 2007, ACM Transactions on Computer Systems, vol. 25 (2), Article No. 4, 35 pages.
Taylor M.B., et al., "The Raw Microprocessor: A Computational Fabric for Software Circuits and General-Purpose Programs," 2002, IEEE Micro, vol. 22 (2), pp. 25-35.
Truong D.N., et al., "A 167-Processor Computational Platform in 65 nm CMOS," IEEE Journal of Solid-State Circuits, Apr. 2009, vol. 44 (4), pp. 1130-1144.
Van De Geijn R.A., et aL, "SUMMA: Scalable Universal Matrix Multiplication Algorithm," 1997, 19 pages.
Vijayaraghavan M., et al., "Bounded Dataflow Networks and Latency-Insensitive Circuits," In Proceedings of the 7th IEEE/ACM International Conference on Formal Methods and Models for Codesign (MEMOCODE'09), Jul. 13-15, 2009, pp. 171-180.
Wikipedia, The Free Encyclopedia, "Priority encoder," https://en.wikipedia.org/w/index.php?Title=Priority_encoder&oldid=746908667, revised Oct. 30, 2016, 2 pages.
Wikipedia, The Free Encyclopedia, "Truth table," Logical Implication Table, https://enwikipedia.org/wiki/Truth_table#Logical_implication, revised Nov. 18, 2016, 1 page.
Wikipedia, "TRIPS Architecture," retrieved from https://en.wikipedia.org/wiki/TRIPS_architecture on Oct. 14, 2018, 4 pages.
Williston, Roving Reporter, Intel® Embedded Alliance, "Roving Reporter: FPGA + Intel® Atom TM =Configurable Processor," Dec. 2010, 5 pages.
Ye Z.A., et al., "CHIMAERA: A High-Performance Architecture with a Tightly-Coupled Reconfigurable Functional Unit," Proceedings of the 27th International Symposium on Computer Architecture (ISCA'00), 2000, 11 pages.
Yu Z., et al., "An Asynchronous Array of Simple Processors for DSP Applications," IEEE International Solid-State Circuits Conference, ISSCC'06, Feb. 8, 2006, 10 pages.
Abandonment from U.S. Appl. No. 15/640,544, dated Mar. 20, 2018, 2 pages.
Advisory Action from U.S. Appl. No. 14/037,468, dated Aug. 11, 2017, 3 pages.
Arvind., et al., "Executing a Program on the MIT Tagged-Token Dataflow Architecture," Mar. 1990, IEEE Transactions on Computers, vol. 39 (3), pp. 300-318.
Asanovic K., et al., "The Landscape of Parallel Computing Research: A View from Berkeley," Dec. 18, 2006, Electrical Engineering and Computer Sciences University of California at Berkeley, Technical Report No. UCB/EECS-2006-183, http://www.eecs.berkeley.edu/Pubs/TechRpts/2006/EECS-2006-183.html, 56 pages.

(56) References Cited

OTHER PUBLICATIONS

Ball T., "What's in a Region? or Computing Control Dependence Regions in Near-Linear Time for Reducible Control Flow," Dec. 1993, ACM Letters on Programming Languages and Systems, 2(1-4):1-16, 24 pages.

Bluespec, "Bluespec System Verilog Reference Guide," Jun. 16, 2010, Bluespec, Inc, 453 pages.

Bohm I., "Configurable Flow Accelerators," Mar. 3, 2016, XP055475839. retrieved from http://groups.inf.ed.ac.uk/pasta/rareas_cfa.html on Oct. 25, 2018, 3 pages.

Burger D., et al., "Scaling to the End of Silicon with EDGE Architectures," Jul. 12, 2004, vol. 37 (7), pp. 44-55.

Carloni L.P., et al., "The Theory of Latency Insensitive Design," Sep. 2001, IEEE Transactions on Computer-Aided Design of Integrated Circuits and Systems, vol. 20 (9), 18 pages.

Chandy K.M., et al., "Parallel Program Design: A Foundation," Addison-Wesley Publishing Company, Aug. 1988, 552 pages.

Compton K., et al., "Reconfigurable Computing: A Survey of Systems and Software," ACM Computing Surveys, Jun. 2002, vol. 34 (2), pp. 171-210.

Long J., et al., "Supporting Address Translation for Accelerator-Centric Architectures," Feb. 2017, IEEE International Symposium on High Performance Computer Architecture (HPCA), 12 pages.

"CORAL Collaboration: Oak Ridge, Argonne, Livermore," Benchmark codes, downloaded from https://asc.llnl.gov/CORAL-benchmarks/ on Nov. 16, 2018, 6 pages.

Dally W.J., et al., "Principles and Practices of Interconnection Networks," Morgan Kaufmann, 2003, 584 pages.

Dennis J.B., et al., "A Preliminary Architecture for a Basic Data-Flow Processor," 1975, In Proceedings of the 2nd Annual Symposium on Computer Architecture, pp. 125-131.

Dijkstra E.W., "Guarded Commands, Nondeterminacy and Formal Derivation of Programs," Aug. 1975, Communications of the ACM, vol. 18 (8), pp. 453-457.

Eisenhardt S., et al., "Optimizing Partial Reconfiguration of Multi-Context Architectures," Dec. 2008, 2008 International Conference on Reconfigurable Computing and FPGAs, 6 pages.

Emer J., et al., "Asim: A Performance Model Framework," Feb. 2002, Computer, vol. 35 (2), pp. 68-76.

Emer J.S., et al., "A Characterization of Processor Performance in the VAX-11/780," In Proceedings of the 11th Annual International Symposium on Computer Architecture, Jun. 1984, vol. 12 (3), pp. 274-283.

Extended European Search Report for Application No. 17207172.2, dated Oct. 1, 2018, 14 pages.

Extended European Search Report for Application No. 17210484.6, dated May 29, 2018, 8 pages.

Final Office Action from U.S. Appl. No. 13/994,582, dated Oct. 3, 2017, 11 pages.

Final Office Action from U.S. Appl. No. 14/037,468, dated Jun. 1, 2017, 18 pages.

Final Office Action from U.S. Appl. No. 14/037,468, dated Jun. 15, 2018, 7 pages.

Final Office Action from U.S. Appl. No. 14/037,468, dated May 16, 2016, 24 pages.

Final Office Action from U.S. Appl. No. 14/037,468, dated Oct. 5, 2016, 17 pages.

Fleming K., et al., "Leveraging Latency-Insensitivity to Ease Multiple FPGA Design," In Proceedings of the ACM/SIGDA International Symposium on Field Programmable Gate Arrays, FPGA'12, Feb. 22-24, 2012, pp. 175-184.

Fleming K.E., et al., "Leveraging Latency-Insensitive Channels to Achieve Scalable Reconfigurable Computation," Feb. 2013, 197 pages.

Fleming et al., U.S. Appl. No. 15/396,038, titled "Memory Ordering in Acceleration Hardware," 81 pages, filed Dec. 30, 2016.

Fleming et al., U.S. Appl. No. 15/396,049, titled "Runtime Address Disambiguation in Acceleration Hardware," filed Dec. 30, 2016, 97 pages.

Govindaraju V., et al., "Dynamically Specialized Datapaths for Energy Efficient Computing," 2011, In Proceedings of the 17th International Conference on High Performance Computer Architecture, 12 pages.

Hauser J.R., et al., "Garp: a MIPS processor with a Reconfigurable Coprocessor," Proceedings of the 5th Annual IEEE Symposium on Field-Programmable Custom Computing Machines, 1997, 10 pages.

Hoogerbrugge J., et al., "Transport-Triggering vs. Operation-Triggering," 1994, In Compiler Construction, Lecture Notes in Computer Science, vol. 786, Springer, pp. 435-449.

Ibrahim Eng., Walaa Abd El Aziz, "Binary Floating Point Fused Multiply Add Unit", Faculty of Engineering, Cairo University Giza, Egypt, 2012, 100 Pages.

International Preliminary Report on Patentability for Application No. PCT/RU2011/001049, dated Jul. 10, 2014, 6 pages.

International Search Report and Written Opinion for Application No. PCT/RU2011/001049, dated Sep. 20, 2012, 6 pages.

International Search Report and Written Opinion received for PCT Patent Application No. PCT/US2017/050663, dated Dec. 28, 2017, 14 pages.

Kalte H., et al., "Context Saving and Restoring for Multitasking in Reconfigurable Systems," International Conference on Field Programmable Logic and Applications, Aug. 2005, pp. 223-228.

Kim et al., "Energy-Efficient and High Performance CGRA-based Multi-Core Architecture," Journal of Semiconductor Technology and Science, vol. 14 (3), Jun. 2014, 16 pages.

King M., et al., "Automatic Generation of Hardware/Software Interfaces," Proceedings of the 17th International Conference on Architectural Support for Programming Languages and Operating Systems, ASPLOS'12, Mar. 2012, 12 pages.

Knuth D.E., et al., "Fast Pattern Matching in Strings," Jun. 1977, SIAM Journal of Computing, vol. 6(2), pp. 323-350.

Lee T., et al., "Hardware Context-Switch Methodology for Dynamically Partially Reconfigurable Systems," Journal of Information Science and Engineering, vol. 26, Jul. 2010, pp. 1289-1305.

Li S., et al., "Case Study: Computing Black-Scholes with Intel® Advanced Vector Extensions," Sep. 6, 2012, 20 pages.

Marquardt A., et al., "Speed and Area Trade-OFFS in Cluster-Based FPGA Architectures," Feb. 2000, IEEE Transactions on Very Large Scale Integration (VLSI) Systems, vol. 8 (1), 10 pages.

Matsen F.A., et al., "The CMU warp processor," In Supercomputers: Algorithms, Architectures, and Scientific computation, 1986, pp. 235-247.

McCalpin J.D., "Memory Bandwidth and Machine Balance in Current High Performance Computers," IEEE Computer Society Technical Committee on Computer Architecture (TCCA) Newsletter, Dec. 1995, 7 pages.

McCalpin J.D., "STREAM: Sustainable memory bandwidth in high performance computers," 2016, 4 pages.

Mei B., et al., "ADRES: An Architecture with Tightly Coupled VLIW Processor and Coarse-Grained Reconfigurable Matrix," 2003, In Proceedings of International Conference on Field-Programmable Logic and Applications, 10 pages.

Merrill D., et al., "Revisiting sorting for GPGPU stream architectures," In Proceedings of the 19th International Conference on Parallel Architectures and Compilation Techniques (PACT'10), Feb. 2010, 17 pages.

Mirsky E., at al., "MATRIX: A Reconfigurable Computing Architecture with Configurable Instruction Distribution and Deployable Resources," 1996, In Proceedings of the IEEE Symposium on FPGAs for Custom Computing Machines, pp. 157-166.

"Benchmarking DNN Processors," Nov. 2016, 2 pages.

Chen Y., et al., "Eyeriss: A Spacial Architecture for Energy-Efficient Dataflow for Convolutional Neural Networks," Jun. 2016, 53 pages.

Chen Y., et al., "Eyeriss: A Spacial Architecture for Energy-Efficient Dataflow for Convolutional Neural Networks," International Symposium on Computer Architecture (ISCA), Jun. 2016, pp. 367-379.

Chen Y., et al., "Eyeriss: An Energy-Efficient Reconfigurable Accelerator for Deep Convolutional Neural Networks," IEEE International Conference on Solid-State Circuits (ISSCC), Feb. 2016, pp. 262-264.

(56) References Cited

OTHER PUBLICATIONS

Chen Y., et al., "Eyeriss: An Energy-Efficient Reconfigurable Accelerator for Deep Convolutional Neural Networks," IEEE International Solid-State Circuits Conference, ISSCC, 2016, 9 pages.
Chen Y., et al., "Eyeriss: An Energy-Efficient Reconfigurable Accelerator for Deep Convolutional Neural Networks," IEEE International Solid-State Circuits Conference, ISSCC 2016, Digest of Technical Papers, retrieved from eyeriss-isscc2016, spreadsheet, http://eyeriss.mit.edu/benchmarking.html, 2016, 7 pages.
Chen Y., et al., "Eyeriss v2: A Flexible and High-Performance Accelerator for Emerging Deep Neural Networks," Jul. 2018, 14 pages.
Chen Y., et al., "Understanding the Limitations of Existing Energy-Efficient Design Approaches for Deep Neural Networks," Feb. 2018, 3 pages.
Chen Y., et al., "Using Dataflow to Optimize Energy Efficiency of Deep Neural Network Accelerators," IEEE Micro's Top Picks from the Computer Architecture Conferences, May/Jun. 2017, pp. 12-21.
Chen Y.H., et al., "Eyeriss: An Energy-Efficient Reconfigurable Accelerator for Deep Convolutional Neural Networks," 2016 IEEE International Solid-State Circuits Conference (ISSCC), Jan. 2016, 12 pages.
Corrected Notice of Allowance from U.S. Appl. No. 15/640,535, dated Feb. 13, 2019, 7 pages.
Emer J., et al., "Hardware Architectures for Deep Neural Networks at CICS/MTL Tutorial," Mar. 27, 2017, 258 pages.
Emer J., et al., "Hardware Architectures for Deep Neural Networks at ISCA Tutorial," Jun. 24, 2017, 290 pages.
Emer J., et al., "Hardware Architectures for Deep Neural Networks at MICRO-49 Tutorial," Oct. 16, 2016, 300 pages.
Emer J., et al., "Tutorial on Hardware Architectures for Deep Neural Networks," Nov. 2016, 8 pages.
Final Office Action from U.S. Appl. No. 15/396,038, dated Mar. 11, 2019, 36 pages.
Final Office Action from U.S. Appl. No. 15/859,473, dated Feb. 26, 2019, 13 pages.
"Full Day Tutorial Held at MICRO-49," Oct. 15-19, 2016, retrieved from https://www.microarch.org/micro49/ on Feb. 14, 2019, 2 pages.
Han S., et al., "Deep Compression: Compressing Deep Neural Networks with Pruning, Trained Quantization and Huffman Coding," ICLR, Feb. 2016, 14 pages.
Han S., et al., "EIE: Efficient Inference Engine on Compressed Deep Neural Network," 43rd ACM/IEEE Annual International Symposium on Computer Architecture, ISCA 2016, Seoul, South Korea, Jun. 18-22, 2016, retrieved from eie-isca2016, spreadsheet, http://eyeriss.mit.edu/benchmarking.html, 7 pages.
Han S., et al., "EIE: Efficient Inference Engine on Compressed Deep Neural Network," ISCA, May 2016, 12 pages.
Hsin Y., "Building Energy-Efficient Accelerators for Deep Learning," at Deep Learning Summit Boston, May 2016, retrieved from https://www.re-work.co/events/deep-learning-boston-2016 on Feb. 14, 2019, 10 pages.
Hsin Y., "Deep Learning & Artificial Intelligence," at GPU Technology Conference, Mar. 26-29, 2018, retrieved from http://www.gputechconf.com/resources/poster-gallery/2016/deep-learning-artificial-intelligence on Feb. 14, 2019, 4 pages.
Non-Final Office Action from U.S. Appl. No. 15/719,285, dated Feb. 25, 2019, 47 pages.
Non-Final Office Action from U.S. Appl. No. 15/855,964, dated Dec. 13, 2018, 13 pages.
Notice of Allowance from U.S. Appl. No. 14/037,468, dated Mar. 7, 2019, 51 pages.
Notice of Allowance from U.S. Appl. No. 15/640,533, dated Feb. 14, 2019, 43 pages.
Notice of Allowance from U.S. Appl. No. 15/640,535, dated Feb. 6, 2019, 38 pages.
Notice of Allowance from U.S. Appl. No. 15/640,540, dated Mar. 14, 2019, 39 pages.
Notice of Allowance from U.S. Appl. No. 15/721,802, dated Mar. 18, 2019, 23 pages.
Suleiman A., et al., "Towards Closing the Energy Gap Between HOG and CNN Features for Embedded Vision," IEEE International Symposium of Circuits and Systems (ISCAS), May 2017, 4 pages.
Sze V., "Designing Efficient Deep Learning Systems," in Mountain View, CA, Mar. 27-28, 2019, retrieved from https://professional.mit.edu/programs/short-programs/designing-efficient-deep-learning-systems-OC on Feb. 14, 2019, 2 pages.
Sze V., et al., "Efficient Processing of Deep Neural Networks: A Tutorial and Survey," Mar. 2017, 32 pages.
Sze V., et al., "Efficient Processing of Deep Neural Networks: A Tutorial and Survey," Proceedings of the IEEE, Dec. 2017, vol. 105 (12), pp. 2295-2329.
Sze V., et al., "Hardware for Machine Learning: Challenges and Opportunities," IEEE Custom Integrated Circuits Conference (CICC), Oct. 2017, 9 pages.
"Tutorial at MICRO-50," The 50th Annual IEEE/ACM International Symposium on Microarchitecture, Oct. 14-18, 2017, retrieved from https://www.microarch.org/micro50/ on Feb. 14, 2019, 3 pages.
"Tutorial on Hardware Architectures for Deep Neural Networks at ISCA 2017," The 44th International Symposium on Computer Architecture, Jun. 24-28, 2017, retrieved from http://isca17.ece.utoronto.ca/doku.php on Feb. 14, 2019, 2 pages.
Yang T., et al., "Deep Neural Network Energy Estimation Tool," IEEE Conference on Computer Vision and Pattern Recognition CVPR 2017, Jul. 21-26, 2017, retrieved from https://energyestimation.mit.edu/ on Feb. 21, 2019, 4 pages.
Yang T., et al., "NetAdapt: Platform-Aware Neural Network Adaptation for Mobile Applications," European Conference on Computer Vision (ECCV), Version 1, Apr. 9, 2018, 16 pages.
Yang T., et al ., "A Method to Estimate the Energy Consumption of Deep Neural Networks," Asilomar Conference on Signals, Systems and Computers, Oct. 2017, 5 pages.
Yang T., et al ., "Designing Energy-Efficient Convolutional Neural Networks using Energy-Aware Pruning," IEEE Conference on Computer Vision and Pattern Recognition (CVPR), Jul. 2017, 9 pages.
Yang T., et al., "Designing Energy-Efficient Convolutional Neural Networks using Energy-Aware Pruning," IEEE Conference on Computer Vision and Pattern Recognition CVPR 2017, Jul. 21-26, 2017, retrieved from http://www.rle.mit.edu/eems/wp-content/uploads/2017/07/2017_cvpr_poster.pdf on Feb. 21, 2019, 1 page.
Yang T., et al., "Designing Energy-Efficient Convolutional Neural Networks using Energy-Aware Pruning," IEEE CVPR, Mar. 2017, 6 pages.
Yang T., et al., "NetAdapt: Platform-Aware Neural Network Adaptation for Mobile Applications," European Conference on Computer Vision (ECCV), Version 2, Sep. 28, 2018, 16 pages.
Canis A., et al., "LegUp: An Open-Source High-Level Synthesis Tool for FPGA-Based Processor/Accelerator Systems," ACM Transactions on Embedded Computing Systems, vol. 1(1), Article 1, Jul. 2012, 25 pages.
Corrected Notice of Allowance from U.S. Appl. No. 14/037,468, dated Apr. 1, 2019, 10 pages.
Corrected Notice of Allowance from U.S. Appl. No. 14/037,468, dated May 29, 2019, 12 pages.
Corrected Notice of Allowance from U.S. Appl. No. 15/396,395, dated Jun. 7, 2019, 8 pages.
Corrected Notice of Allowance from U.S. Appl. No. 15/640,534, dated Apr. 26, 2019, 21 pages.
Corrected Notice of Allowance from U.S. Appl. No. 15/721,802, dated Jun. 12, 2019, 11 pages.
Corrected Notice of Allowance from U.S. Appl. No. 15/855,964, dated Jun. 25, 2019, 7 pages.
Corrected Notice of Allowance from U.S. Appl. No. 15/640,534, dated Jul. 2, 2019, 12 pages.
Final Office Action from U.S. Appl. No. 15/396,402, dated May 17, 2019, 85 pages.
Govindaraju et al.,"DySER: Unifying Functionality and Parallelism Specialization for Energy-Efficient Computing," Published by the IEEE Computer Society, Sep./Oct. 2012, pp. 38-51.
International Preliminary Report on Patentability for Application No. PCT/US2017/050663, dated Apr. 11, 2019, 11 pages.

(56) References Cited

OTHER PUBLICATIONS

International Search Report and Written Opinion for Application No. PCT/US2019/020243, dated Jun. 19, 2019, 11 pages.
International Search Report and Written Opinion for Application No. PCT/US2019/020270, dated Jun. 14, 2019, 11 pages.
International Search Report and Written Opinion for Application No. PCT/US2019/019965, dated Jun. 13, 2019, 9 pages.
International Search Report and Written Opinion for Application No. PCT/US2019/020287, dated Jun. 12, 2019, 9 pages.
Non-Final Office Action from U.S. Appl. No. 15/640,542, dated Apr. 2, 2019, 59 pages.
Notice of Allowance from U.S. Appl. No. 15/640,534, dated May 31, 2019, 9 pages.
Notice of Allowance from U.S. Appl. No. 15/640,535, dated Jun. 21, 2019, 8 pages.
Notice of Allowance from U.S. Appl. No. 15/283,295, dated Apr. 10, 2019, 49 pages.
Notice of Allowance from U.S. Appl. No. 15/396,395, dated May 15, 2019, 23 pages.
Notice of Allowance from U.S. Appl. No. 15/640,533, dated May 22, 2019, 19 pages.
Notice of Allowance from U.S. Appl. No. 15/640,534, dated Apr. 2, 2019, 9 pages.
Notice of Allowance from U.S. Appl. No. 15/640,535, dated May 24, 2019, 19 pages.
Notice of Allowance from U.S. Appl. No. 15/721,809, dated Jun. 6, 2019, 32 pages.
Notice of Allowance from U.S. Appl. No. 15/855,964, dated Apr. 24, 2019, 15 pages.
Notice of Allowance from U.S. Appl. No. 15/859,454, dated Jun. 7, 2019, 55 pages.
Notice of Allowance from U.S. Appl. No. 15/859,466, dated May 17, 2019, 56 pages.
Notice of Allowance from U.S. Appl. No. 16/024,801, dated Jun. 5, 2019, 64 pages.
Notice of Allowance from U.S. Appl. No. 15/396,049, dated Jul. 2, 2019, 70 pages.
Notice of Allowance from U.S. Appl. No. 15/640,538, dated Jul. 3, 2019, 76 pages.
Notice of Allowance from U.S. Appl. No. 15/640,540, dated Jul. 1, 2019, 36 pages.
Smith A., et al., "Compiling for EDGE Architectures," Appears in the Proceedings of the 4th International Symposium on code Generation and Optimization, 2006, 11 pages.
"The LLVM Compiler Infrastructure," retrieved from http://www.llvm.org/, on May 1, 2018, maintained by the llvm-admin team, 4 pages.
Final office action from U.S. Appl. No. 15/640,542, dated Aug. 7, 2019, 46 pages.
International Search Report and Written Opinion for Application No. PCT/US2019/034358, dated Sep. 18, 2019, 10 pages.
International Search Report and Written Opinion for Application No. PCT/US2019/034400, dated Sep. 19, 2019, 11 pages.
International Search Report and Written Opinion for Application No. PCT/US2019/034433, dated Sep. 20, 2019, 10 pages.
International Search Report and Written Opinion for Application No. PCT/US2019/034441, dated Sep. 23, 2019, 10 pages.
Non-Final office action from U.S. Appl. No. 16/443,717, dated Sep. 30, 2019, 25 pages.
Non-Final office action from U.S. Appl. No. 16/236,423, dated Aug. 21, 2019, 75 pages.
Notice of Allowance from U.S. Appl. No. 15/396,049, dated Oct. 16, 2019, 7 pages.
Notice of Allowance from U.S. Appl. No. 15/396,395, dated Aug. 7, 2019, 12 pages.
Notice of Allowance from U.S. Appl. No. 15/640,535, dated Aug. 21, 2019, 13 pages.
Notice of Allowance from U.S. Appl. No. 15/396,038, dated Oct. 2, 2019, 62 pages.
Notice of Allowance from U.S. Appl. No. 15/396,402, dated Sep. 16, 2019, 15 pages.
Notice of Allowance from U.S. Appl. No. 15/640,533, dated Sep. 12, 2019, 16 pages.
Notice of Allowance from U.S. Appl. No. 15/721,809, dated Sep. 5, 2019, 8 pages.
Notice of Allowance from U.S. Appl. No. 15/859,454, dated Sep. 12, 2019, 8 pages.
Notice of Allowance from U.S. Appl. No. 15/859,473, dated Sep. 24, 2019, 65 pages.
Notice of Allowance from U.S. Appl. No. 15/944,761, dated Sep. 12, 2019, 75 pages.
Notice of Allowance from U.S. Appl. No. 16/024,801, dated Sep. 12, 2019, 10 pages.
Notice of Allowance from U.S. Appl. No. 15/640,538, dated Sep. 20, 2019, 8 pages.
Notice of Allowance from U.S. Appl. No. 15/640,543, dated Jul. 29, 2019, 43 pages.
Notice of Allowance from U.S. Appl. No. 15/719,285, dated Jul. 23, 2019, 26 pages.

* cited by examiner

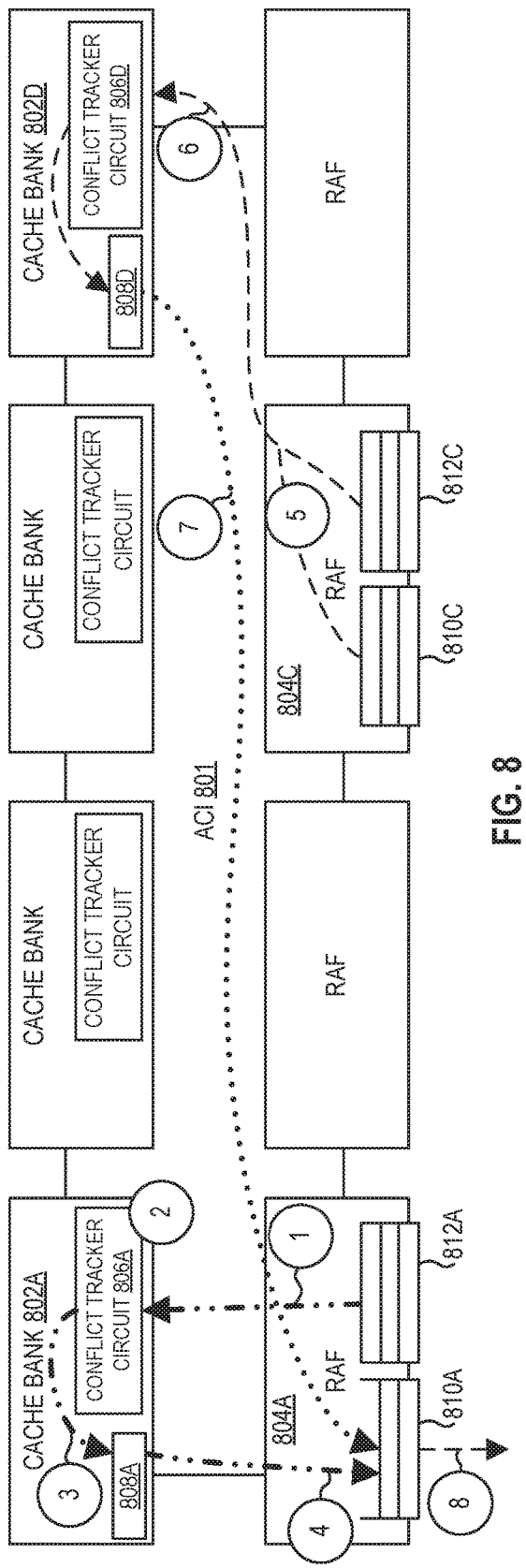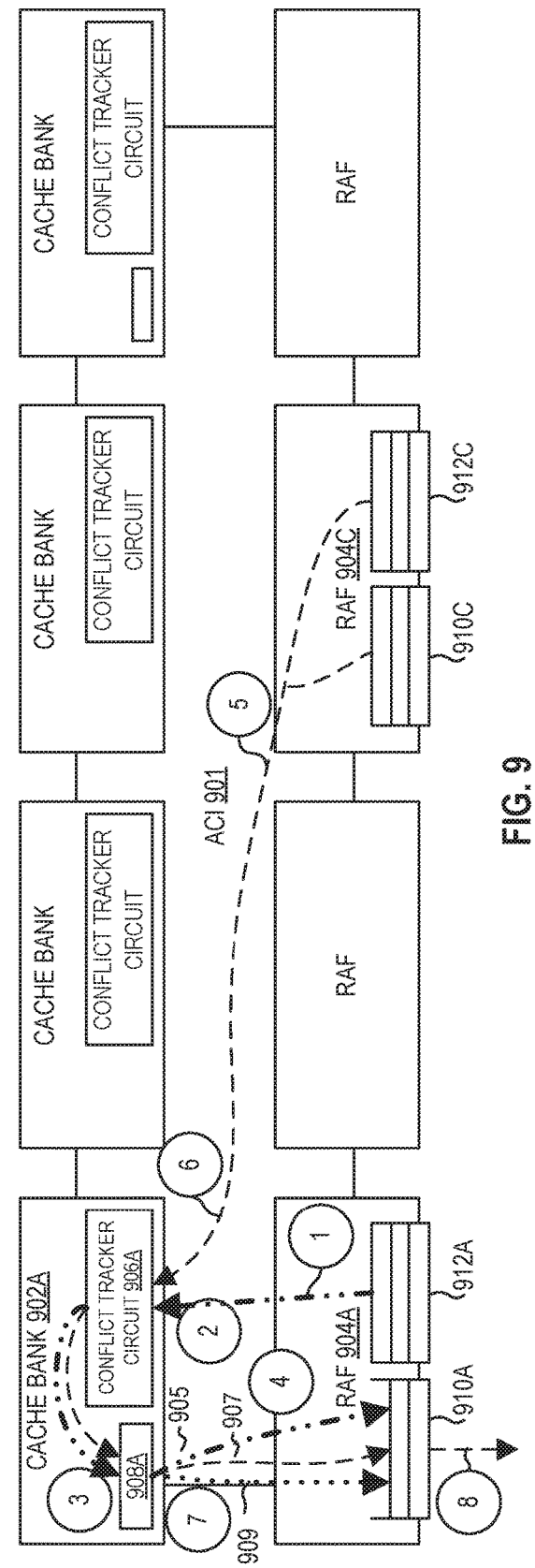

1300

```
┌─────────────────────────────────────────────────────────────────┐
│ RECEIVING, WITH A MEMORY INTERFACE CIRCUIT, MEMORY REQUESTS     │
│ FROM A SPATIAL ARRAY OF PROCESSING ELEMENTS FOR DATA STORED IN  │
│ A PLURALITY OF CACHE BANKS HAVING A HAZARD DETECTION CIRCUIT IN │
│ EACH OF THE PLURALITY OF CACHE BANKS 1302                       │
└─────────────────────────────────────────────────────────────────┘
                                 │
                                 ▼
┌─────────────────────────────────────────────────────────────────┐
│ MARKING AN ADDRESS FOR TRACKING OF OTHER MEMORY REQUESTS TO     │
│ THE ADDRESS WITH A FIRST HAZARD DETECTION CIRCUIT FOR A         │
│ SPECULATIVE MEMORY LOAD REQUEST FROM THE MEMORY INTERFACE       │
│ CIRCUIT THAT IS MARKED WITH A DYNAMIC DATA DEPENDENCY TO THE    │
│ ADDRESS WITHIN A FIRST CACHE BANK OF THE FIRST HAZARD DETECTION │
│ CIRCUIT 1304                                                    │
└─────────────────────────────────────────────────────────────────┘
                                 │
                                 ▼
┌─────────────────────────────────────────────────────────────────┐
│ STORING DATA FROM THE ADDRESS IN SPECULATIVE COMPLETION         │
│ STORAGE 1306                                                    │
└─────────────────────────────────────────────────────────────────┘
                                 │
                                 ▼
┌─────────────────────────────────────────────────────────────────┐
│ SENDING THE DATA FROM THE SPECULATIVE COMPLETION STORAGE TO     │
│ THE SPATIAL ARRAY OF PROCESSING ELEMENTS WHEN A MEMORY          │
│ DEPENDENCY TOKEN IS RECEIVED FOR THE SPECULATIVE MEMORY LOAD    │
│ REQUEST 1308                                                    │
└─────────────────────────────────────────────────────────────────┘
```

FIG. 13

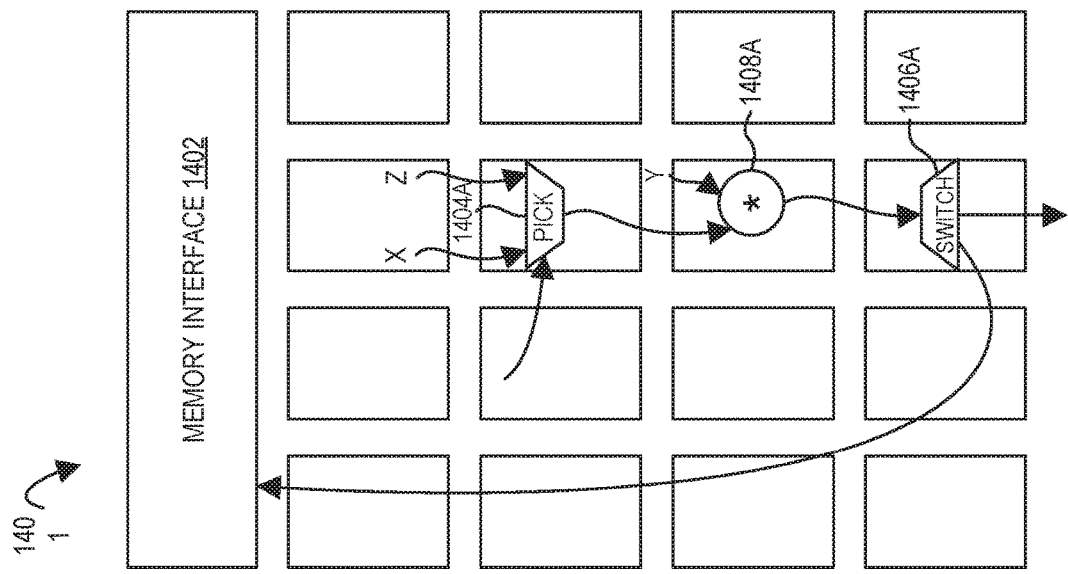
CONFIGURED CSA
FIG. 14C
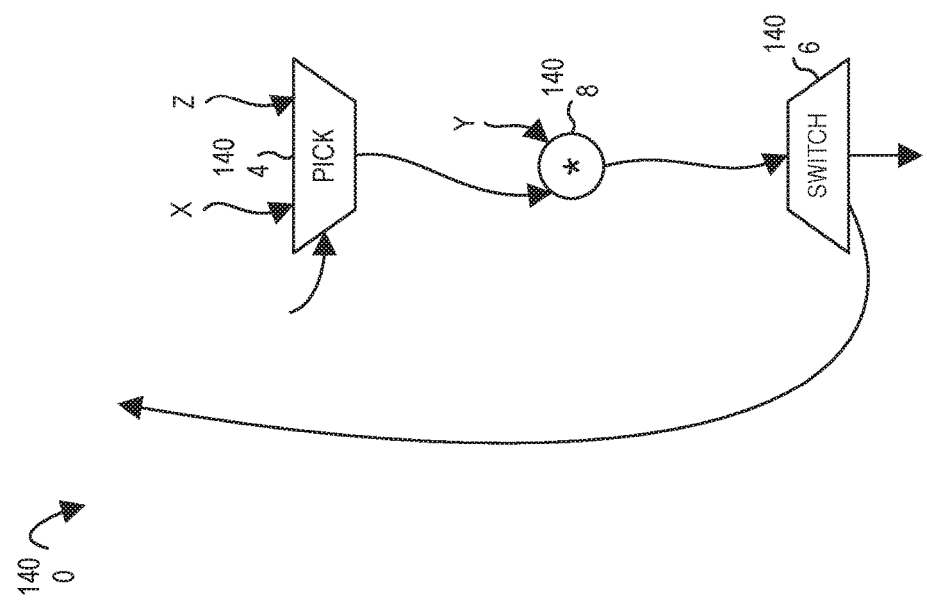
DATAFLOW GRAPH
FIG. 14B
```
void func (int x,y) {
  x = x * y;
  return x;
}
```
PROGRAM SOURCE
FIG. 14A

```
void memcpy(void *A, void *B, int N) {
    for(int index = 0; index < N; index++) {
        a[index] = b[index]
    }
}
```

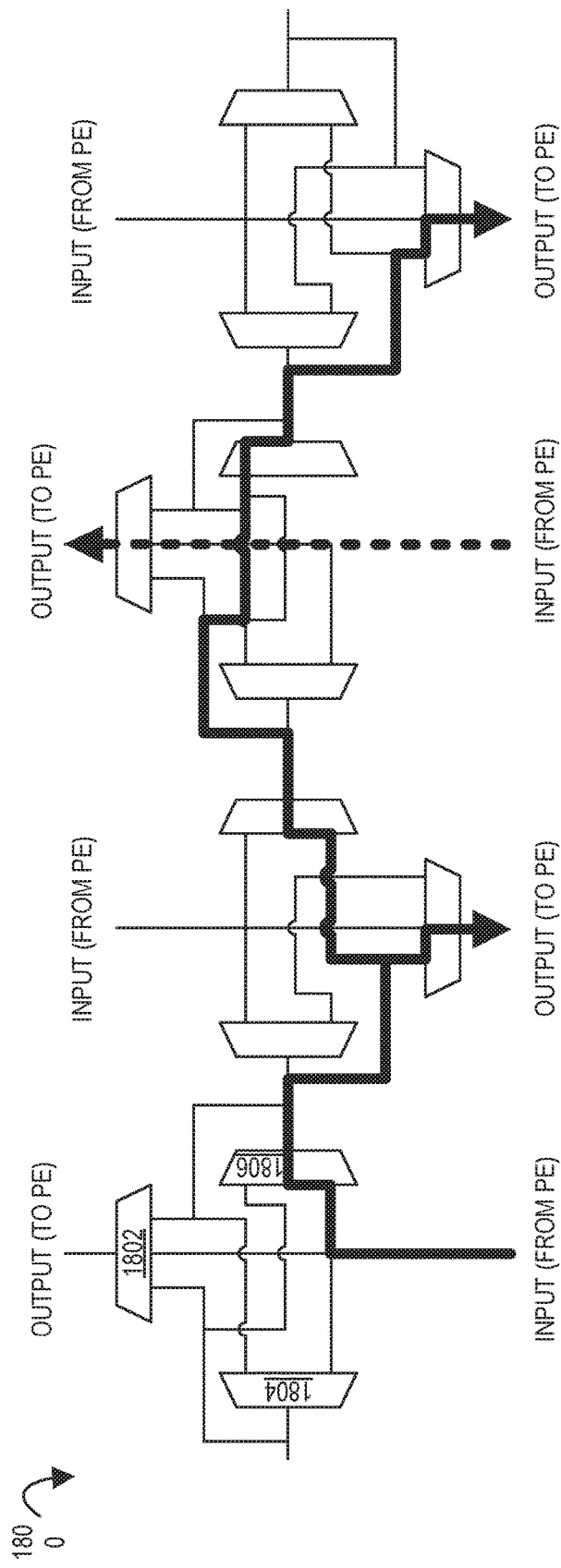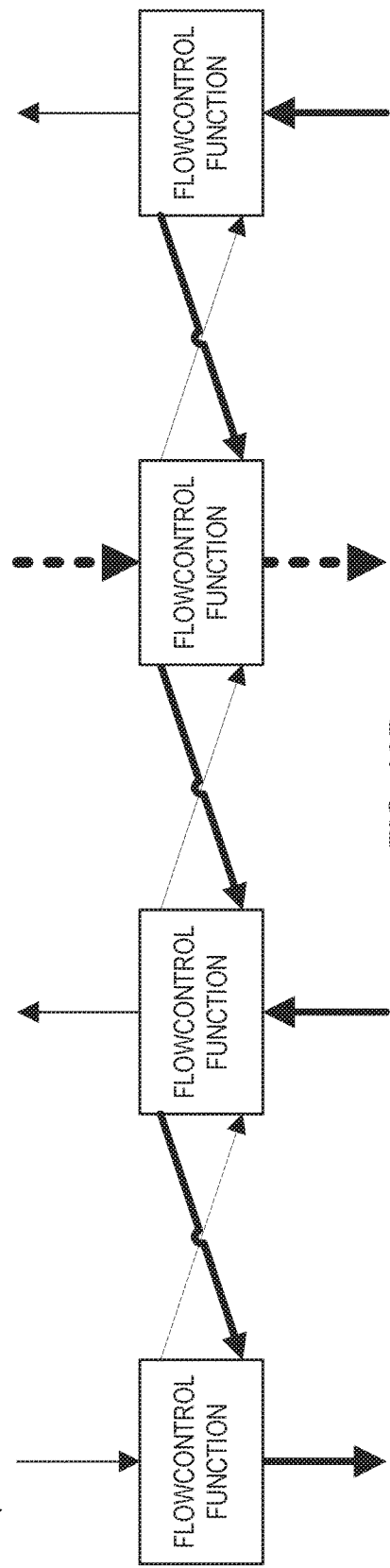
FIG. 18A
FIG. 18B

```
ld32 Rdata, Raddr
ld32 Rdata2, Raddr2
mul32 Rv0, Rdata, 17
mul32 Rv1, Rdata2, Rdata2
add32 Rres, Rv0, Rv1
st32 Raddr, Rres
ld32 Rdata3, Raddr3
```

SEQUENTIAL ASSEMBLY 2802

FIG. 28A

```
.lic .i32 data;  .lic .i64 addr;
.lic .i32 data2; .lic .i64 addr2;
.lic .i32 data3; .lic .i64 addr3;
.lic .i32 v0;    .lic .i32 v1;    .lic .i32 res
ld32 data, addr
ld32 data2, addr2
mul32 v0, data, 17
mul32 v1, data2, data2
add32 res, v0, v1
st32 addr, res, done, %ign
ld32 data3, addr3, %ign, done
```

DATAFLOW ASSEMBLY 2804

FIG. 28B

DATAFLOW GRAPH 2806

```
if (i < n)
    y = x + a;
else
    y = i + x;
```

C SOURCE CODE 2902

FIG. 29A

```
.lic .il test
cmplts32 test, i, n
switch32 %ign, aT, test, a
switch32 iF, %ign, test, i
switch32 xF, xT, test, x
add32 yT, xT, aT      # True path
add32 yF, iF, xF      # False path
pick32 y, test, yF, yT
add32 z, y, 1
```

DATAFLOW ASSEMBLY 2904

FIG. 29B

DATAFLOW GRAPH 2906

```
int i = 0;
int sum = 0;
do {
    sum = sum + i;
    i = i + 1;
} while (i < n);
return sum;
```

C SOURCE CODE 3002

FIG. 30A

```
# Loop control channels.
.lic .il picker
.lic .il switcher

# Offset values in picker with an initial 0.
.curr picker; .value 0; .avail 0

# Generate value of i for each loop iteration
pick32 top_i, picker, init_i, loopback_i
add32 bottom_i, top_i, 1
switch32 %ign, loopback_i, switcher, bottom_i

# Repeat value of n for each execution of the loop.
pick32 loop_n, picker, init_n, loopback_n
switch32 %ign, loopback_n, switcher, loop_n

# Comparison at the bottom of the loop.
cmplts32 switcher, bottom_i, loop_n
movi picker, switcher

# Add up the sum around the loop iteration.
pick32 top_sum, picker, init_sum, loopback_sum
add32 bottom_sum, top_sum, top_i
switch32 out_sum, loopback_sum, switcher, bottom_sum
```

DATAFLOW ASSEMBLY 3004

| | INPUT QUEUE ID | OUTPUT QUEUE ID | DEPENDENCY QUEUE ID | MEMOP |
|---|---|---|---|---|
| LOGICAL | CHANNEL 0 5210 | COMPL. CHAN. 1 5220 | DEPLN: CHANNEL B0 DEPOUT: COUNTER C0 5230 | LOAD 5240 |
| BINARY (PROVISIONAL) | 001 | 010 | 1000/0001 | 00 |

| LOGICAL | INPUT QUEUE ID | OUTPUT QUEUE ID | DEPENDENCY QUEUE ID | OPERATION TYPE |
|---|---|---|---|---|
| LOGICAL | CHANNEL 0 | COMPL. CHAN. 1 | DEPIN: COUNTER C0<br>DEPOUT: COUNTER C1 | LOAD ← 5602 |
| LOGICAL | CHANNEL 1<br>CHANNEL 2 | NONE | DEPIN: COUNTER C1<br>DEPOUT: COUNTER C0 | STORE ← 5604 |

FIG. 56A

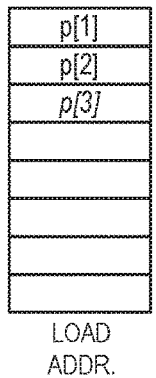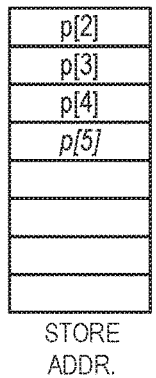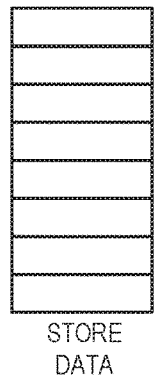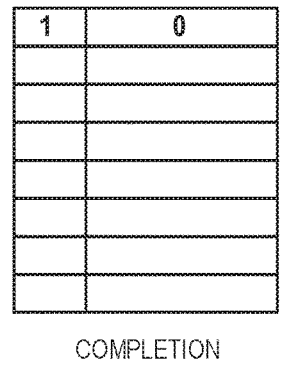
FIG. 57D
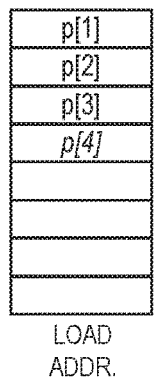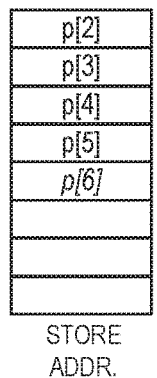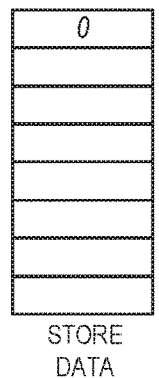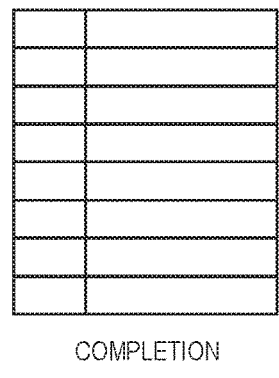
FIG. 57E
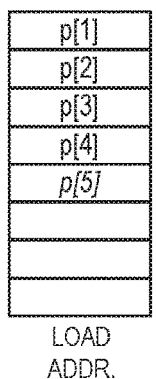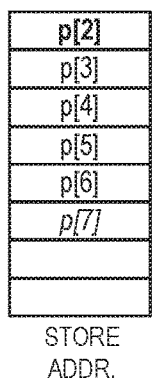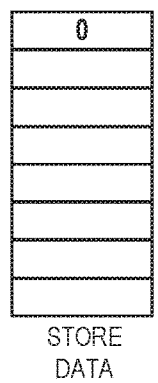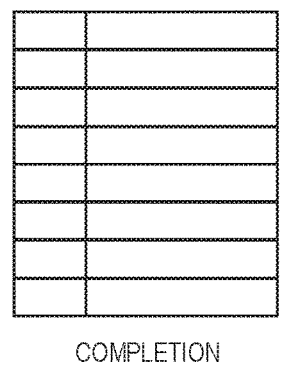
FIG. 57F

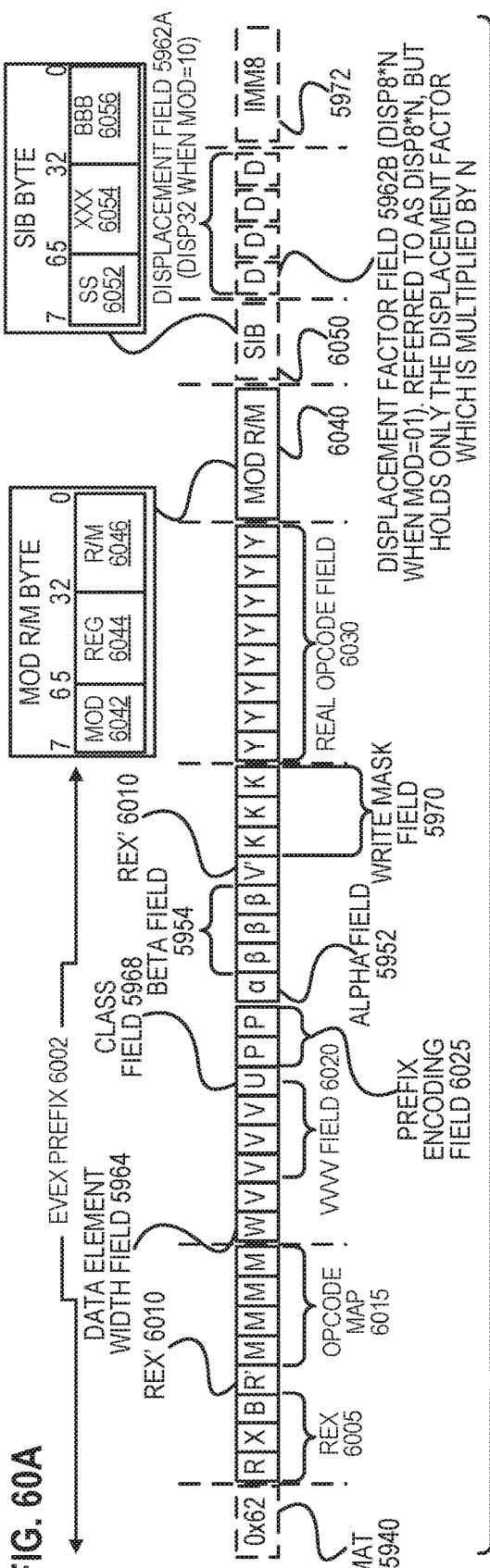
FIG. 60A
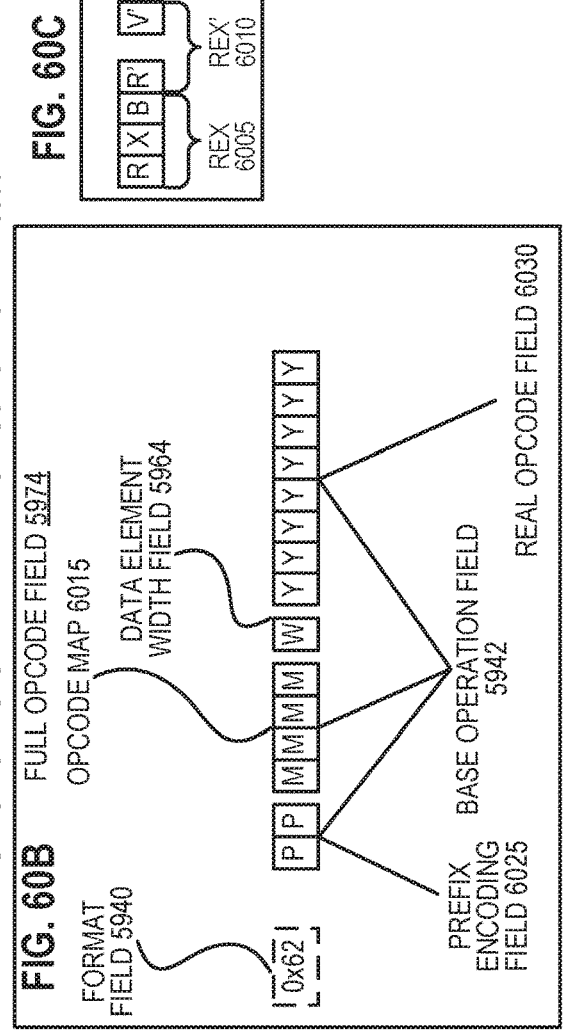
FIG. 60B
FIG. 60C

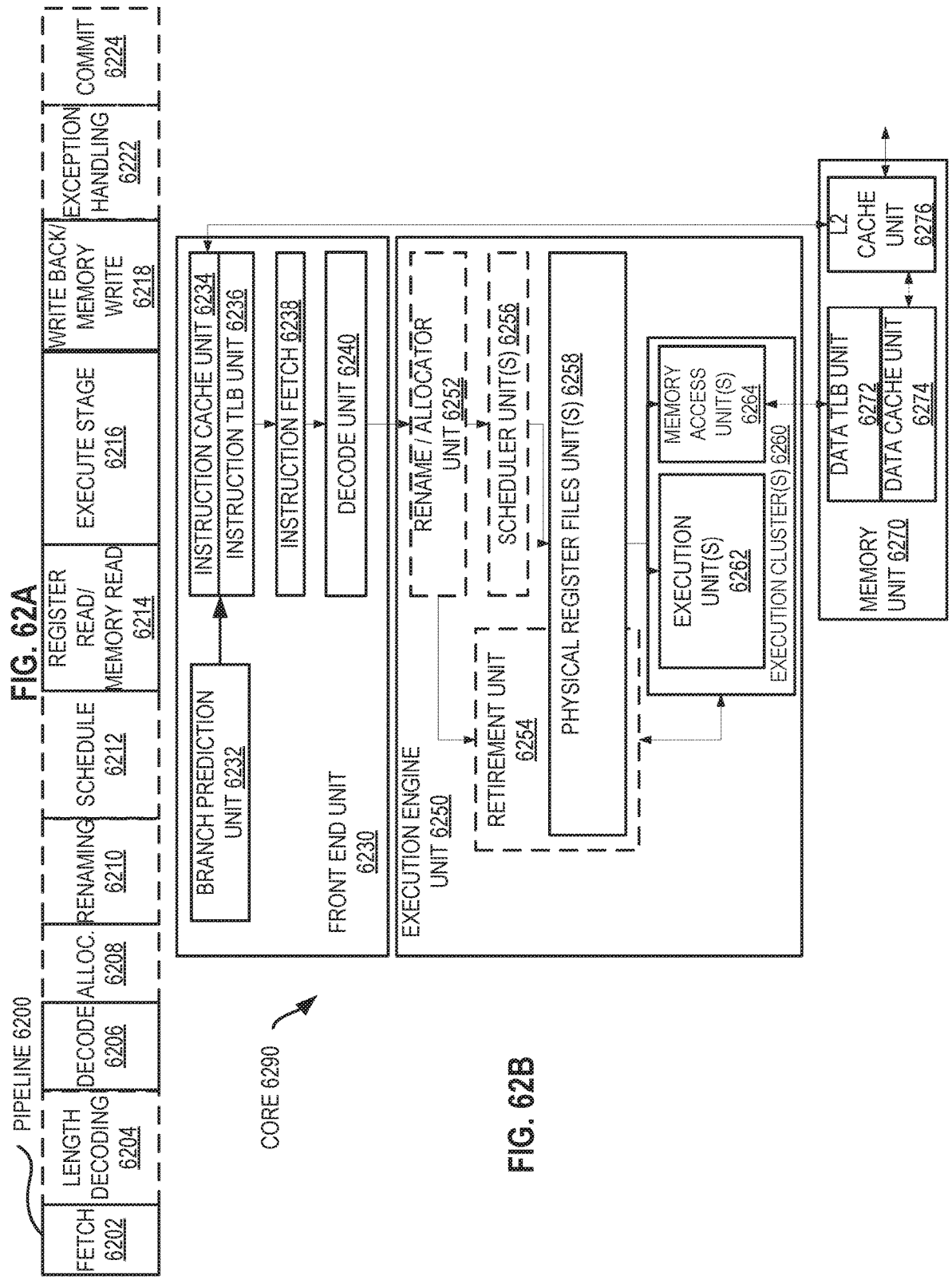

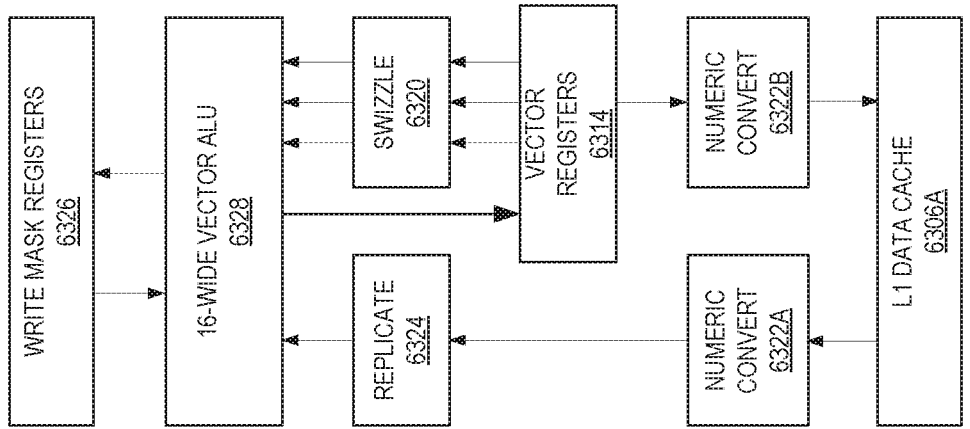
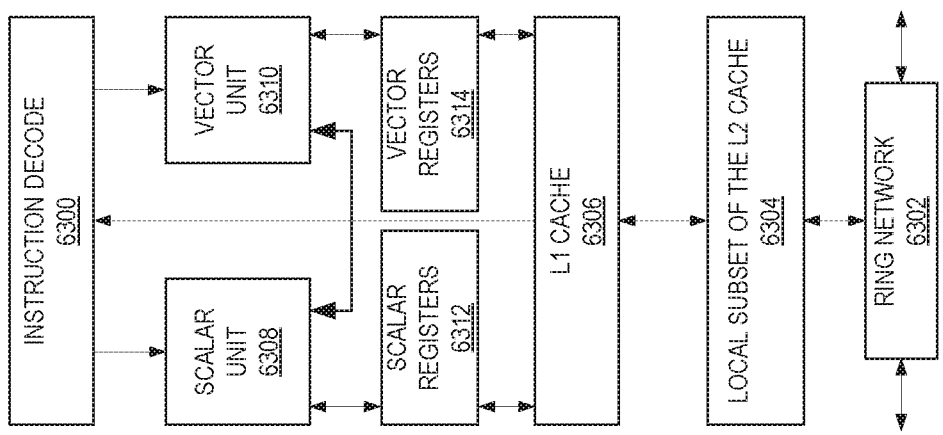

MEMORY CIRCUITS AND METHODS FOR DISTRIBUTED MEMORY HAZARD DETECTION AND ERROR RECOVERY

STATEMENT REGARDING FEDERALLY SPONSORED RESEARCH AND DEVELOPMENT

This invention was made with Government support under contract number H98230-13-D-0124 awarded by the Department of Defense. The Government has certain rights in this invention.

TECHNICAL FIELD

The disclosure relates generally to electronics, and, more specifically, an embodiment of the disclosure relates to a hazard detection circuit.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 8 illustrates a profitable speculation in a plurality of memory interface circuits (e.g., request address file (RAF) circuits) coupled to a plurality of cache banks according to embodiments of the disclosure.

FIG. 9 illustrates an unprofitable speculation (misspeculation) in a plurality of memory interface circuits (e.g., request address file (RAF) circuits) coupled to a plurality of cache banks according to embodiments of the disclosure.

FIG. 13 illustrates a flow diagram according to embodiments of the disclosure.

FIG. 14A illustrates a program source according to embodiments of the disclosure.

FIG. 14B illustrates a dataflow graph for the program source of FIG. 14A according to embodiments of the disclosure.

FIG. 14C illustrates an accelerator with a plurality of processing elements configured to execute the dataflow graph of FIG. 14B according to embodiments of the disclosure.

FIG. 16 illustrates a program source according to embodiments of the disclosure.

FIG. 18A illustrates a configurable data path network according to embodiments of the disclosure.

FIG. 18B illustrates a configurable flow control path network according to embodiments of the disclosure.

FIG. 28A illustrates sequential assembly code according to embodiments of the disclosure.

FIG. 28B illustrates dataflow assembly code for the sequential assembly code of FIG. 28A according to embodiments of the disclosure.

FIG. 29A illustrates C source code according to embodiments of the disclosure.

FIG. 29B illustrates dataflow assembly code for the C source code of FIG. 29A according to embodiments of the disclosure.

FIG. 30A illustrates C source code according to embodiments of the disclosure.

FIG. 30B illustrates dataflow assembly code for the C source code of FIG. 30A according to embodiments of the disclosure.

FIG. 54 is a block diagram of an exemplary load operation, both logical and in binary according to embodiments of the disclosure.

FIG. 56A is a block diagram of exemplary memory arguments for a load operation and for a store operation according to embodiments of the disclosure.

FIGS. 57A, 57B, 57C, 57D, 57E, 57F, 57G, and 57H are block diagrams illustrating functional flow of load operations and store operations for an exemplary program through queues of the microarchitecture of FIG. 57B according to embodiments of the disclosure.

FIG. 60A is a block diagram illustrating fields for the generic vector friendly instruction formats in FIGS. 59A and 59B according to embodiments of the disclosure.

FIG. 60B is a block diagram illustrating the fields of the specific vector friendly instruction format in FIG. 60A that make up a full opcode field according to one embodiment of the disclosure.

FIG. 60C is a block diagram illustrating the fields of the specific vector friendly instruction format in FIG. 60A that make up a register index field according to one embodiment of the disclosure.

FIG. 62A is a block diagram illustrating both an exemplary in-order pipeline and an exemplary register renaming, out-of-order issue/execution pipeline according to embodiments of the disclosure.

FIG. 62B is a block diagram illustrating both an exemplary embodiment of an in-order architecture core and an exemplary register renaming, out-of-order issue/execution architecture core to be included in a processor according to embodiments of the disclosure.

FIG. 63A is a block diagram of a single processor core, along with its connection to the on-die interconnect network and with its local subset of the Level 2 (L2) cache, according to embodiments of the disclosure.

FIG. 63B is an expanded view of part of the processor core in FIG. 63A according to embodiments of the disclosure.

DETAILED DESCRIPTION

Figure 1:
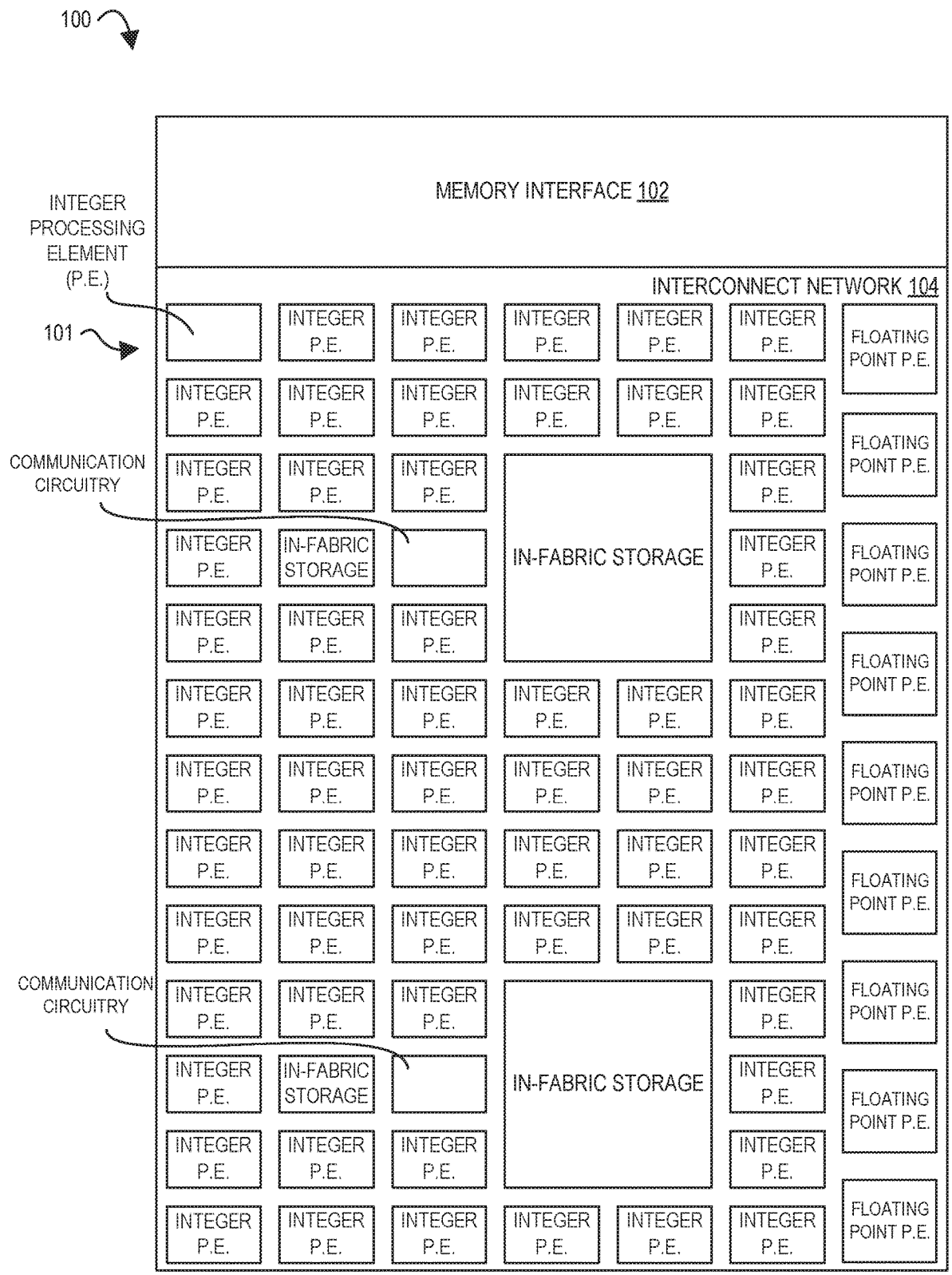
FIG. 1 illustrates an accelerator tile according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. One non-limiting example of an operation is a blend operation to input a plurality of vectors elements and output a vector with a blended plurality of elements. In certain embodiments, multiple operations are accomplished with the execution of a single instruction.

Exascale performance, e.g., as defined by the Department of Energy, may require system-level floating point performance to exceed $10^{18}$ floating point operations per second (exaFLOPs) or more within a given (e.g., 20 MW) power budget. Certain embodiments herein are directed to a spatial array of processing elements (e.g., a configurable spatial accelerator (CSA)) that targets high performance computing (HPC), for example, of a processor. Certain embodiments herein of a spatial array of processing elements (e.g., a CSA) target the direct execution of a dataflow graph (or graphs) to yield a computationally dense yet energy-efficient spatial microarchitecture which far exceeds conventional roadmap architectures.

Certain embodiments of spatial architectures (e.g., the spatial arrays disclosed herein) are an energy efficient and high performance way to accelerate user applications. In certain embodiments, a spatial array (e.g., a plurality of processing elements coupled together by a (e.g., circuit switched) (e.g., interconnect) network) is to accelerate an application, for example, to execute some region of a single stream program (e.g., faster than a core of a processor). Certain embodiments of spatial architectures herein facilitate the mapping of sequential programs to spatial arrays. Certain embodiments herein provide an improved spatial memory microarchitecture which automatically extracts parallelism in the context of programs with memory dependencies. Certain embodiments herein including detecting (e.g., checking) hazards at cache banks, e.g., which is different than typical memory disambiguation schemes. Certain embodiments herein allow for compiling legacy sequential codes to parallel architectures. Certain embodiments herein of memory microarchitecture enables compiled code to obtain significant memory-level parallelism, e.g., even in the case of statically-unresolvable memory conflicts.

Certain embodiments of spatial architectures (e.g., the spatial arrays disclosed herein) are to access memory locations, e.g., separate from any memory in the spatial array. Certain embodiments of spatial architectures (e.g., the spatial arrays disclosed herein) include memory accessing (e.g., load or store) dataflow operators of a dataflow graph). For example, data may be streamed in and/or accessed randomly from memory, through the (e.g., fabric area of a) spatial array of processing elements, and then back out to memory.

Certain embodiments of spatial architectures (e.g., the spatial arrays disclosed herein) achieve remarkable performance efficiency relative to traditional multicore processors: compute, in the form of PEs, may be simpler and more numerous than (e.g., large) cores and communications may be direct, as opposed to an extension of the memory system.

However, in certain embodiments, memory system parallelism may be essential in supporting parallel processing element (PE) computation. If memory accesses are serialized (e.g., performed in serial, program order) high parallelism may be unachievable. To alleviate this issue or issues, certain embodiments herein facilitates the discovery of memory-level parallelism in spatial programs, for example, even in the presence of conflicting accesses (e.g., apparent static conflicting accesses or actual dynamic conflicting accesses).

Memory accesses (e.g., loads (reads) and stores (writes)) may be performed out of order, e.g., and a data hazard may exist because of the out of order performance. A data hazard may generally refer to a danger or risk of two operations (e.g., that are performed out of (e.g., logical (program)) order) being performed (e.g., in time) such that the incorrect data is read or written. Some examples of data hazards are read after write (RAW), write after read (WAR), and write after write (WAW) hazards. A hindrance to targeting general programs to spatial architectures may be distributed memory semantics, e.g., it may be difficult for a compiler to statically prove that a set of memory accesses are alias-free.

Certain embodiments herein provide a hardware mechanism for dynamic detection and recovery in the case of (e.g., unexpected) memory address conflicts. Certain embodiments herein provide a spatially-tuned memory interface architecture. Certain embodiments herein may or may not provide multiple independent channels to memory. Certain embodiments herein may or may not enforce ordering between these channels, e.g., and accesses within channels may be ordered. Certain embodiments herein provide hardware such that ordering is not (e.g., solely) resolved in software. Certain embodiments herein provide a hazard detection circuit that does not use (e.g., consume) gates in a field-programmable gate (FPGA) or a processing element (PE) in a spatial array or coarse-grained reconfigurable array (CGRA), e.g., and do not introduce significant overhead in terms of area, throughput, latency, and energy. Certain embodiments herein are directly implemented in hardware (e.g., in transistors). Certain embodiments herein use distributed (e.g., not centralized) techniques at memory requestors for dynamic memory-level parallelism, e.g., techniques that scale well to large, distributed spatial arrays. Certain embodiments herein use distributed (e.g., not centralized) hazard detection at memory requestors for dynamic memory-level parallelism, e.g., techniques that scale well to large, distributed spatial arrays. Embodiments herein may be utilized with a field-programmable gate (FPGA), spatial array of processing elements, or a coarse-grained reconfigurable array (CGRA).

Certain embodiments provide a memory microarchitecture for spatial architectures which improves the performance of algorithms that have potential dynamic data dependencies, e.g., statically unresolvable dependent memory accesses. Certain embodiments of this architecture tracks potentially dependent accesses with tracking hardware (e.g., hazard detection circuits) placed at (e.g., in) cache banks. Memory operations (e.g., particularly loads) may occur out-of-program-order. Certain embodiments herein place memory operations into cache tracking structures, e.g., but their data is returned. In one embodiment, if no (e.g., actual) conflict occurs, this data may be released into the fabric (e.g., once program order tokens are obtained or released before program order is obtained). In one embodiment, releasing before program order is obtained may mean that the whole fabric is to be torn down (e.g., deleted) and/or rolled back to a checkpoint. The software handler discussed below may reduce parallelism to the point that program-order-speculation worked. By allowing load requests to proceed earlier than program order would allow, certain embodiments herein may largely eliminate the latency of requests that while at compile time had potential dynamic data dependencies, but in execution, are non-dependent requests. In the case that a (e.g., dynamic) conflict is discovered, in certain embodiments, cache banks retain sufficient data (e.g., metadata) to forward updated values to requestor(s), e.g., thereby also reducing request latency. Certain embodiments herein provide hardware features which support memory (e.g., access) conflict detection and/or recovery. Certain embodiments herein mark data (e.g., a cache line or a subset of less than all of a cache line) with information about the source of the read or write, e.g., with respect to a spatial array that is to access that data. In certain embodiments, when a data hazard is detected (for example, a read touches a line written by a different memory interface), a handler may be invoked to notify (e.g., software) of the issue, e.g., by writing to software hazard handler register 1216. Certain embodiments herein also define a commit mechanism, e.g., which allows a spatial program to define points when it is known that no hazards exist.

Below also includes a description of the architectural philosophy of embodiments of a spatial array of processing elements (e.g., a CSA) and certain features thereof. As with any revolutionary architecture, programmability may be a risk. To mitigate this issue, embodiments of the CSA architecture have been co-designed with a compilation tool chain, which is also discussed below.

INTRODUCTION

Exascale computing goals may require enormous system-level floating point performance (e.g., 1 ExaFLOPs) within an aggressive power budget (e.g., 20 MW). However, simultaneously improving the performance and energy efficiency of program execution with classical von Neumann architectures has become difficult: out-of-order scheduling, simultaneous multi-threading, complex register files, and other structures provide performance, but at high energy cost. Certain embodiments herein achieve performance and energy requirements simultaneously. Exascale computing power-performance targets may demand both high throughput and low energy consumption per operation. Certain embodiments herein provide this by providing for large numbers of low-complexity, energy-efficient processing (e.g., computational) elements which largely eliminate the control overheads of previous processor designs. Guided by this observation, certain embodiments herein include a spatial array of processing elements, for example, a configurable spatial accelerator (CSA), e.g., comprising an array of processing elements (PEs) connected by a set of lightweight, back-pressured (e.g., communication) networks. One example of a CSA tile is depicted in FIG. 1. Certain embodiments of processing (e.g., compute) elements are dataflow operators, e.g., multiple of a dataflow operator that only processes input data when both (i) the input data has arrived at the dataflow operator and (ii) there is space available for storing the output data, e.g., otherwise no processing is occurring. Certain embodiments (e.g., of an accelerator or CSA) do not utilize a triggered instruction.

Coarse grained spatial architectures, such as an embodiment of the configurable spatial accelerator (CSA) shown in FIG. 1, are the composition of lightweight processing elements (PEs) connected by an interconnect network. Programs, e.g., viewed as control dataflow graphs, may be mapped onto the architecture by configuring the PEs and the network. Generally, PEs may be configured as dataflow operators, e.g., once all input operands arrive at the PE, some operation occurs, and results are forwarded downstream (e.g., to a destination PE(s)) in a pipelined fashion. A dataflow operator (e.g., the underlying operation) may be a load or a store, e.g., as illustrated in reference to the request address file (RAF) circuit in FIG. 21 below. Dataflow operators may choose to consume incoming data on a per operator basis.

Certain embodiments herein extend the capabilities of a spatial array (e.g., CSA) to perform parallel accesses to memory, for example, via a hazard detection circuit(s), e.g., in a memory subsystem.

FIG. 1 illustrates an accelerator tile 100 embodiment of a spatial array of processing elements according to embodiments of the disclosure. Accelerator tile 100 may be a portion of a larger tile. Accelerator tile 100 executes a dataflow graph or graphs. A dataflow graph may generally refer to an explicitly parallel program description which arises in the compilation of sequential codes. Certain embodiments herein (e.g., CSAs) allow dataflow graphs to be directly configured onto the CSA array, for example, rather than being transformed into sequential instruction streams. Certain embodiments herein allow a memory accessing (e.g., types of) dataflow operations to be performed by one or more processing elements (PEs) of the spatial array.

The derivation of a dataflow graph from a sequential compilation flow allows embodiments of a CSA to support familiar programming models and to directly (e.g., without using a table of work) execute existing high performance computing (HPC) code. CSA processing elements (PEs) may be energy efficient. In FIG. 1, memory interface 102 may couple to a memory (e.g., memory 202 in FIG. 2) to allow accelerator tile 100 to access (e.g., load and/store) data to the (e.g., off die or system) memory. Depicted accelerator tile 100 is a heterogeneous array comprised of several kinds of PEs coupled together via an interconnect network 105. Accelerator tile 100 may include one or more of integer arithmetic PEs, floating point arithmetic PEs, communication circuitry (e.g., network dataflow endpoint circuits), and in-fabric storage, e.g., as part of spatial array of processing elements 101. Dataflow graphs (e.g., compiled dataflow graphs) may be overlaid on the accelerator tile 100 for execution. In one embodiment, for a particular dataflow graph, each PE handles only one or two (e.g., dataflow) operations of the graph. The array of PEs may be heterogeneous, e.g., such that no PE supports the full CSA dataflow architecture and/or one or more PEs are programmed (e.g., customized) to perform only a few, but highly efficient operations. Certain embodiments herein thus yield a processor or accelerator having an array of processing elements that is computationally dense compared to roadmap architectures and yet achieves approximately an order-of-magnitude gain in energy efficiency and performance relative to existing HPC offerings.

Certain embodiments herein provide for performance increases from parallel execution within a (e.g., dense) spatial array of processing elements (e.g., CSA) where each PE utilized may perform its operations simultaneously, e.g., if input data is available. Efficiency increases may result from the efficiency of each PE, e.g., where each PE's operation (e.g., behavior) is fixed once per configuration (e.g., mapping) step and execution occurs on local data arrival at the PE, e.g., without considering other fabric activity. In certain embodiments, a PE is (e.g., each a single) dataflow operator, for example, a dataflow operator that only operates on input data when both (i) the input data has arrived at the dataflow operator and (ii) there is space available for storing the output data, e.g., otherwise no operation is occurring.

Certain embodiments herein include a spatial array of processing elements as an energy-efficient and high-performance way of accelerating user applications. In one embodiment, a spatial array(s) is configured via a serial process in which the latency of the configuration is fully exposed via a global reset. Some of this may stem from the register-transfer level (RTL) semantics of an array (e.g., a field-programmable gate array (FPGA)). A program for executing on an array (e.g., FPGA) may assume a fundamental notion of reset in which every part of the configuration is expected to be operational coming out of the configuration reset. Certain embodiments herein provide a dataflow-style array in which PEs (e.g., all) conform to a flow-controller micro-protocol. This micro-protocol may create the effect of a distributed initialization. This micro-protocol can allow for a pipelined configuration and extraction mechanism, e.g., with regional (e.g., not the entire array) orchestration. Certain embodiments herein provide for hazard detection and/or error recovery (e.g., handling) in a dataflow architecture.

Certain embodiments herein provide paradigm-shifting levels of performance and tremendous improvements in energy efficiency across a broad class of existing single-stream and parallel programs, e.g., all while preserving familiar HPC programming models. Certain embodiments herein may target HPC such that floating point energy efficiency is extremely important. Certain embodiments herein not only deliver compelling improvements in performance and reductions in energy, they also deliver these gains to existing HPC programs written in mainstream HPC languages and for mainstream HPC frameworks. Certain embodiments of the architecture herein (e.g., with compilation in mind) provide several extensions in direct support of the control-dataflow internal representations generated by modern compilers. Certain embodiments herein are direct to a CSA dataflow compiler, e.g., which can accept C, C++, and Fortran programming languages, to target a CSA architecture.

Figure 2:
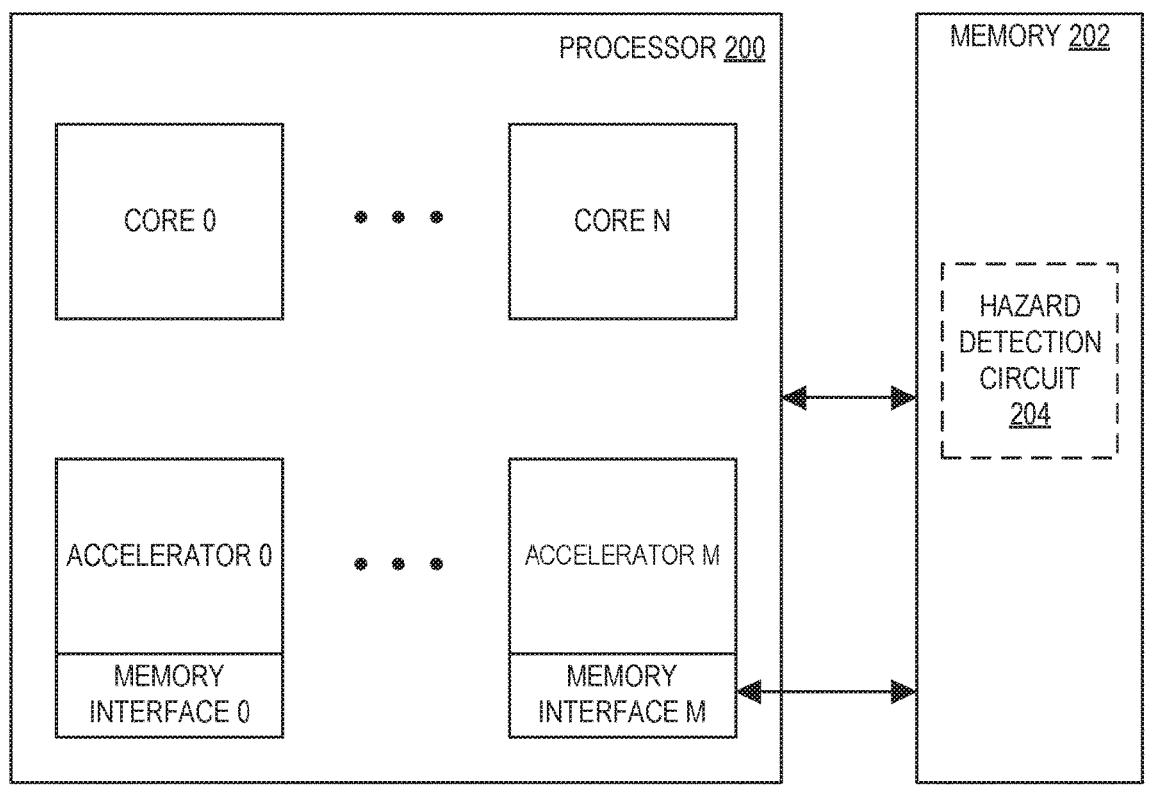
FIG. 2 illustrates a hardware processor coupled to a memory according to embodiments of the disclosure.

FIG. 2 illustrates a hardware processor 200 coupled to (e.g., connected to) a memory 202 according to embodiments of the disclosure. In one embodiment, hardware processor 200 and memory 202 are a computing system 201. In certain embodiments, one or more of accelerators is a CSA according to this disclosure. In certain embodiments, one or more of the cores in a processor are those cores disclosed herein. Hardware processor 200 (e.g., each core thereof) may include a hardware decoder (e.g., decode unit) and a hardware execution unit. Hardware processor 200 may include registers. Note that the figures herein may not depict all data communication couplings (e.g., connections). One of ordinary skill in the art will appreciate that this is to not obscure certain details in the figures. Note that a single headed arrow in the figures may not require one-way communication, for example, it may indicate two-way communication (e.g., to or from that component or device). Note that a double headed arrow in the figures may not require two-way communication, for example, it may indicate one-way communication (e.g., to or from that component or device). Any or all combinations of communications paths may be utilized in certain embodiments herein. Depicted hardware processor 200 includes a plurality of cores (0 to N, where N may be 1 or more) and hardware accelerators (0 to M, where M may be 1 or more) according to embodiments of the disclosure. Hardware processor 200 (e.g., accelerator(s) and/or core(s) thereof) may be coupled to memory 202 (e.g., data storage device), for example, via a (e.g., respective) memory interface circuit (0 to M, where M may be 1 or more). A memory interface circuit may be a request address file (RAF) circuit, e.g., as discussed below. A memory architecture herein (e.g., via a RAF) may handle memory dependencies, e.g., via dependency tokens. In certain embodiments of a memory architecture, a compiler emits memory operations which are configured on to a special memory interface circuit, e.g., a RAF. The spatial array (e.g., fabric) interface to the RAFs may be channel-based. Certain embodiments herein extend the definition of memory operations and the implementation of a RAF to support program order descriptions. Load operations may accept address streams for memory requests from the spatial array (e.g., fabric), and return data streams as requests are satisfied. Store operations may accept two streams, e.g., one for data and one for the (e.g., destination) address. In one embodiment, each of these operations corresponds to exactly one memory operation in the source program. In one embodiment, individual operation channels are strongly ordered, but no order is implied between the channels.

Hardware decoder (e.g., of core) may receive an (e.g., single) instruction (e.g., macro-instruction) and decode the instruction, e.g., into micro-instructions and/or micro-operations. Hardware execution unit (e.g., of core) may execute the decoded instruction (e.g., macro-instruction) to perform an operation or operations. Memory 202 and/or processor may include a hazard detection circuit 204, for example, to detect data hazards from memory accesses, e.g., from memory interface circuit(s).

Section 1 below discusses memory circuits (circuitry) and methods for distributed memory hazard detection and error recovery. Section 2 below discloses embodiments of CSA architecture. In particular, novel embodiments of integrating memory within the dataflow execution model are disclosed. Section 3 delves into the microarchitectural details of embodiments of a CSA. In one embodiment, the main goal of a CSA is to support compiler produced programs. Section 4 below examines embodiments of a CSA compilation tool chain. The advantages of embodiments of a CSA are compared to other architectures in the execution of compiled codes in Section 5. The performance of embodiments of a CSA microarchitecture is discussed in Section 6, further CSA details are discussed in Section 7, example memory ordering in acceleration hardware (e.g., spatial array of processing elements) is discussed in Section 8, and a summary is provided in Section 9.

1. Memory Circuits and Methods for Distributed Memory Hazard Detection and Error Recovery In certain embodiments, processing elements (PEs) communicate using dedicated virtual circuits which are formed by statically configuring a (e.g., circuit switched) communications network, for example, as discussed herein. These virtual circuits may be flow controlled and fully back-pressured, e.g., such that a PE will stall if either the source has no data or its destination is full. At runtime, data may flow through the PEs implementing the mapped dataflow graph (e.g., mapped algorithm). For example, data may be streamed in from memory, through the (e.g., fabric area of a) spatial array of processing elements, and then back out to memory.

Such an architecture may achieve remarkable performance efficiency relative to traditional multicore processors: compute, e.g., in the form of PEs, may be simpler and more numerous than cores and communications may be direct, e.g., as opposed to an extension of the memory system. In certain embodiments, the degree to which programs (e.g., dataflow graphs thereof) may be accelerated by execution on a spatial array is related to the speed with which the spatial array (e.g., accelerator) receives (e.g., input) data from and/or sends (e.g., output) data to storage (e.g., memory). Certain embodiments herein provide for coarse grained memory semantics enforcement mechanisms (hardware) for spatial architectures.

Certain embodiments herein access memory according to the disclosure below, for example, according to the embodiments discussed in reference to Figures. Certain embodiments herein provide a microarchitectural refinement to memory ordering architecture and microarchitecture discussed below, e.g., in reference to Figures.

Certain embodiments herein provide techniques for localized memory disambiguation, e.g., within a single memory interface circuit (e.g., element). Certain embodiments herein scale to a massively parallel (spatial) array in which many potentially conflicting memory requestors are simultaneously accessing memory. This scalability may result from avoiding the exchanging of addresses among all potentially conflicting requestors, which may be a major energy, hardware, and performance overhead.

In certain embodiments, herein, all requests for a single (e.g., cache line) address must necessarily touch the same cache bank, e.g., storing the data corresponding to the single address. In such an embodiment, any conflicts may easily be observed (e.g., with low overhead) by placing checking hardware at the cache bank (e.g., a hazard detection circuit), rather than at the local memory (request) interface (e.g., which may be a request address file (RAF) circuit). Certain embodiments of this hardware (e.g., a hazard detection circuit) is both inexpensive to implement and does not require any communication between requestors, e.g., where conflicts are detected by examining the requests themselves at the cache. By providing such hardware, certain embodiments herein introduce speculating memory operation ordering. This technique may (e.g., substantially) eliminate the latency of memory order tracking, for example, by allowing loads to proceed before all prior stores have committed.

Figures 3A, 3B:
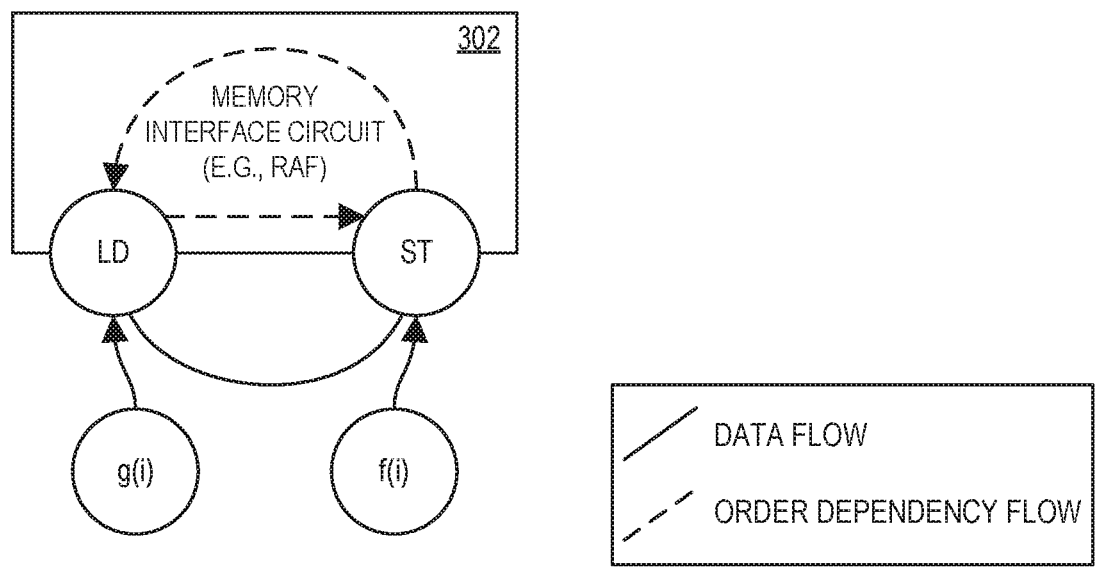
FIG. 3A illustrates a loop with a potential dynamic data dependency according to embodiments of the disclosure.
FIG. 3B illustrates a dataflow graph representation of the loop in FIG. 3A according to embodiments of the disclosure.

Spatial architectures may provide an energy-efficient and high-performance way of accelerating user applications. One of the chief problems faced by embodiments of such architectures is the mapping of a broad set of sequential or partially parallel applications to the spatial array which is distributed by nature and highly parallel. A main difficulty in this mapping may be the (e.g., automatic) parallelization of memory accesses in programs due to the centralized, largely sequential memory model present in other programming environments. Consider the following code in FIG. 3A. FIG. 3A illustrates a loop 300 with a potential dynamic data dependency according to embodiments of the disclosure. More particularly, loop 300 has an ambiguous pointer used in both function "f" (e.g., as an index into an array p) based on input i and different function "g" (e.g., as an index into an array p) based on input i, e.g., there is an implied read then a write (read of g, followed by write of f in program (e.g., logical) order). If this happens out of program order for the same index (e.g., f(i) and g(i) for a given i are the same value), this may cause an error. E.g., suppose this is a memory copy function, if the regions do not overlap then there may be speculative (e.g., out-of-program-order) memory accesses, but if they do overlap, then there may be a data hazard (for example, a possible error, e.g., stale data). In one embodiment, a compiler of this code (e.g., to the (binary) machine language to run on a processor/array) is not able to prove that that f(i) does not equal g(i) (e.g., for the same value of i or across (e.g., all) iterations of loop bodies, this may be referred to as pointer or memory aliasing), and therefore it must serialize the accesses to array p (e.g., to generate statically correct code). Certain embodiments herein allow hardware to extract parallelism even for potential dynamically data dependencies, e.g., to achieve high performance. For example, certain embodiments herein allow for dynamic parallelism in hardware when (e.g., at runtime) f(i) and g(i) are not equal. Certain embodiments herein achieve dynamical parallelism without using structures, such as load-store queues, to check for and to exploit potential dynamic dependencies. Certain embodiments herein allow a spatial architecture to re-order non-dependent access, e.g., thereby improving memory utilization and overall program performance. Certain embodiments herein provide that a read for an address (e.g., address region) is registered in a hazard detection circuit (e.g., conflict tracker circuit thereof), to monitor any write to that region that is not in program order, e.g., to avoid forcing all memory accesses (e.g., reads) in program order.

FIG. 3B illustrates a dataflow graph 301 representation of the loop 300 in FIG. 3A according to embodiments of the disclosure. Dataflow graph 301 is depicted as obtaining the memory accesses through a hardware memory interface circuit 302. FIG. 3B illustrates how a spatial code for loop 300 might be mapped to a spatial architecture, e.g., the two accesses to array p are mapped to the memory interface circuit 302 (e.g., RAF circuit). The memory interface circuit 302 (e.g., RAF circuit) may schedule (e.g., speculative) memory requests to the memory subsystem, ensures that requests return in program order, and that any existing data dependencies within a channel are honored. Particularly for loop 300, the load of the data from memory corresponding to g(i) is to occur before the store of that data (e.g., for each loop iteration) to the memory corresponding to f(i) in program (e.g., logical order), e.g., as accomplished with memory dependency tokens discussed herein.

Certain embodiments herein (e.g., of microarchitecture) improve the memory level parallelism (MLP) of spatial applications, for example, even in the case that the application has a statically unresolvable memory conflict (e.g., from a potential dynamic data dependency) and with an example in FIG. 3A. For example, certain embodiments herein execute the above architecture faithfully and with high performance.

Since spatial architectures are inherently distributed, certain embodiments herein are also distributed, for example, conflict management hardware (e.g., a hazard detection circuit) is located at the cache banks to detect hazards. Certain embodiments of a hardware detection circuit (e.g., order violation detection mechanism and its accompanying correction mechanism) allows memory interface hardware to issue memory requests out-of-order. Requests may issue out-of-order in some embodiments, thus to improve both memory level parallelism and observed latency. In some cases, order-of-magnitude improvements in these figures of merit are possible.

Figure 4:
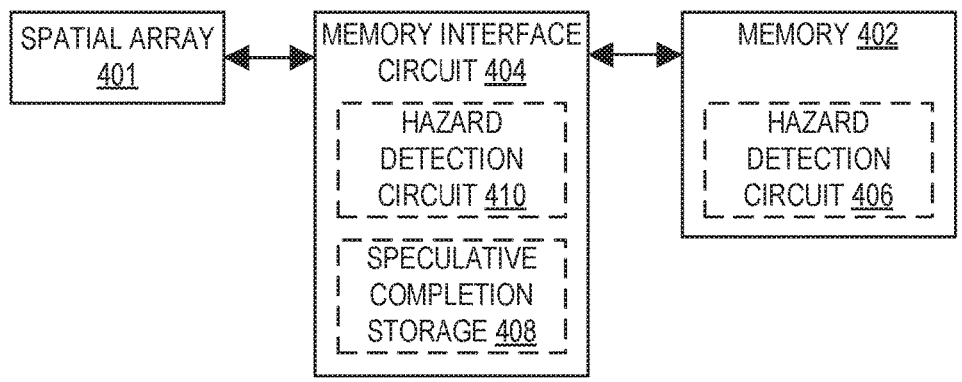
FIG. 4 illustrates a spatial array coupled to a memory through a memory interface circuit according to embodiments of the disclosure.

FIG. 4 illustrates a spatial array 401 coupled to a memory 402 through a memory interface circuit 404 according to embodiments of the disclosure. Spatial array 401 may be any spatial array, e.g., as disclosed herein. In one embodiment, a spatial accelerator is a field-programmable gate array (FPGA) accelerator, coarse grained reconfigurable accelerator (CGRA), or a fixed function (e.g., not configurable) accelerator. Memory interface circuit may be any interface between a spatial array and memory, e.g., a request address file (RAF) circuit as disclosed herein. Hazard detection circuit 406, e.g., to detect a data hazard from a memory access, may be utilized in memory 402, e.g., one for each cache or memory bank of a memory. Memory 402 may be a cache memory, e.g., an on-die memory. Additionally or alternatively, a hazard detection circuit 410, e.g., to detect a data hazard from a memory access, may be utilized in memory interface circuit 404, e.g., one for each memory interface circuit. Memory interface circuit 404 may include a speculative completion storage 408, for example, separate from memory (e.g., cache) 402. Speculative completion storage 408 may store speculatively fetched data from memory for a memory access, e.g., that speculatively fetched data is held in speculative completion storage 408 until a hazard detection circuit indicates that there is no data hazard for that data (e.g., for the memory access (e.g., load) request). Memory interface circuit 404 may receive a data access request from a circuit switched network and/or packet switched network of a spatial array 401 and access the memory 402 through a packet switched network of memory 402.

Figure 5:
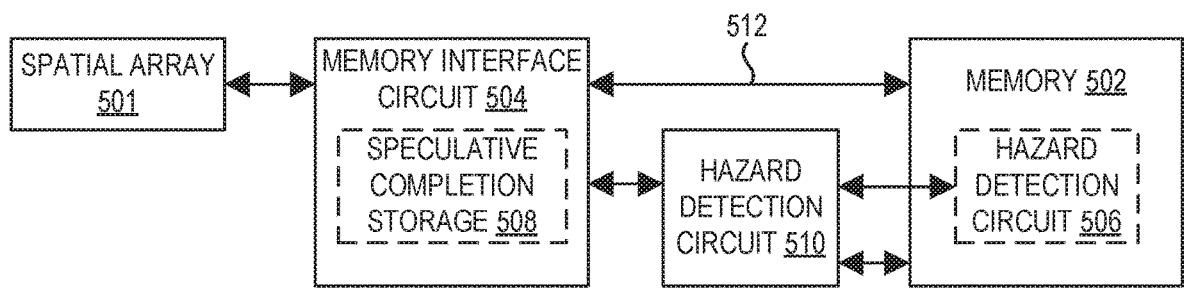
FIG. 5 illustrates a spatial array coupled to a memory through a memory interface circuit according to embodiments of the disclosure.

FIG. 5 illustrates a spatial array 501 coupled to a memory 502 through a memory interface circuit 504 according to embodiments of the disclosure. Spatial array 405 may be any spatial array, e.g., as disclosed herein. Memory interface circuit may be any interface between a spatial array and memory, e.g., a request address file (RAF) circuit as disclosed herein. Hazard detection circuit 506, e.g., to detect a data hazard from a memory access, may be utilized in memory 502, e.g., one for each cache or memory bank of a memory. Memory 502 may be a cache memory, e.g., an on-die memory. Additionally or alternatively, a hazard detection circuit 510, e.g., to detect a data hazard from a memory access, may be utilized separate from memory interface circuit 504 and/or from memory 502, e.g., one for each memory interface circuit and/or cache or memory bank. Hazard detection circuit 510 may cause any accesses of data (e.g., addresses) that are being tracked for a data hazard to be monitored, e.g., and other non-tracked accesses may traverse bypass path 512 directly to memory 502, e.g., from memory interface circuit 504. Memory interface circuit 404 may include a speculative completion storage 508, for example, separate from memory (e.g., cache) 502. Speculative completion storage 508 may store speculatively fetched data from memory for a memory access, e.g., that speculatively fetched data is held in speculative completion storage 508 until a hazard detection circuit indicates that there is no data hazard for that data (e.g., for the memory access (e.g., load) request). Memory interface circuit 454 may receive a data access request from a circuit switched network of a spatial array 501 and access the memory 502 through a packet switched network of memory 502.

Figure 6:
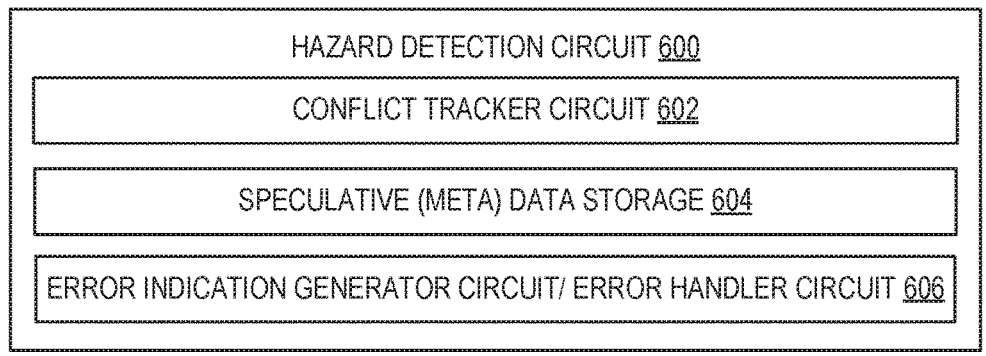
FIG. 6 illustrates a hazard detection circuit according to embodiments of the disclosure.

FIG. 6 illustrates a hazard detection circuit 600 according to embodiments of the disclosure. A memory circuit may include multiple instances of a hazard detection circuit, e.g., in a distributed embodiment. Depicted hazard detection circuit 600 includes a conflict tracker circuit 602, e.g., to tracker a data address for multiple accesses (e.g., out-of-program-order accesses). A circuit (e.g., a compiler running on a processor) may mark data (e.g., memory (cache) address) as having a potential dynamic data dependency. Conflict tracker circuit 602 may detect (e.g., on arrival of a data access requested annotated with an indication of the potential dynamic data dependency (e.g., a field thereof) of the data access request). Depicted hazard detection circuit 600 includes a speculative data (e.g., metadata) storage 604, for example, to store (e.g., in the case that a (dynamic) conflict is discovered) sufficient metadata to forward updated (correct) values to requestor(s) and/or other information about speculative cache accesses, e.g., the request address, the issuing memory interface circuit (e.g., RAF), and/or speculative completion storage (e.g., buffer) address (e.g., slot). Depicted hazard detection circuit 600 includes an error indication generator circuit and/or error handler circuit 606. Error indication generator circuit may generate an error indication when a data hazard becomes a data error (e.g., the wrong version of data was accessed), e.g., and send the error indication to other components, e.g., memory interface circuit(s). In one embodiment, error indication generator circuit sends an error indication to a software error (e.g., hazard) handler. Error handler circuit may send updated data (e.g., the correct version of data) to the other accessor(s), e.g., to the memory interface circuit used for their access request. A hazard detection circuit may include one or more instances of each of (e.g., in any combination) conflict tracker circuit 602, speculative data (e.g., metadata) storage 604, error indication generator circuit and/or error handler circuit 606, or any combination thereof.

Figure 7:
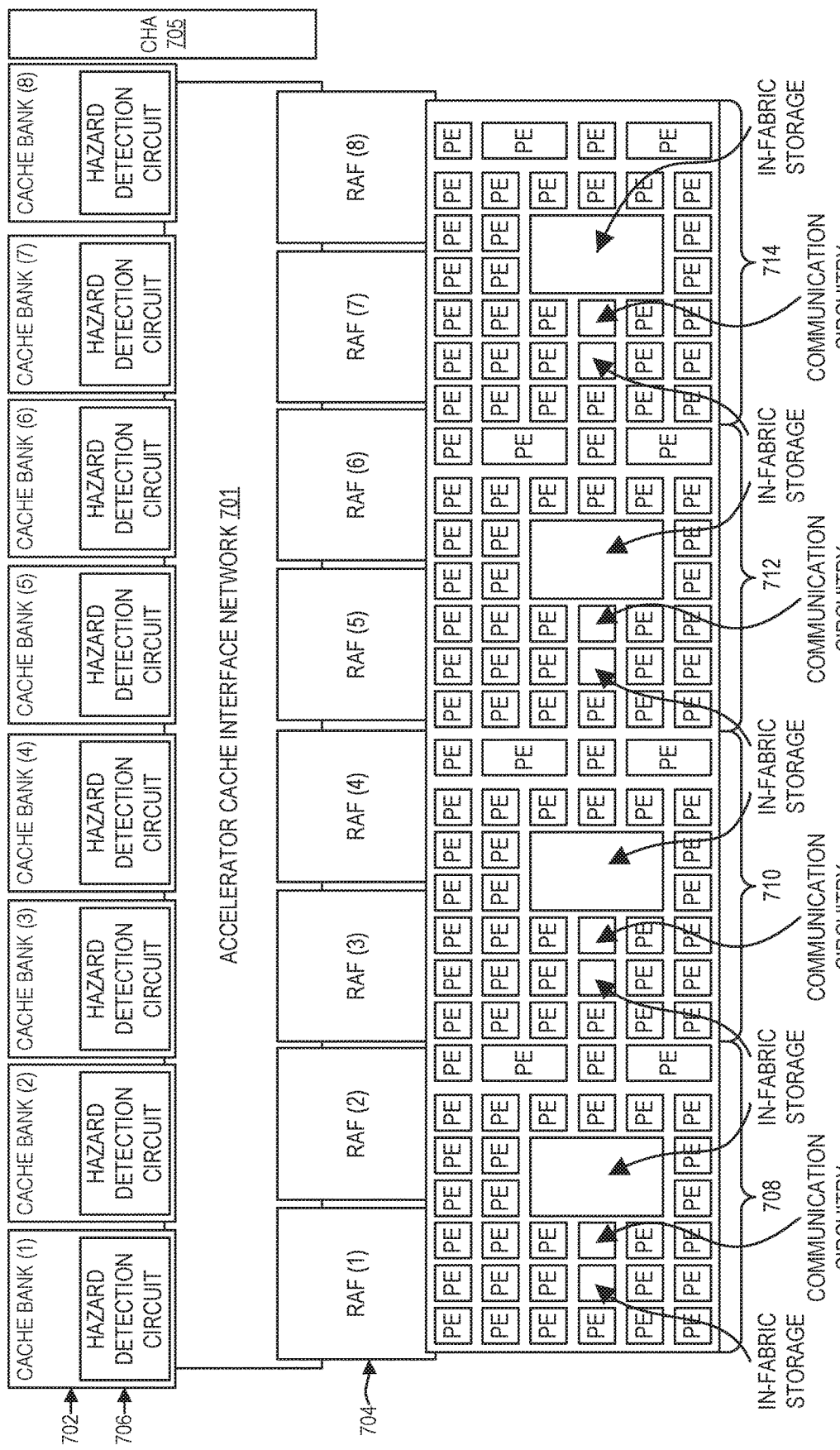
FIG. 7 illustrates a plurality of memory interface circuits (e.g., request address file (RAF) circuits) coupled between a plurality of accelerator tiles and a plurality of cache banks according to embodiments of the disclosure.

FIG. 7 illustrates a plurality of memory interface circuits (e.g., request address file (RAF) circuits 704) coupled between a spatial array 700 of a plurality of (accelerator) tiles and a plurality of cache banks 702 according to embodiments of the disclosure. Although a plurality of tiles are depicted, a spatial array 700 may be a single tile. Although eight cache banks are depicted, a single cache bank or any plurality of cache banks may be utilized. In one embodiment, the number of RAFs and cache banks may be in a ratio of either 1:1 or 1:2. Cache banks may contain full cache lines (e.g., as opposed to sharding by word), for example, with each line (e.g., address) having exactly one home in the cache. Cache lines may be mapped to cache banks via a pseudo-random function. The CSA may adopt the shared virtual memory (SVM) model to integrate with other tiled architectures. Certain embodiments include an Accelerator Cache Interface (Interconnect) (ACI) network 701 (e.g., a packet switched network) connecting the RAFs to the cache banks. This network may carry address and data between the RAFs and the cache. The topology of the ACI network 701 may be a cascaded crossbar, e.g., as a compromise between latency and implementation complexity. Cache 702 may be a first level (L1) or second level (L2) cache. Cache may also include (e.g., as part of a next level (e.g., L2 or L3) a cache home agent 705 (CHA), for example, to serve as the local coherence and cache controller (e.g., caching agent) and/or also serve as the global coherence and memory controller interface (e.g., home agent).

In FIG. 7, each of cache banks 702 includes its own hazard detection circuit of hazard detection circuits 706. In one embodiment, a processing element (PE) (or other component) of spatial array 700 may request a memory access (e.g., to cache banks 702), for example, to perform a load or a store of data in the cache bank (or out through other memory via CHA 705). A memory interface circuit (e.g., RAF) may receive a memory request for data that may be (e.g., is) stored in cache banks 702. The memory interface circuit may select the appropriate cache bank (e.g., by comparing (e.g., hashing) the address corresponding to the memory request with a list of memory addresses stored in respective cache banks) and send the request (e.g., via ACI network 701) to that cache bank. Recall that in one embodiment, each data item (e.g., cache line) (e.g., address) is stored in only one location in cache. If that data item (e.g., cache line) (e.g., based on its address) is being tracked by hazard detection circuit (e.g., of that cache bank), appropriate action may be taken, e.g., as discussed below in reference to FIGS. 8-10. In certain embodiments, appropriate action may be recovery (e.g., when an error is detected), for example, (i) by overwriting stale data in a RAF, (ii) rolling back of the spatial array (e.g., to a commit point) and/or (iii) by notifying software.

Embodiments of memory-level parallelism extracting micro architecture are discussed in the context below in reference to FIGS. 8-10, although the approach is applicable to a broad set of architectures. Certain embodiments herein allow (e.g., all) speculative loads to go out for servicing (e.g., before they match the store), go out parallel to memory (cache). The circuitry depicted in FIGS. 8-10 may be components from FIG. 7, e.g., although the requesting PEs are not depicted.

FIG. 8 illustrates a profitable speculation in a plurality of memory interface circuits (e.g., request address file (RAF) circuits (804A, 804C)) coupled to a plurality of cache banks (802A, 802D) according to embodiments of the disclosure. Although not depicted, the plurality of memory interface circuits may be coupled to a spatial array (e.g., having a plurality of processing elements), for example, as in FIG. 7. Memory access requests may be generated by a component (for example, processing element, e.g., as disclosed herein) of the spatial array.

For the following, assume that a memory store request and then a memory load request are present in program order in code (for example, their ordering has been specified, e.g., as in FIG. 3A above) and, for example, the memory store request and the memory load request are marked (e.g., by a compiler) as having a potential dynamic data dependency (e.g., they may, but not must, read and write to the same memory location).

In one embodiment, the load and store operations for the requests are serialized (performed in program order only) where the program has declared that they require ordering, for example, a load would execute and pass a dependency token to the store (e.g., after completion), then the store would then execute on receipt of that dependency token, e.g., as discussed in Section 8 below. In general, however, the load and store may not actually conflict (e.g., during run-time) because their addresses are not the same. Recognizing this, certain embodiments herein (e.g., of microarchitecture) optimistically issues memory (e.g., load) requests early, for example, even if the (e.g., store) address is not known, in the hope that no conflict (e.g., accessing the same address (not in program order) actually occurs. Such order-speculative requests may be marked as speculative.

FIG. 8 illustrates a case of profitable speculation of the loop 300 in FIG. 3A (e.g., the dataflow graph of FIG. 3B). Here, the load request is issued (1) to the memory (e.g., cache) before the logically preceding store request is issued (5) to the memory, even though the store from RAF 804C is before the load from RAF 804A in program order. Since the two accesses go to different banks, it may be assumed that there is no address conflict when each data item (e.g., cache line) (e.g., address) is stored in only one location in cache, and the load latency is reduced.

More particularly, load request is received (e.g., from a processing element) and arrives at a memory interface circuit, e.g., RAF 804A. In one embodiment, RAF 804A includes one or more buffers 812A (e.g., register(s)) to receive and store (memory (e.g., load) requests. See, for example, FIG. 21, e.g., queues and buffers thereof. RAF (shown as RAF 804A) may then send (1) load request to the cache bank (shown as cache bank 802A) storing the data to be loaded (e.g., according to the address of the data). In one embodiment, a (e.g., each) RAF is to perform a hash function on the incoming memory (e.g., load) request (e.g., the address the request is seeking to access) to determine which cache bank is storing that memory address, and the memory request may then be sent to that cache bank (e.g., on Accelerator Cache Interface (ACI) 801 network). Here, that means that load request moves (1) to cache bank 802A. Note that cache bank 802A and RAF 804A are adjacent, but this disclosure is not so limited.

Assuming this memory load request is speculative, e.g., marked as having a potential dynamic data dependency, the cache bank 802A (e.g., a hazard detection circuit of cache bank 802A) then starts tracking that address for hazards (e.g., errors), e.g., other access requests for that address. In one embodiment, metadata of (e.g., a tag of) a memory request includes a value (e.g., bit or bits) to indicate a potential dynamic data dependency. In one embodiment, the lack of the presence of a memory dependency token (e.g., from the logically proceeding memory access that is to occur before the current memory access) indicates that a memory access request is a speculative request.

In one embodiment, conflict tracker circuit 806A (e.g., of a hazard detection circuit) inserts (2) the address of the speculative load into a speculation tracking data structure (e.g., speculative (meta) data storage 808A). In one embodiment, metadata for load request that is now being tracked is placed (3) into speculative (meta) data storage 808A (and/or with other data). Metadata may include data indicating the request address, the RAF and which speculative completion storage 810A slot the speculative data for that request is stored in for that RAF.

Cache bank 802A may then return (4) the data corresponding to the request from the address, e.g., to the requesting RAF for a load request. In certain embodiments, that data (e.g., speculative value) is held in the RAF (e.g., in speculative completion storage 810A (e.g., buffer) of the RAF), for example, and then released when program order is obtained (e.g., through a dependency token for the (immediately) previous program-order access of the current memory access, e.g., as discussed further herein). In certain embodiments, the speculative completion storage is used to store the speculative data until it is known to be safe to use. For example, once the order (e.g., memory dependency) token is obtained, the speculative value is no longer speculative and may be released into the spatial array (e.g., fabric). By issuing load requests early, certain embodiments herein hide memory access latency and increase memory level parallelism (MLP). In one embodiment, when data is released into the spatial array (e.g., fabric), that data may be removed from being tracked by the hazard detection circuit (e.g., deleted as an entry). In one embodiment, a RAF circuit (e.g., on release of the data into the spatial array (e.g., fabric)) is to send a message to the cache (e.g., the cache bank including that hazard detection circuit or storage) to release the speculative state in the hazard detection circuit. This message may be acknowledged by the cache to the RAF in some embodiments.

In certain embodiments, store request may be received by a (e.g., different) RAF (e.g., by RAF 804C). RAF may include one or more queues or buffers (e.g., buffer 810C and 812C). Buffer 810C may store the (payload) data for a particular store request and buffer 812C may store the target address of that data for the particular store request. RAF 804C may then send store request to the cache bank (shown as cache bank 802D) where the data is to be stored (e.g., according to the target address of the store). In one embodiment, a (e.g., each) RAF is to perform a hash function on the incoming memory (e.g., store) request (e.g., the address the request is seeking to access) to determine which cache bank is to store data for that memory address, and the memory request may then be sent to that cache bank (e.g., on Accelerator Cache Interface (ACI) 801 network). Here, that means that store request moves (5) to cache bank 802D. Assuming this memory store request is speculative (e.g., marked as having a potential dynamic data dependency, for example, by not having a memory dependency token for that particular request), the cache bank 802D (e.g., a hazard detection circuit of cache bank 802D) then starts tracking/ checking (6) that address for hazards (e.g., errors). Here, load request may be dependent on store request (e.g., such a memory dependency token indicated that the store operation is intended to be performed before the load operation). The hazard detection circuit of cache bank 802D (e.g., conflict tracker circuit 806D) may query its storage (e.g., and/or the speculative data storage of others hazard detection circuits) and determine that no other speculative accesses have been made for that address, e.g., there are no hazards currently. The hazard detection circuit of cache bank 802D (e.g., conflict tracker circuit 806D) may then forward (7) a memory dependency token of the store request for the load request, e.g., here to the RAF 804A so that the data already loaded into speculative completion storage 810A may be released (8) (e.g., to the load requestor and/or spatial array). In one embodiment, a store request comes in with a memory dependency token that indicates that the dependent load (e.g., from RAF 804A) is the target for that memory dependency token. In one embodiment, the steering of a dependency token is annotated with the request, e.g., the ACI has a (e.g. back) path for dependency tokens. For example, when the store commits into bank 802D, circuitry (e.g., bank 802D) may send the dependency token to the appropriate location (e.g., RAF 804A here). As another example, the dependency token may be sent to the appropriate location (e.g., RAF 804A here) when the to-be-stored data passes through (e.g., without a conflict being detected) the conflict tracker circuit, e.g., but before the store commits into bank 802D.

Certain embodiments herein provision (e.g., provide storage space) to accommodate most common cases of outstanding memory requests, however it is possible for finite structures in the microarchitecture to run out of space. In this case, a no (e.g., not or negative) acknowledgement message (NACK) may be sent to the appropriate requestor, e.g., such that the requestor (e.g., RAF) will try again later. Alternatively, we may also introduce message classes and virtual channels in the ACI to achieve a similar effect.

Certain embodiments herein avoid using memory ordering in those programs which do not have ordering requirements by including hardware to annotate unordered (e.g., without a dynamic data dependency) operations. These operations may be marked (or be unmarked) in the microarchitecture to indicate that they do not participate in any order-checking hardware structures (e.g., hazard detection circuit(s)).

In some cases, compilers may be able to prove that certain memory access do not conflict with any other memory accesses. In this case, the memory operation may be annotated (e.g., by the compiler) as having no ordering (e.g., dependency token) requirements, for example, and may issue as soon as its operands are available. In the case that a memory operation has no succeeding operations, it may be annotated to not produce ordering tokens, e.g., and bypass the hazard detection circuits (e.g., conflict tracker circuit) discussed herein.

In one embodiment, all potentially conflicting stores may be checked for a hazard by a hazard detection circuit, e.g., and all speculative loads are checked for a hazard by a hazard detection circuit.

In certain embodiments, as speculative requests obtain their actual memory dependency tokens, they become non-speculative, commit, and may be removed from the cache tracking structure (e.g., conflict tracker circuit(s)). This removal process may include sending a message to the cache so that the corresponding tracking request may be removed. In one embodiment, the request address is present with the request to stop tracking that address. In another embodiment, the RAF sends a reference to the cache metadata store to stop tracking that address, which may include an address representation. This method reduces energy, storage area, and network complexity. In one embodiment, when circuitry (e.g., a RAF) receives the speculative address, it is accompanied with metadata that permits removal of the tracking request from the hazard detection circuit. This metadata may be an index ID or a portion of the original request address. The choice may depend on whether the hazard detection circuit (e.g., conflict detection circuit) is built with a CAM or with a bloom filter. In one embodiment, when the request is (e.g., program) ordered or commits, this metadata (e.g. an index or an address portion) may be returned to the cache bank (e.g., from a RAF circuit) so that the hazard detection circuit (e.g., conflict detection circuit) is updated accordingly.

FIG. 9 illustrates an unprofitable speculation (misspeculation) in a plurality of memory interface circuits (e.g., RAFs 904A, 904C) according to embodiments of the disclosure. Although not depicted, the plurality of memory interface circuits may be coupled to a spatial array (e.g., having a plurality of processing elements). Memory access requests may be generated by a component (for example, processing element, e.g., as disclosed herein) of the spatial array.

For the following, assume that a memory store request and then a memory load request are present in program order in code (for example, their ordering has been specified, e.g., as in FIG. 3A above) and, for example, the memory store request and the memory load request are marked (e.g., by a compiler) as having a potential dynamic data dependency (e.g., they may, but not must, read and write to the same memory location).

In one embodiment, the load and store operations for the requests are serialized (performed in program order only) where the program has declared that they require ordering, for example, a load would execute and pass a dependency token to the store (e.g., after completion), then the store would then execute on receipt of that dependency token, e.g., as discussed in Section 8 below. In general, however, the load and store may not actually conflict (e.g., during run-time) because their addresses are not the same. Recognizing this, certain embodiments herein (e.g., of microarchitecture) optimistically issues memory (e.g., load) requests early, for example, even if the (e.g., store) address is not known, in the hope that no conflict (e.g., accessing the same address (not in program order) actually occurs. Such order-speculative requests may be marked as speculative.

FIG. 9 illustrates a case of unprofitable speculation (misspeculation) of the loop 300 in FIG. 3A (e.g., the dataflow graph of FIG. 3B). Here, the load request is issued (1) to the memory (e.g., cache) before the logically preceding store request is issued (5) to the memory, even though the store from RAF 904C is before the load from RAF 904A in program order. Since the two accesses go to the same bank (bank 902A), it may not be assumed that there is no address conflict.

More particularly, load request is received (e.g., from a processing element) and arrives at a memory interface circuit, e.g., RAF 904A. In one embodiment, RAF 904A includes one or more buffers 912A (e.g., register(s)) to receive and store (memory (e.g., load) requests. See, for example, FIG. 21, e.g., queues and buffers thereof. RAF (shown as RAF 904A) may then send (1) load request to the cache bank (shown as cache bank 902A) storing the data to be loaded (e.g., according to the address of the data). In one embodiment, a (e.g., each) RAF is to perform a hash function on the incoming memory (e.g., load) request (e.g., the address the request is seeking to access) to determine which cache bank is storing that memory address, and the memory request may then be sent to that cache bank (e.g., on Accelerator Cache Interface (ACI) 901 network). Here, that means that load request moves (1) to cache bank 902A. Note that cache bank 902A and RAF 904A are adjacent, but this disclosure is not so limited.

Assuming this memory load request is speculative, e.g., marked as having a potential dynamic data dependency, the cache bank 902A (e.g., a hazard detection circuit of cache bank 902A) then starts tracking that address for hazards (e.g., errors), e.g., other access requests for that address. In one embodiment, metadata of (e.g., a tag of) a memory request includes a value (e.g., bit or bits) to indicate a potential dynamic data dependency. In one embodiment, the lack of the presence of a memory dependency token (e.g., from the logically proceeding memory access that is to occur before the current memory access) indicates that a memory access request is a speculative request.

In one embodiment, conflict tracker circuit 906A (e.g., of a hazard detection circuit) inserts (2) the address of the speculative load into a speculation tracking data structure (e.g., speculative (meta) data storage 908A). In one embodiment, metadata for load request that is now being tracked is placed (3) into speculative (meta) data storage 908A (and/or with other data). Metadata may include data indicating the request address, the RAF and which speculative completion storage 910A slot the speculative data for that request is stored in for that RAF.

Cache bank 902A may then return (4) the data 905 (e.g., value) corresponding to the request from the address, e.g., to the requesting RAF for a load request. In certain embodiments, that data (e.g., speculative value) is held in the RAF (e.g., in speculative completion storage 910A (e.g., buffer) of the RAF), for example, and then released (8) when program order is obtained (e.g., through a dependency token for the (immediately) previous program-order access of the current memory access, e.g., as discussed further herein). In certain embodiments, the speculative completion storage is used to store the speculative data until it is known to be safe to use. For example, once the order (e.g., memory dependency) token is obtained, the speculative value is no longer speculative and may be released into the spatial array (e.g., fabric). By issuing load requests early, certain embodiments herein hide memory access latency and increase memory level parallelism (MLP).

In certain embodiments, store request may be received by a (e.g., different) RAF (e.g., by RAF 904C). RAF may include one or more queues or buffers (e.g., buffer 910C and 912C). Buffer 910C may store the (payload) data for a particular store request and buffer 912C may store the target address of that data for the particular store request. RAF 904C may then send store request to the cache bank (shown as cache bank 902A) where the data is to be stored (e.g., according to the target address of the store). In one embodiment, a (e.g., each) RAF is to perform a hash function on the incoming memory (e.g., store) request (e.g., the address the request is seeking to access) to determine which cache bank is to store data for that memory address, and the memory request may then be sent to that cache bank (e.g., on Accelerator Cache Interface (ACI) 901 network). Here, that means that store request moves (5) to cache bank 902A. Assuming this memory store request is speculative (e.g., marked as having a potential dynamic data dependency, for example, by not having a memory dependency token for that particular request or being marked as requiring a check of the conflict tracker circuit), the cache bank 902A (e.g., a hazard detection circuit of cache bank 902A) then starts tracking/checking (6) that address for hazards (e.g., errors). Here, load request may be dependent on store request (e.g., such a memory dependency token indicated that the store operation is intended to be performed before the load operation). The hazard detection circuit of cache bank 902A (e.g., conflict tracker circuit 906A) may query its storage (e.g., and/or the speculative data storage of others hazard detection circuits) and determine that a speculative access (e.g., by load request from RAF 904A) has been made for that address, e.g., there is a hazard currently. The hazard detection circuit of cache bank 902A (e.g., conflict tracker circuit 906A) may then indicate there is an error, for example, which may cause a remedial action to be taken, e.g., by error indication circuitry/error handler circuitry (e.g., error indication circuitry/error handler circuitry 606 in FIG. 6). In the depicted embodiment, hazard detection circuit (e.g., error handler circuitry) may send the updated value 907 (e.g., from the store) to the requesting RAF and/or spatial array. In one embodiment, the updated value 907 overwrites the speculative value 905, e.g., in the same slot of speculative completion storage 910A. In the depicted embodiment, hazard detection circuit (e.g., error handler circuitry) may further send (7) the memory dependency token 909 to the requesting RAF and/or spatial array. In one embodiment, the receipt of memory dependency token 909 causes the updated value 907 to be sent from the speculative completion storage 910A to the requestor. In one embodiment, a store request comes in with a memory dependency token that indicates that the dependent load (e.g., from RAF 904A) is the target for that memory dependency token. In one embodiment, the steering of a dependency token is annotated with the request, e.g., the ACI has a back path for dependency tokens. For example, when the store commits into bank 902A, circuitry (e.g., bank 902A) may send the dependency token 909 to the appropriate location (e.g., RAF 904A here). As a result, the newly stored value is sent to the requesting RAF. Load latency may still be reduced as compared to a baseline case, e.g., since load data is directly forwarded.

Error Recovery

In certain cases, there will be no address conflict between dependent memory accesses. However, in some cases there may be address collisions. In one case, a non-speculative write request touches the same address as a temporally previous, but logically succeeding read that has been placed in a hazard detection circuit (e.g., its tracking structure), e.g., in FIG. 10, a read-after-write error has been detected. To correct the error, the cache may forward the new value associated with the incoming store. This may allow for a reduction in load latency, even in the case that there is an address conflict.

Error recovery may also have a potential for race conditions, e.g., if the ordering of the new value and the dependency token cannot be guaranteed. The race condition may be solved by integrating the new value response and dependency token. Here, a RAF receiving the new value may retransmit the dependency token to the dependent RAF. If multiple new value messages are sent, then the dependency token may also be annotated with the number of updates sent, e.g., so that the dependent operation is guaranteed not to execute until all expected dependency tokens have arrived. An example of this is shown in FIG. 10.

Figure 10:
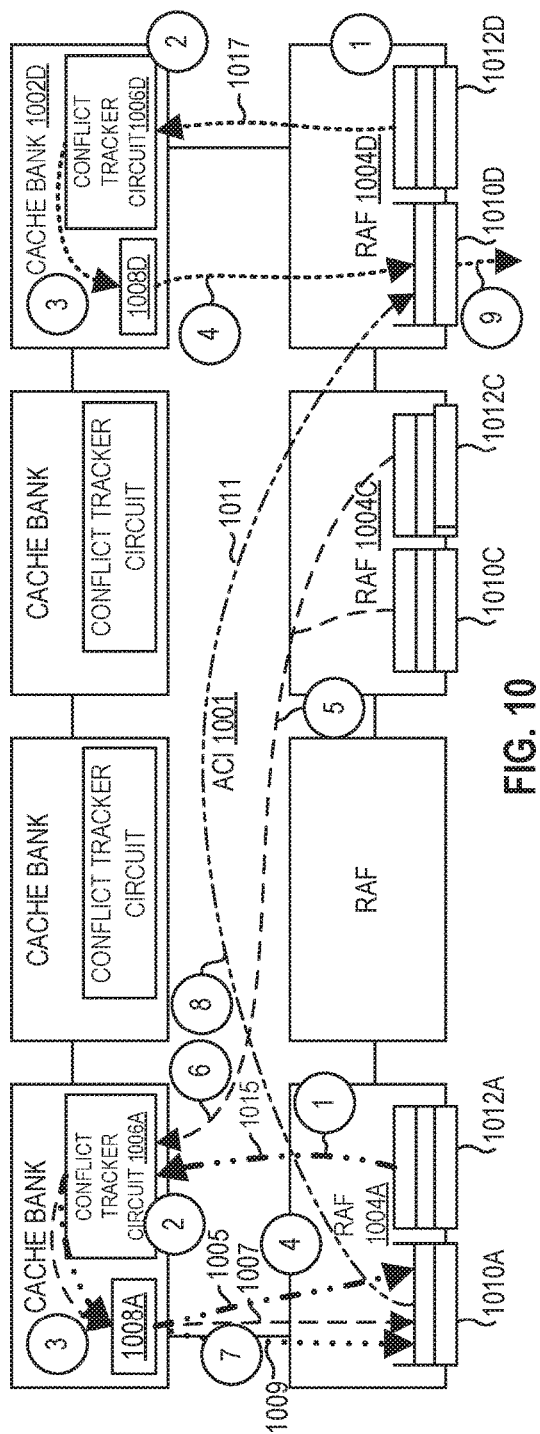
FIG. 10 illustrates an unprofitable speculation (misspeculation) in a plurality of memory interface circuits (e.g., request address file (RAF) circuits) to a plurality of cache banks according to embodiments of the disclosure.

FIG. 10 illustrates an unprofitable speculation (misspeculation) in a plurality of memory interface circuits (e.g., request address file (RAF) circuits (1004A, 1004C, 1004D)) coupled to a plurality of cache banks (1002, 1008) according to embodiments of the disclosure.

Here, two loads (load 1015 from RAF 1004A and load 1017 from RAF 1004D) are issued before the logically preceding store (from RAF 1004C). However, there is a conflict with (speculative) load 1015 occurring before the store and the store is also to send a memory dependency token to (speculative) load 1017, e.g., load 1017 dependency is to be ordered with respect to the conflict with load 1015. Thus, in certain embodiments, the value update message (7) is annotated to forward 1011 memory dependency token 1109 to (e.g., RAF 1004D of) load 1017, and order is maintained. In one embodiment, receipt of memory dependency token 1009 at RAF 1004D will allow the data for load 1017 to enter the fabric, e.g., released (10) from speculative completion storage 1010D.

Although not depicted, the plurality of memory interface circuits may be coupled to a spatial array (e.g., having a plurality of processing elements). Memory access requests may be generated by a component (for example, processing element, e.g., as disclosed herein) of the spatial array.

For the following, assume that a memory store request and then two memory load request are present in program order in code and, for example, the memory store request and the memory load requests are marked (e.g., by a compiler) as having a potential dynamic data dependency (e.g., they may, but not must, read and write to the same memory location) and the second (e.g., in program order) load 1017 is to occur after the store.

In one embodiment, the load and store operations for the requests are serialized (performed in program order only) where the program has declared that they require ordering, for example, a load would execute and pass a dependency token to the store (e.g., after completion), then the store would then execute on receipt of that dependency token, e.g., as discussed in Section 8 below. In general, however, the loads and store may not actually conflict (e.g., during run-time) because their addresses are not the same. Recognizing this, certain embodiments herein (e.g., of microarchitecture) optimistically issues memory (e.g., load) requests early, for example, even if the (e.g., store) address is not known, in the hope that no conflict (e.g., accessing the same address (not in program order) actually occurs. Such order-speculative requests may be marked as speculative.

FIG. 10 illustrates a case of unprofitable speculation (misspeculation) of the loop 300 in FIG. 3A (e.g., the dataflow graph of FIG. 3B) for load 1015 and store, with a dependency to the store from load 1017. Here, the load request 1015 is issued (1) to the memory (e.g., cache) before the logically preceding store request is issued (5) to the memory, even though the store from RAF 1004C is before the load 1015 from RAF 1004A in program order. Since the two accesses go to the same bank (bank 1002A), it may not be assumed that there is no address conflict.

More particularly, load request 1015 is received (e.g., from a processing element) and arrives at a memory interface circuit, e.g., RAF 1004A. In one embodiment, RAF 1004A includes one or more buffers 1012A (e.g., register(s)) to receive and store (memory (e.g., load) requests. See, for example, FIG. 21, e.g., queues and buffers thereof. RAF (shown as RAF 1004A) may then send (1) load request 1015 to the cache bank (shown as cache bank 1002A) storing the data to be loaded (e.g., according to the address of the data). In one embodiment, a (e.g., each) RAF is to perform a hash function on the incoming memory (e.g., load) request (e.g., the address the request is seeking to access) to determine which cache bank is storing that memory address, and the memory request may then be sent to that cache bank (e.g., on Accelerator Cache Interface (ACI) 1001 network). Here, that means that load request 1015 moves (1) to cache bank 1002A. Note that cache bank 1002A and RAF 1004A are adjacent, but this disclosure is not so limited.

Assuming this memory load request 1015 is speculative, e.g., marked as having a potential dynamic data dependency, the cache bank 1002A (e.g., a hazard detection circuit of cache bank 1002A) then starts tracking that address for hazards (e.g., errors), e.g., other access requests for that address. In one embodiment, metadata of (e.g., a tag of) a memory request includes a value (e.g., bit or bits) to indicate a potential dynamic data dependency. In one embodiment, the lack of the presence of a memory dependency token (e.g., from the logically proceeding memory access that is to occur before the current memory access) indicates that a memory access request is a speculative request.

In one embodiment, conflict tracker circuit 1006A (e.g., of a hazard detection circuit) inserts (2) the address of the speculative load 1015 into a speculation tracking data structure (e.g., speculative (meta) data storage 1008A). In one embodiment, metadata for load request that is now being tracked is placed (3) into speculative (meta) data storage 1008A (and/or with other data). Metadata may include data indicating the request address, the RAF and which speculative completion storage 1010A slot the speculative data for that request is stored in for that RAF.

Cache bank 1002A may then return (4) the data 1005 (e.g., value) corresponding to the request from the address, e.g., to the requesting RAF for a load request. In certain embodiments, that data (e.g., speculative value) is held in the RAF (e.g., in speculative completion storage 1010A (e.g., buffer) of the RAF), for example, and then released when program order is obtained (e.g., through a dependency token for the (immediately) previous program-order access of the current memory access, e.g., as discussed further herein). In certain embodiments, the speculative completion storage is used to store the speculative data until it is known to be safe to use. For example, once the order (e.g., memory dependency) token is obtained, the speculative value is no longer speculative and may be released into the spatial array (e.g., fabric). By issuing load requests early, certain embodiments herein hide memory access latency and increase memory level parallelism (MLP).

In certain embodiments, store request may be received by a (e.g., different) RAF (e.g., by RAF 1004C). RAF may include one or more queues or buffers (e.g., buffer 1010C and 1012C). Buffer 1010C may store the (payload) data for a particular store request and buffer 1012C may store the target address of that data for the particular store request. RAF 1004C may then send store request to the cache bank (shown as cache bank 1002A) where the data is to be stored (e.g., according to the target address of the store). In one embodiment, a (e.g., each) RAF is to perform a hash function on the incoming memory (e.g., store) request (e.g., the address the request is seeking to access) to determine which cache bank is to store data for that memory address, and the memory request may then be sent to that cache bank (e.g., on Accelerator Cache Interface (ACI) 1001 network). Here, that means that store request moves (5) to cache bank 1002A. Assuming this memory store request is speculative (e.g., marked as having a potential dynamic data dependency, for example, by not yet having a memory dependency token for that particular request), the cache bank 1002A (e.g., a hazard detection circuit of cache bank 1002A) then starts tracking/checking (6) that address for hazards (e.g., errors). Here, load request(s) may be dependent on store request (e.g., such a memory dependency token indicates that the store operation is intended to be performed before the corresponding load operation). The term corresponding for memory accesses may generally refer to two (or more) memory accesses that are to be performed in a given order, e.g., having a memory dependency token for the second memory access that stalls the second memory access (e.g., or stalls the associated data in a buffer) until the first memory access occurs (or is committed) and thus causes the memory dependency token to be sent (or updated) for the second memory access to indicate completion of the first memory access. The hazard detection circuit of cache bank 1002A (e.g., conflict tracker circuit 1006A) may query its storage (e.g., and/or the speculative data storage of others hazard detection circuits) and determine that a speculative access (e.g., by load request 1015 from RAF 1004A) has been made for that address, e.g., there is a hazard currently. The hazard detection circuit of cache bank 1002A (e.g., conflict tracker circuit 1006A) may query its storage (e.g., and/or the speculative data storage of others hazard detection circuits) and also determine that a memory access (e.g., load 1017) is dependent (e.g., is to receive a memory dependency token therefrom) on the store in RAF 1004C. Thus, a message from cache bank 1002A (e.g., value update message (7)) may also cause that memory dependency token 1009 to be forwarded to RAF 1004D for load 1017. Certain embodiments herein thus prevent a memory dependency token from preceding a speculative value update, e.g., to prevent tokens from passing each other.

The hazard detection circuit of cache bank 1002A (e.g., conflict tracker circuit 1006A) may then indicate there is an error, for example, which may cause a remedial action to be taken, e.g., by error indication circuitry/error handler circuitry (e.g., error indication circuitry/error handler circuitry 606 in FIG. 6). In the depicted embodiment, hazard detection circuit (e.g., error handler circuitry) may send the updated value 1007 (e.g., from the store) to the requesting RAF and/or spatial array. In one embodiment, the updated value 1007 overwrites the speculative value 1005, e.g., in the same slot of speculative completion storage 1010A. In the depicted embodiment, hazard detection circuit (e.g., error handler circuitry) may further send (7) the memory dependency token 1009 (e.g., corresponding to request of load 1017) to the requesting RAF and/or spatial array. In one embodiment, the receipt of memory dependency token 1009 in RAF 1004A causes the dependency token 1009 to be sent 1011 to RAF 1004D, e.g., as dependency token 1009 corresponding to request of load 1017. In one embodiment, a store request comes in with a memory dependency token that indicates that the dependent load (e.g., from RAF 1004A) is the target for that memory dependency token. In one embodiment, the steering of a dependency token is annotated with the request, e.g., the ACI has a back path for dependency tokens. For example, when the store commits into bank 1002A, circuitry (e.g., bank 1002A) may send the dependency token 1009 to the appropriate location (e.g., RAF 1004A here). As a result, the newly stored value is sent to the requesting RAF 1004A and the memory dependency token is sent to the requesting RAF 1004A and the RAF 1004D with the dependency on the store. Load latency may still be reduced as compared to a baseline case, e.g., since load data is directly forwarded.

Cache Banks

In certain embodiments, cache banks include a hazard detection circuit, e.g., each cache bank includes a hazard detection circuit. A hazard detection circuit may be used to maintain a view of existing outstanding speculative accesses. A hazard detection circuit (e.g., a conflict tracker circuit thereof) may be accessed based on tags present in inbound requests, e.g., from the RAFs.

In one embodiment, a hazard detection circuit includes a conflict tracker circuit (e.g., conflict tracker circuit 602 in FIG. 6) and a speculative metadata storage (e.g., speculative (meta) data storage 604 in FIG. 6). The conflict tracker circuit may be queried to determine if a particular address is currently speculative, e.g., within any RAF. In one embodiment, a conflict tracker circuit includes a counting bloom filter, e.g., to ensure that multiple speculative requests to the same address are tracked. Insertion and deletion in counting bloom filters may be based on access requests and their completion. Alternatively, conflict tracker circuit may include a content addressable memory (CAM) to track multiple speculative requests to a same address.

Speculative metadata storage may include information (e.g., metadata) about speculative cache accesses, for example, the request address, the RAF, and speculative completion storage address (slot). In one embodiment, a bloom filter may have false positives if it is used for tracking, thus the speculative metadata storage may be tagged with speculative request addresses to allow the appropriate metadata to be found. In this case, an associative store like a cache could be used, including a fully associative cache. Certain embodiments herein manage conflict granularity at less than a cache line (e.g., a 32-bit or 64-bit word) or the cache line level, e.g., with the lower level using more bits in the tracking structure metadata. In certain embodiments, all potentially conflicting stores access the conflict tracker circuit (e.g., bloom filter), it is possible to use a pre-filter to eliminate some checks, for example, if the filter is empty.

RAFs

Figure 11:
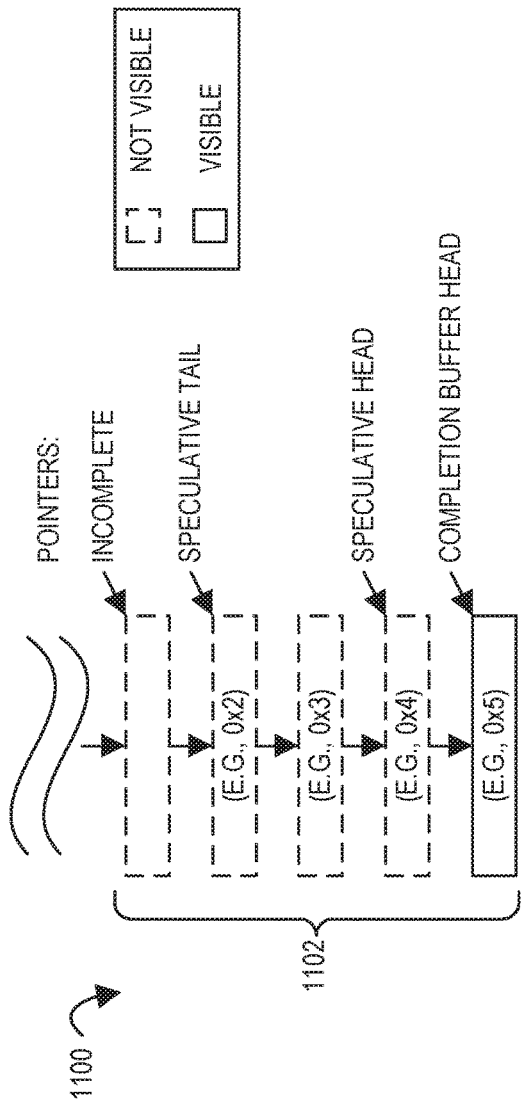
FIG. 11 illustrates a microarchitectural extension for speculative completion storage according to embodiments of the disclosure.

In certain embodiments, a memory interface circuit (e.g., RAF) includes speculative completion storage, e.g., as shown in FIG. 11. The memory interface circuit may allow for the notion of a speculative value, e.g., a value which is present, but not yet available (not visible) to the program. In one embodiment, a memory interface circuit includes a counter which is updated as memory dependency tokens become available (e.g., for data stored in the speculative completion storage). The speculative completion storage may also be extended to contain (e.g., any) cache metadata utilized to send the tracking-removal message back to the cache.

In one embodiment, a memory interface circuit includes control to permit or restrict the speculation operations. In one embodiment, a memory interface circuit includes utilizes a speculative dependency token, e.g., similar to the memory dependency tokens discussed herein but allowing them to have negative values, e.g., with a programmable (lower) limit. Speculation may occur when the dependency token balance is less than zero. If the balance is non-negative, then program order may be obtained, e.g., a check useful in several program management operations like context switches. A speculative dependency token may be used to put a limit on the number of speculative accesses outstanding, e.g., a RAF may be limited to one or a plurality (e.g., 2, 3, 4, 5, 6, 7, 8, 9, 10, etc.) outstanding speculative accesses, e.g., stored in that RAF's speculative completion storage. In one embodiment, it is possible to disable speculation by setting the speculation limit to a value (e.g., zero).

FIG. 11 illustrates a microarchitectural extension 1100 for speculative completion storage 1102 according to embodiments of the disclosure. In one embodiment, a memory interface circuit (e.g., RAF) maintains additional state (e.g., the pointers depicted on the right side in FIG. 11) to reflect the speculative nature of speculative completion storage. For example, the data in the dotted boxes, e.g., "not visible", may not be released into a spatial array (e.g., fabric) therefrom until an according memory dependency token is received (e.g., from a store executing).

ACI Network

In one embodiment, an ACI network includes the network support to carry various metadata related to speculative operations. The metadata may be relatively small and only utilized (e.g., actuated) in the case of speculation.

Speculative Stores

Although certain embodiments reduce load latencies through speculation, embodiments may also accommodate speculative stores. For example, one issue with speculative stores may be is that it is possible to have multiple speculative accesses (loads or stores) to the same address. In general, these accesses may not be precisely ordered. In this case, the circuitry is to both discard whatever speculative accesses have occurred and send a message back to the RAFs that the stores should be retried in program order. Otherwise, the behavior of speculative stores may follow that of speculative loads discussed herein.

Certain of the above embodiments may generally store speculative data in storage (e.g., in the RAF) and not release it into the fabric before it is proved correct, e.g., on receipt of a memory dependency token. In those embodiments, the spatial array (e.g., fabric) may be correct, e.g., any issues caused by incorrect speculation do not get fanned out into the spatial array.

Additionally or alternatively, an embodiment may fan out speculative data into the spatial array, e.g., and when a data hazard is detected (for example, a read touches a line written by a different memory interface), a handler may be invoked to notify (e.g., software) of the issue. Certain embodiments herein also define a commit mechanism, e.g., which allows a spatial program to define points when it is known that no hazards exist.

Figure 12:
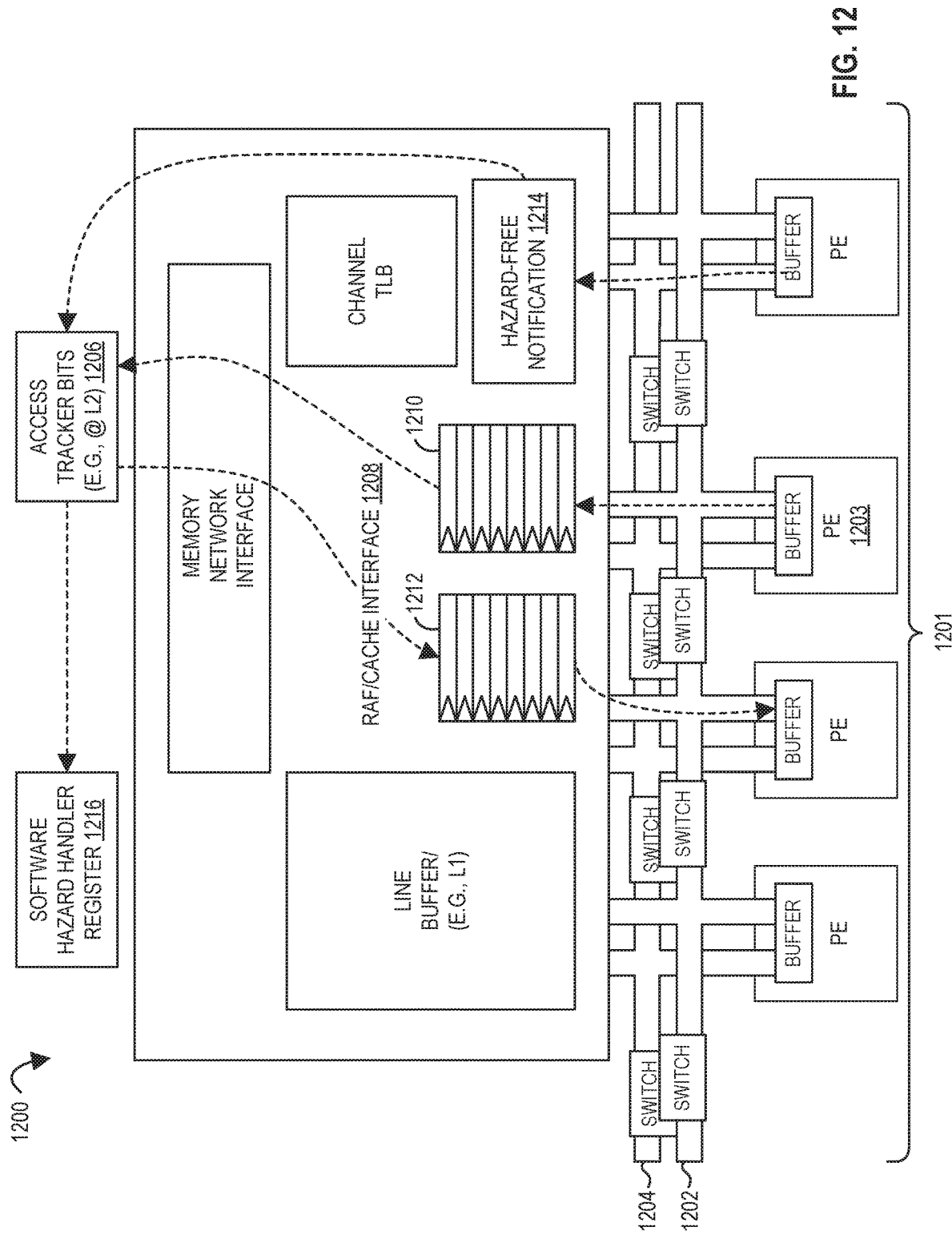
FIG. 12 illustrates a hazard tracking system according to embodiments of the disclosure.

FIG. 12 illustrates a hazard tracking system 1200 according to embodiments of the disclosure. Memory accesses requests (e.g., commands) may flow from the spatial array 1201 of processing elements (PEs) to the cache infrastructure, e.g., through a (circuit-switched) network 1202 and/or 1204. Access tracker bits may be stored in storage 1206 (e.g., in the (L2) cache) to track modifications to memory. Configuration bits may be used to detect the existence of conflicts. Depicted spatial array 1201 may interface with memory (not shown) via RAF/cache interface 1208, for example, as in the other figures herein (e.g., as in Section 8 herein). RAF/cache interface 1208 may include one or more input buffers 1210 and output buffers 1212. Data may not be output until a corresponding memory dependency token is received for memory access data in the output buffers 1212. In one embodiment, system 1200 (e.g., RAF/cache interface 1208) is to output data from output buffers 1212 even when the memory dependency tokens are not received, e.g., for data accesses that have a dynamic data dependency. But those outputs of data for accesses having a dynamic data dependency are tracked, e.g., with access tracker bits in storage 1206. Thus, an input of a memory dependency token to input buffer 1210 may be detected and checked against the access tracker bits in storage 1206. If there was dependent data already output (e.g., from output buffer 1212), then an error indication may be generated, for example, sent to control register e.g. to cause a software hazard handler to perform a corrective action (e.g., to perform a roll-back to previous point).

FIG. 12 shows a system-level architecture of a hazard detection interface. Here, a processing element (e.g., PE 1203) may make a memory access request (e.g., a store). For those requests (e.g., streams) which may have memory hazards (for example, when the memory dependency token has not yet been received, e.g., in a RAF) these accesses may be marked at the cache, e.g., using some status bits. If another access occurs (e.g., another stream accesses) to the address while it is marked, this may denote an access error. In one embodiment, this results in an exception being delivered to software. In one embodiment, an exception is delivered when a marked line would be evicted from the cache. On an exception, software may be invoked to repair the potential conflict. The effected (e.g., all) modified cache values may be invalidated, e.g., and software runs a less parallel version of the program, for example, a sequential version on a core at the point of a previous, safe check point. Certain embodiments herein may then change the (e.g., misspeculated) code to be less speculative, e.g., including disabling speculation support. Certain embodiments herein allow for adding a tag field (e.g., to a cache) to identify conflict sets, e.g., to allow finer conflict granularity.

Certain embodiments herein utilize check-pointing and notification on the part of the spatial array (e.g., fabric) software. The spatial array 1201 (e.g., fabric) may begin a checkpoint, and proceed with execution. After some time, the spatial array 1201 (e.g., fabric) may then synchronize memory, for example through issuing memory fences. The spatial array 1201 (e.g., fabric) may then notify the memory of the synchronization so that the access (conflict) tracker bit in storage 1206 may be cleared. On the completion of the clearing operation, the next can batch of spatial array 1201 (e.g., fabric) operations may begin. Hazards may be marked global, or between channels or sets of channels. In one embodiment, if conflicts occur between unmarked channels, then this is not an error and no exception will be generated (e.g., hazard free notification 1214 is sent).

FIG. 13 illustrates a flow diagram 1300 according to embodiments of the disclosure. Depicted flow 1300 includes receiving, with a memory interface circuit, memory requests from a spatial array of processing elements for data stored in a plurality of cache banks having a hazard detection circuit in each of the plurality of cache banks 1302; marking an address for tracking of other memory requests to the address with a first hazard detection circuit for a speculative memory load request from the memory interface circuit that is marked with a potential dynamic data dependency to the address within a first cache bank of the first hazard detection circuit 1304; storing data from the address in speculative completion storage 1306; and sending the data from the speculative completion storage to the spatial array of processing elements when a memory dependency token is received for the speculative memory load request 1308.

2. CSA Architecture

The goal of certain embodiments of a CSA is to rapidly and efficiently execute programs, e.g., programs produced by compilers. Certain embodiments of the CSA architecture provide programming abstractions that support the needs of compiler technologies and programming paradigms. Embodiments of the CSA execute dataflow graphs, e.g., a program manifestation that closely resembles the compiler's own internal representation (IR) of compiled programs. In this model, a program is represented as a dataflow graph comprised of nodes (e.g., vertices) drawn from a set of architecturally-defined dataflow operators (e.g., that encompass both computation and control operations) and edges which represent the transfer of data between dataflow operators. Execution may proceed by injecting dataflow tokens (e.g., that are or represent data values) into the dataflow graph. Tokens may flow between and be transformed at each node (e.g., vertex), for example, forming a complete computation. A sample dataflow graph and its derivation from high-level source code is shown in FIGS. 14A-14C, and FIG. 16 shows an example of the execution of a dataflow graph.

Embodiments of the CSA are configured for dataflow graph execution by providing exactly those dataflow-graph-execution supports required by compilers. In one embodiment, the CSA is an accelerator (e.g., an accelerator in FIG. 2) and it does not seek to provide some of the necessary but infrequently used mechanisms available on general purpose processing cores (e.g., a core in FIG. 2), such as system calls. Therefore, in this embodiment, the CSA can execute many codes, but not all codes. In exchange, the CSA gains significant performance and energy advantages. To enable the acceleration of code written in commonly used sequential languages, embodiments herein also introduce several novel architectural features to assist the compiler. One particular novelty is CSA's treatment of memory, a subject which has been ignored or poorly addressed previously. Embodiments of the CSA are also unique in the use of dataflow operators, e.g., as opposed to lookup tables (LUTs), as their fundamental architectural interface.

Turning back to embodiments of the CSA, dataflow operators are discussed next.

2.1 Dataflow Operators

The key architectural interface of embodiments of the accelerator (e.g., CSA) is the dataflow operator, e.g., as a direct representation of a node in a dataflow graph. From an operational perspective, dataflow operators behave in a streaming or data-driven fashion. Dataflow operators may execute as soon as their incoming operands become available. CSA dataflow execution may depend (e.g., only) on highly localized status, for example, resulting in a highly scalable architecture with a distributed, asynchronous execution model. Dataflow operators may include arithmetic dataflow operators, for example, one or more of floating point addition and multiplication, integer addition, subtraction, and multiplication, various forms of comparison, logical operators, and shift. However, embodiments of the CSA may also include a rich set of control operators which assist in the management of dataflow tokens in the program graph. Examples of these include a "pick" operator, e.g., which multiplexes two or more logical input channels into a single output channel, and a "switch" operator, e.g., which operates as a channel demultiplexor (e.g., outputting a single channel from two or more logical input channels). These operators may enable a compiler to implement control paradigms such as conditional expressions. Certain embodiments of a CSA may include a limited dataflow operator set (e.g., to relatively small number of operations) to yield dense and energy efficient PE microarchitectures. Certain embodiments may include dataflow operators for complex operations that are common in HPC code. The CSA dataflow operator architecture is highly amenable to deployment-specific extensions. For example, more complex mathematical dataflow operators, e.g., trigonometry functions, may be included in certain embodiments to accelerate certain mathematics-intensive HPC workloads. Similarly, a neural-network tuned extension may include dataflow operators for vectorized, low precision arithmetic.

FIG. 14A illustrates a program source according to embodiments of the disclosure. Program source code includes a multiplication function (func). FIG. 14B illustrates a dataflow graph 1400 for the program source of FIG. 14A according to embodiments of the disclosure. Dataflow graph 1400 includes a pick node 1404, switch node 1406, and multiplication node 1408. A buffer may optionally be included along one or more of the communication paths. Depicted dataflow graph 1400 may perform an operation of selecting input X with pick node 1404, multiplying X by Y (e.g., multiplication node 1408), and then outputting the result from the left output of the switch node 1406. FIG. 14C illustrates an accelerator (e.g., CSA) with a plurality of processing elements 1401 configured to execute the dataflow graph of FIG. 14B according to embodiments of the disclosure. More particularly, the dataflow graph 1400 is overlaid into the array of processing elements 1401 (e.g., and the (e.g., interconnect) network(s) therebetween), for example, such that each node of the dataflow graph 1400 is represented as a dataflow operator in the array of processing elements 1401. For example, certain dataflow operations may be achieved with a processing element and/or certain dataflow operations may be achieved with a communications network (e.g., a network dataflow endpoint circuit thereof). For example, a Pick, PickSingleLeg, PickAny, Switch, and/or SwitchAny operation may be achieved with one or more components of a communications network (e.g., a network dataflow endpoint circuit thereof), e.g., in contrast to a processing element.

In one embodiment, one or more of the processing elements in the array of processing elements 1401 is to access memory through memory interface 1402. In one embodiment, pick node 1404 of dataflow graph 1400 thus corresponds (e.g., is represented by) to pick operator 1404A, switch node 1406 of dataflow graph 1400 thus corresponds (e.g., is represented by) to switch operator 1406A, and multiplier node 1408 of dataflow graph 1400 thus corresponds (e.g., is represented by) to multiplier operator 1408A. Another processing element and/or a flow control path network may provide the control signals (e.g., control tokens) to the pick operator 1404A and switch operator 1406A to perform the operation in FIG. 14A. In one embodiment, array of processing elements 1401 is configured to execute the dataflow graph 1400 of FIG. 14B before execution begins. In one embodiment, compiler performs the conversion from FIG. 14A-14B. In one embodiment, the input of the dataflow graph nodes into the array of processing elements logically embeds the dataflow graph into the array of processing elements, e.g., as discussed further below, such that the input/output paths are configured to produce the desired result.

2.2 Latency Insensitive Channels

Communications arcs are the second major component of the dataflow graph. Certain embodiments of a CSA describes these arcs as latency insensitive channels, for example, in-order, back-pressured (e.g., not producing or sending output until there is a place to store the output), point-to-point communications channels. As with dataflow operators, latency insensitive channels are fundamentally asynchronous, giving the freedom to compose many types of networks to implement the channels of a particular graph. Latency insensitive channels may have arbitrarily long latencies and still faithfully implement the CSA architecture. However, in certain embodiments there is strong incentive in terms of performance and energy to make latencies as small as possible. Section 3.2 herein discloses a network microarchitecture in which dataflow graph channels are implemented in a pipelined fashion with no more than one cycle of latency. Embodiments of latency-insensitive channels provide a critical abstraction layer which may be leveraged with the CSA architecture to provide a number of runtime services to the applications programmer. For example, a CSA may leverage latency-insensitive channels in the implementation of the CSA configuration (the loading of a program onto the CSA array).

Figure 15:
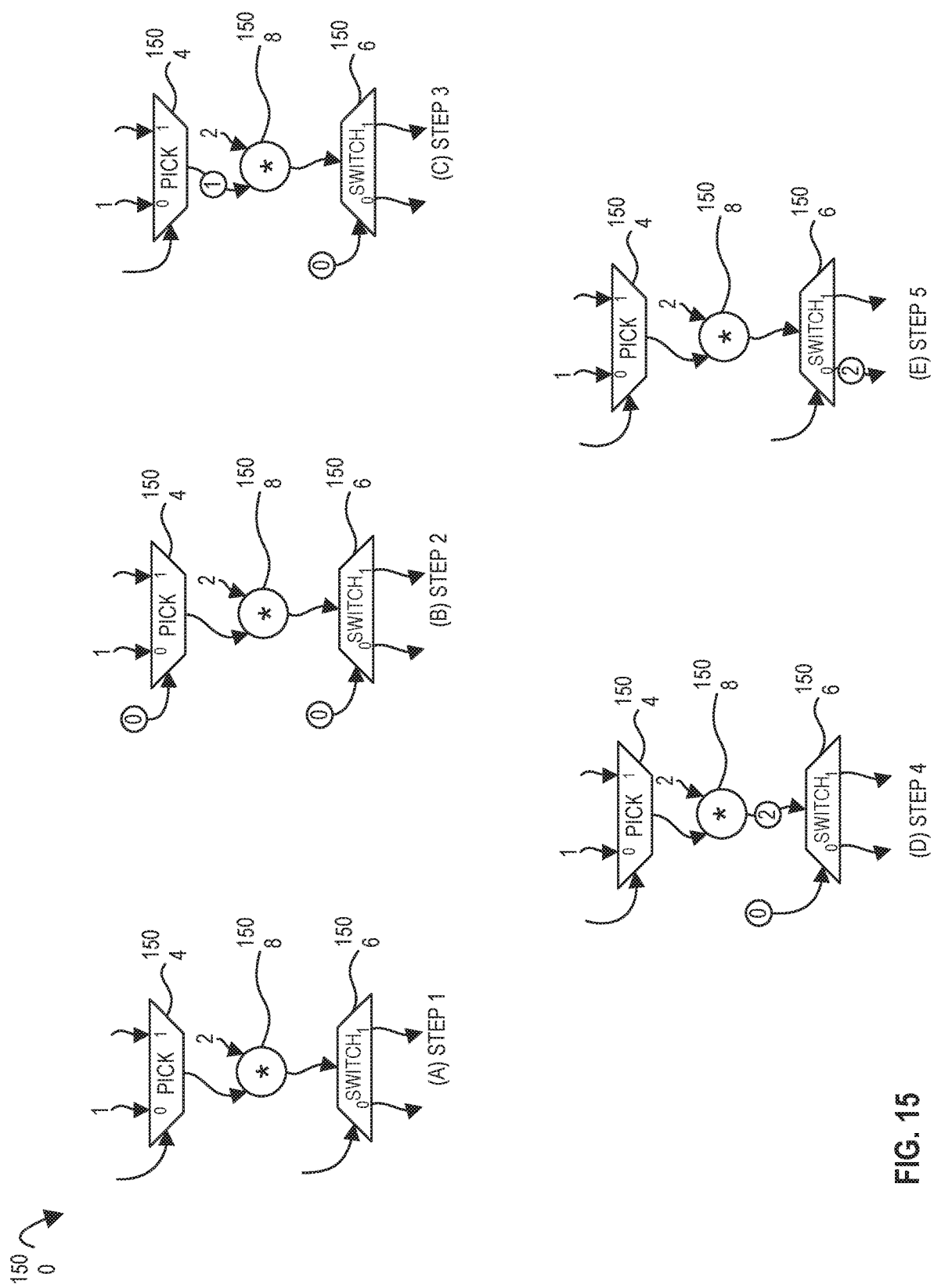
FIG. 15 illustrates an example execution of a dataflow graph according to embodiments of the disclosure.

FIG. 15 illustrates an example execution of a dataflow graph 1500 according to embodiments of the disclosure. At step 1, input values (e.g., 1 for X in FIG. 14B and 2 for Y in FIG. 14B) may be loaded in dataflow graph 1500 to perform a 1*2 multiplication operation. One or more of the data input values may be static (e.g., constant) in the operation (e.g., 1 for X and 2 for Y in reference to FIG. 14B) or updated during the operation. At step 2, a processing element (e.g., on a flow control path network) or other circuit outputs a zero to control input (e.g., mux control signal) of pick node 1504 (e.g., to source a one from port "0" to its output) and outputs a zero to control input (e.g., mux control signal) of switch node 1506 (e.g., to provide its input out of port "0" to a destination (e.g., a downstream processing element). At step 3, the data value of 1 is output from pick node 1504 (e.g., and consumes its control signal "0" at the pick node 1504) to multiplier node 1508 to be multiplied with the data value of 2 at step 4. At step 4, the output of multiplier node 1508 arrives at switch node 1506, e.g., which causes switch node 1506 to consume a control signal "0" to output the value of 2 from port "0" of switch node 1506 at step 5. The operation is then complete. A CSA may thus be programmed accordingly such that a corresponding dataflow operator for each node performs the operations in FIG. 15. Although execution is serialized in this example, in principle all dataflow operations may execute in parallel. Steps are used in FIG. 15 to differentiate dataflow execution from any physical microarchitectural manifestation. In one embodiment a downstream processing element is to send a signal (or not send a ready signal) (for example, on a flow control path network) to the switch 1506 to stall the output from the switch 1506, e.g., until the downstream processing element is ready (e.g., has storage room) for the output.

2.3 Memory

Dataflow architectures generally focus on communication and data manipulation with less attention paid to state. However, enabling real software, especially programs written in legacy sequential languages, requires significant attention to interfacing with memory. Certain embodiments of a CSA use architectural memory operations as their primary interface to (e.g., large) stateful storage. From the perspective of the dataflow graph, memory operations are similar to other dataflow operations, except that they have the side effect of updating a shared store. In particular, memory operations of certain embodiments herein have the same semantics as every other dataflow operator, for example, they "execute" when their operands, e.g., an address, are available and, after some latency, a response is produced. Certain embodiments herein explicitly decouple the operand input and result output such that memory operators are naturally pipelined and have the potential to produce many simultaneous outstanding requests, e.g., making them exceptionally well suited to the latency and bandwidth characteristics of a memory subsystem. Embodiments of a CSA provide basic memory operations such as load, which takes an address channel and populates a response channel with the values corresponding to the addresses, and a store. Embodiments of a CSA may also provide more advanced operations such as in-memory atomics and consistency operators. These operations may have similar semantics to their von Neumann counterparts. Embodiments of a CSA may accelerate existing programs described using sequential languages such as C and Fortran. A consequence of supporting these language models is addressing program memory order, e.g., the serial ordering of memory operations typically prescribed by these languages.

FIG. 16 illustrates a program source (e.g., C code) 1600 according to embodiments of the disclosure. According to the memory semantics of the C programming language, memory copy (memcpy) should be serialized. However, memcpy may be parallelized with an embodiment of the CSA if arrays A and B are known to be disjoint. FIG. 16 further illustrates the problem of program order. In general, compilers cannot prove that array A is different from array B, e.g., either for the same value of index or different values of index across loop bodies. This is known as pointer or memory aliasing. Since compilers are to generate statically correct code, they are usually forced to serialize memory accesses. Typically, compilers targeting sequential von Neumann architectures use instruction ordering as a natural means of enforcing program order. However, embodiments of the CSA have no notion of instruction or instruction-based program ordering as defined by a program counter. In certain embodiments, incoming dependency tokens, e.g., which contain no architecturally visible information, are like all other dataflow tokens and memory operations may not execute until they have received a dependency token. In certain embodiments, memory operations produce an outgoing dependency token once their operation is visible to all logically subsequent, dependent memory operations. In certain embodiments, dependency tokens are similar to other dataflow tokens in a dataflow graph. For example, since memory operations occur in conditional contexts, dependency tokens may also be manipulated using control operators described in Section 2.1, e.g., like any other tokens. Dependency tokens may have the effect of serializing memory accesses, e.g., providing the compiler a means of architecturally defining the order of memory accesses.

2.4 Runtime Services

A primary architectural considerations of embodiments of the CSA involve the actual execution of user-level programs, but it may also be desirable to provide several support mechanisms which underpin this execution. Chief among these are configuration (in which a dataflow graph is loaded into the CSA), extraction (in which the state of an executing graph is moved to memory), and exceptions (in which mathematical, soft, and other types of errors in the fabric are detected and handled, possibly by an external entity). Section 3.6 below discusses the properties of a latency-insensitive dataflow architecture of an embodiment of a CSA to yield efficient, largely pipelined implementations of these functions. Conceptually, configuration may load the state of a dataflow graph into the interconnect (and/or communications network (e.g., a network dataflow endpoint circuit thereof)) and processing elements (e.g., fabric), e.g., generally from memory. During this step, all structures in the CSA may be loaded with a new dataflow graph and any dataflow tokens live in that graph, for example, as a consequence of a context switch. The latency-insensitive semantics of a CSA may permit a distributed, asynchronous initialization of the fabric, e.g., as soon as PEs are configured, they may begin execution immediately. Unconfigured PEs may backpressure their channels until they are configured, e.g., preventing communications between configured and unconfigured elements. The CSA configuration may be partitioned into privileged and user-level state. Such a two-level partitioning may enable primary configuration of the fabric to occur without invoking the operating system. During one embodiment of extraction, a logical view of the dataflow graph is captured and committed into memory, e.g., including all live control and dataflow tokens and state in the graph.

Extraction may also play a role in providing reliability guarantees through the creation of fabric checkpoints. Exceptions in a CSA may generally be caused by the same events that cause exceptions in processors, such as illegal operator arguments or reliability, availability, and serviceability (RAS) events. In certain embodiments, exceptions are detected at the level of dataflow operators, for example, checking argument values or through modular arithmetic schemes. Upon detecting an exception, a dataflow operator (e.g., circuit) may halt and emit an exception message, e.g., which contains both an operation identifier and some details of the nature of the problem that has occurred. In one embodiment, the dataflow operator will remain halted until it has been reconfigured. The exception message may then be communicated to an associated processor (e.g., core) for service, e.g., which may include extracting the graph for software analysis.

2.5 Tile-level Architecture

Figure 17:
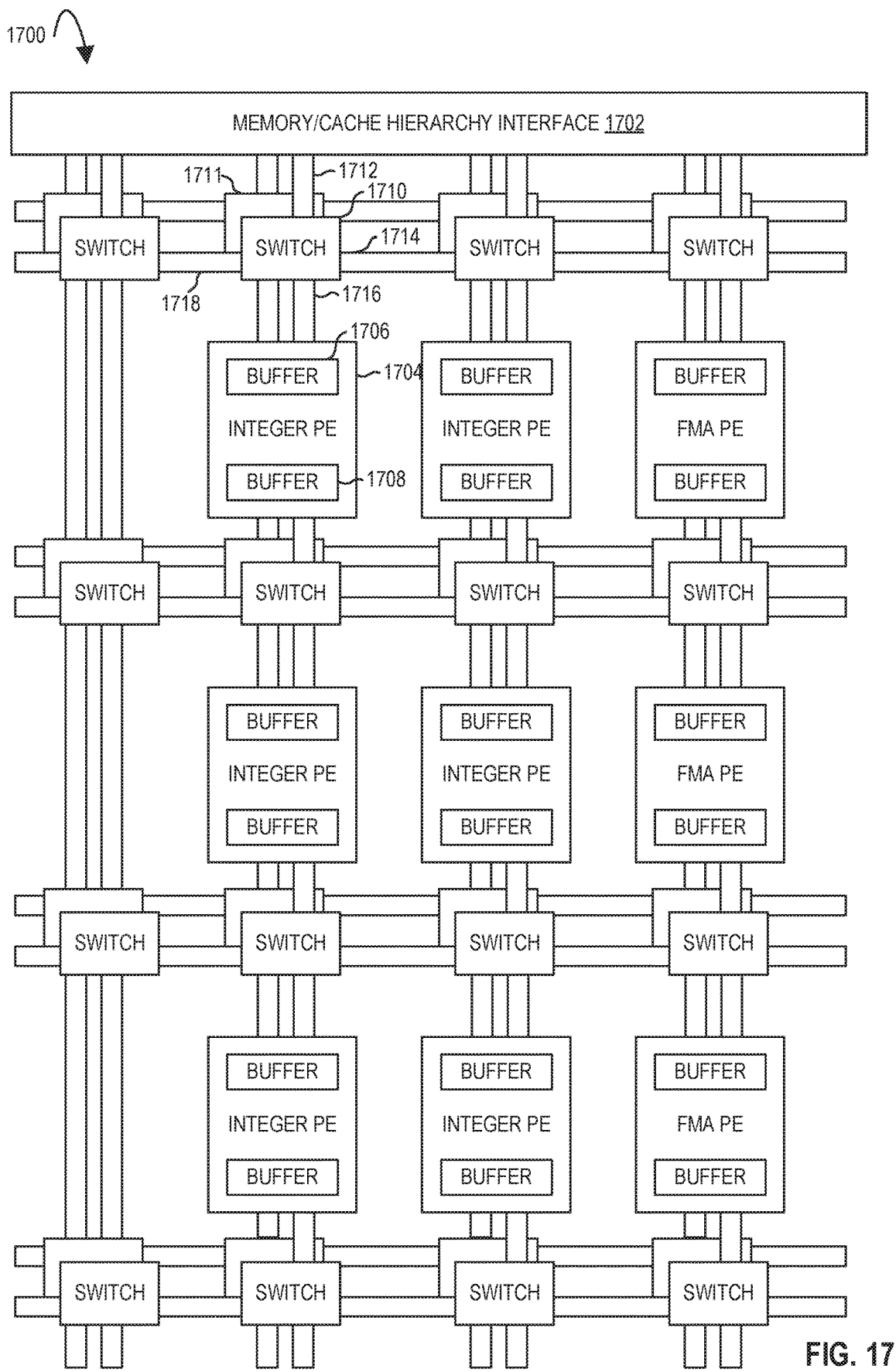
FIG. 17 illustrates an accelerator tile comprising an array of processing elements according to embodiments of the disclosure.
Figure 19:
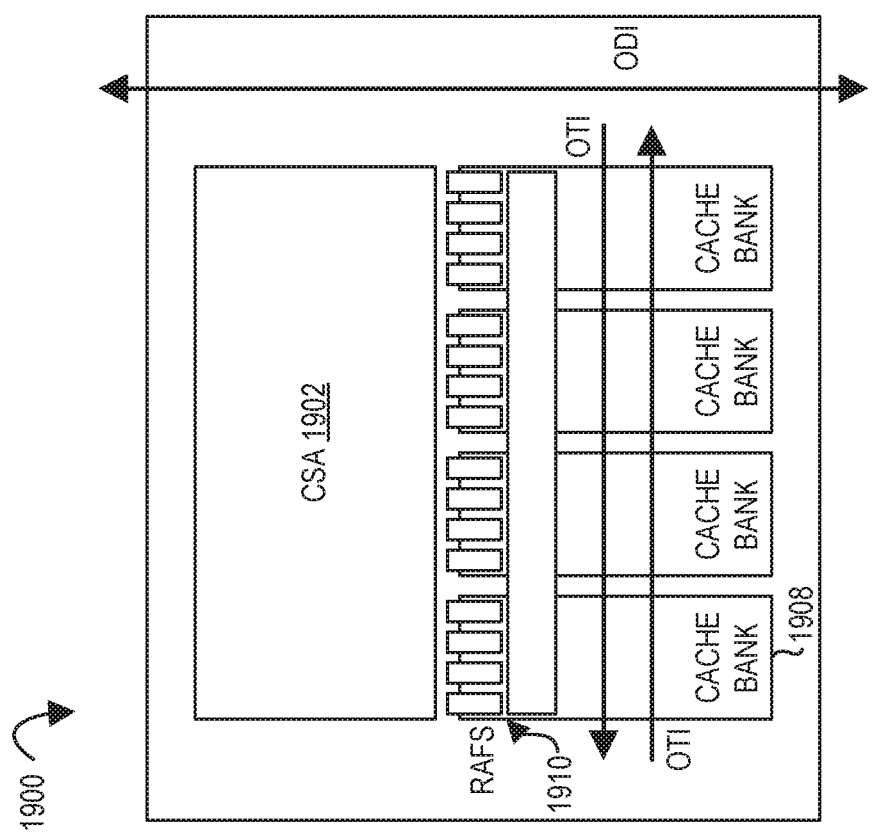
FIG. 19 illustrates a hardware processor tile comprising an accelerator according to embodiments of the disclosure.

Embodiments of the CSA computer architectures (e.g., targeting HPC and datacenter uses) are tiled. FIGS. 17 and 19 show tile-level deployments of a CSA. FIG. 19 shows a full-tile implementation of a CSA, e.g., which may be an accelerator of a processor with a core. A main advantage of this architecture is may be reduced design risk, e.g., such that the CSA and core are completely decoupled in manufacturing. In addition to allowing better component reuse, this may allow the design of components like the CSA Cache to consider only the CSA, e.g., rather than needing to incorporate the stricter latency requirements of the core. Finally, separate tiles may allow for the integration of CSA with small or large cores. One embodiment of the CSA captures most vector-parallel workloads such that most vector-style workloads run directly on the CSA, but in certain embodiments vector-style instructions in the core may be included, e.g., to support legacy binaries.

3. Microarchitecture

In one embodiment, the goal of the CSA microarchitecture is to provide a high quality implementation of each dataflow operator specified by the CSA architecture. Embodiments of the CSA microarchitecture provide that each processing element (and/or communications network (e.g., a network dataflow endpoint circuit thereof)) of the microarchitecture corresponds to approximately one node (e.g., entity) in the architectural dataflow graph. In one embodiment, a node in the dataflow graph is distributed in multiple network dataflow endpoint circuits. In certain embodiments, this results in microarchitectural elements that are not only compact, resulting in a dense computation array, but also energy efficient, for example, where processing elements (PEs) are both simple and largely unmultiplexed, e.g., executing a single dataflow operator for a configuration (e.g., programming) of the CSA. To further reduce energy and implementation area, a CSA may include a configurable, heterogeneous fabric style in which each PE thereof implements only a subset of dataflow operators (e.g., with a separate subset of dataflow operators implemented with network dataflow endpoint circuit(s)). Peripheral and support subsystems, such as the CSA cache, may be provisioned to support the distributed parallelism incumbent in the main CSA processing fabric itself. Implementation of CSA microarchitectures may utilize dataflow and latency-insensitive communications abstractions present in the architecture. In certain embodiments, there is (e.g., substantially) a one-to-one correspondence between nodes in the compiler generated graph and the dataflow operators (e.g., dataflow operator compute elements) in a CSA.

Below is a discussion of an example CSA, followed by a more detailed discussion of the microarchitecture. Certain embodiments herein provide a CSA that allows for easy compilation, e.g., in contrast to an existing FPGA compilers that handle a small subset of a programming language (e.g., C or C++) and require many hours to compile even small programs.

Certain embodiments of a CSA architecture admits of heterogeneous coarse-grained operations, like double precision floating point. Programs may be expressed in fewer coarse grained operations, e.g., such that the disclosed compiler runs faster than traditional spatial compilers. Certain embodiments include a fabric with new processing elements to support sequential concepts like program ordered memory accesses. Certain embodiments implement hardware to support coarse-grained dataflow-style communication channels. This communication model is abstract, and very close to the control-dataflow representation used by the compiler. Certain embodiments herein include a network implementation that supports single-cycle latency communications, e.g., utilizing (e.g., small) PEs which support single control-dataflow operations. In certain embodiments, not only does this improve energy efficiency and performance, it simplifies compilation because the compiler makes a one-to-one mapping between high-level dataflow constructs and the fabric. Certain embodiments herein thus simplify the task of compiling existing (e.g., C, C++, or Fortran) programs to a CSA (e.g., fabric).

Energy efficiency may be a first order concern in modern computer systems. Certain embodiments herein provide a new schema of energy-efficient spatial architectures. In certain embodiments, these architectures form a fabric with a unique composition of a heterogeneous mix of small, energy-efficient, dataflow oriented processing elements (PEs) (and/or a packet switched communications network (e.g., a network dataflow endpoint circuit thereof)) with a lightweight circuit switched communications network (e.g., interconnect), e.g., with hardened support for flow control. Due to the energy advantages of each, the combination of these components may form a spatial accelerator (e.g., as part of a computer) suitable for executing compiler-generated parallel programs in an extremely energy efficient manner. Since this fabric is heterogeneous, certain embodiments may be customized for different application domains by introducing new domain-specific PEs. For example, a fabric for high-performance computing might include some customization for double-precision, fused multiply-add, while a fabric targeting deep neural networks might include low-precision floating point operations.

An embodiment of a spatial architecture schema, e.g., as exemplified in FIG. 17, is the composition of light-weight processing elements (PE) connected by an inter-PE network. Generally, PEs may comprise dataflow operators, e.g., where once (e.g., all) input operands arrive at the dataflow operator, some operation (e.g., micro-instruction or set of micro-instructions) is executed, and the results are forwarded to downstream operators. Control, scheduling, and data storage may therefore be distributed amongst the PEs, e.g., removing the overhead of the centralized structures that dominate classical processors.

Programs may be converted to dataflow graphs that are mapped onto the architecture by configuring PEs and the network to express the control-dataflow graph of the program. Communication channels may be flow-controlled and fully back-pressured, e.g., such that PEs will stall if either source communication channels have no data or destination communication channels are full. In one embodiment, at runtime, data flow through the PEs and channels that have been configured to implement the operation (e.g., an accelerated algorithm). For example, data may be streamed in from memory, through the fabric, and then back out to memory.

Embodiments of such an architecture may achieve remarkable performance efficiency relative to traditional multicore processors: compute (e.g., in the form of PEs) may be simpler, more energy efficient, and more plentiful than in larger cores, and communications may be direct and mostly short-haul, e.g., as opposed to occurring over a wide, full-chip network as in typical multicore processors. Moreover, because embodiments of the architecture are extremely parallel, a number of powerful circuit and device level optimizations are possible without seriously impacting throughput, e.g., low leakage devices and low operating voltage. These lower-level optimizations may enable even greater performance advantages relative to traditional cores. The combination of efficiency at the architectural, circuit, and device levels yields of these embodiments are compelling. Embodiments of this architecture may enable larger active areas as transistor density continues to increase.

Embodiments herein offer a unique combination of dataflow support and circuit switching to enable the fabric to be smaller, more energy-efficient, and provide higher aggregate performance as compared to previous architectures. FPGAs are generally tuned towards fine-grained bit manipulation, whereas embodiments herein are tuned toward the double-precision floating point operations found in HPC applications. Certain embodiments herein may include a FPGA in addition to a CSA according to this disclosure.

Certain embodiments herein combine a light-weight network with energy efficient dataflow processing elements (and/or communications network (e.g., a network dataflow endpoint circuit thereof)) to form a high-throughput, low-latency, energy-efficient HPC fabric. This low-latency network may enable the building of processing elements (and/or communications network (e.g., a network dataflow endpoint circuit thereof)) with fewer functionalities, for example, only one or two instructions and perhaps one architecturally visible register, since it is efficient to gang multiple PEs together to form a complete program.

Relative to a processor core, CSA embodiments herein may provide for more computational density and energy efficiency. For example, when PEs are very small (e.g., compared to a core), the CSA may perform many more operations and have much more computational parallelism than a core, e.g., perhaps as many as 16 times the number of FMAs as a vector processing unit (VPU). To utilize all of these computational elements, the energy per operation is very low in certain embodiments.

The energy advantages our embodiments of this dataflow architecture are many. Parallelism is explicit in dataflow graphs and embodiments of the CSA architecture spend no or minimal energy to extract it, e.g., unlike out-of-order processors which must re-discover parallelism each time an instruction is executed. Since each PE is responsible for a single operation in one embodiment, the register files and ports counts may be small, e.g., often only one, and therefore use less energy than their counterparts in core. Certain CSAs include many PEs, each of which holds live program values, giving the aggregate effect of a huge register file in a traditional architecture, which dramatically reduces memory accesses. In embodiments where the memory is multi-ported and distributed, a CSA may sustain many more outstanding memory requests and utilize more bandwidth than a core. These advantages may combine to yield an energy level per watt that is only a small percentage over the cost of the bare arithmetic circuitry. For example, in the case of an integer multiply, a CSA may consume no more than 25% more energy than the underlying multiplication circuit. Relative to one embodiment of a core, an integer operation in that CSA fabric consumes less than 1/30th of the energy per integer operation.

From a programming perspective, the application-specific malleability of embodiments of the CSA architecture yields significant advantages over a vector processing unit (VPU). In traditional, inflexible architectures, the number of functional units, like floating divide or the various transcendental mathematical functions, must be chosen at design time based on some expected use case. In embodiments of the CSA architecture, such functions may be configured (e.g., by a user and not a manufacturer) into the fabric based on the requirement of each application. Application throughput may thereby be further increased. Simultaneously, the compute density of embodiments of the CSA improves by avoiding hardening such functions, and instead provision more instances of primitive functions like floating multiplication. These advantages may be significant in HPC workloads, some of which spend 75% of floating execution time in transcendental functions.

Certain embodiments of the CSA represents a significant advance as a dataflow-oriented spatial architectures, e.g., the PEs of this disclosure may be smaller, but also more energy-efficient. These improvements may directly result from the combination of dataflow-oriented PEs with a lightweight, circuit switched interconnect, for example, which has single-cycle latency, e.g., in contrast to a packet switched network (e.g., with, at a minimum, a 300% higher latency). Certain embodiments of PEs support 32-bit or 64-bit operation. Certain embodiments herein permit the introduction of new application-specific PEs, for example, for machine learning or security, and not merely a homogeneous combination. Certain embodiments herein combine lightweight dataflow-oriented processing elements with a lightweight, low-latency network to form an energy efficient computational fabric.

In order for certain spatial architectures to be successful, programmers are to configure them with relatively little effort, e.g., while obtaining significant power and performance superiority over sequential cores. Certain embodiments herein provide for a CSA (e.g., spatial fabric) that is easily programmed (e.g., by a compiler), power efficient, and highly parallel. Certain embodiments herein provide for a (e.g., interconnect) network that achieves these three goals. From a programmability perspective, certain embodiments of the network provide flow controlled channels, e.g., which correspond to the control-dataflow graph (CDFG) model of execution used in compilers. Certain network embodiments utilize dedicated, circuit switched links, such that program performance is easier to reason about, both by a human and a compiler, because performance is predictable. Certain network embodiments offer both high bandwidth and low latency. Certain network embodiments (e.g., static, circuit switching) provides a latency of 0 to 1 cycle (e.g., depending on the transmission distance.) Certain network embodiments provide for a high bandwidth by laying out several networks in parallel, e.g., and in low-level metals. Certain network embodiments communicate in low-level metals and over short distances, and thus are very power efficient.

Certain embodiments of networks include architectural support for flow control. For example, in spatial accelerators composed of small processing elements (PEs), communications latency and bandwidth may be critical to overall program performance. Certain embodiments herein provide for a light-weight, circuit switched network which facilitates communication between PEs in spatial processing arrays, such as the spatial array shown in FIG. 17, and the microarchitectural control features necessary to support this network. Certain embodiments of a network enable the construction of point-to-point, flow controlled communications channels which support the communications of the dataflow oriented processing elements (PEs). In addition to point-to-point communications, certain networks herein also support multicast communications. Communications channels may be formed by statically configuring the network to from virtual circuits between PEs. Circuit switching techniques herein may decrease communications latency and commensurately minimize network buffering, e.g., resulting in both high performance and high energy efficiency. In certain embodiments of a network, inter-PE latency may be as low as a zero cycles, meaning that the downstream PE may operate on data in the cycle after it is produced. To obtain even higher bandwidth, and to admit more programs, multiple networks may be laid out in parallel, e.g., as shown in FIG. 17.

Spatial architectures, such as the one shown in FIG. 17, may be the composition of lightweight processing elements connected by an inter-PE network (and/or communications network (e.g., a network dataflow endpoint circuit thereof)). Programs, viewed as dataflow graphs, may be mapped onto the architecture by configuring PEs and the network. Generally, PEs may be configured as dataflow operators, and once (e.g., all) input operands arrive at the PE, some operation may then occur, and the result are forwarded to the desired downstream PEs. PEs may communicate over dedicated virtual circuits which are formed by statically configuring a circuit switched communications network. These virtual circuits may be flow controlled and fully backpressured, e.g., such that PEs will stall if either the source has no data or the destination is full. At runtime, data may flow through the PEs implementing the mapped algorithm. For example, data may be streamed in from memory, through the fabric, and then back out to memory. Embodiments of this architecture may achieve remarkable performance efficiency relative to traditional multicore processors: for example, where compute, in the form of PEs, is simpler and more numerous than larger cores and communication are direct, e.g., as opposed to an extension of the memory system.

FIG. 17 illustrates an accelerator tile 1700 comprising an array of processing elements (PEs) according to embodiments of the disclosure. The interconnect network is depicted as circuit switched, statically configured communications channels. For example, a set of channels coupled together by a switch (e.g., switch 1710 in a first network and switch 1711 in a second network). The first network and second network may be separate or coupled together. For example, switch 1710 may couple one or more of the four data paths (1712, 1714, 1716, 1718) together, e.g., as configured to perform an operation according to a dataflow graph. In one embodiment, the number of data paths is any plurality. Processing element (e.g., processing element 1704) may be as disclosed herein, for example, as in FIG. 20. Accelerator tile 1700 includes a memory/cache hierarchy interface 1702, e.g., to interface the accelerator tile 1700 with a memory and/or cache. A data path (e.g., 1718) may extend to another tile or terminate, e.g., at the edge of a tile.

A processing element may include an input buffer (e.g., buffer 1706) and an output buffer (e.g., buffer 1708).

Figure 20:
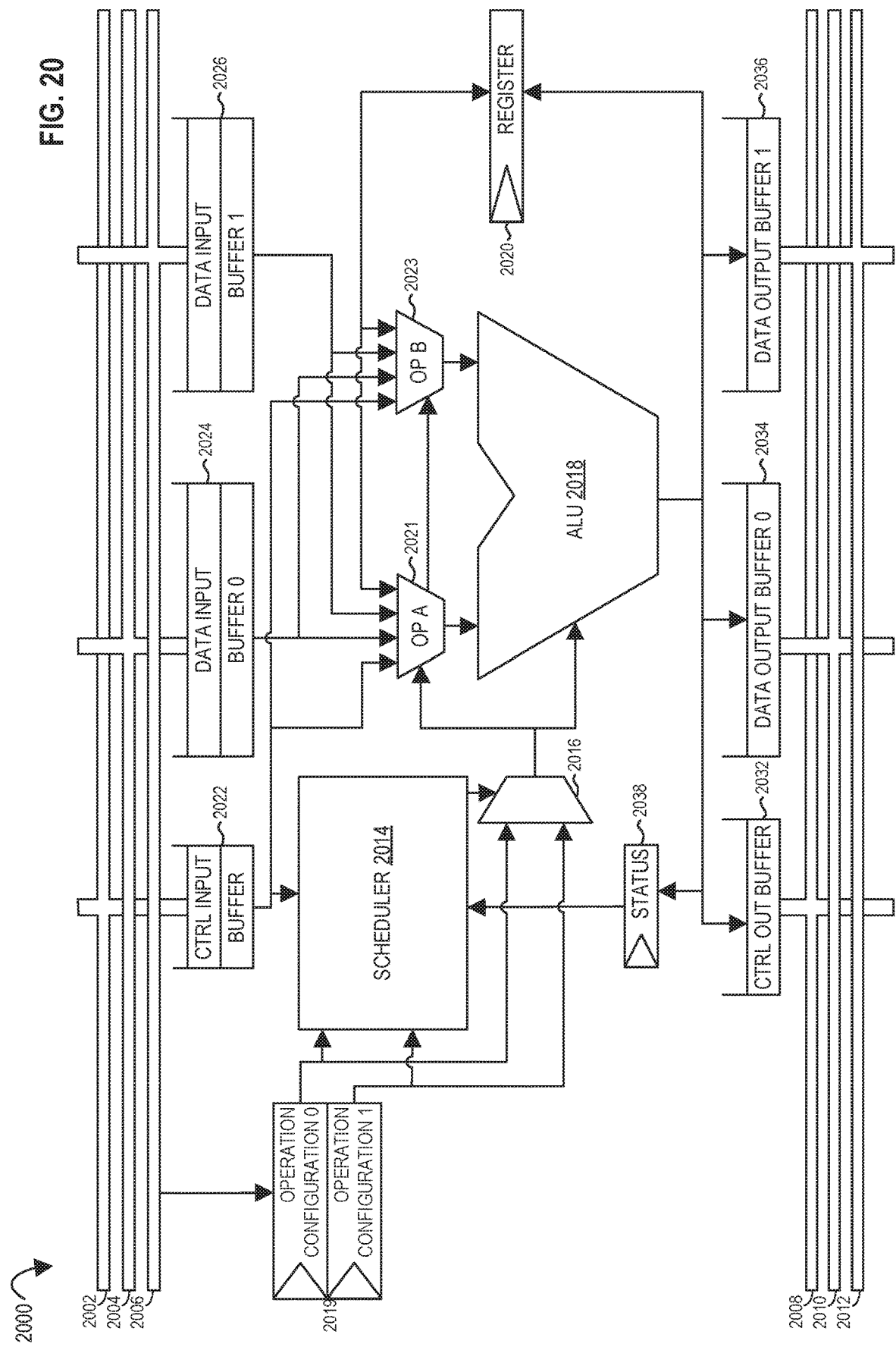
FIG. 20 illustrates a processing element according to embodiments of the disclosure.

Operations may be executed based on the availability of their inputs and the status of the PE. A PE may obtain operands from input channels and write results to output channels, although internal register state may also be used. Certain embodiments herein include a configurable dataflow-friendly PE. FIG. 20 shows a detailed block diagram of one such PE: the integer PE. This PE consists of several I/O buffers, an ALU, a storage register, some instruction registers, and a scheduler. Each cycle, the scheduler may select an instruction for execution based on the availability of the input and output buffers and the status of the PE. The result of the operation may then be written to either an output buffer or to a (e.g., local to the PE) register. Data written to an output buffer may be transported to a downstream PE for further processing. This style of PE may be extremely energy efficient, for example, rather than reading data from a complex, multi-ported register file, a PE reads the data from a register. Similarly, instructions may be stored directly in a register, rather than in a virtualized instruction cache.

Instruction registers may be set during a special configuration step. During this step, auxiliary control wires and state, in addition to the inter-PE network, may be used to stream in configuration across the several PEs comprising the fabric. As result of parallelism, certain embodiments of such a network may provide for rapid reconfiguration, e.g., a tile sized fabric may be configured in less than about 10 microseconds.

FIG. 20 represents one example configuration of a processing element, e.g., in which all architectural elements are minimally sized. In other embodiments, each of the components of a processing element is independently scaled to produce new PEs. For example, to handle more complicated programs, a larger number of instructions that are executable by a PE may be introduced. A second dimension of configurability is in the function of the PE arithmetic logic unit (ALU). In FIG. 20, an integer PE is depicted which may support addition, subtraction, and various logic operations. Other kinds of PEs may be created by substituting different kinds of functional units into the PE. An integer multiplication PE, for example, might have no registers, a single instruction, and a single output buffer. Certain embodiments of a PE decompose a fused multiply add (FMA) into separate, but tightly coupled floating multiply and floating add units to improve support for multiply-add-heavy workloads. PEs are discussed further below.

FIG. 18A illustrates a configurable data path network 1800 (e.g., of network one or network two discussed in reference to FIG. 17) according to embodiments of the disclosure. Network 1800 includes a plurality of multiplexers (e.g., multiplexers 1802, 1804, 1806) that may be configured (e.g., via their respective control signals) to connect one or more data paths (e.g., from PEs) together. FIG. 18B illustrates a configurable flow control path network 1801 (e.g., network one or network two discussed in reference to FIG. 17) according to embodiments of the disclosure. A network may be a light-weight PE-to-PE network. Certain embodiments of a network may be thought of as a set of composable primitives for the construction of distributed, point-to-point data channels. FIG. 18A shows a network that has two channels enabled, the bold black line and the dotted black line. The bold black line channel is multicast, e.g., a single input is sent to two outputs. Note that channels may cross at some points within a single network, even though dedicated circuit switched paths are formed between channel endpoints. Furthermore, this crossing may not introduce a structural hazard between the two channels, so that each operates independently and at full bandwidth.

Implementing distributed data channels may include two paths, illustrated in FIGS. 18A-18B. The forward, or data path, carries data from a producer to a consumer. Multiplexors may be configured to steer data and valid bits from the producer to the consumer, e.g., as in FIG. 18A. In the case of multicast, the data will be steered to multiple consumer endpoints. The second portion of this embodiment of a network is the flow control or backpressure path, which flows in reverse of the forward data path, e.g., as in FIG. 18B. Consumer endpoints may assert when they are ready to accept new data. These signals may then be steered back to the producer using configurable logical conjunctions, labelled as (e.g., backflow) flowcontrol function in FIG. 18B. In one embodiment, each flowcontrol function circuit may be a plurality of switches (e.g., muxes), for example, similar to FIG. 18A. The flow control path may handle returning control data from consumer to producer. Conjunctions may enable multicast, e.g., where each consumer is ready to receive data before the producer assumes that it has been received. In one embodiment, a PE is a PE that has a dataflow operator as its architectural interface. Additionally or alternatively, in one embodiment a PE may be any kind of PE (e.g., in the fabric), for example, but not limited to, a PE that has an instruction pointer, triggered instruction, or state machine based architectural interface.

The network may be statically configured, e.g., in addition to PEs being statically configured. During the configuration step, configuration bits may be set at each network component. These bits control, for example, the mux selections and flow control functions. A network may comprise a plurality of networks, e.g., a data path network and a flow control path network. A network or plurality of networks may utilize paths of different widths (e.g., a first width, and a narrower or wider width). In one embodiment, a data path network has a wider (e.g., bit transport) width than the width of a flow control path network. In one embodiment, each of a first network and a second network includes their own data path network and flow control path network, e.g., data path network A and flow control path network A and wider data path network B and flow control path network B.

Certain embodiments of a network are bufferless, and data is to move between producer and consumer in a single cycle. Certain embodiments of a network are also boundless, that is, the network spans the entire fabric. In one embodiment, one PE is to communicate with any other PE in a single cycle. In one embodiment, to improve routing bandwidth, several networks may be laid out in parallel between rows of PEs.

Relative to FPGAs, certain embodiments of networks herein have three advantages: area, frequency, and program expression. Certain embodiments of networks herein operate at a coarse grain, e.g., which reduces the number configuration bits, and thereby the area of the network. Certain embodiments of networks also obtain area reduction by implementing flow control logic directly in circuitry (e.g., silicon). Certain embodiments of hardened network implementations also enjoys a frequency advantage over FPGA. Because of an area and frequency advantage, a power advantage may exist where a lower voltage is used at throughput parity. Finally, certain embodiments of networks provide better high-level semantics than FPGA wires, especially with respect to variable timing, and thus those certain embodiments are more easily targeted by compilers. Certain embodiments of networks herein may be thought of as a set of composable primitives for the construction of distributed, point-to-point data channels.

In certain embodiments, a multicast source may not assert its data valid unless it receives a ready signal from each sink. Therefore, an extra conjunction and control bit may be utilized in the multicast case.

Like certain PEs, the network may be statically configured. During this step, configuration bits are set at each network component. These bits control, for example, the mux selection and flow control function. The forward path of our network requires some bits to swing its muxes. In the example shown in FIG. 18A, four bits per hop are required: the east and west muxes utilize one bit each, while the southbound mux utilize two bits. In this embodiment, four bits may be utilized for the data path, but 7 bits may be utilized for the flow control function (e.g., in the flow control path network). Other embodiments may utilize more bits, for example, if a CSA further utilizes a north-south direction. The flow control function may utilize a control bit for each direction from which flow control can come. This may enables the setting of the sensitivity of the flow control function statically. The table 1 below summarizes the Boolean algebraic implementation of the flow control function for the network in FIG. 18B, with configuration bits capitalized. In this example, seven bits are utilized.

TABLE 1

| | Flow Implementation |
|---|---|
| readyToEast | (EAST_WEST_SENSITIVE+readyFromWest) * (EAST_SOUTH_SENSITIVE+readyFromSouth) |
| readyToWest | (WEST_EAST_SENSITIVE+readyFromEast) * (WEST_SOUTH_SENSITIVE+readyFromSouth) |
| readyToNorth | (NORTH_WEST_SENSITVE+readyFromWest) * (NORTH_EAST_SENSITIVE+readyFromEast) * (NORTH_SOUTH_SENSITIVE+readyFromSouth) |

For the third flow control box from the left in FIG. 18B, EAST_WEST_SENSITIVE and NORTH_SOUTH_SENSITIVE are depicted as set to implement the flow control for the bold line and dotted line channels, respectively.

FIG. 19 illustrates a hardware processor tile 1900 comprising an accelerator 1902 according to embodiments of the disclosure. Accelerator 1902 may be a CSA according to this disclosure. Tile 1900 includes a plurality of cache banks (e.g., cache bank 1908). Request address file (RAF) circuits 1910 may be included, e.g., as discussed below in Section 3.2. ODI may refer to an On Die Interconnect, e.g., an interconnect stretching across an entire die connecting up all the tiles. OTI may refer to an On Tile Interconnect, for example, stretching across a tile, e.g., connecting cache banks on the tile together.

3.1 Processing Elements

In certain embodiments, a CSA includes an array of heterogeneous PEs, in which the fabric is composed of several types of PEs each of which implement only a subset of the dataflow operators. By way of example, FIG. 20 shows a provisional implementation of a PE capable of implementing a broad set of the integer and control operations. Other PEs, including those supporting floating point addition, floating point multiplication, buffering, and certain control operations may have a similar implementation style, e.g., with the appropriate (dataflow operator) circuitry substituted for the ALU. PEs (e.g., dataflow operators) of a CSA may be configured (e.g., programmed) before the beginning of execution to implement a particular dataflow operation from among the set that the PE supports. A configuration may include one or two control words which specify an opcode controlling the ALU, steer the various multiplexors within the PE, and actuate dataflow into and out of the PE channels. Dataflow operators may be implemented by microcoding these configurations bits. The depicted integer PE 2000 in FIG. 20 is organized as a single-stage logical pipeline flowing from top to bottom. Data enters PE 2000 from one of set of local networks, where it is registered in an input buffer for subsequent operation. Each PE may support a number of wide, data-oriented and narrow, control-oriented channels. The number of provisioned channels may vary based on PE functionality, but one embodiment of an integer-oriented PE has 2 wide and 1-2 narrow input and output channels. Although the integer PE is implemented as a single-cycle pipeline, other pipelining choices may be utilized. For example, multiplication PEs may have multiple pipeline stages.

PE execution may proceed in a dataflow style. Based on the configuration microcode, the scheduler may examine the status of the PE ingress and egress buffers, and, when all the inputs for the configured operation have arrived and the egress buffer of the operation is available, orchestrates the actual execution of the operation by a dataflow operator (e.g., on the ALU). The resulting value may be placed in the configured egress buffer. Transfers between the egress buffer of one PE and the ingress buffer of another PE may occur asynchronously as buffering becomes available. In certain embodiments, PEs are provisioned such that at least one dataflow operation completes per cycle. Section 2 discussed dataflow operator encompassing primitive operations, such as add, xor, or pick. Certain embodiments may provide advantages in energy, area, performance, and latency. In one embodiment, with an extension to a PE control path, more fused combinations may be enabled. In one embodiment, the width of the processing elements is 64 bits, e.g., for the heavy utilization of double-precision floating point computation in HPC and to support 64-bit memory addressing.

3.2 Communications Networks

Embodiments of the CSA microarchitecture provide a hierarchy of networks which together provide an implementation of the architectural abstraction of latency-insensitive channels across multiple communications scales. The lowest level of CSA communications hierarchy may be the local network. The local network may be statically circuit switched, e.g., using configuration registers to swing multiplexor(s) in the local network data-path to form fixed electrical paths between communicating PEs. In one embodiment, the configuration of the local network is set once per dataflow graph, e.g., at the same time as the PE configuration. In one embodiment, static, circuit switching optimizes for energy, e.g., where a large majority (perhaps greater than 95%) of CSA communications traffic will cross the local network. A program may include terms which are used in multiple expressions. To optimize for this case, embodiments herein provide for hardware support for multicast within the local network. Several local networks may be ganged together to form routing channels, e.g., which are interspersed (as a grid) between rows and columns of PEs. As an optimization, several local networks may be included to carry control tokens. In comparison to a FPGA interconnect, a CSA local network may be routed at the granularity of the data-path, and another difference may be a CSA's treatment of control. One embodiment of a CSA local network is explicitly flow controlled (e.g., back-pressured). For example, for each forward data-path and multiplexor set, a CSA is to provide a backward-flowing flow control path that is physically paired with the forward data-path. The combination of the two microarchitectural paths may provide a low-latency, low-energy, low-area, point-to-point implementation of the latency-insensitive channel abstraction. In one embodiment, a CSA's flow control lines are not visible to the user program, but they may be manipulated by the architecture in service of the user program. For example, the exception handling mechanisms described in Section 2.2 may be achieved by pulling flow control lines to a "not present" state upon the detection of an exceptional condition. This action may not only gracefully stalls those parts of the pipeline which are involved in the offending computation, but may also preserve the machine state leading up the exception, e.g., for diagnostic analysis. The second network layer, e.g., the mezzanine network, may be a shared, packet switched network. Mezzanine network may include a plurality of distributed network controllers, network dataflow endpoint circuits. The mezzanine network (e.g., the network schematically indicated by the dotted box in FIG. 33) may provide more general, long range communications, e.g., at the cost of latency, bandwidth, and energy. In some programs, most communications may occur on the local network, and thus mezzanine network provisioning will be considerably reduced in comparison, for example, each PE may connects to multiple local networks, but the CSA will provision only one mezzanine endpoint per logical neighborhood of PEs. Since the mezzanine is effectively a shared network, each mezzanine network may carry multiple logically independent channels, e.g., and be provisioned with multiple virtual channels. In one embodiment, the main function of the mezzanine network is to provide wide-range communications in-between PEs and between PEs and memory. In addition to this capability, the mezzanine may also include network dataflow endpoint circuit(s), for example, to perform certain dataflow operations. In addition to this capability, the mezzanine may also operate as a runtime support network, e.g., by which various services may access the complete fabric in a user-program-transparent manner. In this capacity, the mezzanine endpoint may function as a controller for its local neighborhood, for example, during CSA configuration. To form channels spanning a CSA tile, three subchannels and two local network channels (which carry traffic to and from a single channel in the mezzanine network) may be utilized. In one embodiment, one mezzanine channel is utilized, e.g., one mezzanine and two local=3 total network hops.

The composability of channels across network layers may be extended to higher level network layers at the inter-tile, inter-die, and fabric granularities.

FIG. 20 illustrates a processing element 2000 according to embodiments of the disclosure. In one embodiment, operation configuration register 2019 is loaded during configuration (e.g., mapping) and specifies the particular operation (or operations) this processing (e.g., compute) element is to perform. Register 2020 activity may be controlled by that operation (an output of mux 2016, e.g., controlled by the scheduler 2014). Scheduler 2014 may schedule an operation or operations of processing element 2000, for example, when input data and control input arrives. Control input buffer 2022 is connected to local network 2002 (e.g., and local network 2002 may include a data path network as in FIG. 18A and a flow control path network as in FIG. 18B) and is loaded with a value when it arrives (e.g., the network has a data bit(s) and valid bit(s)). Control output buffer 2032, data output buffer 2034, and/or data output buffer 2036 may receive an output of processing element 2000, e.g., as controlled by the operation (an output of mux 2016). Status register 2038 may be loaded whenever the ALU 2018 executes (also controlled by output of mux 2016). Data in control input buffer 2022 and control output buffer 2032 may be a single bit. Mux 2021 (e.g., operand A) and mux 2023 (e.g., operand B) may source inputs.

For example, suppose the operation of this processing (e.g., compute) element is (or includes) what is called call a pick in FIG. 14B. The processing element 2000 then is to select data from either data input buffer 2024 or data input buffer 2026, e.g., to go to data output buffer 2034 (e.g., default) or data output buffer 2036. The control bit in 2022 may thus indicate a 0 if selecting from data input buffer 2024 or a 1 if selecting from data input buffer 2026.

For example, suppose the operation of this processing (e.g., compute) element is (or includes) what is called call a switch in FIG. 14B. The processing element 2000 is to output data to data output buffer 2034 or data output buffer 2036, e.g., from data input buffer 2024 (e.g., default) or data input buffer 2026. The control bit in 2022 may thus indicate a 0 if outputting to data output buffer 2034 or a 1 if outputting to data output buffer 2036.

Multiple networks (e.g., interconnects) may be connected to a processing element, e.g., (input) networks 2002, 2004, 2006 and (output) networks 2008, 2010, 2012. The connections may be switches, e.g., as discussed in reference to FIGS. 18A and 18B. In one embodiment, each network includes two sub-networks (or two channels on the network), e.g., one for the data path network in FIG. 18A and one for the flow control (e.g., backpressure) path network in FIG. 18B. As one example, local network 2002 (e.g., set up as a control interconnect) is depicted as being switched (e.g., connected) to control input buffer 2022. In this embodiment, a data path (e.g., network as in FIG. 18A) may carry the control input value (e.g., bit or bits) (e.g., a control token) and the flow control path (e.g., network) may carry the backpressure signal (e.g., backpressure or no-backpressure token) from control input buffer 2022, e.g., to indicate to the upstream producer (e.g., PE) that a new control input value is not to be loaded into (e.g., sent to) control input buffer 2022 until the backpressure signal indicates there is room in the control input buffer 2022 for the new control input value (e.g., from a control output buffer of the upstream producer). In one embodiment, the new control input value may not enter control input buffer 2022 until both (i) the upstream producer receives the "space available" backpressure signal from "control input" buffer 2022 and (ii) the new control input value is sent from the upstream producer, e.g., and this may stall the processing element 2000 until that happens (and space in the target, output buffer(s) is available).

Data input buffer 2024 and data input buffer 2026 may perform similarly, e.g., local network 2004 (e.g., set up as a data (as opposed to control) interconnect) is depicted as being switched (e.g., connected) to data input buffer 2024. In this embodiment, a data path (e.g., network as in FIG. 18A) may carry the data input value (e.g., bit or bits) (e.g., a dataflow token) and the flow control path (e.g., network) may carry the backpressure signal (e.g., backpressure or no-backpressure token) from data input buffer 2024, e.g., to indicate to the upstream producer (e.g., PE) that a new data input value is not to be loaded into (e.g., sent to) data input buffer 2024 until the backpressure signal indicates there is room in the data input buffer 2024 for the new data input value (e.g., from a data output buffer of the upstream producer). In one embodiment, the new data input value may not enter data input buffer 2024 until both (i) the upstream producer receives the "space available" backpressure signal from "data input" buffer 2024 and (ii) the new data input value is sent from the upstream producer, e.g., and this may stall the processing element 2000 until that happens (and space in the target, output buffer(s) is available). A control output value and/or data output value may be stalled in their respective output buffers (e.g., 2032, 2034, 2036) until a backpressure signal indicates there is available space in the input buffer for the downstream processing element(s).

A processing element 2000 may be stalled from execution until its operands (e.g., a control input value and its corresponding data input value or values) are received and/or until there is room in the output buffer(s) of the processing element 2000 for the data that is to be produced by the execution of the operation on those operands.

3.3 Memory Interface

Figure 21:
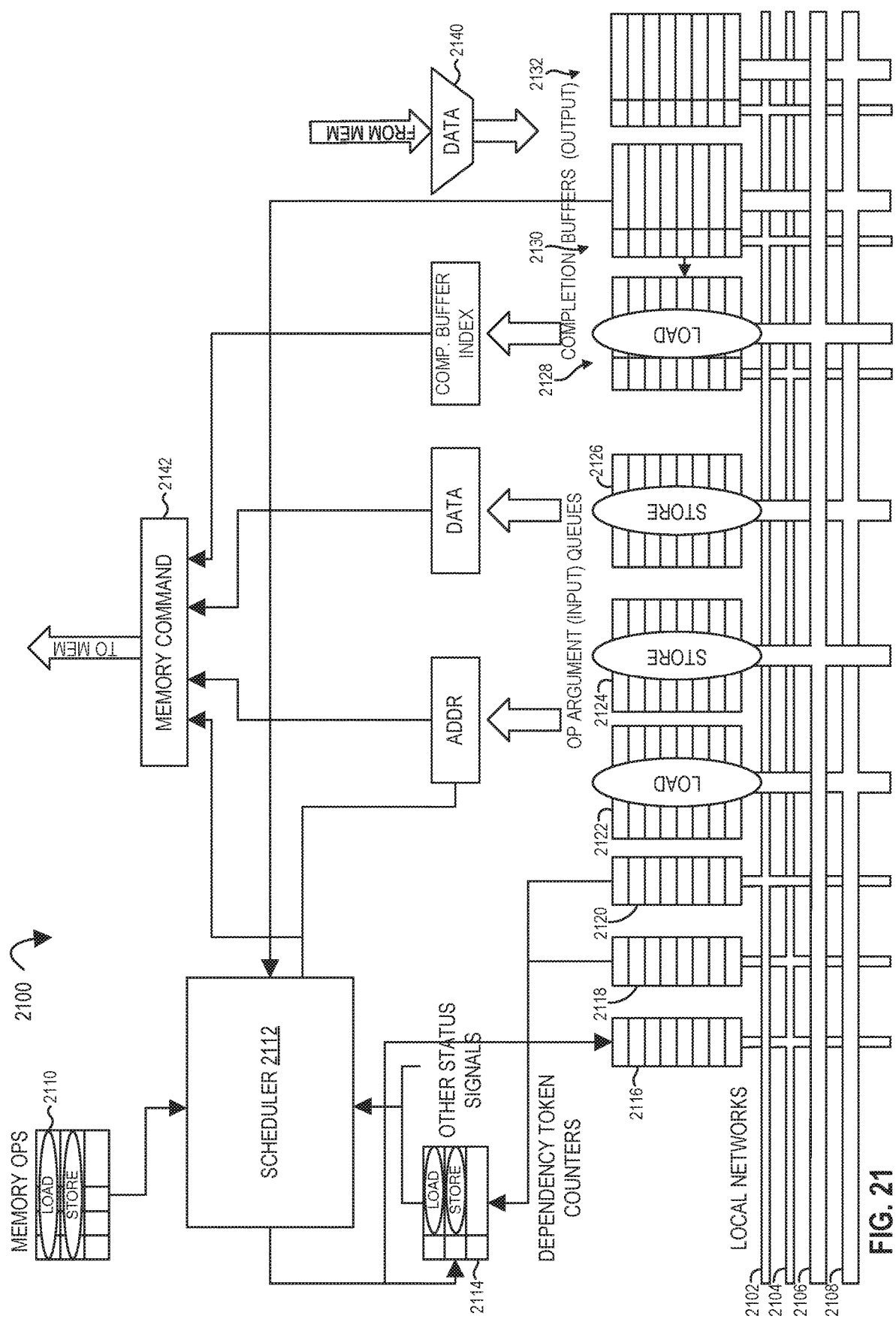
FIG. 21 illustrates a request address file (RAF) circuit according to embodiments of the disclosure.

The request address file (RAF) circuit, a simplified version of which is shown in FIG. 21, may be responsible for executing memory operations and serves as an intermediary between the CSA fabric and the memory hierarchy. As such, the main microarchitectural task of the RAF may be to rationalize the out-of-order memory subsystem with the in-order semantics of CSA fabric. In this capacity, the RAF circuit may be provisioned with completion buffers, e.g., queue-like structures that re-order memory responses and return them to the fabric in the request order. The second major functionality of the RAF circuit may be to provide support in the form of address translation and a page walker. Incoming virtual addresses may be translated to physical addresses using a channel-associative translation lookaside buffer (TLB). To provide ample memory bandwidth, each CSA tile may include multiple RAF circuits. Like the various PEs of the fabric, the RAF circuits may operate in a dataflow-style by checking for the availability of input arguments and output buffering, if required, before selecting a memory operation to execute. Unlike some PEs, however, the RAF circuit is multiplexed among several co-located memory operations. A multiplexed RAF circuit may be used to minimize the area overhead of its various subcomponents, e.g., to share the Accelerator Cache Interface (ACI) port (described in more detail in Section 3.4), shared virtual memory (SVM) support hardware, mezzanine network interface, and other hardware management facilities. However, there are some program characteristics that may also motivate this choice. In one embodiment, a (e.g., valid) dataflow graph is to poll memory in a shared virtual memory system. Memory-latency-bound programs, like graph traversals, may utilize many separate memory operations to saturate memory bandwidth due to memory-dependent control flow. Although each RAF may be multiplexed, a CSA may include multiple (e.g., between 8 and 32) RAFs at a tile granularity to ensure adequate cache bandwidth. RAFs may communicate with the rest of the fabric via both the local network and the mezzanine network. Where RAFs are multiplexed, each RAF may be provisioned with several ports into the local network. These ports may serve as a minimum-latency, highly-deterministic path to memory for use by latency-sensitive or high-bandwidth memory operations. In addition, a RAF may be provisioned with a mezzanine network endpoint, e.g., which provides memory access to runtime services and distant user-level memory accessors.

FIG. 21 illustrates a request address file (RAF) circuit 2100 according to embodiments of the disclosure. In one embodiment, at configuration time, the memory load and store operations that were in a dataflow graph are specified in registers 2110. The arcs to those memory operations in the dataflow graphs may then be connected to the input queues 2122, 2124, and 2126. The arcs from those memory operations are thus to leave completion buffers 2128, 2130, or 2132. Dependency tokens (which may be single bits) arrive into queues 2118 and 2120. Dependency tokens are to leave from queue 2116. Dependency token counter 2114 may be a compact representation of a queue and track a number of dependency tokens used for any given input queue. If the dependency token counters 2114 saturate, no additional dependency tokens may be generated for new memory operations. Accordingly, a memory ordering circuit (e.g., a RAF in FIG. 22) may stall scheduling new memory operations until the dependency token counters 2114 becomes unsaturated.

As an example for a load, an address arrives into queue 2122 which the scheduler 2112 matches up with a load in 2110. A completion buffer slot for this load is assigned in the order the address arrived. Assuming this particular load in the graph has no dependencies specified, the address and completion buffer slot are sent off to the memory system by the scheduler (e.g., via memory command 2142). When the result returns to mux 2140 (shown schematically), it is stored into the completion buffer slot it specifies (e.g., as it carried the target slot all along though the memory system). The completion buffer sends results back into local network (e.g., local network 2102, 2104, 2106, or 2108) in the order the addresses arrived.

Stores may be similar except both address and data have to arrive before any operation is sent off to the memory system.

3.4 Cache

Figure 22:
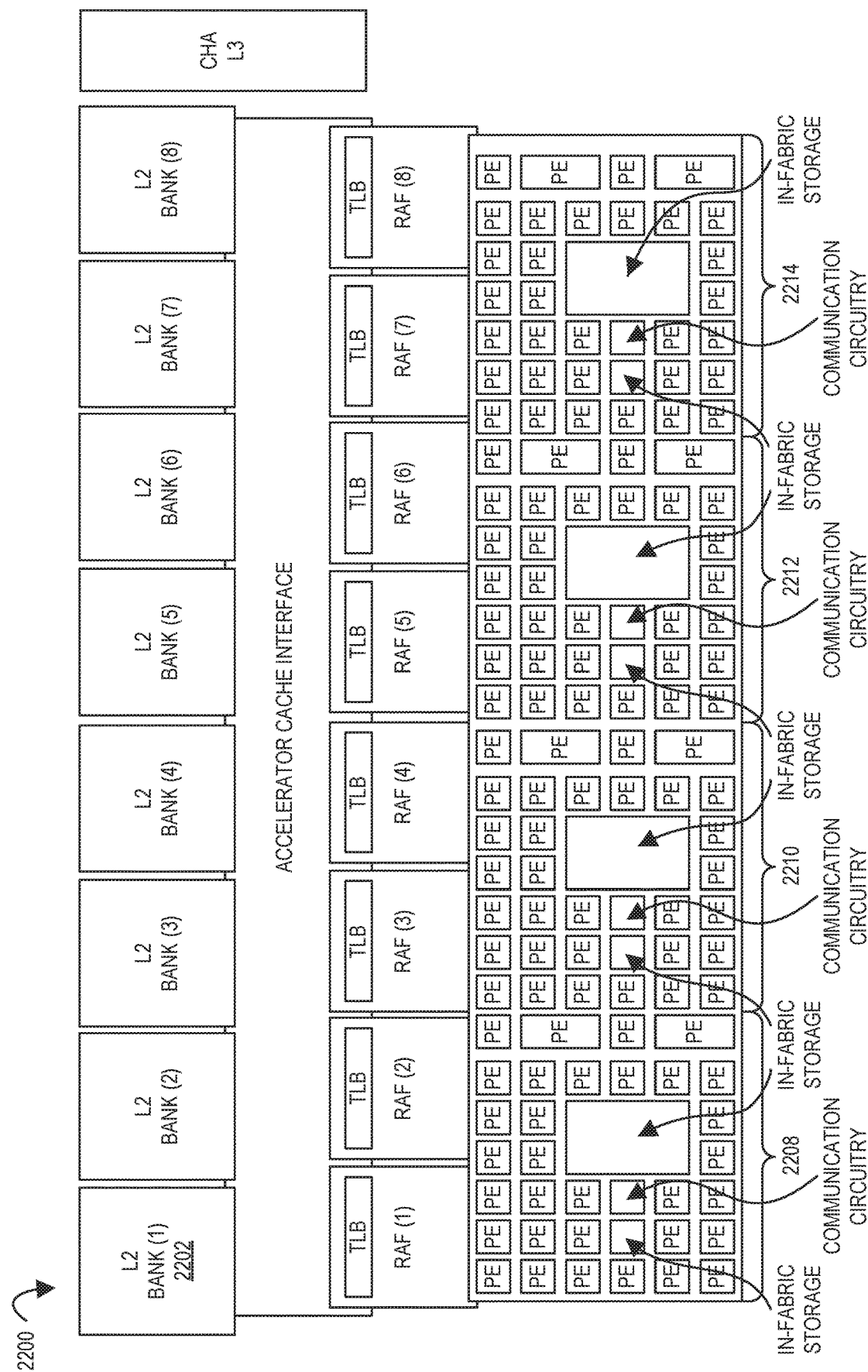
FIG. 22 illustrates a plurality of request address file (RAF) circuits coupled between a plurality of accelerator tiles and a plurality of cache banks according to embodiments of the disclosure.

Dataflow graphs may be capable of generating a profusion of (e.g., word granularity) requests in parallel. Thus, certain embodiments of the CSA provide a cache subsystem with sufficient bandwidth to service the CSA. A heavily banked cache microarchitecture, e.g., as shown in FIG. 22 may be utilized. FIG. 22 illustrates a circuit 2200 with a plurality of request address file (RAF) circuits (e.g., RAF circuit (1)) coupled between a plurality of accelerator tiles (2208, 2210, 2212, 2214) and a plurality of cache banks (e.g., cache bank 2202) according to embodiments of the disclosure. In one embodiment, the number of RAFs and cache banks may be in a ratio of either 1:1 or 1:2. Cache banks may contain full cache lines (e.g., as opposed to sharding by word), with each line having exactly one home in the cache. Cache lines may be mapped to cache banks via a pseudo-random function. The CSA may adopts the SVM model to integrate with other tiled architectures. Certain embodiments include an Accelerator Cache Interface (Interconnect) (ACI) network connecting the RAFs to the cache banks. This network may carry address and data between the RAFs and the cache. The topology of the ACI may be a cascaded crossbar, e.g., as a compromise between latency and implementation complexity.

3.5 Floating Point Support

Figure 23:
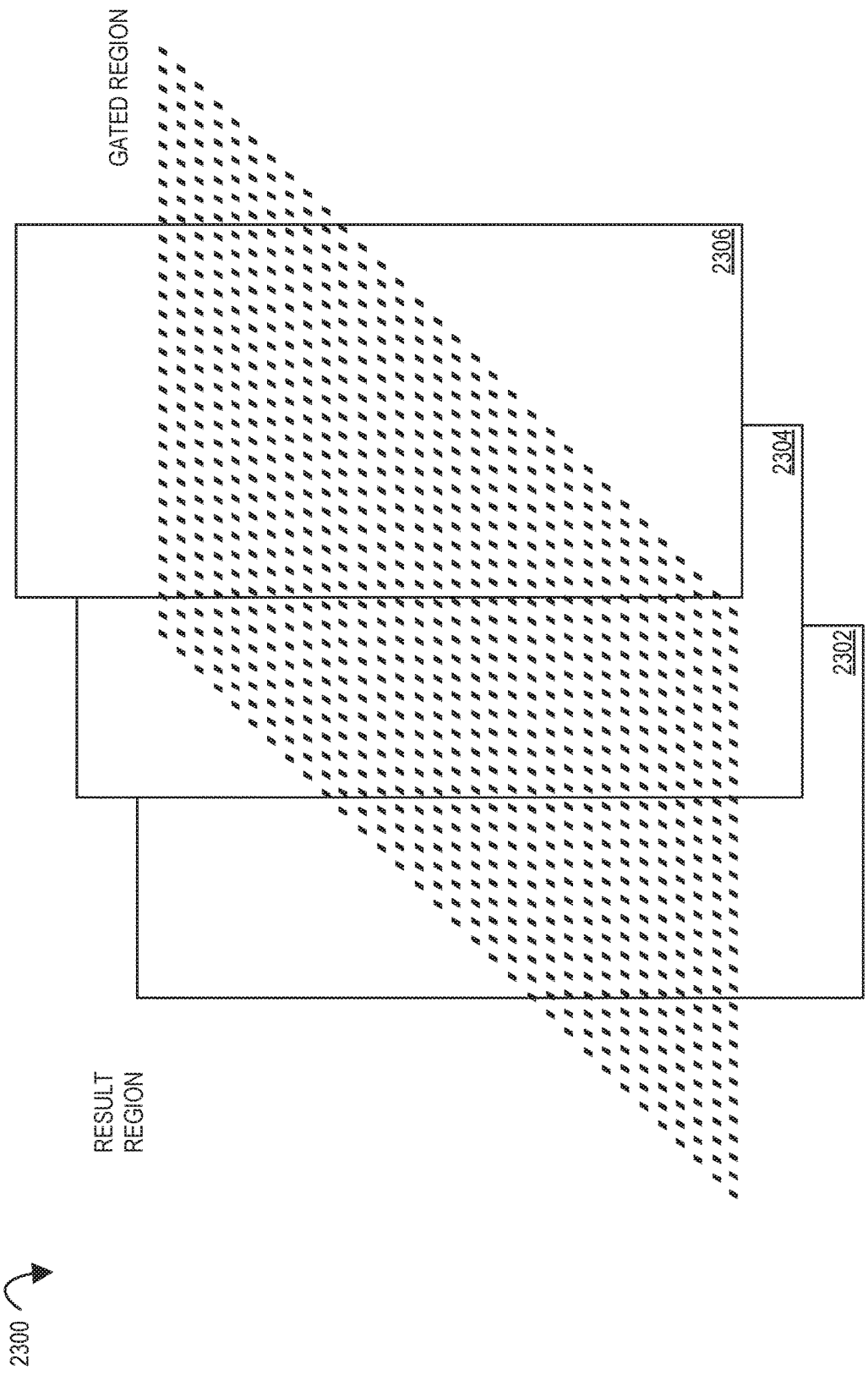
FIG. 23 illustrates a floating point multiplier partitioned into three regions (the result region, three potential carry regions, and the gated region) according to embodiments of the disclosure.

Certain HPC applications are characterized by their need for significant floating point bandwidth. To meet this need, embodiments of a CSA may be provisioned with multiple (e.g., between 128 and 256 each) of floating add and multiplication PEs, e.g., depending on tile configuration. A CSA may provide a few other extended precision modes, e.g., to simplify math library implementation. CSA floating point PEs may support both single and double precision, but lower precision PEs may support machine learning workloads. A CSA may provide an order of magnitude more floating point performance than a processor core. In one embodiment, in addition to increasing floating point bandwidth, in order to power all of the floating point units, the energy consumed in floating point operations is reduced. For example, to reduce energy, a CSA may selectively gate the low-order bits of the floating point multiplier array. In examining the behavior of floating point arithmetic, the low order bits of the multiplication array may often not influence the final, rounded product. FIG. 23 illustrates a floating point multiplier 2300 partitioned into three regions (the result region, three potential carry regions (2302, 2304, 2306), and the gated region) according to embodiments of the disclosure. In certain embodiments, the carry region is likely to influence the result region and the gated region is unlikely to influence the result region. Considering a gated region of g bits, the maximum carry may be:

$$\text{carry}_g \leq \frac{1}{2^g} \sum_{1}^{g} i 2^{i-1}$$
$$\leq \sum_{1}^{g} \frac{i}{2^g} - \sum_{1}^{g} \frac{1}{2^g} + 1$$
$$\leq g - 1$$

Given this maximum carry, if the result of the carry region is less than $2^c$-g, where the carry region is c bits wide, then the gated region may be ignored since it does not influence the result region. Increasing g means that it is more likely the gated region will be needed, while increasing c means that, under random assumption, the gated region will be unused and may be disabled to avoid energy consumption. In embodiments of a CSA floating multiplication PE, a two stage pipelined approach is utilized in which first the carry region is determined and then the gated region is determined if it is found to influence the result. If more information about the context of the multiplication is known, a CSA more aggressively tune the size of the gated region. In FMA, the multiplication result may be added to an accumulator, which is often much larger than either of the multiplicands. In this case, the addend exponent may be observed in advance of multiplication and the CSDA may adjust the gated region accordingly. One embodiment of the CSA includes a scheme in which a context value, which bounds the minimum result of a computation, is provided to related multipliers, in order to select minimum energy gating configurations.

3.6 Runtime Services

Figure 24:
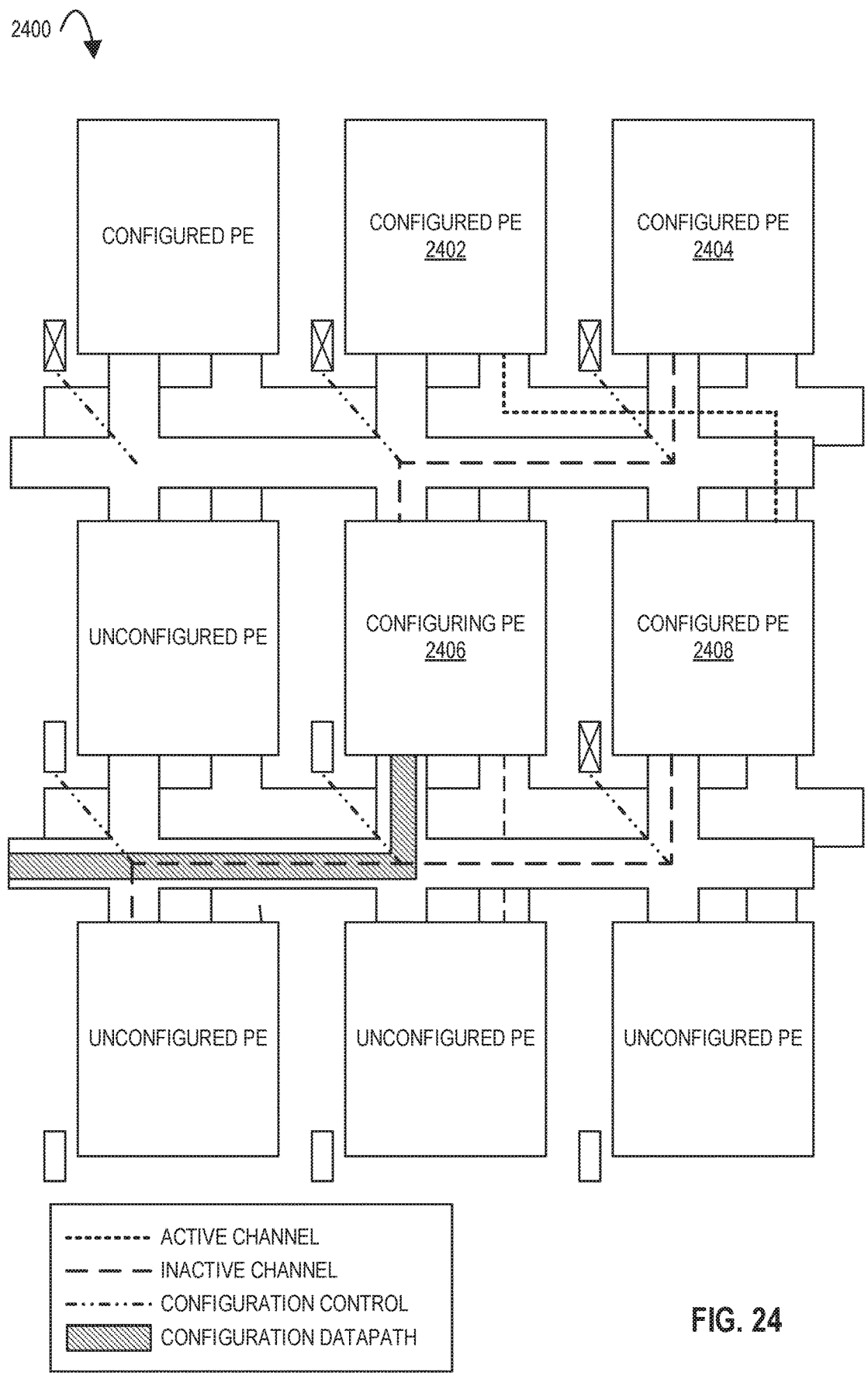
FIG. 24 illustrates an in-flight configuration of an accelerator with a plurality of processing elements according to embodiments of the disclosure.

In certain embodiment, a CSA includes a heterogeneous and distributed fabric, and consequently, runtime service implementations are to accommodate several kinds of PEs in a parallel and distributed fashion. Although runtime services in a CSA may be critical, they may be infrequent relative to user-level computation. Certain implementations, therefore, focus on overlaying services on hardware resources. To meet these goals, CSA runtime services may be cast as a hierarchy, e.g., with each layer corresponding to a CSA network. At the tile level, a single external-facing controller may accepts or sends service commands to an associated core with the CSA tile. A tile-level controller may serve to coordinate regional controllers at the RAFs, e.g., using the ACI network. In turn, regional controllers may coordinate local controllers at certain mezzanine network stops (e.g., network dataflow endpoint circuits). At the lowest level, service specific micro-protocols may execute over the local network, e.g., during a special mode controlled through the mezzanine controllers. The micro-protocols may permit each PE (e.g., PE class by type) to interact with the runtime service according to its own needs. Parallelism is thus implicit in this hierarchical organization, and operations at the lowest levels may occur simultaneously. This parallelism may enables the configuration of a CSA tile in between hundreds of nanoseconds to a few microseconds, e.g., depending on the configuration size and its location in the memory hierarchy. Embodiments of the CSA thus leverage properties of dataflow graphs to improve implementation of each runtime service. One key observation is that runtime services may need only to preserve a legal logical view of the dataflow graph, e.g., a state that can be produced through some ordering of dataflow operator executions. Services may generally not need to guarantee a temporal view of the dataflow graph, e.g., the state of a dataflow graph in a CSA at a specific point in time. This may permit the CSA to conduct most runtime services in a distributed, pipelined, and parallel fashion, e.g., provided that the service is orchestrated to preserve the logical view of the dataflow graph. The local configuration micro-protocol may be a packet-based protocol overlaid on the local network. Configuration targets may be organized into a configuration chain, e.g., which is fixed in the microarchitecture. Fabric (e.g., PE) targets may be configured one at a time, e.g., using a single extra register per target to achieve distributed coordination. To start configuration, a controller may drive an out-of-band signal which places all fabric targets in its neighborhood into an unconfigured, paused state and swings multiplexors in the local network to a pre-defined conformation. As the fabric (e.g., PE) targets are configured, that is they completely receive their configuration packet, they may set their configuration microprotocol registers, notifying the immediately succeeding target (e.g., PE) that it may proceed to configure using the subsequent packet. There is no limitation to the size of a configuration packet, and packets may have dynamically variable length. For example, PEs configuring constant operands may have a configuration packet that is lengthened to include the constant field (e.g., X and Y in FIGS. 14B-14C). FIG. 24 illustrates an in-flight configuration of an accelerator 2400 with a plurality of processing elements (e.g., PEs 2402, 2404, 2406, 2408) according to embodiments of the disclosure. Once configured, PEs may execute subject to dataflow constraints. However, channels involving unconfigured PEs may be disabled by the microarchitecture, e.g., preventing any undefined operations from occurring. These properties allow embodiments of a CSA to initialize and execute in a distributed fashion with no centralized control whatsoever. From an unconfigured state, configuration may occur completely in parallel, e.g., in perhaps as few as 200 nanoseconds. However, due to the distributed initialization of embodiments of a CSA, PEs may become active, for example sending requests to memory, well before the entire fabric is configured. Extraction may proceed in much the same way as configuration. The local network may be conformed to extract data from one target at a time, and state bits used to achieve distributed coordination. A CSA may orchestrate extraction to be non-destructive, that is, at the completion of extraction each extractable target has returned to its starting state. In this implementation, all state in the target may be circulated to an egress register tied to the local network in a scan-like fashion. Although in-place extraction may be achieved by introducing new paths at the register-transfer level (RTL), or using existing lines to provide the same functionalities with lower overhead. Like configuration, hierarchical extraction is achieved in parallel.

Figure 25:
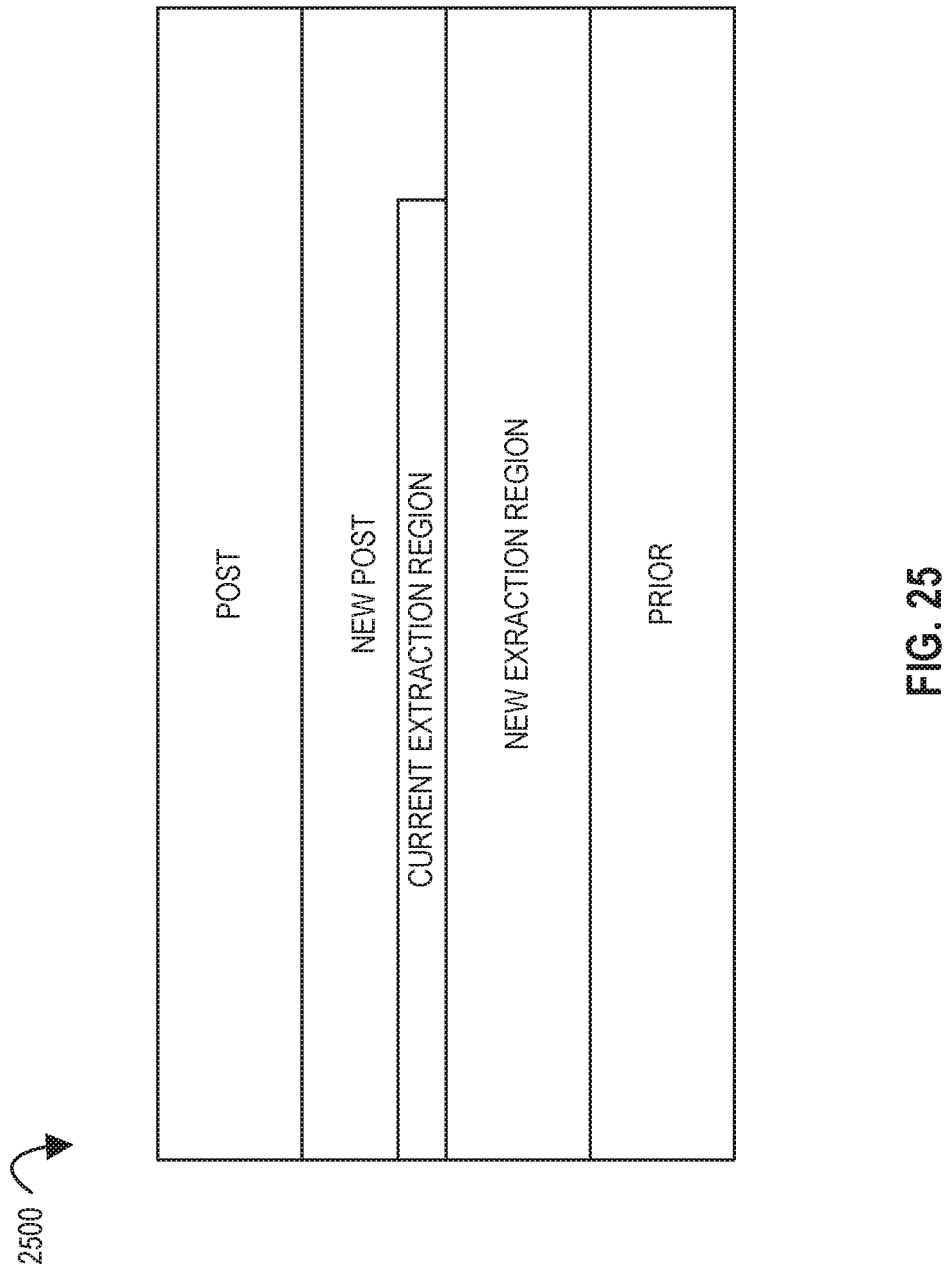
FIG. 25 illustrates a snapshot of an in-flight, pipelined extraction according to embodiments of the disclosure.

FIG. 25 illustrates a snapshot 2500 of an in-flight, pipelined extraction according to embodiments of the disclosure. In some use cases of extraction, such as checkpointing, latency may not be a concern so long as fabric throughput is maintained. In these cases, extraction may be orchestrated in a pipelined fashion. This arrangement, shown in FIG. 25, permits most of the fabric to continue executing, while a narrow region is disabled for extraction. Configuration and extraction may be coordinated and composed to achieve a pipelined context switch. Exceptions may differ qualitatively from configuration and extraction in that, rather than occurring at a specified time, they arise anywhere in the fabric at any point during runtime. Thus, in one embodiment, the exception micro-protocol may not be overlaid on the local network, which is occupied by the user program at runtime, and utilizes its own network. However, by nature, exceptions are rare and insensitive to latency and bandwidth. Thus certain embodiments of CSA utilize a packet switched network to carry exceptions to the local mezzanine stop, e.g., where they are forwarded up the service hierarchy (e.g., as in FIG. 40). Packets in the local exception network may be extremely small. In many cases, a PE identification (ID) of only two to eight bits suffices as a complete packet, e.g., since the CSA may create a unique exception identifier as the packet traverses the exception service hierarchy. Such a scheme may be desirable because it also reduces the area overhead of producing exceptions at each PE.

4. Compilation

The ability to compile programs written in high-level languages onto a CSA may be essential for industry adoption. This section gives a high-level overview of compilation strategies for embodiments of a CSA. First is a proposal for a CSA software framework that illustrates the desired properties of an ideal production-quality toolchain. Next, a prototype compiler framework is discussed. A "control-to-dataflow conversion" is then discussed, e.g., to converts ordinary sequential control-flow code into CSA dataflow assembly code.

4.1 Example Production Framework

Figure 26:
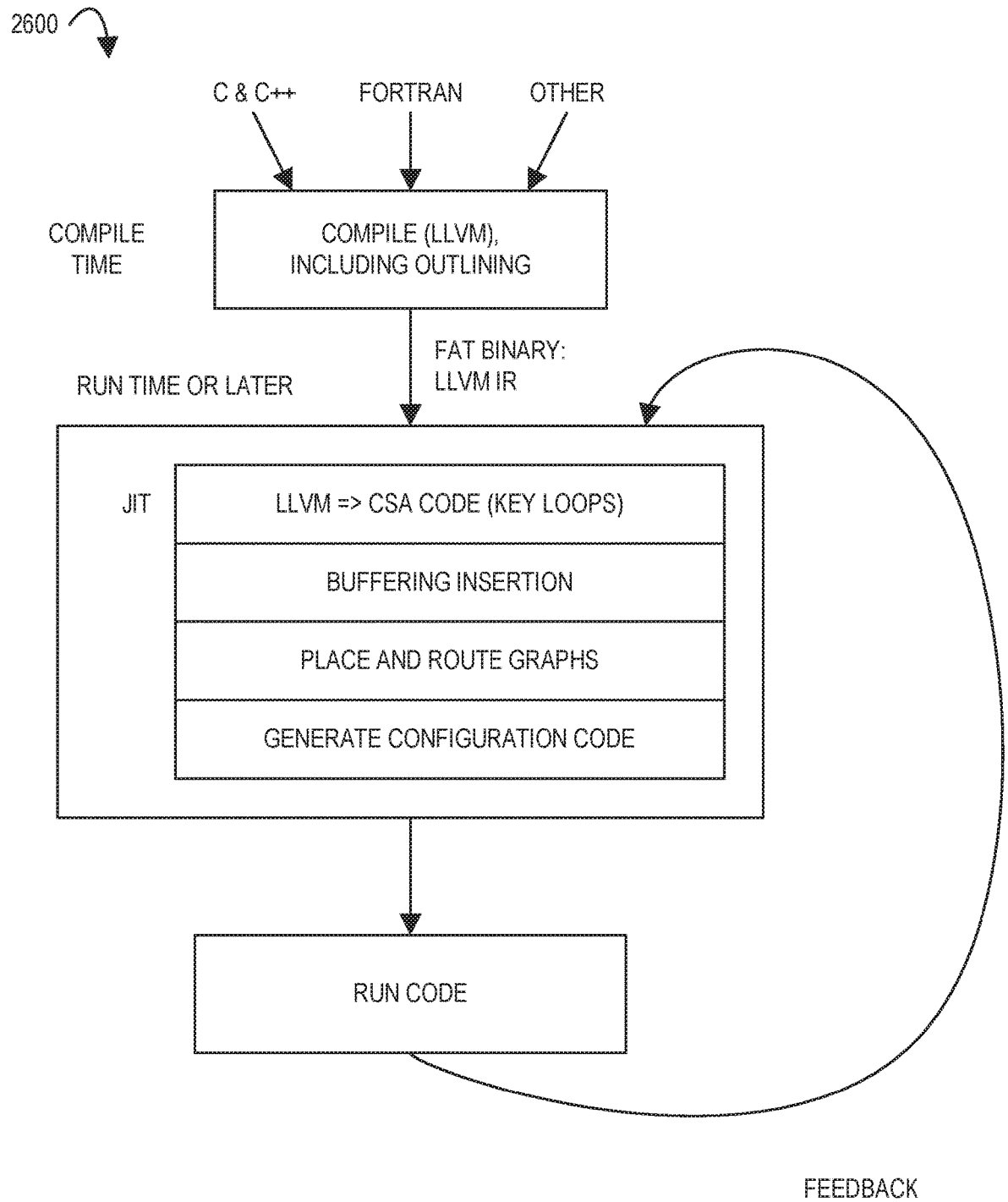
FIG. 26 illustrates a compilation toolchain for an accelerator according to embodiments of the disclosure.

FIG. 26 illustrates a compilation toolchain 2600 for an accelerator according to embodiments of the disclosure. This toolchain compiles high-level languages (such as C, C++, and Fortran) into a combination of host code (LLVM) intermediate representation (IR) for the specific regions to be accelerated. The CSA-specific portion of this compilation toolchain takes LLVM IR as its input, optimizes and compiles this IR into a CSA assembly, e.g., adding appropriate buffering on latency-insensitive channels for performance. It then places and routes the CSA assembly on the hardware fabric, and configures the PEs and network for execution. In one embodiment, the toolchain supports the CSA-specific compilation as a just-in-time (JIT), incorporating potential runtime feedback from actual executions. One of the key design characteristics of the framework is compilation of (LLVM) IR for the CSA, rather than using a higher-level language as input. While a program written in a high-level programming language designed specifically for the CSA might achieve maximal performance and/or energy efficiency, the adoption of new high-level languages or programming frameworks may be slow and limited in practice because of the difficulty of converting existing code bases. Using (LLVM) IR as input enables a wide range of existing programs to potentially execute on a CSA, e.g., without the need to create a new language or significantly modify the front-end of new languages that want to run on the CSA.

4.2 Prototype Compiler

Figure 27:
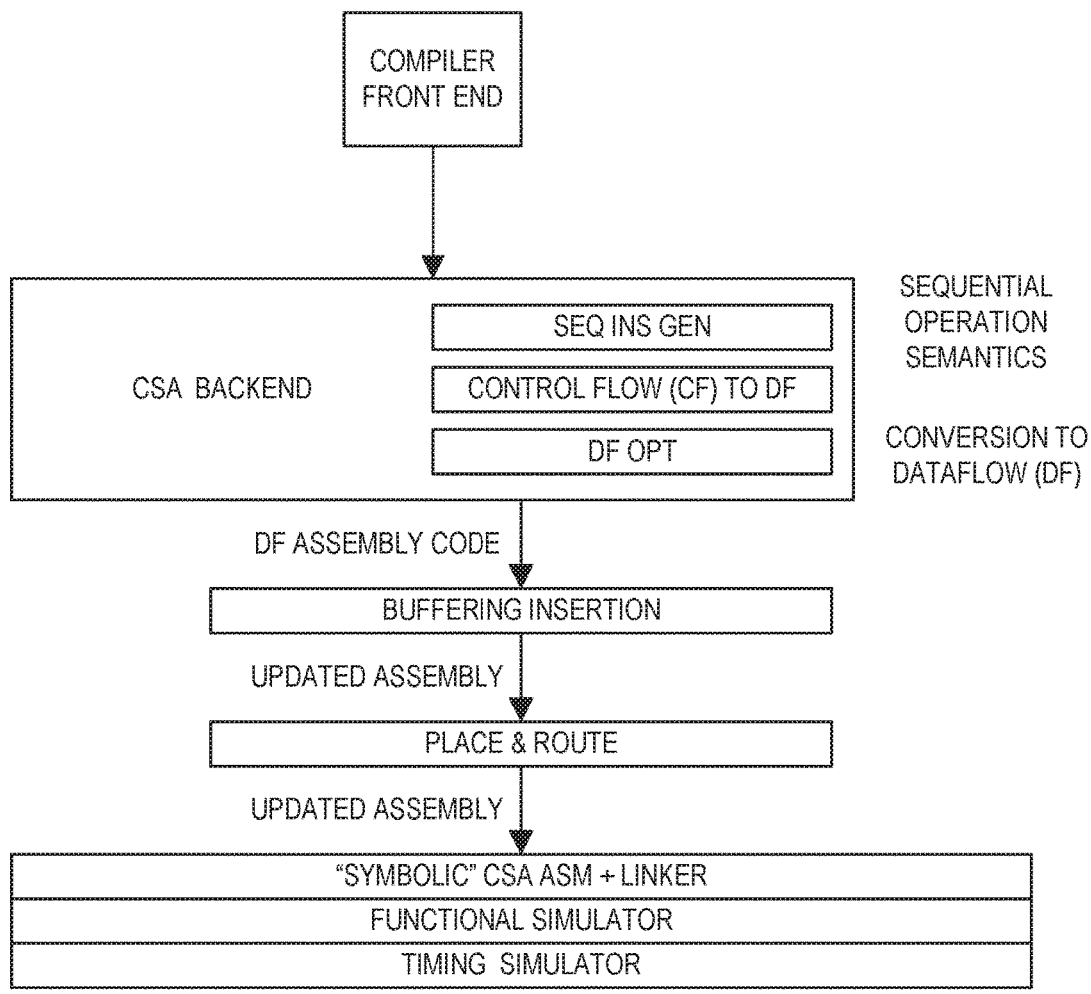
FIG. 27 illustrates a compiler for an accelerator according to embodiments of the disclosure.

FIG. 27 illustrates a compiler 2700 for an accelerator according to embodiments of the disclosure. Compiler 2700 initially focuses on ahead-of-time compilation of C and C++ through the (e.g., Clang) front-end. To compile (LLVM) IR, the compiler implements a CSA back-end target within LLVM with three main stages. First, the CSA back-end lowers LLVM IR into a target-specific machine instructions for the sequential unit, which implements most CSA operations combined with a traditional RISC-like control-flow architecture (e.g., with branches and a program counter). The sequential unit in the toolchain may serve as a useful aid for both compiler and application developers, since it enables an incremental transformation of a program from control flow (CF) to dataflow (DF), e.g., converting one section of code at a time from control-flow to dataflow and validating program correctness. The sequential unit may also provide a model for handling code that does not fit in the spatial array. Next, the compiler converts these control-flow instructions into dataflow operators (e.g., code) for the CSA. This phase is described later in Section 4.3. Then, the CSA back-end may run its own optimization passes on the dataflow instructions. Finally, the compiler may dump the instructions in a CSA assembly format. This assembly format is taken as input to late-stage tools which place and route the dataflow instructions on the actual CSA hardware.

4.3 Control to Dataflow Conversion

A key portion of the compiler may be implemented in the control-to-dataflow conversion pass, or dataflow conversion pass for short. This pass takes in a function represented in control flow form, e.g., a control-flow graph (CFG) with sequential machine instructions operating on virtual registers, and converts it into a dataflow function that is conceptually a graph of dataflow operations (instructions) connected by latency-insensitive channels (LICs). This section gives a high-level description of this pass, describing how it conceptually deals with memory operations, branches, and loops in certain embodiments.

Straight-Line Code

Figure 28C:
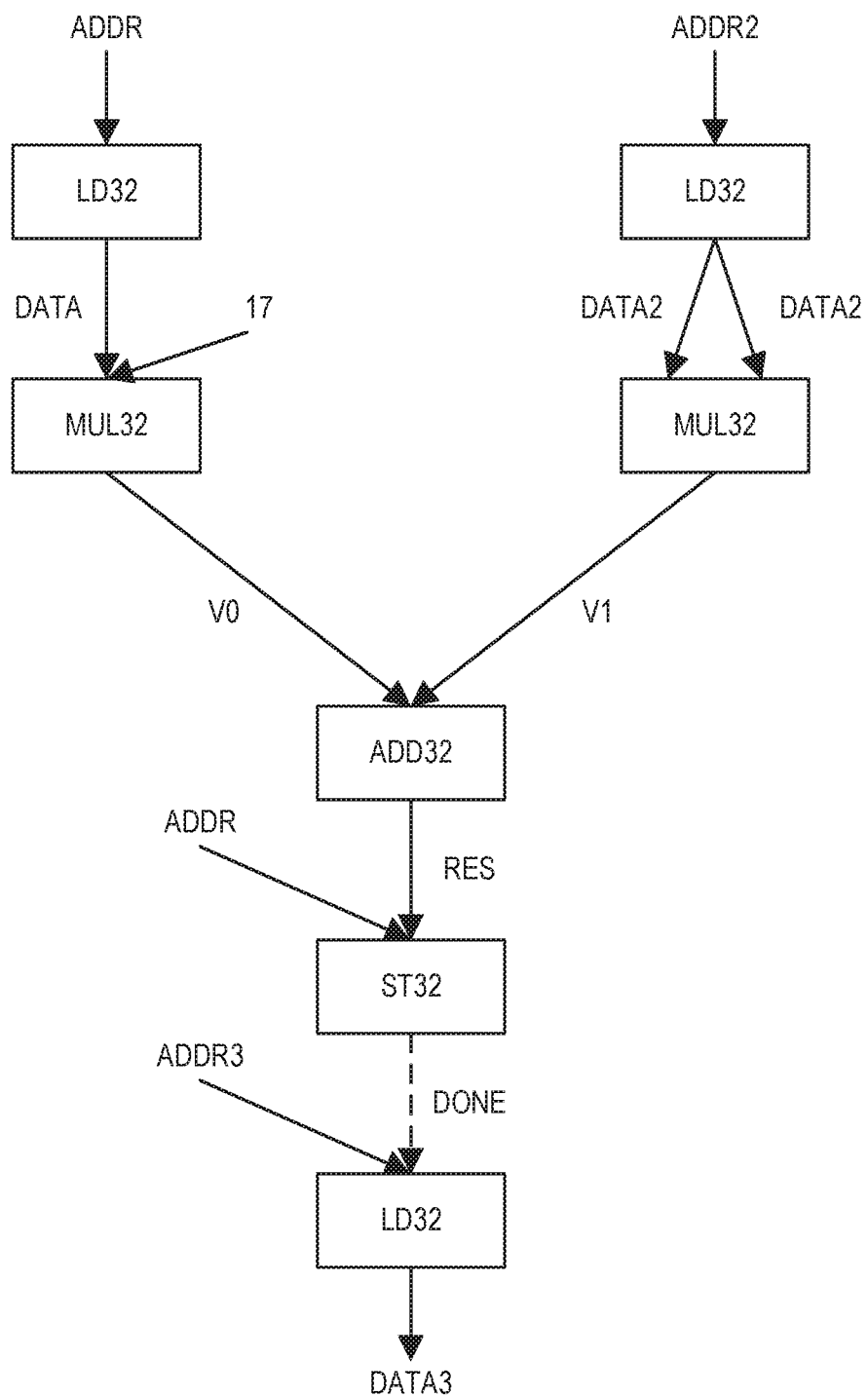
FIG. 28C illustrates a dataflow graph for the dataflow assembly code of FIG. 28B for an accelerator according to embodiments of the disclosure.

FIG. 28A illustrates sequential assembly code 2802 according to embodiments of the disclosure. FIG. 28B illustrates dataflow assembly code 2804 for the sequential assembly code 2802 of FIG. 28A according to embodiments of the disclosure. FIG. 28C illustrates a dataflow graph 2806 for the dataflow assembly code 2804 of FIG. 28B for an accelerator according to embodiments of the disclosure.

First, consider the simple case of converting straight-line sequential code to dataflow. The dataflow conversion pass may convert a basic block of sequential code, such as the code shown in FIG. 28A into CSA assembly code, shown in FIG. 28B. Conceptually, the CSA assembly in FIG. 28B represents the dataflow graph shown in FIG. 28C. In this example, each sequential instruction is translated into a matching CSA assembly. The .lic statements (e.g., for data) declare latency-insensitive channels which correspond to the virtual registers in the sequential code (e.g., Rdata). In practice, the input to the dataflow conversion pass may be in numbered virtual registers. For clarity, however, this section uses descriptive register names. Note that load and store operations are supported in the CSA architecture in this embodiment, allowing for many more programs to run than an architecture supporting only pure dataflow. Since the sequential code input to the compiler is in SSA (singlestatic assignment) form, for a simple basic block, the control-to-dataflow pass may convert each virtual register definition into the production of a single value on a latency-insensitive channel. The SSA form allows multiple uses of a single definition of a virtual register, such as in Rdata2). To support this model, the CSA assembly code supports multiple uses of the same LIC (e.g., data2), with the simulator implicitly creating the necessary copies of the LICs. One key difference between sequential code and dataflow code is in the treatment of memory operations. The code in FIG. 28A is conceptually serial, which means that the load32 (1d32) of addr3 should appear to happen after the st32 of addr, in case that addr and addr3 addresses overlap.

Branches

To convert programs with multiple basic blocks and conditionals to dataflow, the compiler generates special dataflow operators to replace the branches. More specifically, the compiler uses switch operators to steer outgoing data at the end of a basic block in the original CFG, and pick operators to select values from the appropriate incoming channel at the beginning of a basic block. As a concrete example, consider the code and corresponding dataflow graph in FIGS. 29A-29C, which conditionally computes a value of y based on several inputs: a i, x, and n. After computing the branch condition test, the dataflow code uses a switch operator (e.g., see FIGS. 14B-14C) steers the value in channel x to channel xF if test is 0, or channel xT if test is 1. Similarly, a pick operator (e.g., see FIGS. 14B-14C) is used to send channel yF to y if test is 0, or send channel yT to y if test is 1. In this example, it turns out that even though the value of a is only used in the true branch of the conditional, the CSA is to include a switch operator which steers it to channel aT when test is 1, and consumes (eats) the value when test is 0. This latter case is expressed by setting the false output of the switch to % ign. It may not be correct to simply connect channel a directly to the true path, because in the cases where execution actually takes the false path, this value of "a" will be left over in the graph, leading to incorrect value of a for the next execution of the function. This example highlights the property of control equivalence, a key property in embodiments of correct dataflow conversion.

Control Equivalence:

Consider a single-entry-single-exit control flow graph G with two basic blocks A and B. A and B are control-equivalent if all complete control flow paths through G visit A and B the same number of times.

Figure 29C:
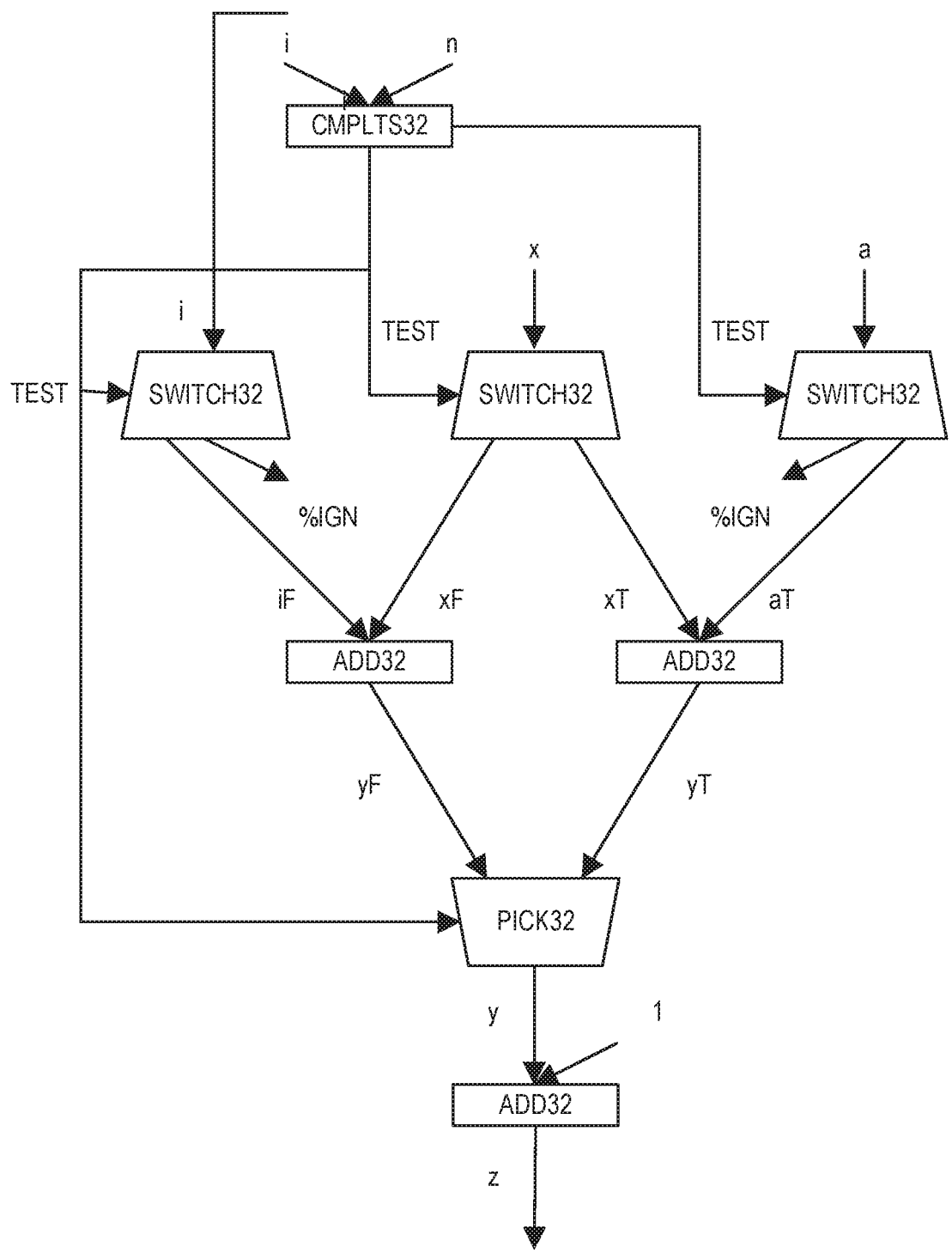
FIG. 29C illustrates a dataflow graph for the dataflow assembly code of FIG. 29B for an accelerator according to embodiments of the disclosure.

LIC Replacement:

In a control flow graph G, suppose an operation in basic block A defines a virtual register x, and an operation in basic block B that uses x. Then a correct control-to-dataflow transformation can replace x with a latency-insensitive channel only if A and B are control equivalent. The control-equivalence relation partitions the basic blocks of a CFG into strong control-dependence regions. FIG. 29A illustrates C source code 2902 according to embodiments of the disclosure. FIG. 29B illustrates dataflow assembly code 2904 for the C source code 2902 of FIG. 29A according to embodiments of the disclosure. FIG. 29C illustrates a dataflow graph 2906 for the dataflow assembly code 2904 of FIG. 29B for an accelerator according to embodiments of the disclosure. In the example in FIGS. 29A-29C, the basic block before and after the conditionals are control-equivalent to each other, but the basic blocks in the true and false paths are each in their own control dependence region. One correct algorithm for converting a CFG to dataflow is to have the compiler insert (1) switches to compensate for the mismatch in execution frequency for any values that flow between basic blocks which are not control equivalent, and (2) picks at the beginning of basic blocks to choose correctly from any incoming values to a basic block. Generating the appropriate control signals for these picks and switches may be the key part of dataflow conversion.

Loops

Figure 30C:
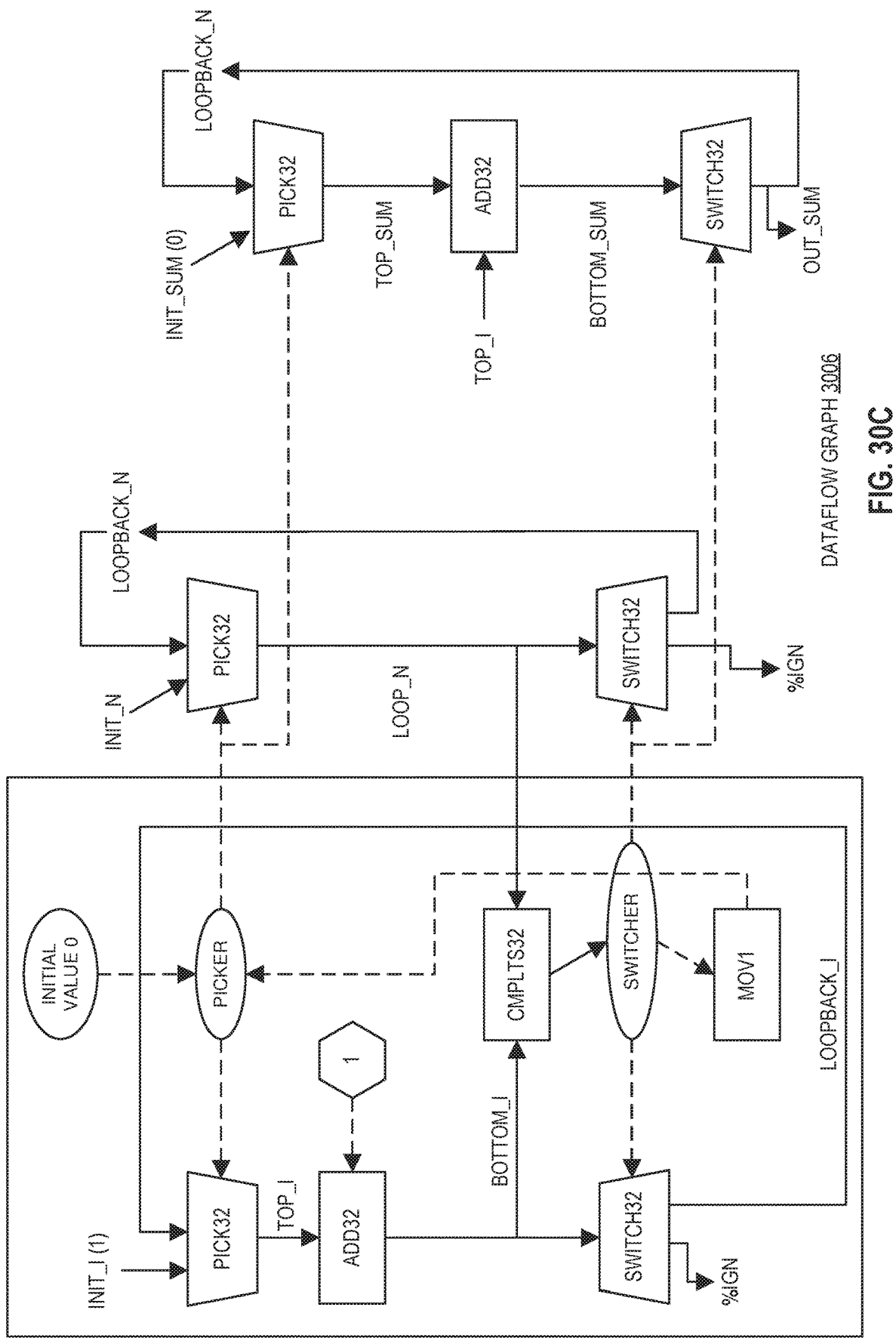
FIG. 30C illustrates a dataflow graph for the dataflow assembly code of FIG. 30B for an accelerator according to embodiments of the disclosure.

Another important class of CFGs in dataflow conversion are CFGs for single-entry-single-exit loops, a common form of loop generated in (LLVM) IR. These loops may be almost acyclic, except for a single back edge from the end of the loop back to a loop header block. The dataflow conversion pass may use same high-level strategy to convert loops as for branches, e.g., it inserts switches at the end of the loop to direct values out of the loop (either out the loop exit or around the back-edge to the beginning of the loop), and inserts picks at the beginning of the loop to choose between initial values entering the loop and values coming through the back edge. FIG. 30A illustrates C source code 3002 according to embodiments of the disclosure. FIG. 30B illustrates dataflow assembly code 3004 for the C source code 3002 of FIG. 30A according to embodiments of the disclosure. FIG. 30C illustrates a dataflow graph 3006 for the dataflow assembly code 3004 of FIG. 30B for an accelerator according to embodiments of the disclosure. FIGS. 30A-30C shows C and CSA assembly code for an example do-while loop that adds up values of a loop induction variable i, as well as the corresponding dataflow graph. For each variable that conceptually cycles around the loop (i and sum), this graph has a corresponding pick/switch pair that controls the flow of these values. Note that this example also uses a pick/switch pair to cycle the value of n around the loop, even though n is loop-invariant. This repetition of n enables conversion of n's virtual register into a LIC, since it matches the execution frequencies between a conceptual definition of n outside the loop and the one or more uses of n inside the loop. In general, for a correct dataflow conversion, registers that are live-in into a loop are to be repeated once for each iteration inside the loop body when the register is converted into a LIC. Similarly, registers that are updated inside a loop and are live-out from the loop are to be consumed, e.g., with a single final value sent out of the loop. Loops introduce a wrinkle into the dataflow conversion process, namely that the control for a pick at the top of the loop and the switch for the bottom of the loop are offset. For example, if the loop in FIG. 29A executes three iterations and exits, the control to picker should be 0, 1, 1, while the control to switcher should be 1, 1, 0. This control is implemented by starting the picker channel with an initial extra 0 when the function begins on cycle 0 (which is specified in the assembly by the directives .value 0 and .avail 0), and then copying the output switcher into picker. Note that the last 0 in switcher restores a final 0 into picker, ensuring that the final state of the dataflow graph matches its initial state.

Figure 31A:
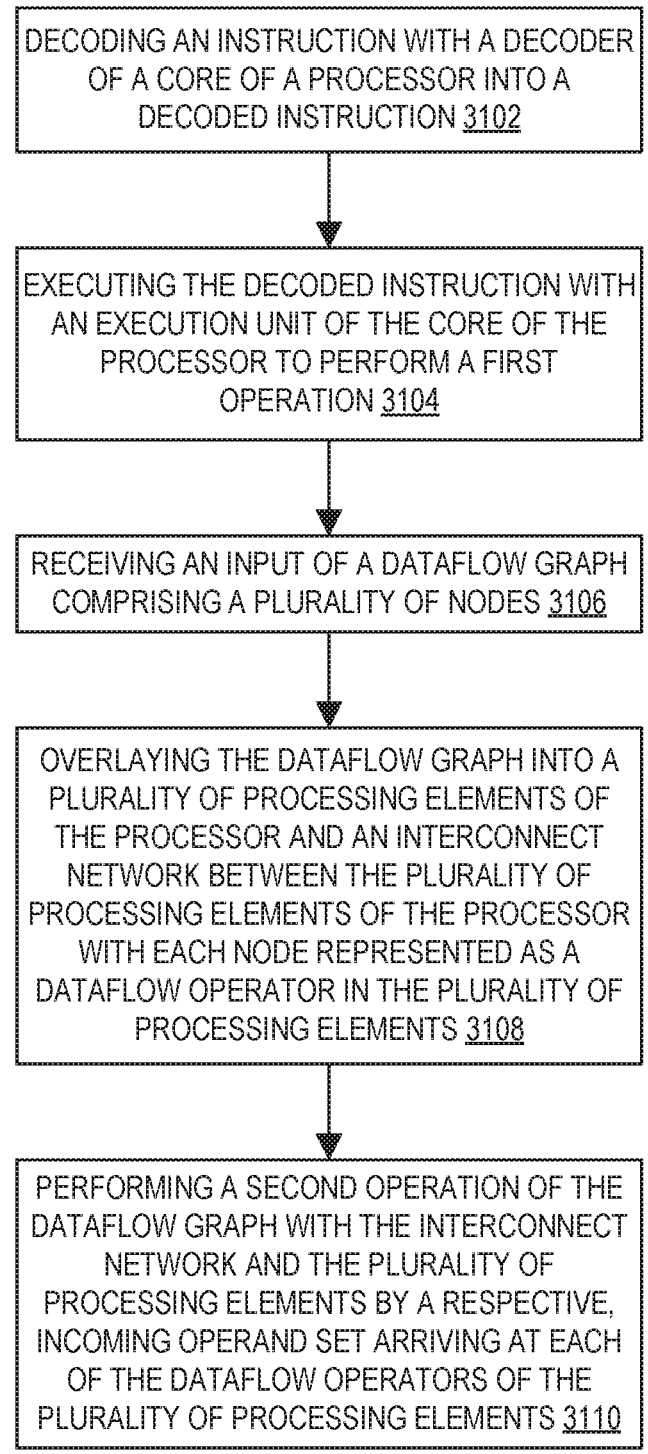
FIG. 31A illustrates a flow diagram according to embodiments of the disclosure.

FIG. 31A illustrates a flow diagram 3100 according to embodiments of the disclosure. Depicted flow 3100 includes decoding an instruction with a decoder of a core of a processor into a decoded instruction 3102; executing the decoded instruction with an execution unit of the core of the processor to perform a first operation 3104; receiving an input of a dataflow graph comprising a plurality of nodes 3106; overlaying the dataflow graph into a plurality of processing elements of the processor and an interconnect network between the plurality of processing elements of the processor with each node represented as a dataflow operator in the plurality of processing elements 3108; and performing a second operation of the dataflow graph with the interconnect network and the plurality of processing elements by a respective, incoming operand set arriving at each of the dataflow operators of the plurality of processing elements 3110.

Figure 31B:
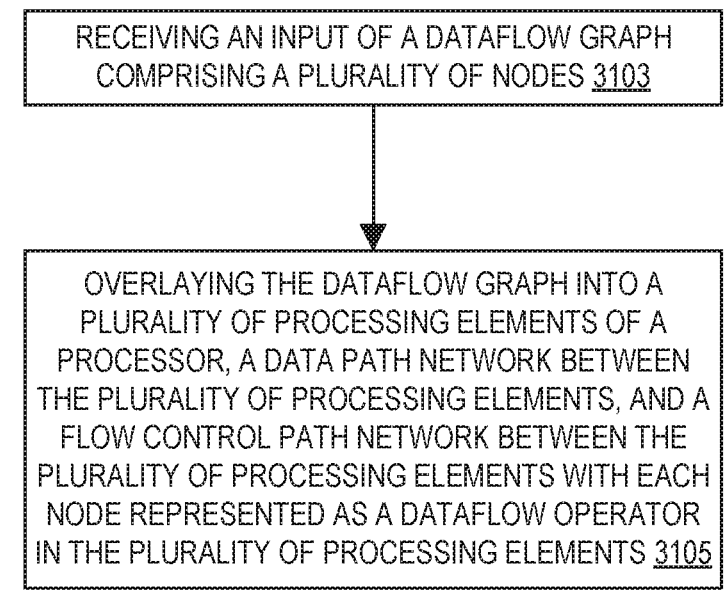
FIG. 31B illustrates a flow diagram according to embodiments of the disclosure.

FIG. 31B illustrates a flow diagram 3101 according to embodiments of the disclosure. Depicted flow 3101 includes receiving an input of a dataflow graph comprising a plurality of nodes 3103; and overlaying the dataflow graph into a plurality of processing elements of a processor, a data path network between the plurality of processing elements, and a flow control path network between the plurality of processing elements with each node represented as a dataflow operator in the plurality of processing elements 3105.

In one embodiment, the core writes a command into a memory queue and a CSA (e.g., the plurality of processing elements) monitors the memory queue and begins executing when the command is read. In one embodiment, the core executes a first part of a program and a CSA (e.g., the plurality of processing elements) executes a second part of the program. In one embodiment, the core does other work while the CSA is executing its operations.

5. CSA Advantages

In certain embodiments, the CSA architecture and microarchitecture provides profound energy, performance, and usability advantages over roadmap processor architectures and FPGAs. In this section, these architectures are compared to embodiments of the CSA and highlights the superiority of CSA in accelerating parallel dataflow graphs relative to each.

5.1 Processors

Figure 32:
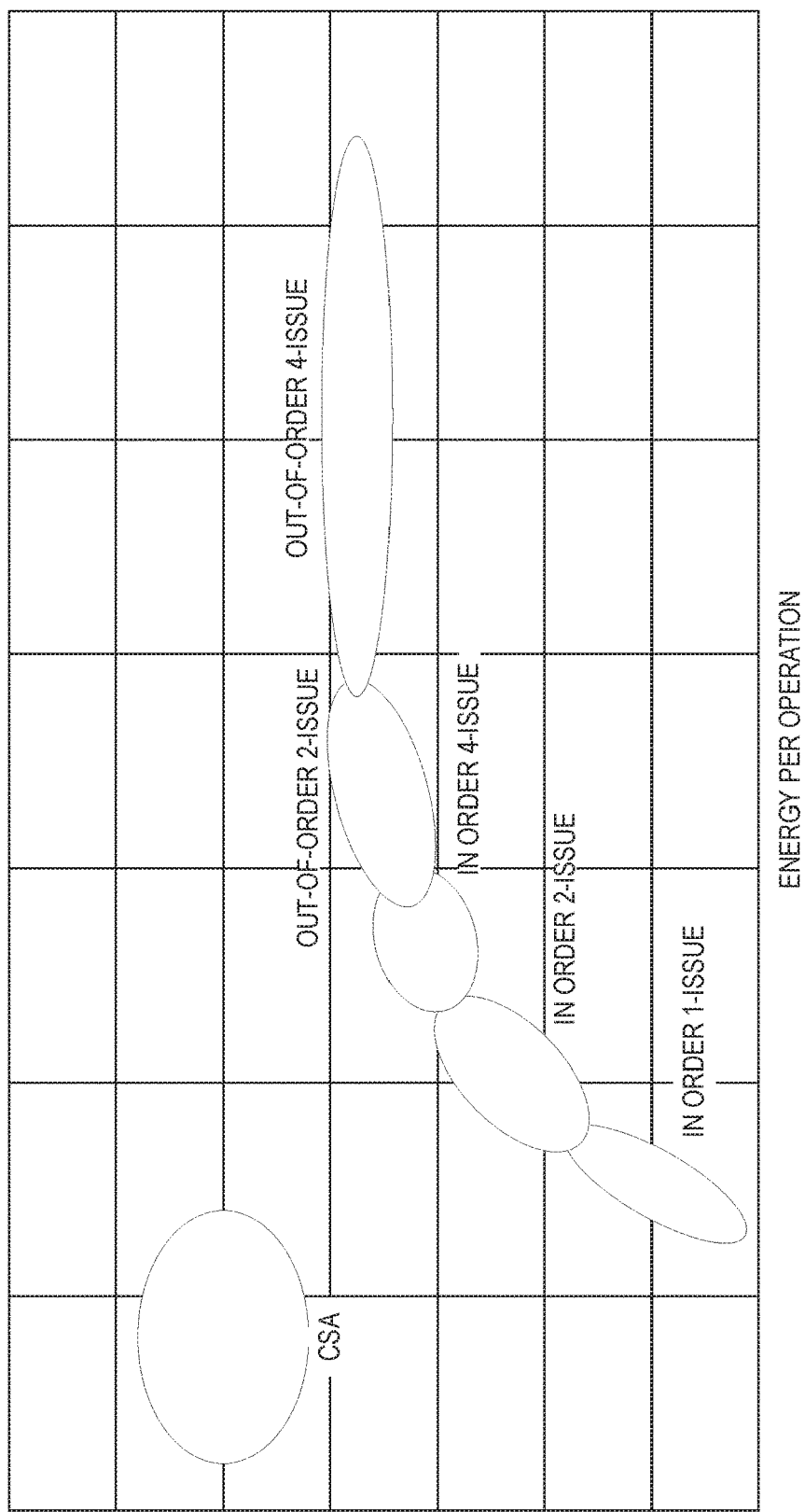
FIG. 32 illustrates a throughput versus energy per operation graph according to embodiments of the disclosure.

FIG. 32 illustrates a throughput versus energy per operation graph 3200 according to embodiments of the disclosure. As shown in FIG. 32, small cores are generally more energy efficient than large cores, and, in some workloads, this advantage may be translated to absolute performance through higher core counts. The CSA microarchitecture follows these observations to their conclusion and removes (e.g., most) energy-hungry control structures associated with von Neumann architectures, including most of the instruction-side microarchitecture. By removing these overheads and implementing simple, single operation PEs, embodiments of a CSA obtains a dense, efficient spatial array. Unlike small cores, which are usually quite serial, a CSA may gang its PEs together, e.g., via the circuit switched local network, to form explicitly parallel aggregate dataflow graphs. The result is performance in not only parallel applications, but also serial applications as well. Unlike cores, which may pay dearly for performance in terms area and energy, a CSA is already parallel in its native execution model. In certain embodiments, a CSA utilizes speculation to increase performance, e.g., and it does not need to repeatedly re-extract parallelism from a sequential program representation, thereby avoiding two of the main energy taxes in von Neumann architectures. Most structures in embodiments of a CSA are distributed, small, and energy efficient, as opposed to the centralized, bulky, energy hungry structures found in cores. Consider the case of registers in the CSA: each PE may have a few (e.g., 10 or less) storage registers. Taken individually, these registers may be more efficient that traditional register files. In aggregate, these registers may provide the effect of a large, in-fabric register file. As a result, embodiments of a CSA avoids most of stack spills and fills incurred by classical architectures, while using much less energy per state access. Of course, applications may still access memory. In embodiments of a CSA, memory access request and response are architecturally decoupled, enabling workloads to sustain many more outstanding memory accesses per unit of area and energy. This property yields substantially higher performance for cache-bound workloads and reduces the area and energy needed to saturate main memory in memory-bound workloads. Embodiments of a CSA expose new forms of energy efficiency which are unique to non-von Neumann architectures. One consequence of executing a single operation (e.g., instruction) at a (e.g., most) PEs is reduced operand entropy.

In the case of an increment operation, each execution may result in a handful of circuit-level toggles and little energy consumption, a case examined in detail in Section 6.2. In contrast, von Neumann architectures are multiplexed, resulting in large numbers of bit transitions. The asynchronous style of embodiments of a CSA also enables microarchitectural optimizations, such as the floating point optimizations described in Section 3.5 that are difficult to realize in tightly scheduled core pipelines. Because PEs may be relatively simple and their behavior in a particular dataflow graph be statically known, clock gating and power gating techniques may be applied more effectively than in coarser architectures. The graph-execution style, small size, and malleability of embodiments of CSA PEs and the network together enable the expression many kinds of parallelism: instruction, data, pipeline, vector, memory, thread, and task parallelism may all be implemented. For example, in embodiments of a CSA, one application may use arithmetic units to provide a high degree of address bandwidth, while another application may use those same units for computation. In many cases, multiple kinds of parallelism may be combined to achieve even more performance. Many key HPC operations may be both replicated and pipelined, resulting in orders-of-magnitude performance gains. In contrast, von Neumann-style cores typically optimize for one style of parallelism, carefully chosen by the architects, resulting in a failure to capture all important application kernels. Just as embodiments of a CSA expose and facilitates many forms of parallelism, it does not mandate a particular form of parallelism, or, worse, a particular subroutine be present in an application in order to benefit from the CSA. Many applications, including single-stream applications, may obtain both performance and energy benefits from embodiments of a CSA, e.g., even when compiled without modification. This reverses the long trend of requiring significant programmer effort to obtain a substantial performance gain in singlestream applications. Indeed, in some applications, embodiments of a CSA obtain more performance from functionally equivalent, but less "modern" codes than from their convoluted, contemporary cousins which have been tortured to target vector instructions.

5.2 Comparison of CSA Embodiments and FGPAs

The choice of dataflow operators as the fundamental architecture of embodiments of a CSA differentiates those CSAs from a FGPA, and particularly the CSA is as superior accelerator for HPC dataflow graphs arising from traditional programming languages. Dataflow operators are fundamentally asynchronous. This enables embodiments of a CSA not only to have great freedom of implementation in the microarchitecture, but it also enables them to simply and succinctly accommodate abstract architectural concepts. For example, embodiments of a CSA naturally accommodate many memory microarchitectures, which are essentially asynchronous, with a simple load-store interface. One need only examine an FPGA DRAM controller to appreciate the difference in complexity. Embodiments of a CSA also leverage asynchrony to provide faster and more-fully-featured runtime services like configuration and extraction, which are believed to be four to six orders of magnitude faster than an FPGA. By narrowing the architectural interface, embodiments of a CSA provide control over most timing paths at the microarchitectural level. This allows embodiments of a CSA to operate at a much higher frequency than the more general control mechanism offered in a FPGA. Similarly, clock and reset, which may be architecturally fundamental to FPGAs, are microarchitectural in the CSA, e.g., obviating the need to support them as programmable entities. Dataflow operators may be, for the most part, coarse-grained. By only dealing in coarse operators, embodiments of a CSA improve both the density of the fabric and its energy consumption: CSA executes operations directly rather than emulating them with look-up tables. A second consequence of coarseness is a simplification of the place and route problem. CSA dataflow graphs are many orders of magnitude smaller than FPGA net-lists and place and route time are commensurately reduced in embodiments of a CSA. The significant differences between embodiments of a CSA and a FPGA make the CSA superior as an accelerator, e.g., for dataflow graphs arising from traditional programming languages.

6. Evaluation

The CSA is a novel computer architecture with the potential to provide enormous performance and energy advantages relative to roadmap processors. Consider the case of computing a single strided address for walking across an array. This case may be important in HPC applications, e.g., which spend significant integer effort in computing address offsets. In address computation, and especially strided address computation, one argument is constant and the other varies only slightly per computation. Thus, only a handful of bits per cycle toggle in the majority of cases. Indeed, it may be shown, using a derivation similar to the bound on floating point carry bits described in Section 3.5, that less than two bits of input toggle per computation in average for a stride calculation, reducing energy by 50% over a random toggle distribution. Were a time-multiplexed approach used, much of this energy savings may be lost. In one embodiment, the CSA achieves approximately 3x energy efficiency over a core while delivering an 8× performance gain. The parallelism gains achieved by embodiments of a CSA may result in reduced program run times, yielding a proportionate, substantial reduction in leakage energy. At the PE level, embodiments of a CSA are extremely energy efficient. A second important question for the CSA is whether the CSA consumes a reasonable amount of energy at the tile level. Since embodiments of a CSA are capable of exercising every floating point PE in the fabric at every cycle, it serves as a reasonable upper bound for energy and power consumption, e.g., such that most of the energy goes into floating point multiply and add.

7. Further CSA Details

This section discusses further details for configuration and exception handling.

7.1 Microarchitecture for Configuring a CSA

This section discloses examples of how to configure a CSA (e.g., fabric), how to achieve this configuration quickly, and how to minimize the resource overhead of configuration. Configuring the fabric quickly may be of preeminent importance in accelerating small portions of a larger algorithm, and consequently in broadening the applicability of a CSA. The section further discloses features that allow embodiments of a CSA to be programmed with configurations of different length.

Embodiments of a CSA (e.g., fabric) may differ from traditional cores in that they make use of a configuration step in which (e.g., large) parts of the fabric are loaded with program configuration in advance of program execution. An advantage of static configuration may be that very little energy is spent at runtime on the configuration, e.g., as opposed to sequential cores which spend energy fetching configuration information (an instruction) nearly every cycle. The previous disadvantage of configuration is that it was a coarse-grained step with a potentially large latency, which places an under-bound on the size of program that can be accelerated in the fabric due to the cost of context switching. This disclosure describes a scalable microarchitecture for rapidly configuring a spatial array in a distributed fashion, e.g., that avoids the previous disadvantages.

As discussed above, a CSA may include light-weight processing elements connected by an inter-PE network. Programs, viewed as control-dataflow graphs, are then mapped onto the architecture by configuring the configurable fabric elements (CFEs), for example PEs and the interconnect (fabric) networks. Generally, PEs may be configured as dataflow operators and once all input operands arrive at the PE, some operation occurs, and the results are forwarded to another PE or PEs for consumption or output. PEs may communicate over dedicated virtual circuits which are formed by statically configuring the circuit switched communications network. These virtual circuits may be flow controlled and fully back-pressured, e.g., such that PEs will stall if either the source has no data or destination is full. At runtime, data may flow through the PEs implementing the mapped algorithm. For example, data may be streamed in from memory, through the fabric, and then back out to memory. Such a spatial architecture may achieve remarkable performance efficiency relative to traditional multicore processors: compute, in the form of PEs, may be simpler and more numerous than larger cores and communications may be direct, as opposed to an extension of the memory system.

Embodiments of a CSA may not utilize (e.g., software controlled) packet switching, e.g., packet switching that requires significant software assistance to realize, which slows configuration. Embodiments of a CSA include out-of-band signaling in the network (e.g., of only 2-3 bits, depending on the feature set supported) and a fixed configuration topology to avoid the need for significant software support.

One key difference between embodiments of a CSA and the approach used in FPGAs is that a CSA approach may use a wide data word, is distributed, and includes mechanisms to fetch program data directly from memory. Embodiments of a CSA may not utilize JTAG-style single bit communications in the interest of area efficiency, e.g., as that may require milliseconds to completely configure a large FPGA fabric.

Embodiments of a CSA include a distributed configuration protocol and microarchitecture to support this protocol. Initially, configuration state may reside in memory. Multiple (e.g., distributed) local configuration controllers (boxes) (LCCs) may stream portions of the overall program into their local region of the spatial fabric, e.g., using a combination of a small set of control signals and the fabric-provided network. State elements may be used at each CFE to form configuration chains, e.g., allowing individual CFEs to self-program without global addressing.

Embodiments of a CSA include specific hardware support for the formation of configuration chains, e.g., not software establishing these chains dynamically at the cost of increasing configuration time. Embodiments of a CSA are not purely packet switched and do include extra out-of-band control wires (e.g., control is not sent through the data path requiring extra cycles to strobe this information and reserialize this information). Embodiments of a CSA decreases configuration latency by fixing the configuration ordering and by providing explicit out-of-band control (e.g., by at least a factor of two), while not significantly increasing network complexity.

Embodiments of a CSA do not use a serial mechanism for configuration in which data is streamed bit by bit into the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

Figure 33:
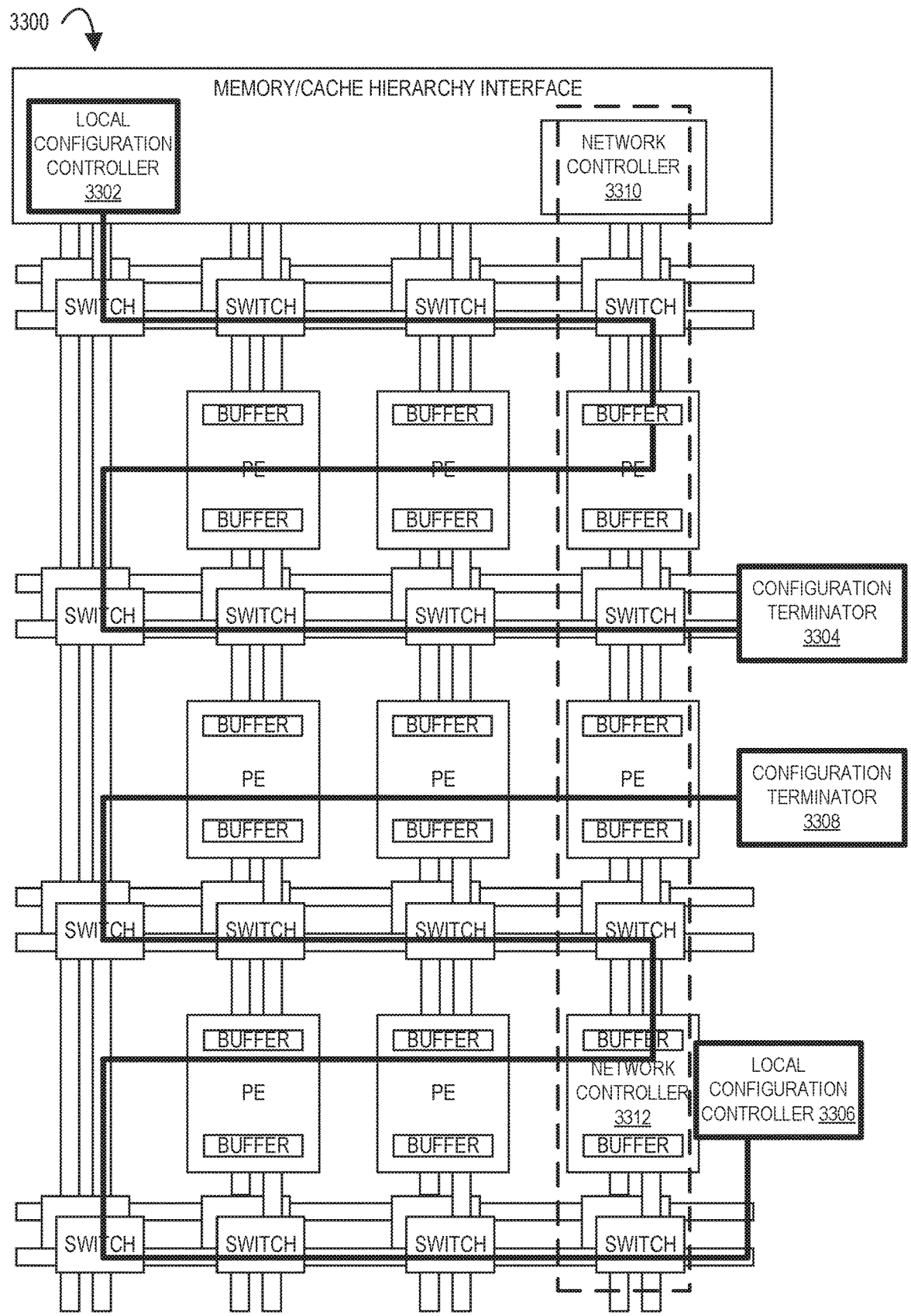
FIG. 33 illustrates an accelerator tile comprising an array of processing elements and a local configuration controller according to embodiments of the disclosure.

FIG. 33 illustrates an accelerator tile 3300 comprising an array of processing elements (PE) and a local configuration controller (3302, 3306) according to embodiments of the disclosure. Each PE, each network controller (e.g., network dataflow endpoint circuit), and each switch may be a configurable fabric elements (CFEs), e.g., which are configured (e.g., programmed) by embodiments of the CSA architecture.

Embodiments of a CSA include hardware that provides for efficient, distributed, low-latency configuration of a heterogeneous spatial fabric. This may be achieved according to four techniques. First, a hardware entity, the local configuration controller (LCC) is utilized, for example, as in FIGS. 33-35. An LCC may fetch a stream of configuration information from (e.g., virtual) memory. Second, a configuration data path may be included, e.g., that is as wide as the native width of the PE fabric and which may be overlaid on top of the PE fabric. Third, new control signals may be received into the PE fabric which orchestrate the configuration process. Fourth, state elements may be located (e.g., in a register) at each configurable endpoint which track the status of adjacent CFEs, allowing each CFE to unambiguously self-configure without extra control signals. These four microarchitectural features may allow a CSA to configure chains of its CFEs. To obtain low configuration latency, the configuration may be partitioned by building many LCCs and CFE chains. At configuration time, these may operate independently to load the fabric in parallel, e.g., dramatically reducing latency. As a result of these combinations, fabrics configured using embodiments of a CSA architecture, may be completely configured (e.g., in hundreds of nanoseconds). In the following, the detailed the operation of the various components of embodiments of a CSA configuration network are disclosed.

Figure 34A:
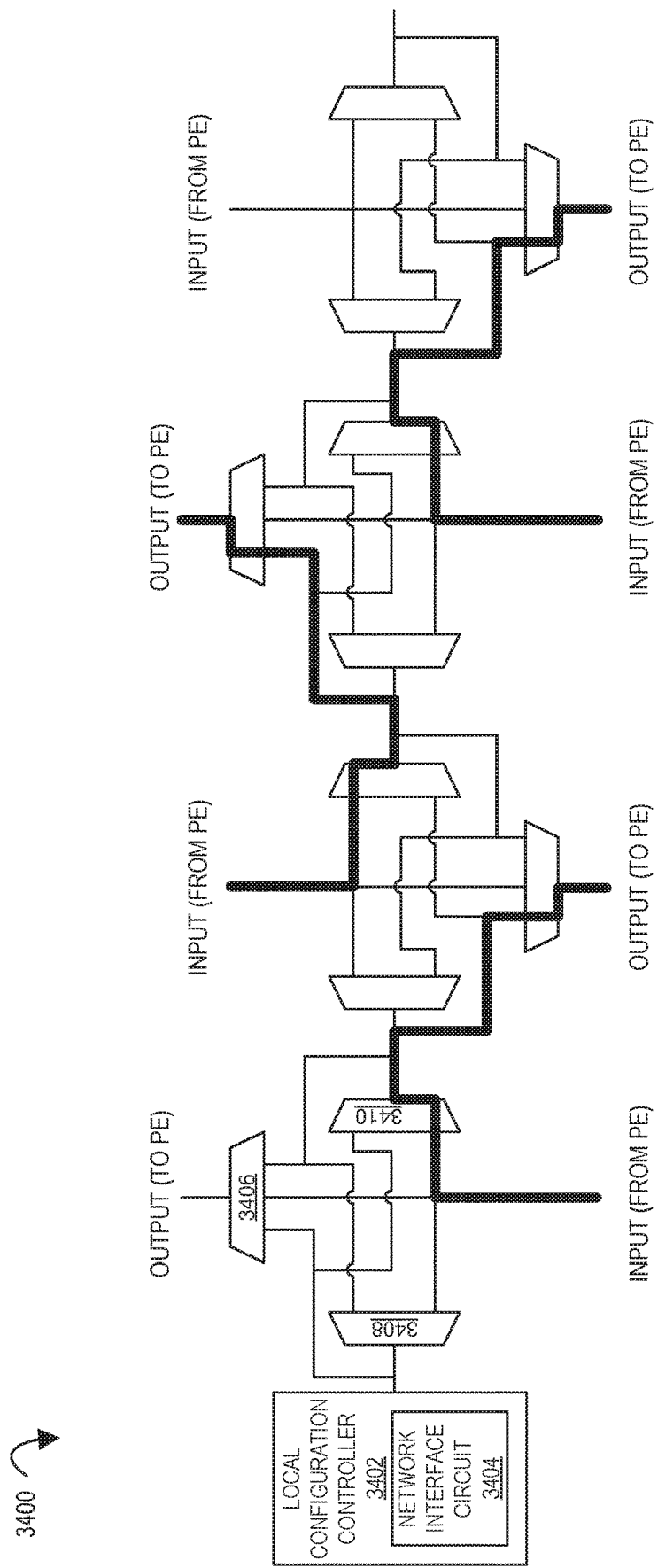
FIGS. 34A-34C illustrate a local configuration controller configuring a data path network according to embodiments of the disclosure.
Figure 34B:
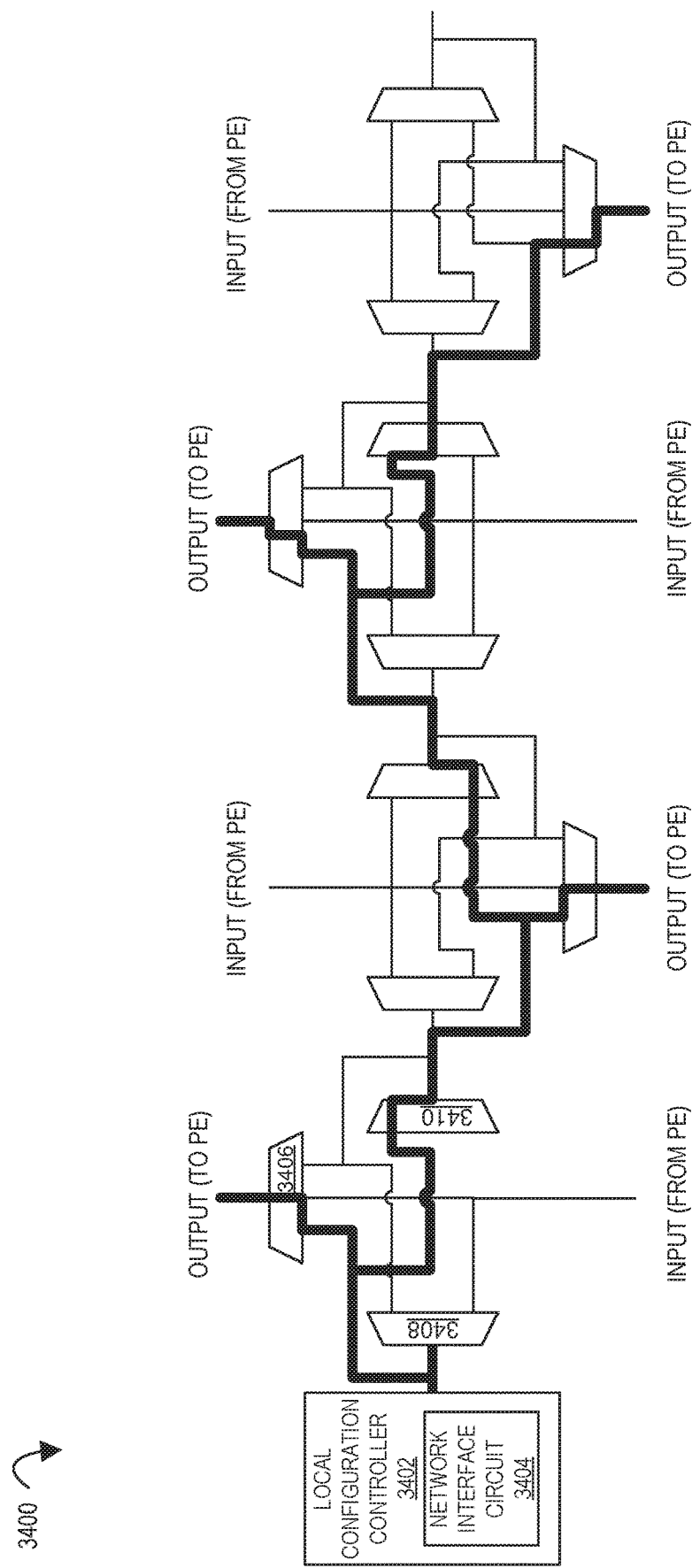
Figure 34C:
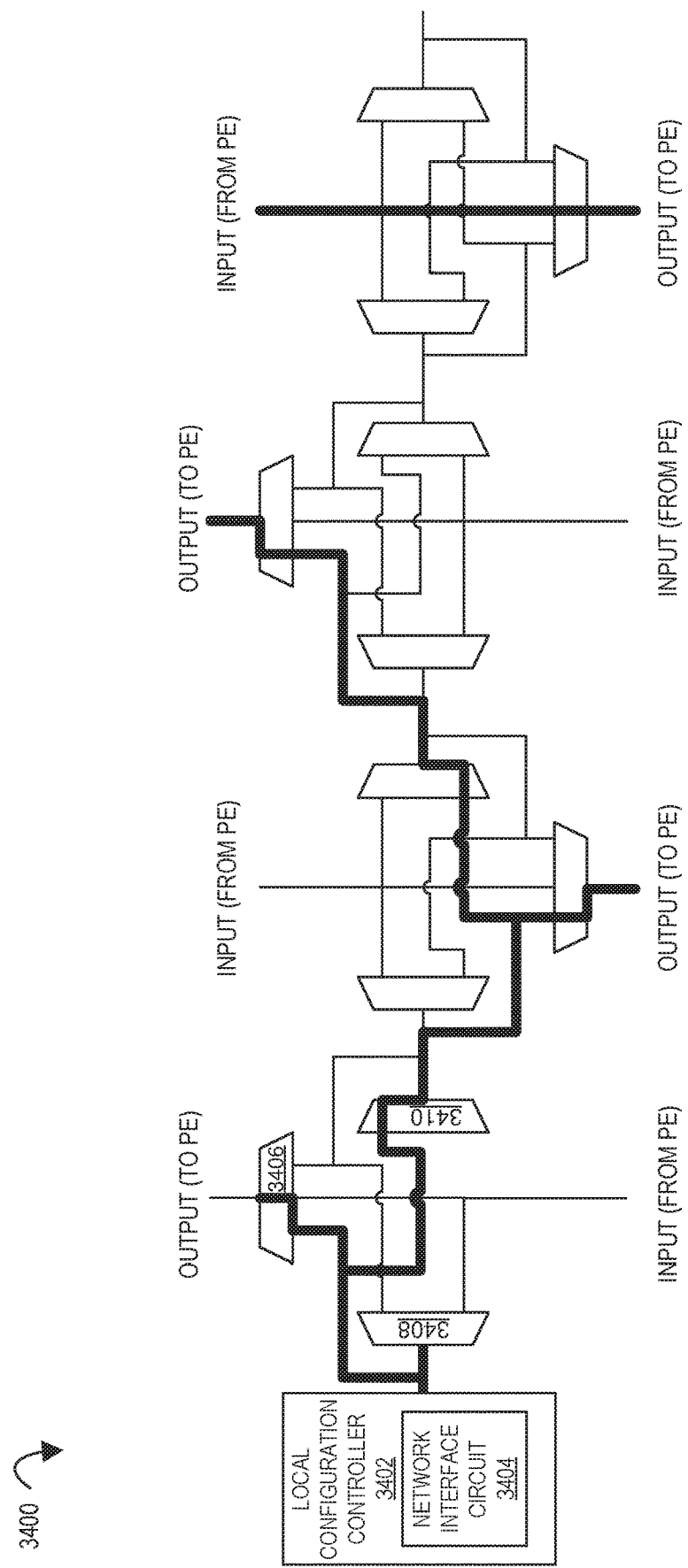

FIGS. 34A-34C illustrate a local configuration controller 3402 configuring a data path network according to embodiments of the disclosure. Depicted network includes a plurality of multiplexers (e.g., multiplexers 3406, 3408, 3410) that may be configured (e.g., via their respective control signals) to connect one or more data paths (e.g., from PEs) together. FIG. 34A illustrates the network 3400 (e.g., fabric) configured (e.g., set) for some previous operation or program. FIG. 34B illustrates the local configuration controller 3402 (e.g., including a network interface circuit 3404 to send and/or receive signals) strobing a configuration signal and the local network is set to a default configuration (e.g., as depicted) that allows the LCC to send configuration data to all configurable fabric elements (CFEs), e.g., muxes. FIG. 34C illustrates the LCC strobing configuration information across the network, configuring CFEs in a predetermined (e.g., silicon-defined) sequence. In one embodiment, when CFEs are configured they may begin operation immediately. In another embodiments, the CFEs wait to begin operation until the fabric has been completely configured (e.g., as signaled by configuration terminator (e.g., configuration terminator 3604 and configuration terminator 3608 in FIG. 36) for each local configuration controller). In one embodiment, the LCC obtains control over the network fabric by sending a special message, or driving a signal. It then strobes configuration data (e.g., over a period of many cycles) to the CFEs in the fabric. In these figures, the multiplexor networks are analogues of the "Switch" shown in certain Figures (e.g., FIG. 17).

Local Configuration Controller

Figure 35:
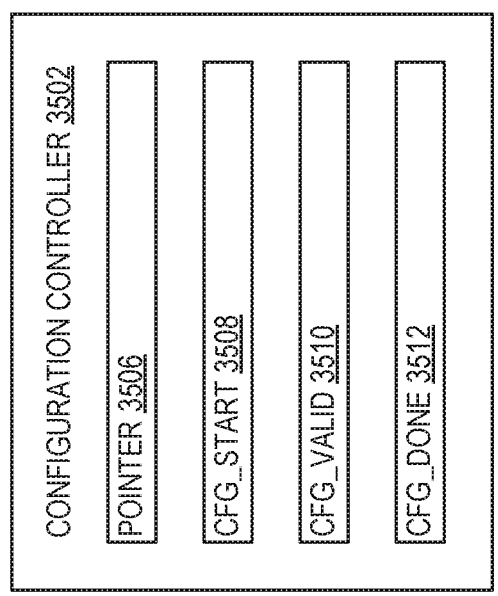
FIG. 35 illustrates a configuration controller according to embodiments of the disclosure.

FIG. 35 illustrates a (e.g., local) configuration controller 3502 according to embodiments of the disclosure. A local configuration controller (LCC) may be the hardware entity which is responsible for loading the local portions (e.g., in a subset of a tile or otherwise) of the fabric program, interpreting these program portions, and then loading these program portions into the fabric by driving the appropriate protocol on the various configuration wires. In this capacity, the LCC may be a special-purpose, sequential microcontroller.

LCC operation may begin when it receives a pointer to a code segment. Depending on the LCB microarchitecture, this pointer (e.g., stored in pointer register 3506) may come either over a network (e.g., from within the CSA (fabric) itself) or through a memory system access to the LCC. When it receives such a pointer, the LCC optionally drains relevant state from its portion of the fabric for context storage, and then proceeds to immediately reconfigure the portion of the fabric for which it is responsible. The program loaded by the LCC may be a combination of configuration data for the fabric and control commands for the LCC, e.g., which are lightly encoded. As the LCC streams in the program portion, it may interprets the program as a command stream and perform the appropriate encoded action to configure (e.g., load) the fabric.

Two different microarchitectures for the LCC are shown in FIG. 33, e.g., with one or both being utilized in a CSA. The first places the LCC 3302 at the memory interface. In this case, the LCC may make direct requests to the memory system to load data. In the second case the LCC 3306 is placed on a memory network, in which it may make requests to the memory only indirectly. In both cases, the logical operation of the LCB is unchanged. In one embodiment, an LCCs is informed of the program to load, for example, by a set of (e.g., OS-visible) control-status-registers which will be used to inform individual LCCs of new program pointers, etc.

Extra Out-of-Band Control Channels (e.g., Wires)

In certain embodiments, configuration relies on 2-8 extra, out-of-band control channels to improve configuration speed, as defined below. For example, configuration controller 3502 may include the following control channels, e.g., CFG_START control channel 3508, CFG_VALID control channel 3510, and CFG_DONE control channel 3512, with examples of each discussed in Table 2 below.

TABLE 2

Control Channels

| | |
|---|---|
| CFG_START | Asserted at beginning of configuration. Sets configuration state at each CFE and sets the configuration bus. |
| CFG_VALID | Denotes validity of values on configuration bus. |
| CFG_DONE | Optional. Denotes completion of the configuration of a particular CFE. This allows configuration to be short circuited in case a CFE does not require additional configuration |

Generally, the handling of configuration information may be left to the implementer of a particular CFE. For example, a selectable function CFE may have a provision for setting registers using an existing data path, while a fixed function CFE might simply set a configuration register.

Due to long wire delays when programming a large set of CFEs, the CFG_VALID signal may be treated as a clock/latch enable for CFE components. Since this signal is used as a clock, in one embodiment the duty cycle of the line is at most 50%. As a result, configuration throughput is approximately halved. Optionally, a second CFG_VALID signal may be added to enable continuous programming.

In one embodiment, only CFG_START is strictly communicated on an independent coupling (e.g., wire), for example, CFG_VALID and CFG_DONE may be overlaid on top of other network couplings.

Reuse of Network Resources

To reduce the overhead of configuration, certain embodiments of a CSA make use of existing network infrastructure to communicate configuration data. A LCC may make use of both a chip-level memory hierarchy and a fabric-level communications networks to move data from storage into the fabric. As a result, in certain embodiments of a CSA, the configuration infrastructure adds no more than 2% to the overall fabric area and power.

Reuse of network resources in certain embodiments of a CSA may cause a network to have some hardware support for a configuration mechanism. Circuit switched networks of embodiments of a CSA cause an LCC to set their multiplexors in a specific way for configuration when the 'CFG_START' signal is asserted. Packet switched networks do not require extension, although LCC endpoints (e.g., configuration terminators) use a specific address in the packet switched network. Network reuse is optional, and some embodiments may find dedicated configuration buses to be more convenient.

Per CFE State

Each CFE may maintain a bit denoting whether or not it has been configured (see, e.g., FIG. 24). This bit may be de-asserted when the configuration start signal is driven, and then asserted once the particular CFE has been configured. In one configuration protocol, CFEs are arranged to form chains with the CFE configuration state bit determining the topology of the chain. A CFE may read the configuration state bit of the immediately adjacent CFE. If this adjacent CFE is configured and the current CFE is not configured, the CFE may determine that any current configuration data is targeted at the current CFE. When the 'CFG_DONE' signal is asserted, the CFE may set its configuration bit, e.g., enabling upstream CFEs to configure. As a base case to the configuration process, a configuration terminator (e.g., configuration terminator 3304 for LCC 3302 or configuration terminator 3308 for LCC 3306 in FIG. 33) which asserts that it is configured may be included at the end of a chain.

Internal to the CFE, this bit may be used to drive flow control ready signals. For example, when the configuration bit is de-asserted, network control signals may automatically be clamped to a values that prevent data from flowing, while, within PEs, no operations or other actions will be scheduled.

Dealing with High-Delay Configuration Paths

One embodiment of an LCC may drive a signal over a long distance, e.g., through many multiplexors and with many loads. Thus, it may be difficult for a signal to arrive at a distant CFE within a short clock cycle. In certain embodiments, configuration signals are at some division (e.g., fraction of) of the main (e.g., CSA) clock frequency to ensure digital timing discipline at configuration. Clock division may be utilized in an out-of-band signaling protocol, and does not require any modification of the main clock tree.

Ensuring Consistent Fabric Behavior During Configuration

Since certain configuration schemes are distributed and have non-deterministic timing due to program and memory effects, different portions of the fabric may be configured at different times. As a result, certain embodiments of a CSA provide mechanisms to prevent inconsistent operation among configured and unconfigured CFEs. Generally, consistency is viewed as a property required of and maintained by CFEs themselves, e.g., using the internal CFE state. For example, when a CFE is in an unconfigured state, it may claim that its input buffers are full, and that its output is invalid. When configured, these values will be set to the true state of the buffers. As enough of the fabric comes out of configuration, these techniques may permit it to begin operation. This has the effect of further reducing context switching latency, e.g., if long-latency memory requests are issued early.

Variable-Width Configuration

Different CFEs may have different configuration word widths. For smaller CFE configuration words, implementers may balance delay by equitably assigning CFE configuration loads across the network wires. To balance loading on network wires, one option is to assign configuration bits to different portions of network wires to limit the net delay on any one wire. Wide data words may be handled by using serialization/deserialization techniques. These decisions may be taken on a per-fabric basis to optimize the behavior of a specific CSA (e.g., fabric). Network controller (e.g., one or more of network controller 3310 and network controller 3312 may communicate with each domain (e.g., subset) of the CSA (e.g., fabric), for example, to send configuration information to one or more LCCs. Network controller may be part of a communications network (e.g., separate from circuit switched network). Network controller may include a network dataflow endpoint circuit.

7.2 Microarchitecture for Low Latency Configuration of a CSA and for Timely Fetching of Configuration Data for a CSA Embodiments of a CSA may be an energy-efficient and high-performance means of accelerating user applications. When considering whether a program (e.g., a dataflow graph thereof) may be successfully accelerated by an accelerator, both the time to configure the accelerator and the time to run the program may be considered. If the run time is short, then the configuration time may play a large role in determining successful acceleration. Therefore, to maximize the domain of accelerable programs, in some embodiments the configuration time is made as short as possible. One or more configuration caches may be includes in a CSA, e.g., such that the high bandwidth, low-latency store enables rapid reconfiguration. Next is a description of several embodiments of a configuration cache.

In one embodiment, during configuration, the configuration hardware (e.g., LCC) optionally accesses the configuration cache to obtain new configuration information. The configuration cache may operate either as a traditional address based cache, or in an OS managed mode, in which configurations are stored in the local address space and addressed by reference to that address space. If configuration state is located in the cache, then no requests to the backing store are to be made in certain embodiments. In certain embodiments, this configuration cache is separate from any (e.g., lower level) shared cache in the memory hierarchy.

Figure 36:
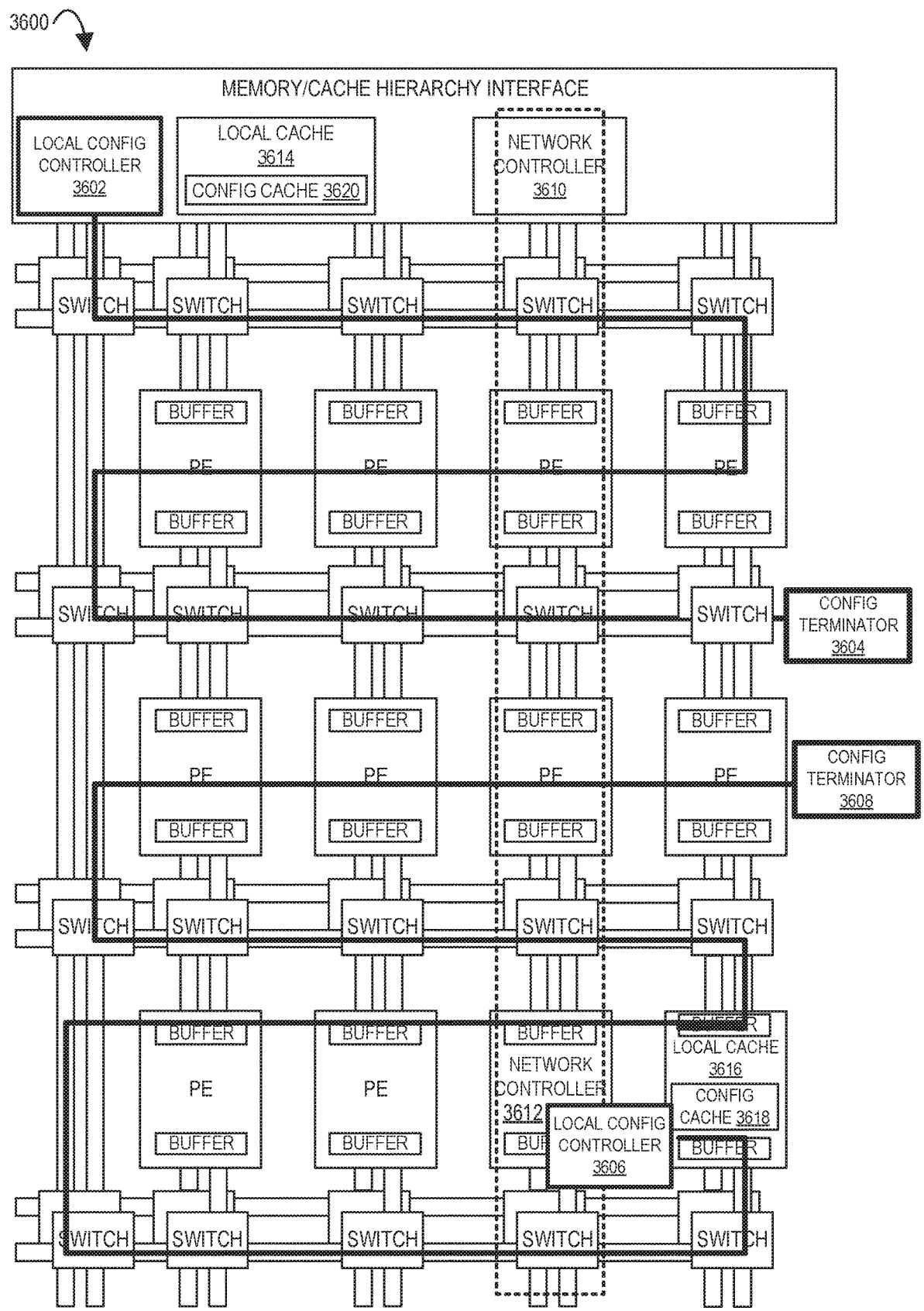
FIG. 36 illustrates an accelerator tile comprising an array of processing elements, a configuration cache, and a local configuration controller according to embodiments of the disclosure.

FIG. 36 illustrates an accelerator tile 3600 comprising an array of processing elements, a configuration cache (e.g., 3618 or 3620), and a local configuration controller (e.g., 3602 or 3606) according to embodiments of the disclosure. In one embodiment, configuration cache 3614 is co-located with local configuration controller 3602. In one embodiment, configuration cache 3618 is located in the configuration domain of local configuration controller 3606, e.g., with a first domain ending at configuration terminator 3604 and a second domain ending at configuration terminator 3608). A configuration cache may allow a local configuration controller may refer to the configuration cache during configuration, e.g., in the hope of obtaining configuration state with lower latency than a reference to memory. A configuration cache (storage) may either be dedicated or may be accessed as a configuration mode of an in-fabric storage element, e.g., local cache 3616.

Caching Modes
1. Demand Caching—In this mode, the configuration cache operates as a true cache. The configuration controller issues address-based requests, which are checked against tags in the cache. Misses are loaded into the cache and then may be re-referenced during future reprogramming.
2. In-Fabric Storage (Scratchpad) Caching—In this mode the configuration cache receives a reference to a configuration sequence in its own, small address space, rather than the larger address space of the host. This may improve memory density since the portion of cache used to store tags may instead be used to store configuration.

In certain embodiments, a configuration cache may have the configuration data pre-loaded into it, e.g., either by external direction or internal direction. This may allow reduction in the latency to load programs. Certain embodiments herein provide for an interface to a configuration cache which permits the loading of new configuration state into the cache, e.g., even if a configuration is running in the fabric already. The initiation of this load may occur from either an internal or external source. Embodiments of a pre-loading mechanism further reduce latency by removing the latency of cache loading from the configuration path.

Pre-Fetching Modes
1. Explicit Prefetching—A configuration path is augmented with a new command, ConfigurationCachePrefetch. Instead of programming the fabric, this command simply cause a load of the relevant program configuration into a configuration cache, without programming the fabric. Since this mechanism piggybacks on the existing configuration infrastructure, it is exposed both within the fabric and externally, e.g., to cores and other entities accessing the memory space.
2. Implicit prefetching—A global configuration controller may maintain a prefetch predictor, and use this to initiate the explicit prefetching to a configuration cache, e.g., in an automated fashion.

7.3 Hardware for Rapid Reconfiguration of a CSA in Response to an Exception

Certain embodiments of a CSA (e.g., a spatial fabric) include large amounts of instruction and configuration state, e.g., which is largely static during the operation of the CSA. Thus, the configuration state may be vulnerable to soft errors. Rapid and error-free recovery of these soft errors may be critical to the long-term reliability and performance of spatial systems.

Certain embodiments herein provide for a rapid configuration recovery loop, e.g., in which configuration errors are detected and portions of the fabric immediately reconfigured. Certain embodiments herein include a configuration controller, e.g., with reliability, availability, and serviceability (RAS) reprogramming features. Certain embodiments of CSA include circuitry for high-speed configuration, error reporting, and parity checking within the spatial fabric. Using a combination of these three features, and optionally, a configuration cache, a configuration/exception handling circuit may recover from soft errors in configuration. When detected, soft errors may be conveyed to a configuration cache which initiates an immediate reconfiguration of (e.g., that portion of) the fabric. Certain embodiments provide for a dedicated reconfiguration circuit, e.g., which is faster than any solution that would be indirectly implemented in the fabric. In certain embodiments, co-located exception and configuration circuit cooperates to reload the fabric on configuration error detection.

Figure 37:
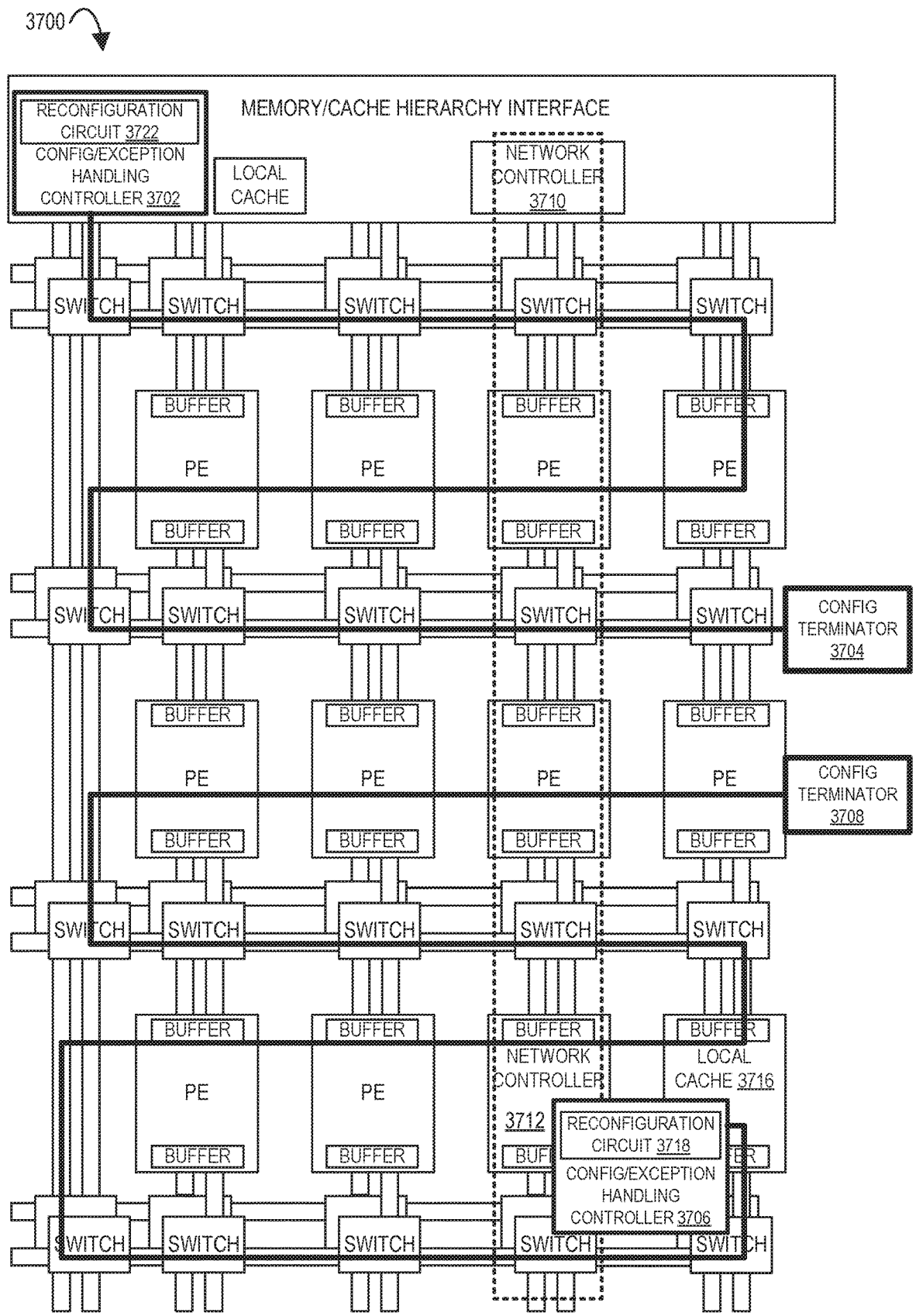
FIG. 37 illustrates an accelerator tile comprising an array of processing elements and a configuration and exception handling controller with a reconfiguration circuit according to embodiments of the disclosure.

FIG. 37 illustrates an accelerator tile 3700 comprising an array of processing elements and a configuration and exception handling controller (3702, 3706) with a reconfiguration circuit (3718, 3722) according to embodiments of the disclosure. In one embodiment, when a PE detects a configuration error through its local RAS features, it sends a (e.g., configuration error or reconfiguration error) message by its exception generator to the configuration and exception handling controller (e.g., 3702 or 3706). On receipt of this message, the configuration and exception handling controller (e.g., 3702 or 3706) initiates the co-located reconfiguration circuit (e.g., 3718 or 3722, respectively) to reload configuration state. The configuration microarchitecture proceeds and reloads (e.g., only) configurations state, and in certain embodiments, only the configuration state for the PE reporting the RAS error. Upon completion of reconfiguration, the fabric may resume normal operation. To decrease latency, the configuration state used by the configuration and exception handling controller (e.g., 3702 or 3706) may be sourced from a configuration cache. As a base case to the configuration or reconfiguration process, a configuration terminator (e.g., configuration terminator 3704 for configuration and exception handling controller 3702 or configuration terminator 3708 for configuration and exception handling controller 3706) in FIG. 37) which asserts that it is configured (or reconfigures) may be included at the end of a chain.

Figure 38:
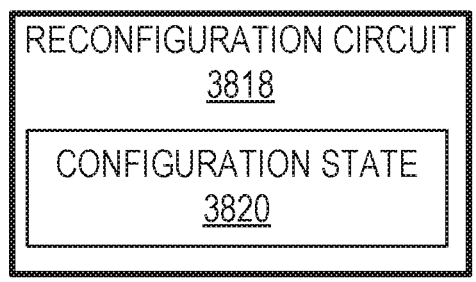
FIG. 38 illustrates a reconfiguration circuit according to embodiments of the disclosure.

FIG. 38 illustrates a reconfiguration circuit 3818 according to embodiments of the disclosure. Reconfiguration circuit 3818 includes a configuration state register 3820 to store the configuration state (or a pointer thereto).

7.4 Hardware for Fabric-Initiated Reconfiguration of a CSA

Some portions of an application targeting a CSA (e.g., spatial array) may be run infrequently or may be mutually exclusive with other parts of the program. To save area, to improve performance, and/or reduce power, it may be useful to time multiplex portions of the spatial fabric among several different parts of the program dataflow graph. Certain embodiments herein include an interface by which a CSA (e.g., via the spatial program) may request that part of the fabric be reprogrammed. This may enable the CSA to dynamically change itself according to dynamic control flow. Certain embodiments herein allow for fabric initiated reconfiguration (e.g., reprogramming). Certain embodiments herein provide for a set of interfaces for triggering configuration from within the fabric. In some embodiments, a PE issues a reconfiguration request based on some decision in the program dataflow graph. This request may travel a network to our new configuration interface, where it triggers reconfiguration. Once reconfiguration is completed, a message may optionally be returned notifying of the completion. Certain embodiments of a CSA thus provide for a program (e.g., dataflow graph) directed reconfiguration capability.

Figure 39:
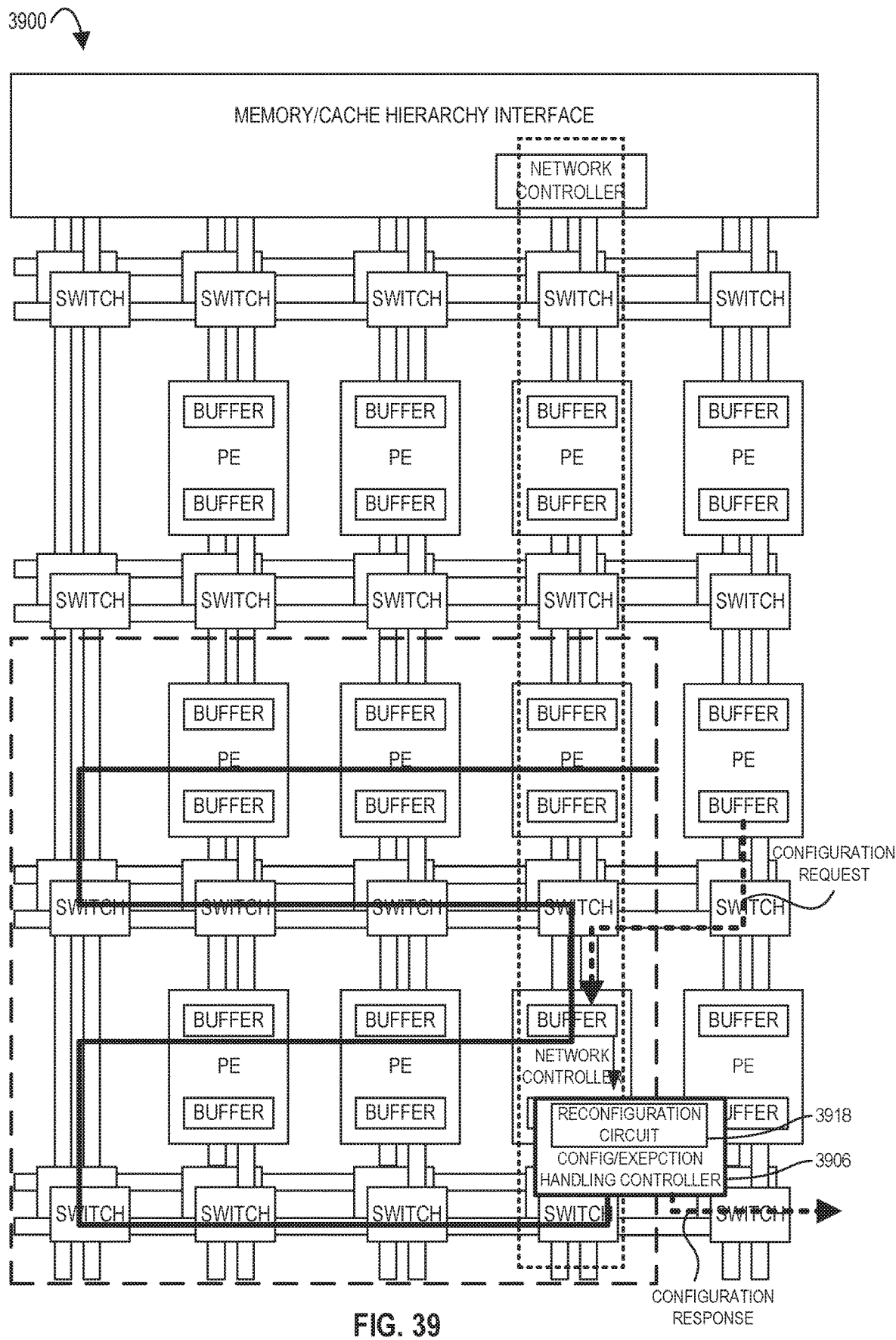
FIG. 39 illustrates an accelerator tile comprising an array of processing elements and a configuration and exception handling controller with a reconfiguration circuit according to embodiments of the disclosure.

FIG. 39 illustrates an accelerator tile 3900 comprising an array of processing elements and a configuration and exception handling controller 3906 with a reconfiguration circuit 3918 according to embodiments of the disclosure. Here, a portion of the fabric issues a request for (re)configuration to a configuration domain, e.g., of configuration and exception handling controller 3906 and/or reconfiguration circuit 3918. The domain (re)configures itself, and when the request has been satisfied, the configuration and exception handling controller 3906 and/or reconfiguration circuit 3918 issues a response to the fabric, to notify the fabric that (re)configuration is complete. In one embodiment, configuration and exception handling controller 3906 and/or reconfiguration circuit 3918 disables communication during the time that (re)configuration is ongoing, so the program has no consistency issues during operation.

Configuration Modes

Configure-by-address—In this mode, the fabric makes a direct request to load configuration data from a particular address.

Configure-by-reference—In this mode the fabric makes a request to load a new configuration, e.g., by a pre-determined reference ID. This may simplify the determination of the code to load, since the location of the code has been abstracted.

Configuring Multiple Domains

A CSA may include a higher level configuration controller to support a multicast mechanism to cast (e.g., via network indicated by the dotted box) configuration requests to multiple (e.g., distributed or local) configuration controllers. This may enable a single configuration request to be replicated across larger portions of the fabric, e.g., triggering a broad reconfiguration.

7.5 Exception Aggregators

Certain embodiments of a CSA may also experience an exception (e.g., exceptional condition), for example, floating point underflow. When these conditions occur, a special handlers may be invoked to either correct the program or to terminate it. Certain embodiments herein provide for a system-level architecture for handling exceptions in spatial fabrics. Since certain spatial fabrics emphasize area efficiency, embodiments herein minimize total area while providing a general exception mechanism. Certain embodiments herein provides a low area means of signaling exceptional conditions occurring in within a CSA (e.g., a spatial array). Certain embodiments herein provide an interface and signaling protocol for conveying such exceptions, as well as a PE-level exception semantics. Certain embodiments herein are dedicated exception handling capabilities, e.g., and do not require explicit handling by the programmer.

Figure 40:
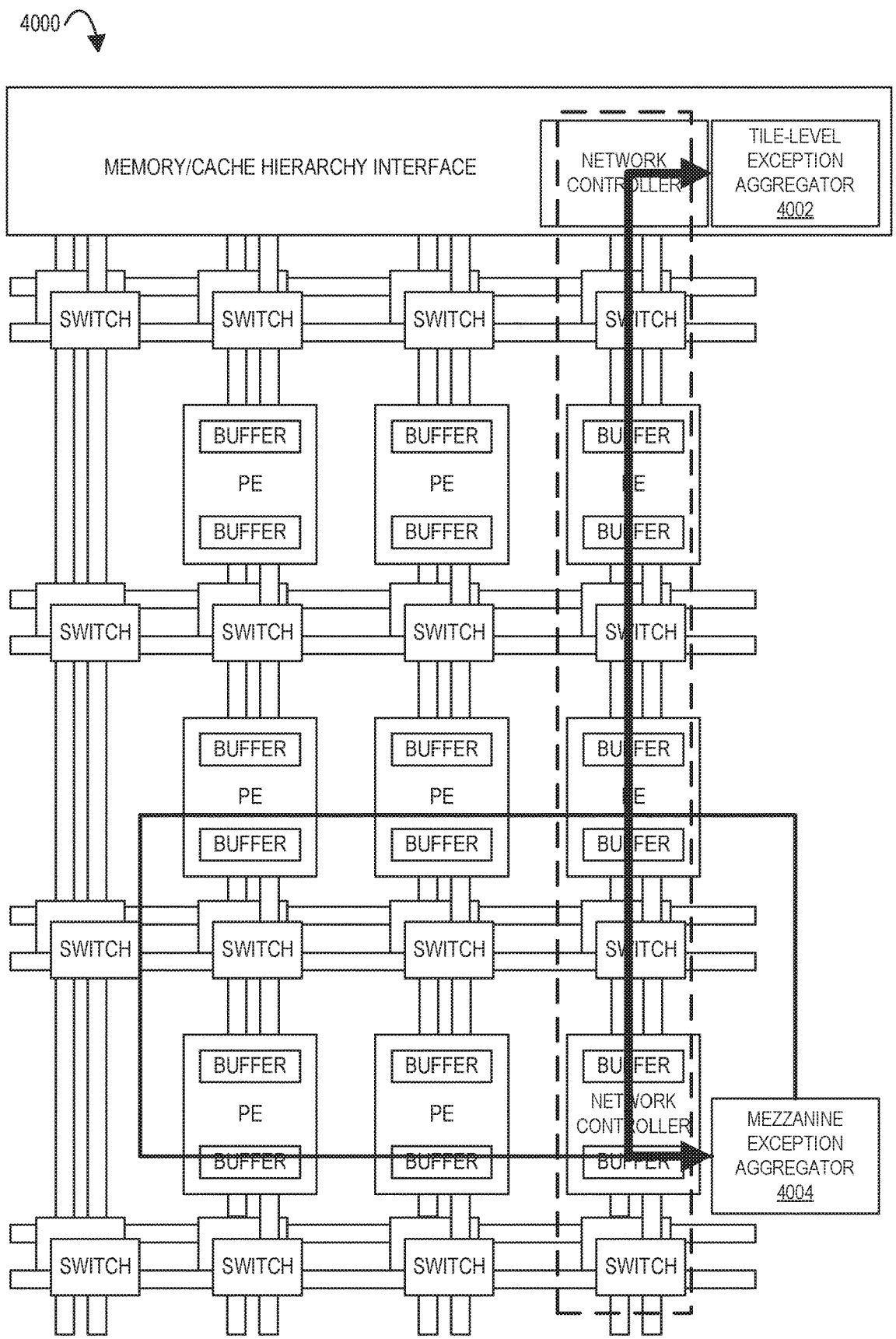
FIG. 40 illustrates an accelerator tile comprising an array of processing elements and a mezzanine exception aggregator coupled to a tile-level exception aggregator according to embodiments of the disclosure.
Figure 41:
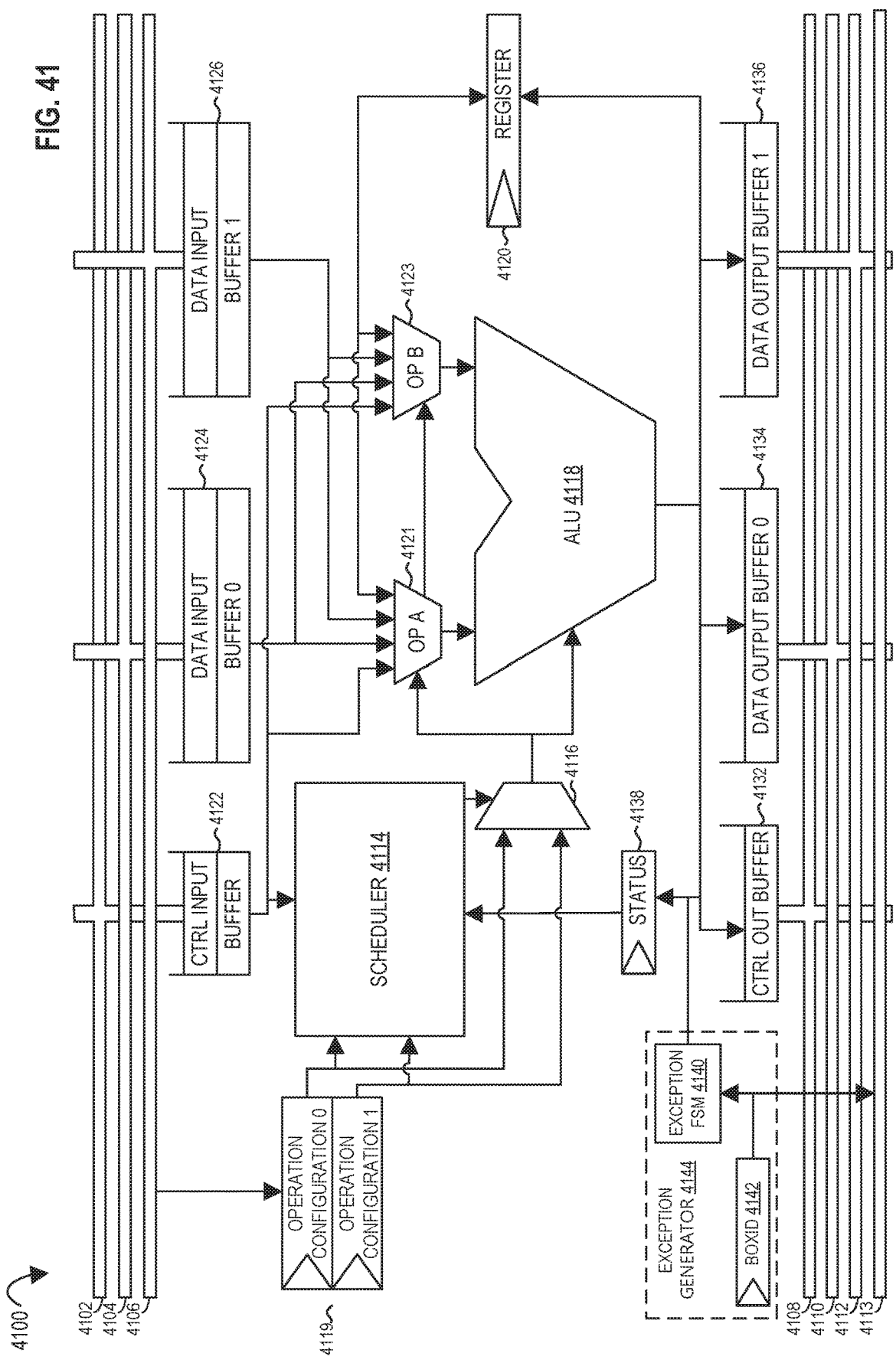
FIG. 41 illustrates a processing element with an exception generator according to embodiments of the disclosure.

One embodiments of a CSA exception architecture consists of four portions, e.g., shown in FIGS. 40-41. These portions may be arranged in a hierarchy, in which exceptions flow from the producer, and eventually up to the tile-level exception aggregator (e.g., handler), which may rendezvous with an exception servicer, e.g., of a core. The four portions may be:

1. PE Exception Generator
2. Local Exception Network
3. Mezzanine Exception Aggregator
4. Tile-Level Exception Aggregator FIG. 40 illustrates an accelerator tile 4000 comprising an array of processing elements and a mezzanine exception aggregator 4002 coupled to a tile-level exception aggregator 4004 according to embodiments of the disclosure. FIG. 41 illustrates a processing element 4100 with an exception generator 4144 according to embodiments of the disclosure.

PE Exception Generator

Processing element 4100 may include processing element 2000 from FIG. 20, for example, with similar numbers being similar components, e.g., local network 2002 and local network 4102. Additional network 4113 (e.g., channel) may be an exception network. A PE may implement an interface to an exception network (e.g., exception network 4113 (e.g., channel) on FIG. 41). For example, FIG. 41 shows the microarchitecture of such an interface, wherein the PE has an exception generator 4144 (e.g., initiate an exception finite state machine (FSM) 4140 to strobe an exception packet (e.g., BOXID 4142) out on to the exception network. BOXID 4142 may be a unique identifier for an exception producing entity (e.g., a PE or box) within a local exception network. When an exception is detected, exception generator 4144 senses the exception network and strobes out the BOXID when the network is found to be free. Exceptions may be caused by many conditions, for example, but not limited to, arithmetic error, failed ECC check on state, etc. however, it may also be that an exception dataflow operation is introduced, with the idea of support constructs like breakpoints.

The initiation of the exception may either occur explicitly, by the execution of a programmer supplied instruction, or implicitly when a hardened error condition (e.g., a floating point underflow) is detected. Upon an exception, the PE 4100 may enter a waiting state, in which it waits to be serviced by the eventual exception handler, e.g., external to the PE 4100. The contents of the exception packet depend on the implementation of the particular PE, as described below.

Local Exception Network

A (e.g., local) exception network steers exception packets from PE 4100 to the mezzanine exception network. Exception network (e.g., 4113) may be a serial, packet switched network consisting of a (e.g., single) control wire and one or more data wires, e.g., organized in a ring or tree topology, e.g., for a subset of PEs. Each PE may have a (e.g., ring) stop in the (e.g., local) exception network, e.g., where it can arbitrate to inject messages into the exception network.

PE endpoints needing to inject an exception packet may observe their local exception network egress point. If the control signal indicates busy, the PE is to wait to commence inject its packet. If the network is not busy, that is, the downstream stop has no packet to forward, then the PE will proceed commence injection.

Network packets may be of variable or fixed length. Each packet may begin with a fixed length header field identifying the source PE of the packet. This may be followed by a variable number of PE-specific field containing information, for example, including error codes, data values, or other useful status information.

Mezzanine Exception Aggregator

The mezzanine exception aggregator 4004 is responsible for assembling local exception network into larger packets and sending them to the tile-level exception aggregator 4002. The mezzanine exception aggregator 4004 may prepend the local exception packet with its own unique ID, e.g., ensuring that exception messages are unambiguous. The mezzanine exception aggregator 4004 may interface to a special exception-only virtual channel in the mezzanine network, e.g., ensuring the deadlock-freedom of exceptions.

The mezzanine exception aggregator 4004 may also be able to directly service certain classes of exception. For example, a configuration request from the fabric may be served out of the mezzanine network using caches local to the mezzanine network stop.

Tile-Level Exception Aggregator

The final stage of the exception system is the tile-level exception aggregator 4002. The tile-level exception aggregator 4002 is responsible for collecting exceptions from the various mezzanine-level exception aggregators (e.g., 4004) and forwarding them to the appropriate servicing hardware (e.g., core). As such, the tile-level exception aggregator 4002 may include some internal tables and controller to associate particular messages with handler routines. These tables may be indexed either directly or with a small state machine in order to steer particular exceptions.

Like the mezzanine exception aggregator, the tile-level exception aggregator may service some exception requests. For example, it may initiate the reprogramming of a large portion of the PE fabric in response to a specific exception.

7.6 Extraction Controllers

Certain embodiments of a CSA include an extraction controller(s) to extract data from the fabric. The below discusses embodiments of how to achieve this extraction quickly and how to minimize the resource overhead of data extraction. Data extraction may be utilized for such critical tasks as exception handling and context switching. Certain embodiments herein extract data from a heterogeneous spatial fabric by introducing features that allow extractable fabric elements (EFEs) (for example, PEs, network controllers, and/or switches) with variable and dynamically variable amounts of state to be extracted.

Embodiments of a CSA include a distributed data extraction protocol and microarchitecture to support this protocol. Certain embodiments of a CSA include multiple local extraction controllers (LECs) which stream program data out of their local region of the spatial fabric using a combination of a (e.g., small) set of control signals and the fabric-provided network. State elements may be used at each extractable fabric element (EFE) to form extraction chains, e.g., allowing individual EFEs to self-extract without global addressing.

Embodiments of a CSA do not use a local network to extract program data. Embodiments of a CSA include specific hardware support (e.g., an extraction controller) for the formation of extraction chains, for example, and do not rely on software to establish these chains dynamically, e.g., at the cost of increasing extraction time. Embodiments of a CSA are not purely packet switched and do include extra out-of-band control wires (e.g., control is not sent through the data path requiring extra cycles to strobe and reserialize this information). Embodiments of a CSA decrease extraction latency by fixing the extraction ordering and by providing explicit out-of-band control (e.g., by at least a factor of two), while not significantly increasing network complexity.

Embodiments of a CSA do not use a serial mechanism for data extraction, in which data is streamed bit by bit from the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

Figure 42:
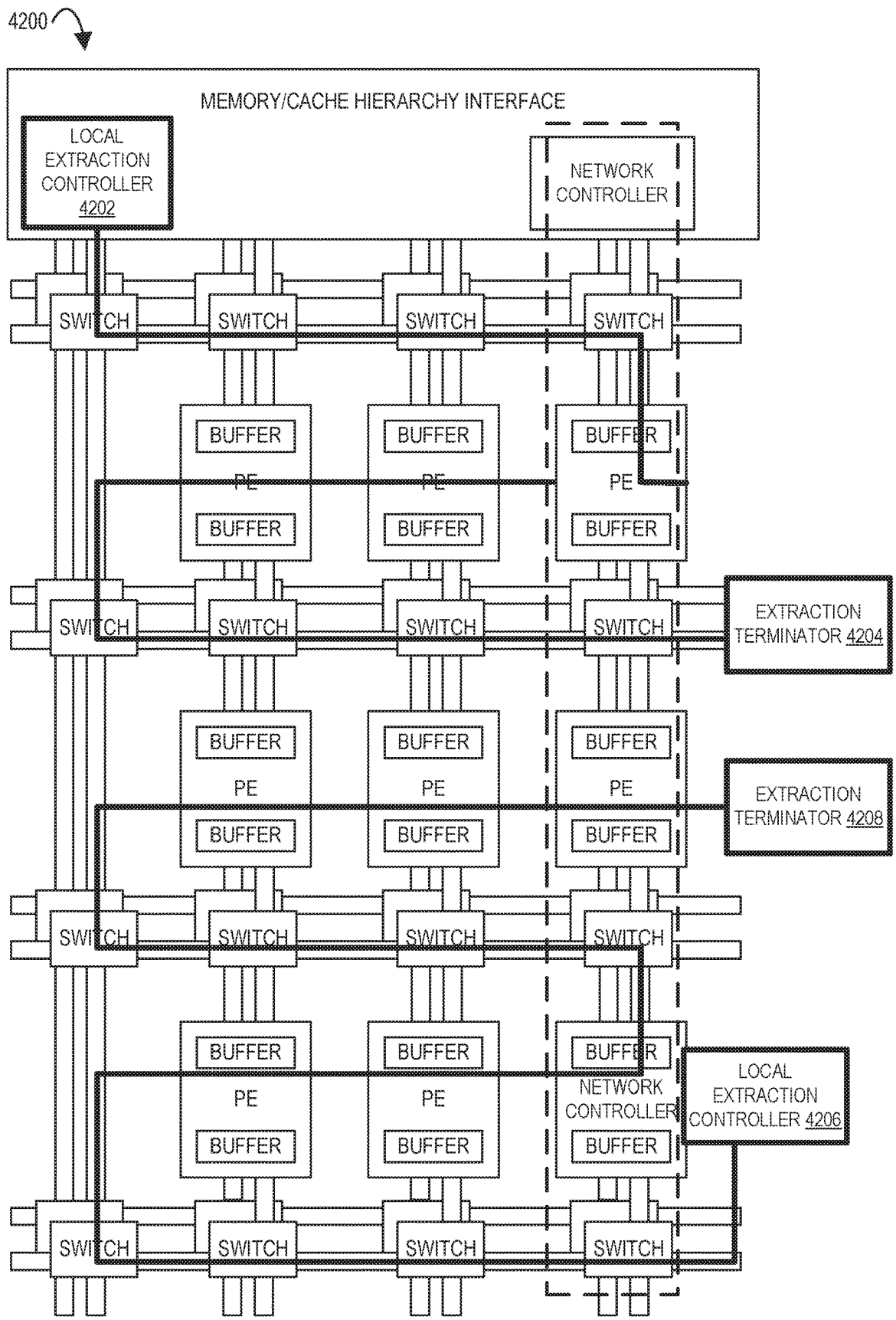
FIG. 42 illustrates an accelerator tile comprising an array of processing elements and a local extraction controller according to embodiments of the disclosure.

FIG. 42 illustrates an accelerator tile 4200 comprising an array of processing elements and a local extraction controller (4202, 4206) according to embodiments of the disclosure. Each PE, each network controller, and each switch may be an extractable fabric elements (EFEs), e.g., which are configured (e.g., programmed) by embodiments of the CSA architecture.

Embodiments of a CSA include hardware that provides for efficient, distributed, low-latency extraction from a heterogeneous spatial fabric. This may be achieved according to four techniques. First, a hardware entity, the local extraction controller (LEC) is utilized, for example, as in FIGS. 42-44. A LEC may accept commands from a host (for example, a processor core), e.g., extracting a stream of data from the spatial array, and writing this data back to virtual memory for inspection by the host. Second, a extraction data path may be included, e.g., that is as wide as the native width of the PE fabric and which may be overlaid on top of the PE fabric. Third, new control signals may be received into the PE fabric which orchestrate the extraction process. Fourth, state elements may be located (e.g., in a register) at each configurable endpoint which track the status of adjacent EFEs, allowing each EFE to unambiguously export its state without extra control signals. These four microarchitectural features may allow a CSA to extract data from chains of EFEs. To obtain low data extraction latency, certain embodiments may partition the extraction problem by including multiple (e.g., many) LECs and EFE chains in the fabric. At extraction time, these chains may operate independently to extract data from the fabric in parallel, e.g., dramatically reducing latency. As a result of these combinations, a CSA may perform a complete state dump (e.g., in hundreds of nanoseconds).

Figure 43A:
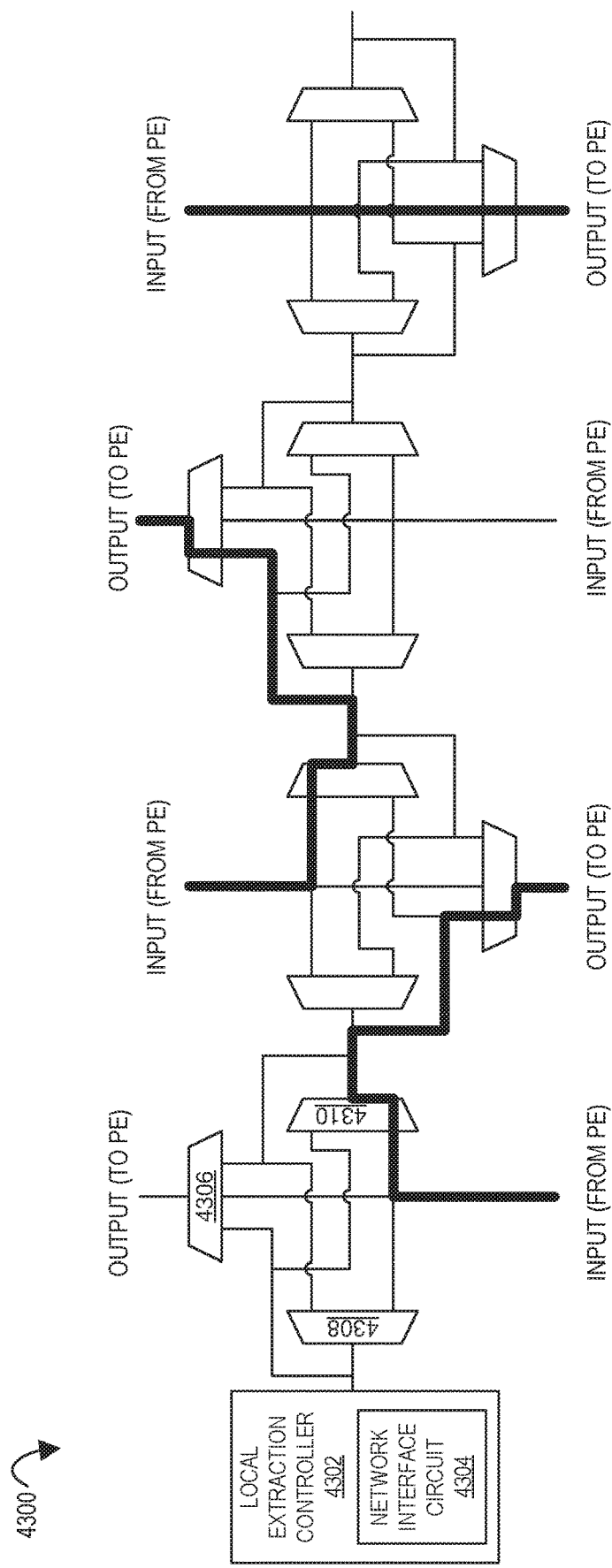
FIGS. 43A-43C illustrate a local extraction controller configuring a data path network according to embodiments of the disclosure.
Figure 43B:
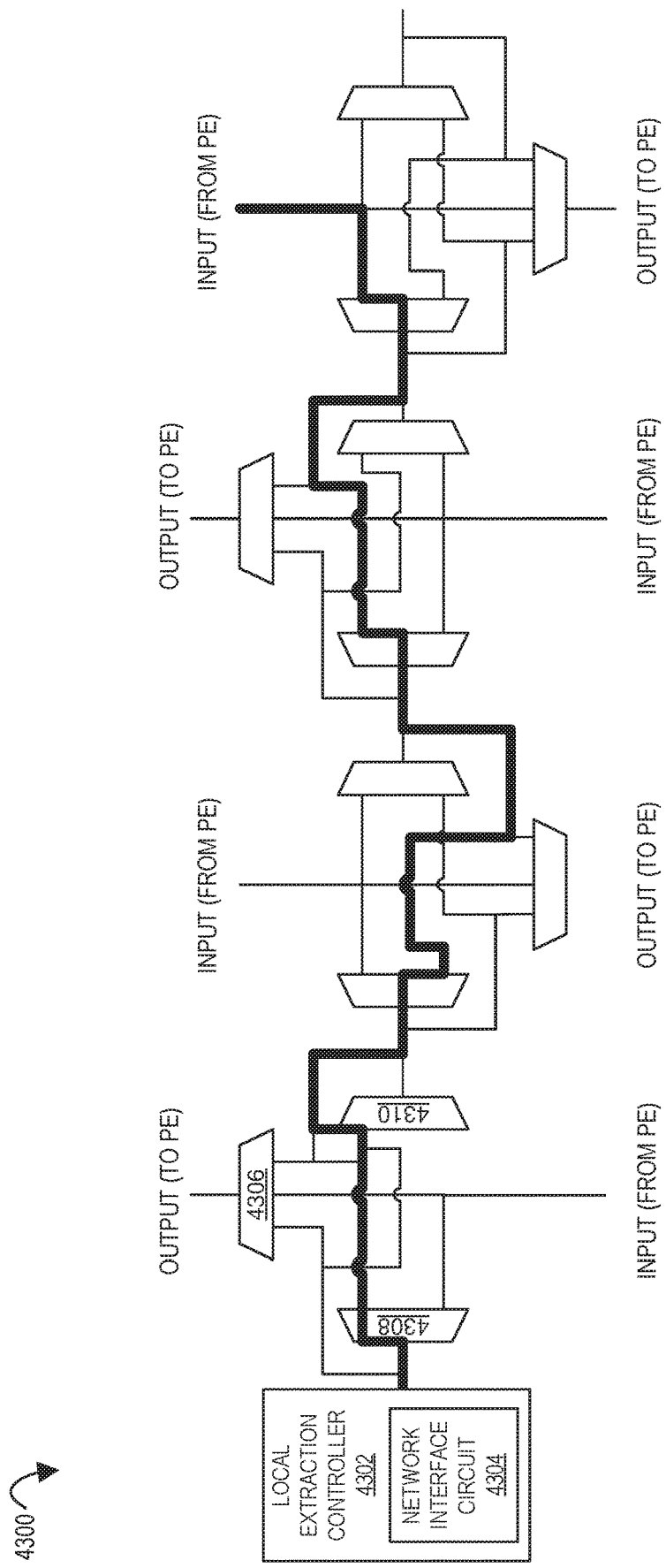
Figure 43C:
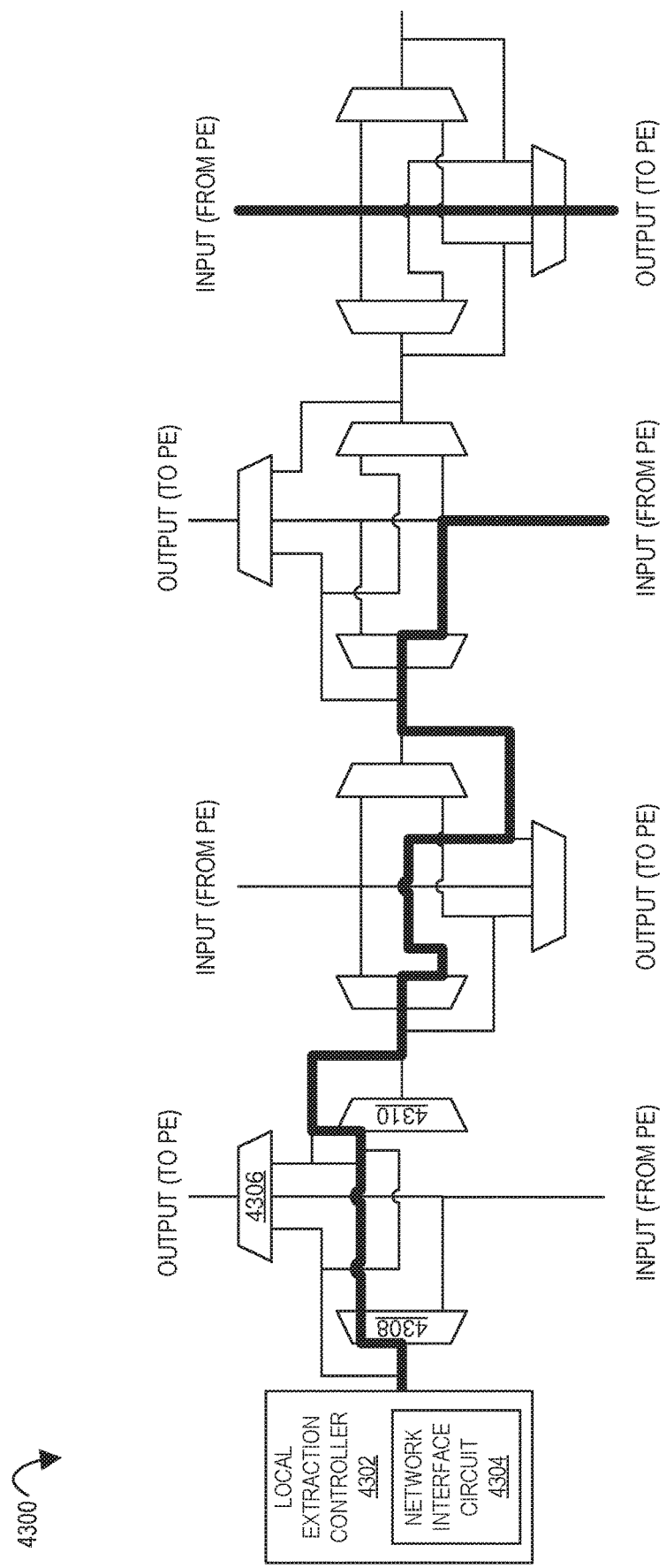

FIGS. 43A-43C illustrate a local extraction controller 4302 configuring a data path network according to embodiments of the disclosure. Depicted network includes a plurality of multiplexers (e.g., multiplexers 4306, 4308, 4310) that may be configured (e.g., via their respective control signals) to connect one or more data paths (e.g., from PEs) together. FIG. 43A illustrates the network 4300 (e.g., fabric) configured (e.g., set) for some previous operation or program. FIG. 43B illustrates the local extraction controller 4302 (e.g., including a network interface circuit 4304 to send and/or receive signals) strobing an extraction signal and all PEs controlled by the LEC enter into extraction mode. The last PE in the extraction chain (or an extraction terminator) may master the extraction channels (e.g., bus) and being sending data according to either (1) signals from the LEC or (2) internally produced signals (e.g., from a PE). Once completed, a PE may set its completion flag, e.g., enabling the next PE to extract its data. FIG. 43C illustrates the most distant PE has completed the extraction process and as a result it has set its extraction state bit or bits, e.g., which swing the muxes into the adjacent network to enable the next PE to begin the extraction process. The extracted PE may resume normal operation. In some embodiments, the PE may remain disabled until other action is taken. In these figures, the multiplexor networks are analogues of the "Switch" shown in certain Figures (e.g., FIG. 17).

The following sections describe the operation of the various components of embodiments of an extraction network.

Local Extraction Controller

Figure 44:
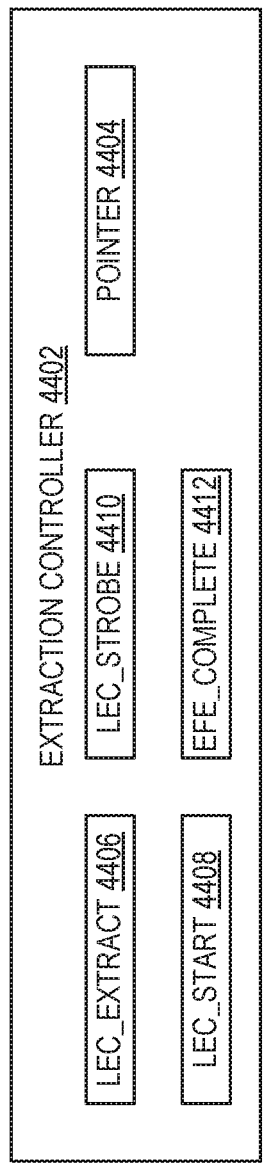
FIG. 44 illustrates an extraction controller according to embodiments of the disclosure.

FIG. 44 illustrates an extraction controller 4402 according to embodiments of the disclosure. A local extraction controller (LEC) may be the hardware entity which is responsible for accepting extraction commands, coordinating the extraction process with the EFEs, and/or storing extracted data, e.g., to virtual memory. In this capacity, the LEC may be a special-purpose, sequential microcontroller.

LEC operation may begin when it receives a pointer to a buffer (e.g., in virtual memory) where fabric state will be written, and, optionally, a command controlling how much of the fabric will be extracted. Depending on the LEC microarchitecture, this pointer (e.g., stored in pointer register 4404) may come either over a network or through a memory system access to the LEC. When it receives such a pointer (e.g., command), the LEC proceeds to extract state from the portion of the fabric for which it is responsible. The LEC may stream this extracted data out of the fabric into the buffer provided by the external caller.

Two different microarchitectures for the LEC are shown in FIG. 42. The first places the LEC 4302 at the memory interface. In this case, the LEC may make direct requests to the memory system to write extracted data. In the second case the LEC 4206 is placed on a memory network, in which it may make requests to the memory only indirectly. In both cases, the logical operation of the LEC may be unchanged. In one embodiment, LECs are informed of the desire to extract data from the fabric, for example, by a set of (e.g., OS-visible) control-status-registers which will be used to inform individual LECs of new commands.

Extra Out-of-Band Control Channels (e.g., Wires)

In certain embodiments, extraction relies on 2-8 extra, out-of-band signals to improve configuration speed, as defined below. Signals driven by the LEC may be labelled LEC. Signals driven by the EFE (e.g., PE) may be labelled EFE. Configuration controller 4402 may include the following control channels, e.g., LEC_EXTRACT control channel 4506, LEC_START control channel 4408, LEC_STROBE control channel 4410, and EFE_COMPLETE control channel 4412, with examples of each discussed in Table 3 below.

TABLE 3

Extraction Channels

| | |
|---|---|
| LEC_EXTRACT | Optional signal asserted by the LEC during extraction process. Lowering this signal causes normal operation to resume. |
| LEC_START | Signal denoting start of extraction, allowing setup of local EFE state |
| LEC_STROBE | Optional strobe signal for controlling extraction related state machines at EFEs. EFEs may generate this signal internally in some implementations. |
| EFE_COMPLETE | Optional signal strobed when EFE has completed dumping state. This helps LEC identify the completion of individual EFE dumps. |

Generally, the handling of extraction may be left to the implementer of a particular EFE. For example, selectable function EFE may have a provision for dumping registers using an existing data path, while a fixed function EFE might simply have a multiplexor.

Due to long wire delays when programming a large set of EFEs, the LEC_STROBE signal may be treated as a clock/latch enable for EFE components. Since this signal is used as a clock, in one embodiment the duty cycle of the line is at most 50%. As a result, extraction throughput is approximately halved. Optionally, a second LEC_STROBE signal may be added to enable continuous extraction.

In one embodiment, only LEC_START is strictly communicated on an independent coupling (e.g., wire), for example, other control channels may be overlayed on existing network (e.g., wires).

Reuse of Network Resources

To reduce the overhead of data extraction, certain embodiments of a CSA make use of existing network infrastructure to communicate extraction data. A LEC may make use of both a chip-level memory hierarchy and a fabric-level communications networks to move data from the fabric into storage. As a result, in certain embodiments of a CSA, the extraction infrastructure adds no more than 2% to the overall fabric area and power.

Reuse of network resources in certain embodiments of a CSA may cause a network to have some hardware support for an extraction protocol. Circuit switched networks require of certain embodiments of a CSA cause a LEC to set their multiplexors in a specific way for configuration when the 'LEC_START' signal is asserted. Packet switched networks do not require extension, although LEC endpoints (e.g., extraction terminators) use a specific address in the packet switched network. Network reuse is optional, and some embodiments may find dedicated configuration buses to be more convenient.

Per EFE State

Each EFE may maintain a bit denoting whether or not it has exported its state. This bit may de-asserted when the extraction start signal is driven, and then asserted once the particular EFE finished extraction. In one extraction protocol, EFEs are arranged to form chains with the EFE extraction state bit determining the topology of the chain. A EFE may read the extraction state bit of the immediately adjacent EFE. If this adjacent EFE has its extraction bit set and the current EFE does not, the EFE may determine that it owns the extraction bus. When an EFE dumps its last data value, it may drives the 'EFE_DONE' signal and sets its extraction bit, e.g., enabling upstream EFEs to configure for extraction. The network adjacent to the EFE may observe this signal and also adjust its state to handle the transition. As a base case to the extraction process, an extraction terminator (e.g., extraction terminator 4204 for LEC 4202 or extraction terminator 4208 for LEC 4206 in FIG. 33) which asserts that extraction is complete may be included at the end of a chain.

Internal to the EFE, this bit may be used to drive flow control ready signals. For example, when the extraction bit is de-asserted, network control signals may automatically be clamped to a values that prevent data from flowing, while, within PEs, no operations or actions will be scheduled.

Dealing with High-Delay Paths

One embodiment of a LEC may drive a signal over a long distance, e.g., through many multiplexors and with many loads. Thus, it may be difficult for a signal to arrive at a distant EFE within a short clock cycle. In certain embodiments, extraction signals are at some division (e.g., fraction of) of the main (e.g., CSA) clock frequency to ensure digital timing discipline at extraction. Clock division may be utilized in an out-of-band signaling protocol, and does not require any modification of the main clock tree.

Ensuring Consistent Fabric Behavior During Extraction

Since certain extraction scheme are distributed and have non-deterministic timing due to program and memory effects, different members of the fabric may be under extraction at different times. While LEC_EXTRACT is driven, all network flow control signals may be driven logically low, e.g., thus freezing the operation of a particular segment of the fabric.

An extraction process may be non-destructive. Therefore a set of PEs may be considered operational once extraction has completed. An extension to an extraction protocol may allow PEs to optionally be disabled post extraction. Alternatively, beginning configuration during the extraction process will have similar effect in embodiments.

Single PE Extraction

In some cases, it may be expedient to extract a single PE. In this case, an optional address signal may be driven as part of the commencement of the extraction process. This may enable the PE targeted for extraction to be directly enabled. Once this PE has been extracted, the extraction process may cease with the lowering of the LEC_EXTRACT signal. In this way, a single PE may be selectively extracted, e.g., by the local extraction controller.

Handling Extraction Backpressure

In an embodiment where the LEC writes extracted data to memory (for example, for post-processing, e.g., in software), it may be subject to limited memory bandwidth. In the case that the LEC exhausts its buffering capacity, or expects that it will exhaust its buffering capacity, it may stops strobing the LEC_STROBE signal until the buffering issue has resolved.

Note that in certain figures (e.g., FIGS. 33, 36, 37, 39, 40, and 42) communications are shown schematically. In certain embodiments, those communications may occur over the (e.g., interconnect) network.

7.7 Flow Diagrams

Figure 45:
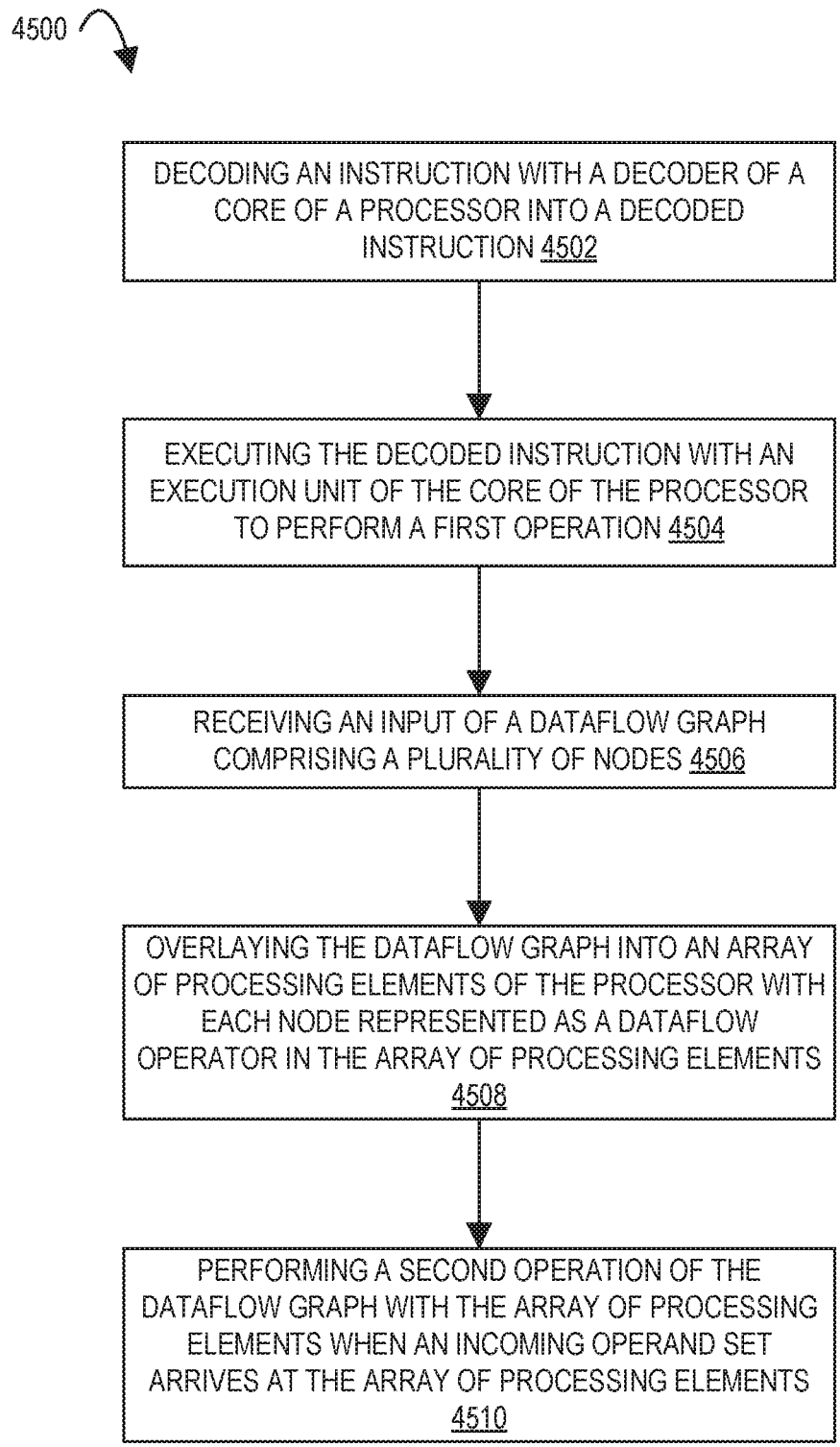
FIG. 45 illustrates a flow diagram according to embodiments of the disclosure.

FIG. 45 illustrates a flow diagram 4500 according to embodiments of the disclosure. Depicted flow 4500 includes decoding an instruction with a decoder of a core of a processor into a decoded instruction 4502; executing the decoded instruction with an execution unit of the core of the processor to perform a first operation 4504; receiving an input of a dataflow graph comprising a plurality of nodes 4506; overlaying the dataflow graph into an array of processing elements of the processor with each node represented as a dataflow operator in the array of processing elements 4508; and performing a second operation of the dataflow graph with the array of processing elements when an incoming operand set arrives at the array of processing elements 4510.

Figure 46:
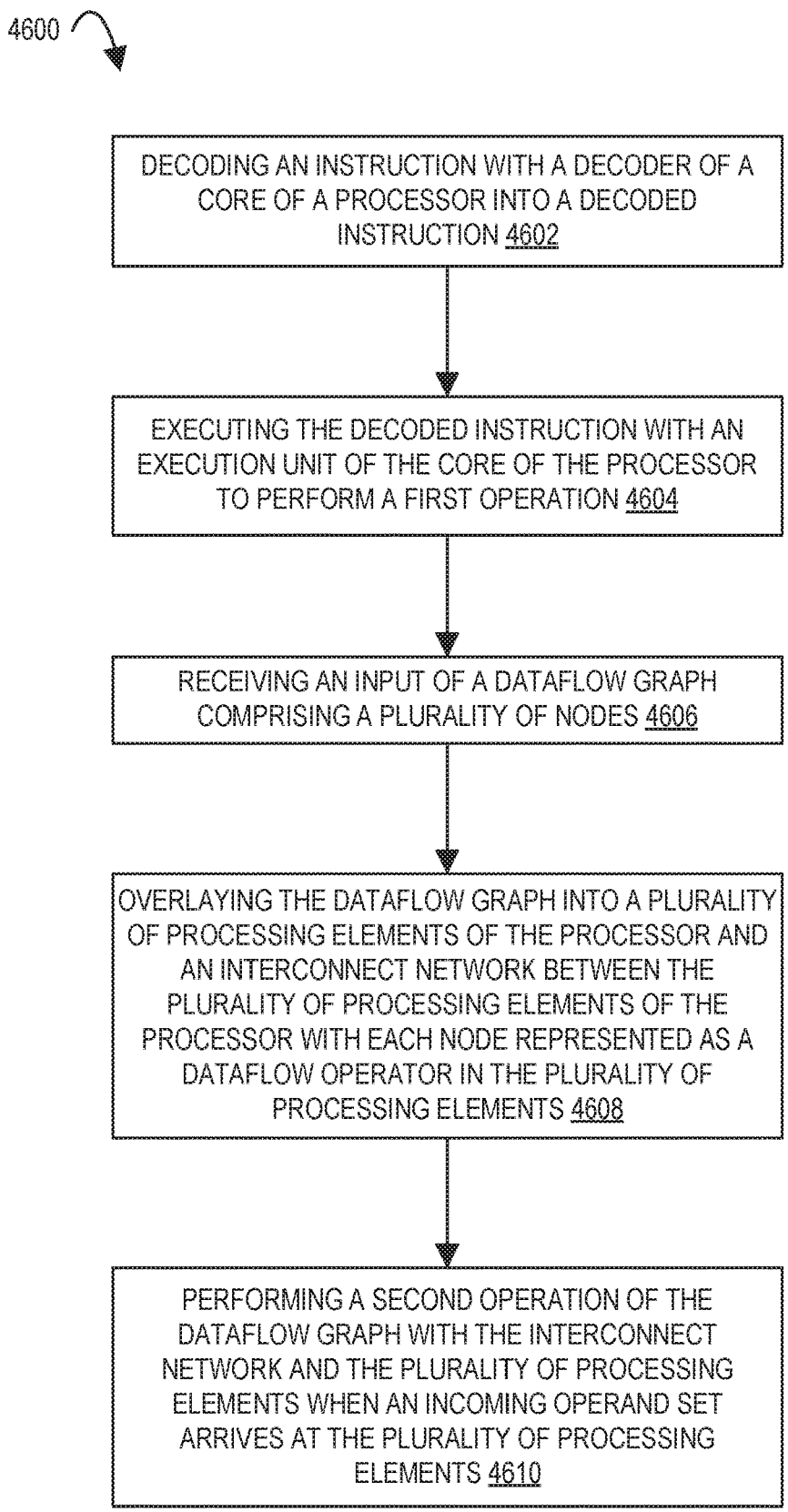
FIG. 46 illustrates a flow diagram according to embodiments of the disclosure.

FIG. 46 illustrates a flow diagram 4600 according to embodiments of the disclosure. Depicted flow 4600 includes decoding an instruction with a decoder of a core of a processor into a decoded instruction 4602; executing the decoded instruction with an execution unit of the core of the processor to perform a first operation 4604; receiving an input of a dataflow graph comprising a plurality of nodes 4606; overlaying the dataflow graph into a plurality of processing elements of the processor and an interconnect network between the plurality of processing elements of the processor with each node represented as a dataflow operator in the plurality of processing elements 4608; and performing a second operation of the dataflow graph with the interconnect network and the plurality of processing elements when an incoming operand set arrives at the plurality of processing elements 4610.

8. Example Memory Ordering in Acceleration Hardware (e.g., in A Spatial Array of Processing Elements)

Figure 47A:
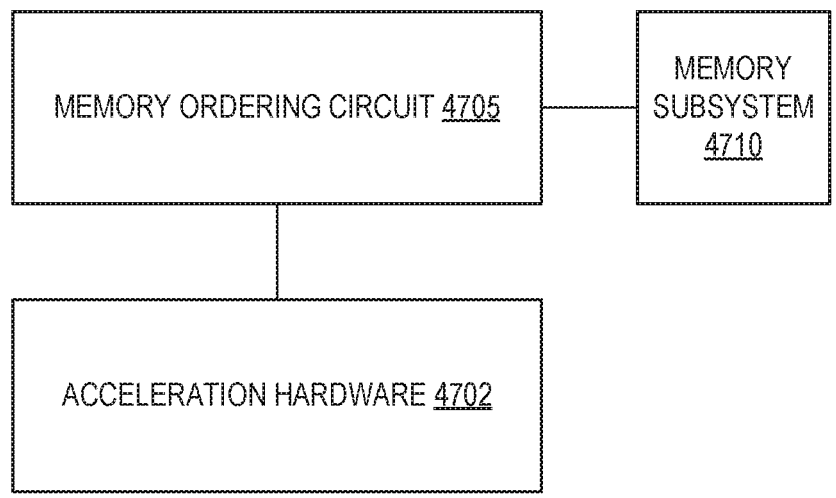
FIG. 47A is a block diagram of a system that employs a memory ordering circuit interposed between a memory subsystem and acceleration hardware according to embodiments of the disclosure.

FIG. 47A is a block diagram of a system 4700 that employs a memory ordering circuit 4705 interposed between a memory subsystem 4710 and acceleration hardware 4702, according to an embodiment of the present disclosure. The memory subsystem 4710 may include known memory components, including cache, memory, and one or more memory controller(s) associated with a processor-based architecture. The acceleration hardware 4702 may be coarse-grained spatial architecture made up of lightweight processing elements (or other types of processing components) connected by an inter-processing element (PE) network or another type of inter-component network.

In one embodiment, programs, viewed as control data flow graphs, are mapped onto the spatial architecture by configuring PEs and a communications network. Generally, PEs are configured as dataflow operators, similar to functional units in a processor: once the input operands arrive at the PE, some operation occurs, and results are forwarded to downstream PEs in a pipelined fashion. Dataflow operators (or other types of operators) may choose to consume incoming data on a per-operator basis. Simple operators, like those handling the unconditional evaluation of arithmetic expressions often consume all incoming data. It is sometimes useful, however, for operators to maintain state, for example, in accumulation.

The PEs communicate using dedicated virtual circuits, which are formed by statically configuring a circuit-switched communications network. These virtual circuits are flow controlled and fully back pressured, such that PEs will stall if either the source has no data or the destination is full. At runtime, data flows through the PEs implementing a mapped algorithm according to a dataflow graph, also referred to as a subprogram herein. For example, data may be streamed in from memory, through the acceleration hardware 4702, and then back out to memory. Such an architecture can achieve remarkable performance efficiency relative to traditional multicore processors: compute, in the form of PEs, is simpler and more numerous than larger cores and communication is direct, as opposed to an extension of the memory subsystem 4710. Memory system parallelism, however, helps to support parallel PE computation. If memory accesses are serialized, high parallelism is likely unachievable. To facilitate parallelism of memory accesses, the disclosed memory ordering circuit 4705 includes memory ordering architecture and microarchitecture, as will be explained in detail. In one embodiment, the memory ordering circuit 4705 is a request address file circuit (or "RAF") or other memory request circuitry.

Figure 47B:
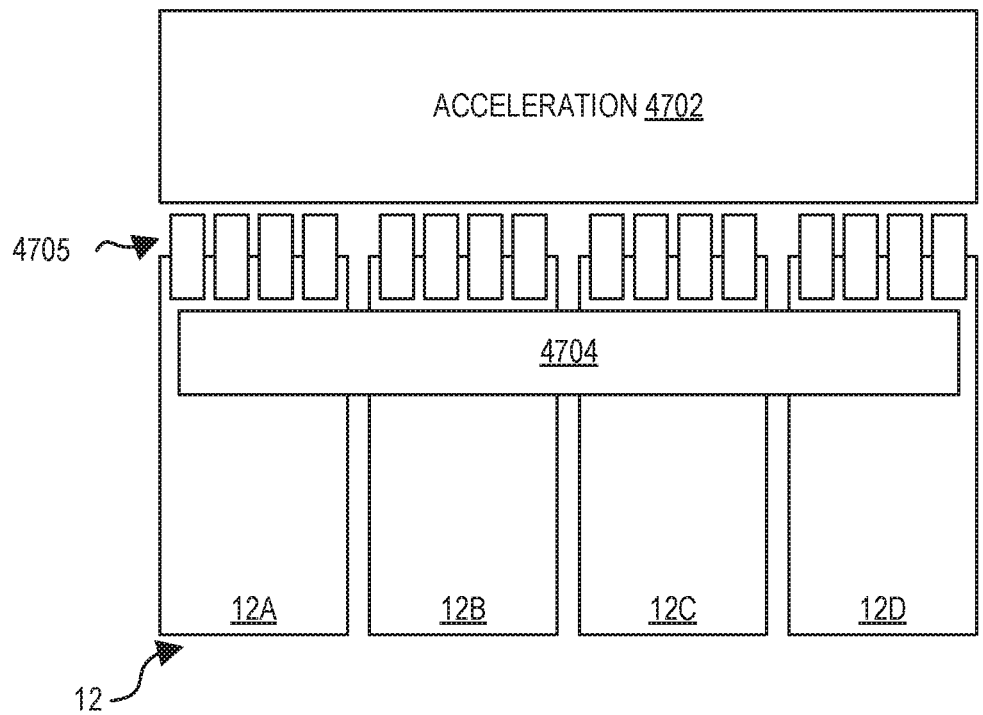
FIG. 47B is a block diagram of the system of FIG. 47A, but which employs multiple memory ordering circuits according to embodiments of the disclosure.

FIG. 47B is a block diagram of the system 4700 of FIG. 47B but which employs multiple memory ordering circuits 4705, according to an embodiment of the present disclosure. Each memory ordering circuit 4705 may function as an interface between the memory subsystem 4710 and a portion of the acceleration hardware 4702 (e.g., spatial array of processing elements or tile). The memory subsystem 4710 may include a plurality of cache slices 12 (e.g., cache slices 12A, 12B, 12C, and 12D in the embodiment of FIG. 47B), and a certain number of memory ordering circuits 4705 (four in this embodiment) may be used for each cache slice 12. A crossbar 4704 (e.g., RAF circuit) may connect the memory ordering circuits 4705 to banks of cache that make up each cache slice 12A, 12B, 12C, and 12D. For example, there may be eight banks of memory in each cache slice in one embodiment. The system 4700 may be instantiated on a single die, for example, as a system on a chip (SoC). In one embodiment, the SoC includes the acceleration hardware 4702. In an alternative embodiment, the acceleration hardware 4702 is an external programmable chip such as an FPGA or CGRA, and the memory ordering circuits 4705 interface with the acceleration hardware 4702 through an input/output hub or the like.

Each memory ordering circuit 4705 may accept read and write requests to the memory subsystem 4710. The requests from the acceleration hardware 4702 arrive at the memory ordering circuit 4705 in a separate channel for each node of the dataflow graph that initiates read or write accesses, also referred to as load or store accesses herein. Buffering is provided so that the processing of loads will return the requested data to the acceleration hardware 4702 in the order it was requested. In other words, iteration six data is returned before iteration seven data, and so forth. Furthermore, note that the request channel from a memory ordering circuit 4705 to a particular cache bank may be implemented as an ordered channel and any first request that leaves before a second request will arrive at the cache bank before the second request.

Figure 48:
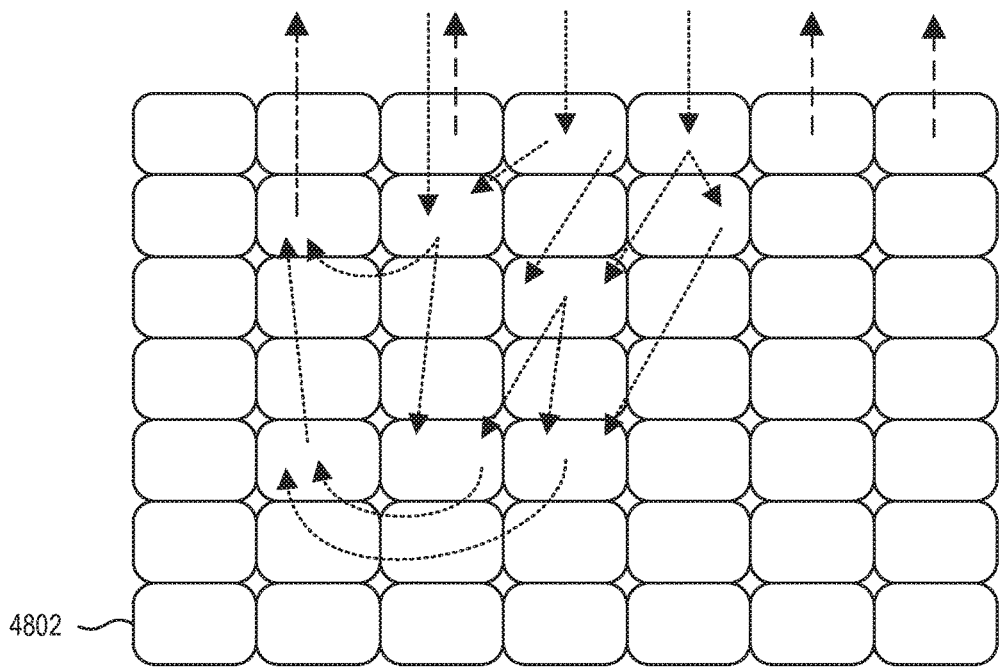
FIG. 48 is a block diagram illustrating general functioning of memory operations into and out of acceleration hardware according to embodiments of the disclosure.

FIG. 48 is a block diagram 4800 illustrating general functioning of memory operations into and out of the acceleration hardware 4702, according to an embodiment of the present disclosure. The operations occurring out the top of the acceleration hardware 4702 are understood to be made to and from a memory of the memory subsystem 4710. Note that two load requests are made, followed by corresponding load responses. While the acceleration hardware 4702 performs processing on data from the load responses, a third load request and response occur, which trigger additional acceleration hardware processing. The results of the acceleration hardware processing for these three load operations are then passed into a store operation, and thus a final result is stored back to memory.

By considering this sequence of operations, it may be evident that spatial arrays more naturally map to channels. Furthermore, the acceleration hardware 4702 is latency-insensitive in terms of the request and response channels, and inherent parallel processing that may occur. The acceleration hardware may also decouple execution of a program from implementation of the memory subsystem 4710 (FIG. 47A), as interfacing with the memory occurs at discrete moments separate from multiple processing steps taken by the acceleration hardware 4702. For example, a load request to and a load response from memory are separate actions, and may be scheduled differently in different circumstances depending on dependency flow of memory operations. The use of spatial fabric, for example, for processing instructions facilitates spatial separation and distribution of such a load request and a load response.

Figure 49:
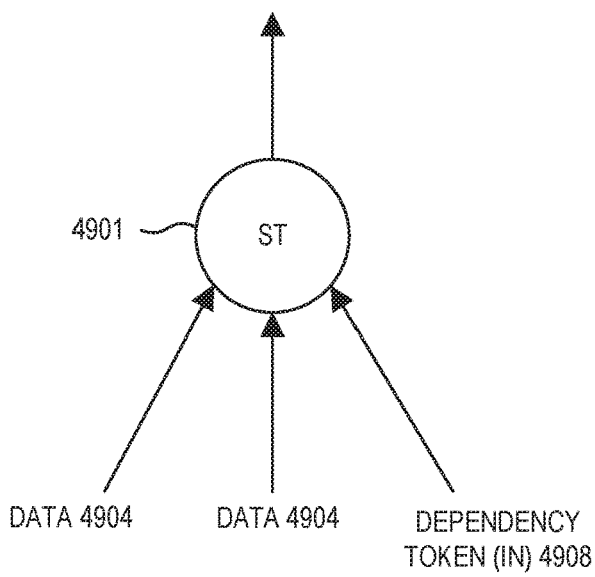
FIG. 49 is a block diagram illustrating a spatial dependency flow for a store operation according to embodiments of the disclosure.

FIG. 49 is a block diagram 4900 illustrating a spatial dependency flow for a store operation 4901, according to an embodiment of the present disclosure. Reference to a store operation is exemplary, as the same flow may apply to a load operation (but without incoming data), or to other operators such as a fence. A fence is an ordering operation for memory subsystems that ensures that all prior memory operations of a type (such as all stores or all loads) have completed. The store operation 4901 may receive an address 4902 (of memory) and data 4904 received from the acceleration hardware 4702. The store operation 4901 may also receive an incoming dependency token 4908, and in response to the availability of these three items, the store operation 4901 may generate an outgoing dependency token 4912. The incoming dependency token, which may, for example, be an initial dependency token of a program, may be provided in a compiler-supplied configuration for the program, or may be provided by execution of memory-mapped input/output (I/O). Alternatively, if the program has already been running, the incoming dependency token 4908 may be received from the acceleration hardware 4702, e.g., in association with a preceding memory operation from which the store operation 4901 depends. The outgoing dependency token 4912 may be generated based on the address 4902 and data 4904 being required by a program-subsequent memory operation.

Figure 50:
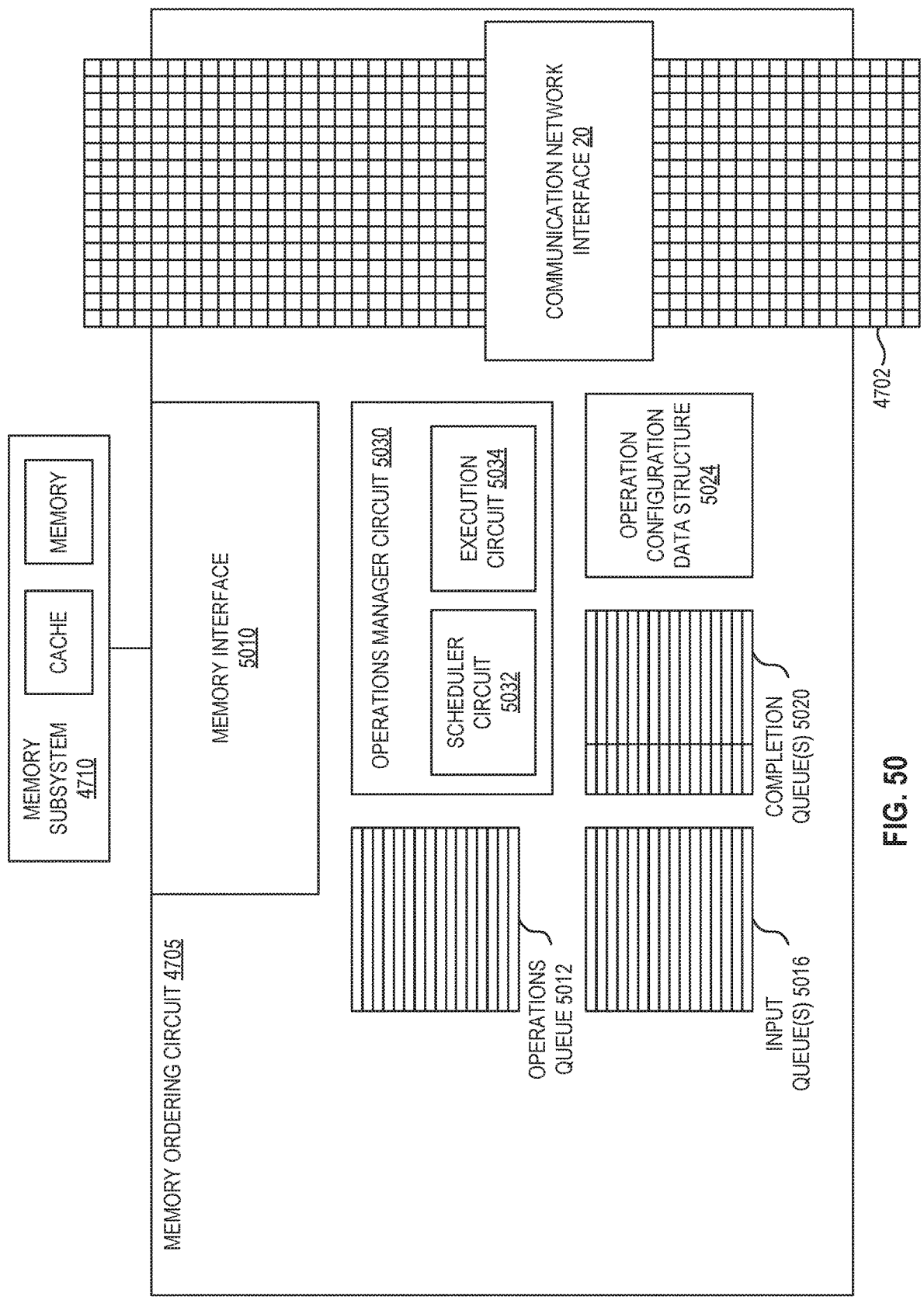
FIG. 50 is a detailed block diagram of the memory ordering circuit of FIG. 47A according to embodiments of the disclosure.

FIG. 50 is a detailed block diagram of the memory ordering circuit 4705 of FIG. 47A, according to an embodiment of the present disclosure. The memory ordering circuit 4705 may be coupled to an out-of-order memory subsystem 4710, which as discussed, may include cache and memory, and associated out-of-order memory controller(s). The memory ordering circuit 4705 may include, or be coupled to, a communications network interface 20 that may be either an inter-tile or an intra-tile network interface, and may be a circuit switched network interface (as illustrated), and thus include circuit-switched interconnects. Alternatively, or additionally, the communications network interface 20 may include packet-switched interconnects.

The memory ordering circuit 4705 may further include, but not be limited to, a memory interface 5010, an operations queue 5012, input queue(s) 5016, a completion queue 5020, an operation configuration data structure 5024, and an operations manager circuit 5030 that may further include a scheduler circuit 5032 and an execution circuit 5034. In one embodiment, the memory interface 5010 may be circuit-switched, and in another embodiment, the memory interface 5010 may be packet-switched, or both may exist simultaneously. The operations queue 5012 may buffer memory operations (with corresponding arguments) that are being processed for request, and may, therefore, correspond to addresses and data coming into the input queues 5016.

More specifically, the input queues 5016 may be an aggregation of at least the following: a load address queue, a store address queue, a store data queue, and a dependency queue. When implementing the input queue 5016 as aggregated, the memory ordering circuit 4705 may provide for sharing of logical queues, with additional control logic to logically separate the queues, which are individual channels with the memory ordering circuit. This may maximize input queue usage, but may also require additional complexity and space for the logic circuitry to manage the logical separation of the aggregated queue. Alternatively, as will be discussed with reference to FIG. 51, the input queues 5016 may be implemented in a segregated fashion, with a separate hardware queue for each. Whether aggregated (FIG. 50) or disaggregated (FIG. 51), implementation for purposes of this disclosure is substantially the same, with the former using additional logic to logically separate the queues within a single, shared hardware queue.

When shared, the input queues 5016 and the completion queue 5020 may be implemented as ring buffers of a fixed size. A ring buffer is an efficient implementation of a circular queue that has a first-in-first-out (FIFO) data characteristic. These queues may, therefore, enforce a semantical order of a program for which the memory operations are being requested. In one embodiment, a ring buffer (such as for the store address queue) may have entries corresponding to entries flowing through an associated queue (such as the store data queue or the dependency queue) at the same rate. In this way, a store address may remain associated with corresponding store data.

More specifically, the load address queue may buffer an incoming address of the memory 18 from which to retrieve data. The store address queue may buffer an incoming address of the memory 18 to which to write data, which is buffered in the store data queue. The dependency queue may buffer dependency tokens in association with the addresses of the load address queue and the store address queue. Each queue, representing a separate channel, may be implemented with a fixed or dynamic number of entries. When fixed, the more entries that are available, the more efficient complicated loop processing may be made. But, having too many entries costs more area and energy to implement. In some cases, e.g., with the aggregated architecture, the disclosed input queue 5016 may share queue slots. Use of the slots in a queue may be statically allocated.

The completion queue 5020 may be a separate set of queues to buffer data received from memory in response to memory commands issued by load operations. The completion queue 5020 may be used to hold a load operation that has been scheduled but for which data has not yet been received (and thus has not yet completed). The completion queue 5020, may therefore, be used to reorder data and operation flow.

The operations manager circuit 5030, which will be explained in more detail with reference to FIGS. 51 through 58, may provide logic for scheduling and executing queued memory operations when taking into account dependency tokens used to provide correct ordering of the memory operations. The operation manager 5030 may access the operation configuration data structure 5024 to determine which queues are grouped together to form a given memory operation. For example, the operation configuration data structure 5024 may include that a specific dependency counter (or queue), input queue, output queue, and completion queue are all grouped together for a particular memory operation. As each successive memory operation may be assigned a different group of queues, access to varying queues may be interleaved across a sub-program of memory operations. Knowing all of these queues, the operations manager circuit 5030 may interface with the operations queue 5012, the input queue(s) 5016, the completion queue(s) 5020, and the memory subsystem 4710 to initially issue memory operations to the memory subsystem 4710 when successive memory operations become "executable," and to next complete the memory operation with some acknowledgement from the memory subsystem. This acknowledgement may be, for example, data in response to a load operation command or an acknowledgement of data being stored in the memory in response to a store operation command.

Figure 51:
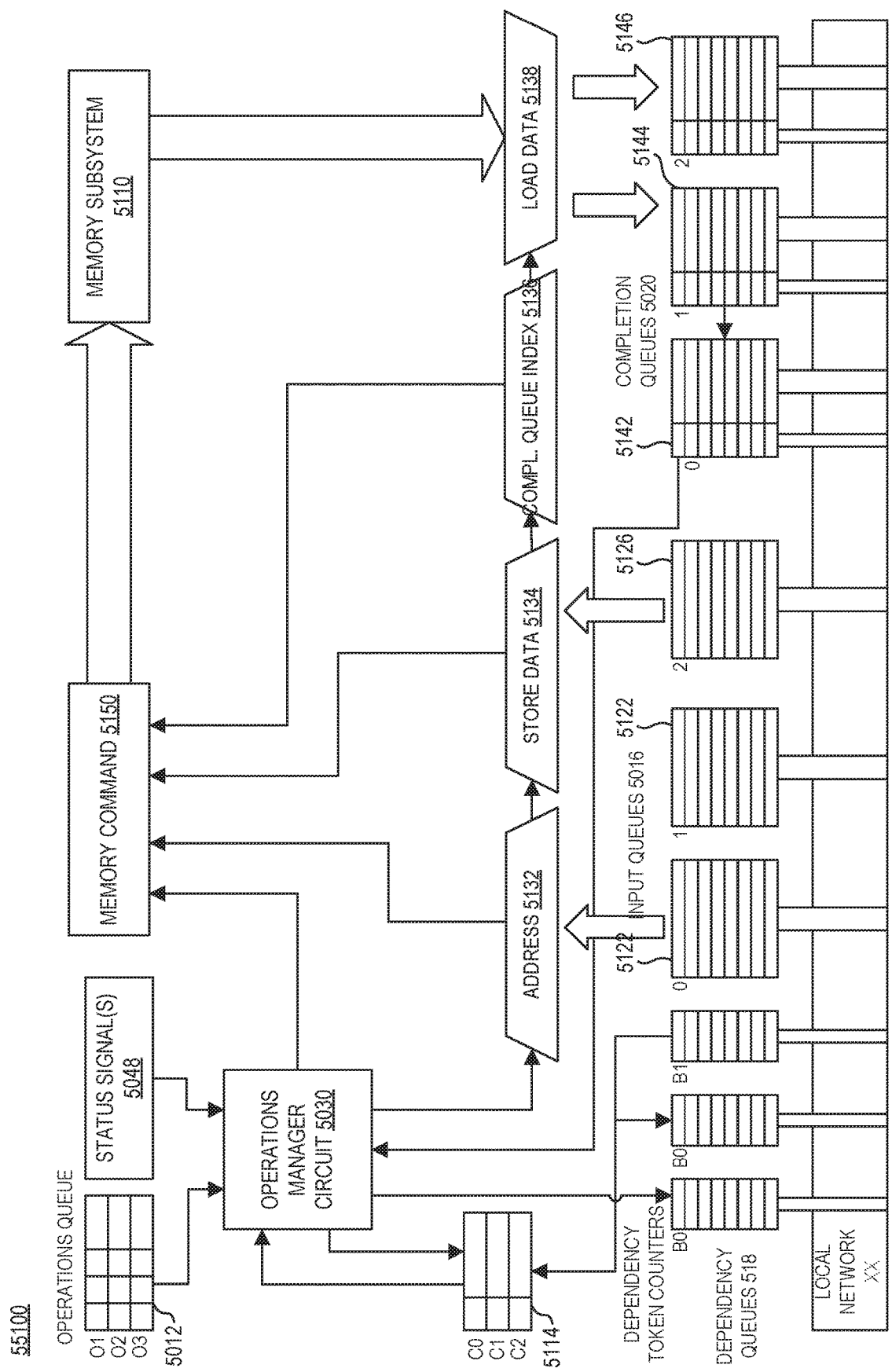
FIG. 51 is a flow diagram of a microarchitecture of the memory ordering circuit of FIG. 47 according to embodiments of the disclosure.

FIG. 51 is a flow diagram of a microarchitecture 5100 of the memory ordering circuit 4705 of FIG. 47A, according to an embodiment of the present disclosure. The memory subsystem 4710 may allow illegal execution of a program in which ordering of memory operations is wrong, due to the semantics of C language (and other object-oriented program languages). The microarchitecture 5100 may enforce the ordering of the memory operations (sequences of loads from and stores to memory) so that results of instructions that the acceleration hardware 4702 executes are properly ordered. A number of local networks 51 are illustrated to represent a portion of the acceleration hardware 4702 coupled to the microarchitecture 5100.

From an architectural perspective, there are at least two goals: first, to run general sequential codes correctly, and second, to obtain high performance in the memory operations performed by the microarchitecture 5100. To ensure program correctness, the compiler expresses the dependency between the store operation and the load operation to an array, p, in some fashion, which are expressed via dependency tokens as will be explained. To improve performance, the microarchitecture 5100 finds and issues as many load commands of an array in parallel as is legal with respect to program order.

In one embodiment, the microarchitecture 5100 may include the operations queue 5012, the input queues 5016, the completion queues 5020, and the operations manager circuit 5030 discussed with reference to FIG. 50, above, where individual queues may be referred to as channels. The microarchitecture 5100 may further include a plurality of dependency token counters 5114 (e.g., one per input queue), a set of dependency queues 5118 (e.g., one each per input queue), an address multiplexer 5132, a store data multiplexer 5134, a completion queue index multiplexer 5136, and a load data multiplexer 5138. The operations manager circuit 5030, in one embodiment, may direct these various multiplexers in generating a memory command 5150 (to be sent to the memory subsystem 4710) and in receipt of responses of load commands back from the memory subsystem 4710, as will be explained.

The input queues 5016, as mentioned, may include a load address queue 5122, a store address queue 5124, and a store data queue 5126. (The small numbers 0, 1, 2 are channel labels and will be referred to later in 54 and FIG. 57A.) In various embodiments, these input queues may be multiplied to contain additional channels, to handle additional parallelization of memory operation processing. Each dependency queue 5118 may be associated with one of the input queues 5016. More specifically, the dependency queue 5118 labeled B0 may be associated with the load address queue 5122 and the dependency queue labeled B1 may be associated with the store address queue 5124. If additional channels of the input queues 5016 are provided, the dependency queues 5118 may include additional, corresponding channels.

In one embodiment, the completion queues 5020 may include a set of output buffers 5144 and 5146 for receipt of load data from the memory subsystem 4710 and a completion queue 5142 to buffer addresses and data for load operations according to an index maintained by the operations manager circuit 5030. The operations manager circuit 5030 can manage the index to ensure in-order execution of the load operations, and to identify data received into the output buffers 5144 and 5146 that may be moved to scheduled load operations in the completion queue 5142.

More specifically, because the memory subsystem 4710 is out of order, but the acceleration hardware 4702 completes operations in order, the microarchitecture 5100 may re-order memory operations with use of the completion queue 5142. Three different sub-operations may be performed in relation to the completion queue 5142, namely to allocate, enqueue, and dequeue. For allocation, the operations manager circuit 5030 may allocate an index into the completion queue 5142 in an in-order next slot of the completion queue. The operations manager circuit may provide this index to the memory subsystem 4710, which may then know the slot to which to write data for a load operation. To enqueue, the memory subsystem 4710 may write data as an entry to the indexed, in-order next slot in the completion queue 5142 like random access memory (RAM), setting a status bit of the entry to valid. To dequeue, the operations manager circuit 5030 may present the data stored in this in-order next slot to complete the load operation, setting the status bit of the entry to invalid. Invalid entries may then be available for a new allocation.

In one embodiment, the status signals 5048 may refer to statuses of the input queues 5016, the completion queues 5020, the dependency queues 5118, and the dependency token counters 5114. These statuses, for example, may include an input status, an output status, and a control status, which may refer to the presence or absence of a dependency token in association with an input or an output. The input status may include the presence or absence of addresses and the output status may include the presence or absence of store values and available completion buffer slots. The dependency token counters 5114 may be a compact representation of a queue and track a number of dependency tokens used for any given input queue. If the dependency token counters 5114 saturate, no additional dependency tokens may be generated for new memory operations. Accordingly, the memory ordering circuit 4705 may stall scheduling new memory operations until the dependency token counters 5114 becomes unsaturated.

Figure 52:
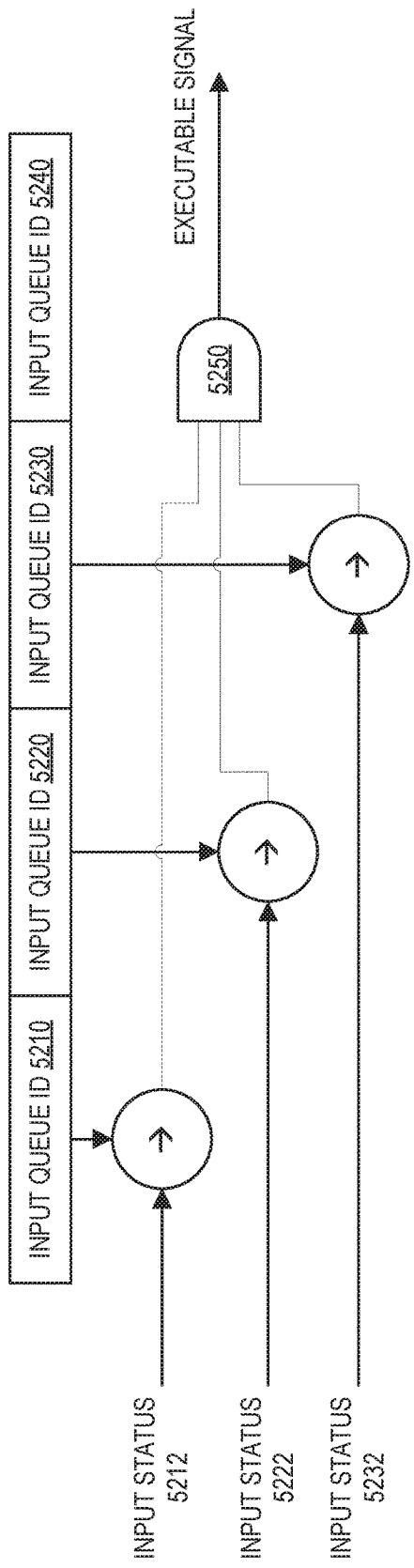
FIG. 52 is a block diagram of an executable determiner circuit according to embodiments of the disclosure.

With additional reference to FIG. 52, FIG. 52 is a block diagram of an executable determiner circuit 5200, according to an embodiment of the present disclosure. The memory ordering circuit 4705 may be set up with several different kinds of memory operations, for example a load and a store:

ldNo[d,x] result.outN, addr.in64, order.in0, order.out0
stNo[d,x] addr.in64, data.inN, order.in0, order.out0

The executable determiner circuit 5200 may be integrated as a part of the scheduler circuit 5032 and which may perform a logical operation to determine whether a given memory operation is executable, and thus ready to be issued to memory. A memory operation may be executed when the queues corresponding to its memory arguments have data and an associated dependency token is present. These memory arguments may include, for example, an input queue identifier 5210 (indicative of a channel of the input queue 5016), an output queue identifier 5220 (indicative of a channel of the completion queues 5020), a dependency queue identifier 5230 (e.g., what dependency queue or counter should be referenced), and an operation type indicator 5240 (e.g., load operation or store operation). A field (e.g., of a memory request) may be included, e.g., in the above format, that stores a bit or bits to indicate to use the hazard checking hardware.

These memory arguments may be queued within the operations queue 5012, and used to schedule issuance of memory operations in association with incoming addresses and data from memory and the acceleration hardware 4702. (See FIG. 53.) Incoming status signals 5048 may be logically combined with these identifiers and then the results may be added (e.g., through an AND gate 5250) to output an executable signal, e.g., which is asserted when the memory operation is executable. The incoming status signals 5048 may include an input status 5212 for the input queue identifier 5210, an output status 5222 for the output queue identifier 5220, and a control status 5232 (related to dependency tokens) for the dependency queue identifier 5230.

For a load operation, and by way of example, the memory ordering circuit 4705 may issue a load command when the load operation has an address (input status) and room to buffer the load result in the completion queue 5142 (output status). Similarly, the memory ordering circuit 4705 may issue a store command for a store operation when the store operation has both an address and data value (input status). Accordingly, the status signals 5048 may communicate a level of emptiness (or fullness) of the queues to which the status signals pertain. The operation type may then dictate whether the logic results in an executable signal depending on what address and data should be available.

To implement dependency ordering, the scheduler circuit 5032 may extend memory operations to include dependency tokens as underlined above in the example load and store operations. The control status 5232 may indicate whether a dependency token is available within the dependency queue identified by the dependency queue identifier 5230, which could be one of the dependency queues 5118 (for an incoming memory operation) or a dependency token counter 5114 (for a completed memory operation). Under this formulation, a dependent memory operation requires an additional ordering token to execute and generates an additional ordering token upon completion of the memory operation, where completion means that data from the result of the memory operation has become available to program-subsequent memory operations.

In one embodiment, with further reference to FIG. 51, the operations manager circuit 5030 may direct the address multiplexer 5132 to select an address argument that is buffered within either the load address queue 5122 or the store address queue 5124, depending on whether a load operation or a store operation is currently being scheduled for execution. If it is a store operation, the operations manager circuit 5030 may also direct the store data multiplexer 5134 to select corresponding data from the store data queue 5126. The operations manager circuit 5030 may also direct the completion queue index multiplexer 5136 to retrieve a load operation entry, indexed according to queue status and/or program order, within the completion queues 5020, to complete a load operation. The operations manager circuit 5030 may also direct the load data multiplexer 5138 to select data received from the memory subsystem 4710 into the completion queues 5020 for a load operation that is awaiting completion. In this way, the operations manager circuit 5030 may direct selection of inputs that go into forming the memory command 5150, e.g., a load command or a store command, or that the execution circuit 5034 is waiting for to complete a memory operation.

Figure 53:
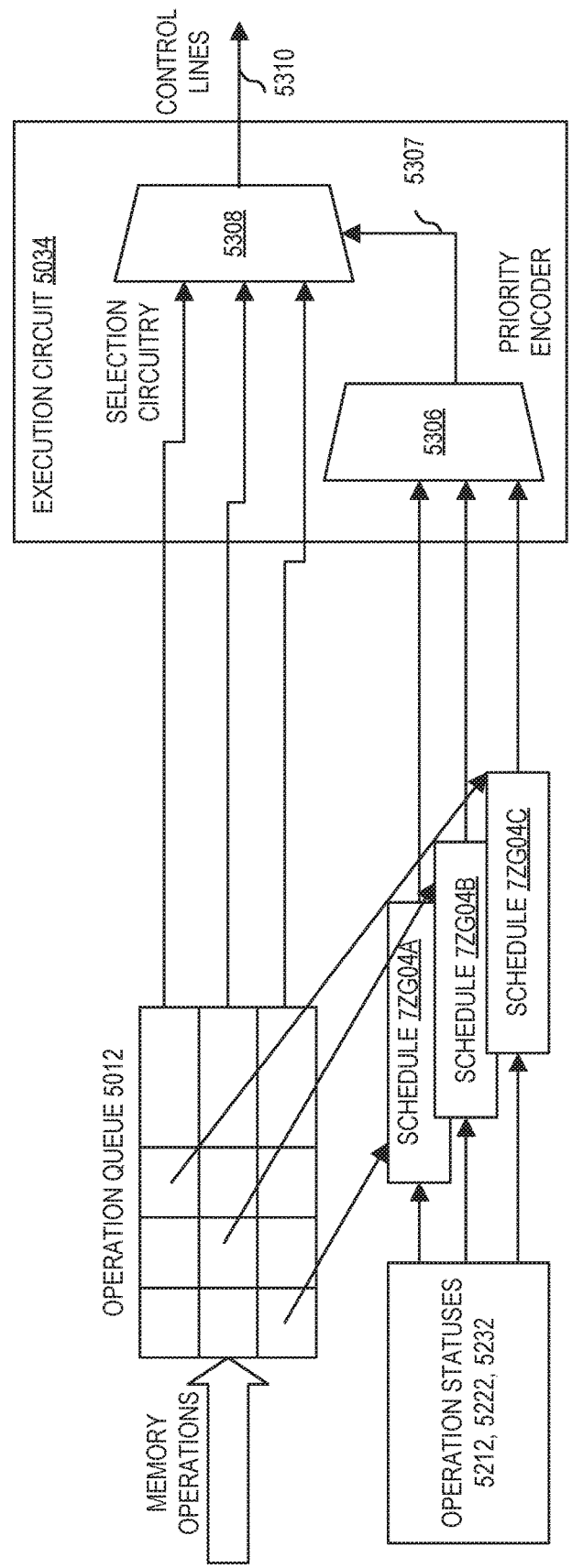
FIG. 53 is a block diagram of a priority encoder according to embodiments of the disclosure.

FIG. 53 is a block diagram the execution circuit 5034 that may include a priority encoder 5306 and selection circuitry 5308 and which generates output control line(s) 5310, according to one embodiment of the present disclosure. In one embodiment, the execution circuit 5034 may access queued memory operations (in the operations queue 5012) that have been determined to be executable (FIG. 52). The execution circuit 5034 may also receive the schedules 5304A, 5304B, 5304C for multiple of the queued memory operations that have been queued and also indicated as ready to issue to memory. The priority encoder 5306 may thus receive an identity of the executable memory operations that have been scheduled and execute certain rules (or follow particular logic) to select the memory operation from those coming in that has priority to be executed first. The priority encoder 5306 may output a selector signal 5307 that identifies the scheduled memory operation that has a highest priority, and has thus been selected.

The priority encoder 5306, for example, may be a circuit (such as a state machine or a simpler converter) that compresses multiple binary inputs into a smaller number of outputs, including possibly just one output. The output of a priority encoder is the binary representation of the original number starting from zero of the most significant input bit. So, in one example, when memory operation 0 ("zero"), memory operation one ("1"), and memory operation two ("2") are executable and scheduled, corresponding to 5304A, 5304B, and 5304C, respectively. The priority encoder 5306 may be configured to output the selector signal 5307 to the selection circuitry 5308 indicating the memory operation zero as the memory operation that has highest priority. The selection circuitry 5308 may be a multiplexer in one embodiment, and be configured to output its selection (e.g., of memory operation zero) onto the control lines 5310, as a control signal, in response to the selector signal from the priority encoder 5306 (and indicative of selection of memory operation of highest priority). This control signal may go to the multiplexers 5132, 5134, 5136, and/or 5138, as discussed with reference to FIG. 51, to populate the memory command 5150 that is next to issue (be sent) to the memory subsystem 4710. The transmittal of the memory command may be understood to be issuance of a memory operation to the memory subsystem 4710.

FIG. 54 is a block diagram of an exemplary load operation 5400, both logical and in binary form, according to an embodiment of the present disclosure. Referring back to FIG. 52, the logical representation of the load operation 5400 may include channel zero ("0") (corresponding to the load address queue 5122) as the input queue identifier 5210 and completion channel one ("1") (corresponding to the output buffer 5144) as the output queue identifier 5220. The dependency queue identifier 5230 may include two identifiers, channel B0 (corresponding to the first of the dependency queues 5118) for incoming dependency tokens and counter C0 for outgoing dependency tokens. The operation type 5240 has an indication of "Load," which could be a numerical indicator as well, to indicate the memory operation is a load operation. Below the logical representation of the logical memory operation is a binary representation for exemplary purposes, e.g., where a load is indicated by "00." The load operation of FIG. 54 may be extended to include other configurations such as a store operation (FIG. 56A) or other type of memory operations, such as a fence.

An example of memory ordering by the memory ordering circuit 4705 will be illustrated with a simplified example for purposes of explanation with relation to FIGS. 55A-55B, 56A-56B and 57A-57G. For this example, the following code includes an array, p, which is accessed by indices i and i+2:

```
for(i) {
    temp=p[i];
    p[i+2]=temp;
}
```

Figure 55A:
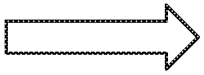
FIG. 55A is flow diagram illustrating logical execution of an example code according to embodiments of the disclosure.
Figure 55B:
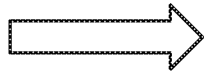
FIG. 55B is the flow diagram of FIG. 55A, illustrating memory-level parallelism in an unfolded version of the example code according to embodiments of the disclosure.

Assume, for this example, that array p contains 0,1,2,3,4,5,6, and at the end of loop execution, array p will contain 0,1,0,1,0,1,0. This code may be transformed by unrolling the loop, as illustrated in FIGS. 55A and 55B. True address dependencies are annotated by arrows in FIG. 55A, which in each case, a load operation is dependent on a store operation to the same address. For example, for the first of such dependencies, a store (e.g., a write) to p[2] needs to occur before a load (e.g., a read) from p[2], and second of such dependencies, a store to p[3] needs to occur before a load from p[3], and so forth. As a compiler is to be pessimistic, the compiler annotates dependencies between two memory operations, load p[i] and store p[i+2]. Note that only sometimes do reads and writes conflict. The micro-architecture 5100 is designed to extract memory-level parallelism where memory operations may move forward at the same time when there are no conflicts to the same address. This is especially the case for load operations, which expose latency in code execution due to waiting for preceding dependent store operations to complete. In the example code in FIG. 55B, safe reorderings are noted by the arrows on the left of the unfolded code.

The way the microarchitecture may perform this reordering is discussed with reference to FIGS. 56A-56B and 57A-57G. Note that this approach is not as optimal as possible because the microarchitecture 5100 may not send a memory command to memory every cycle. However, with minimal hardware, the microarchitecture supports dependency flows by executing memory operations when operands (e.g., address and data, for a store, or address for a load) and dependency tokens are available.

FIG. 56A is a block diagram of exemplary memory arguments for a load operation 5602 and for a store operation 5604, according to an embodiment of the present disclosure. These, or similar, memory arguments were discussed with relation to FIG. 54 and will not be repeated here. Note, however, that the store operation 5604 has no indicator for the output queue identifier because no data is being output to the acceleration hardware 4702. Instead, the store address in channel 1 and the data in channel 2 of the input queues 5016, as identified in the input queue identifier memory argument, are to be scheduled for transmission to the memory subsystem 4710 in a memory command to complete the store operation 5604. Furthermore, the input channels and output channels of the dependency queues are both implemented with counters. Because the load operations and the store operations as displayed in FIGS. 55A and 55B are interdependent, the counters may be cycled between the load operations and the store operations within the flow of the code.

Figure 56B:
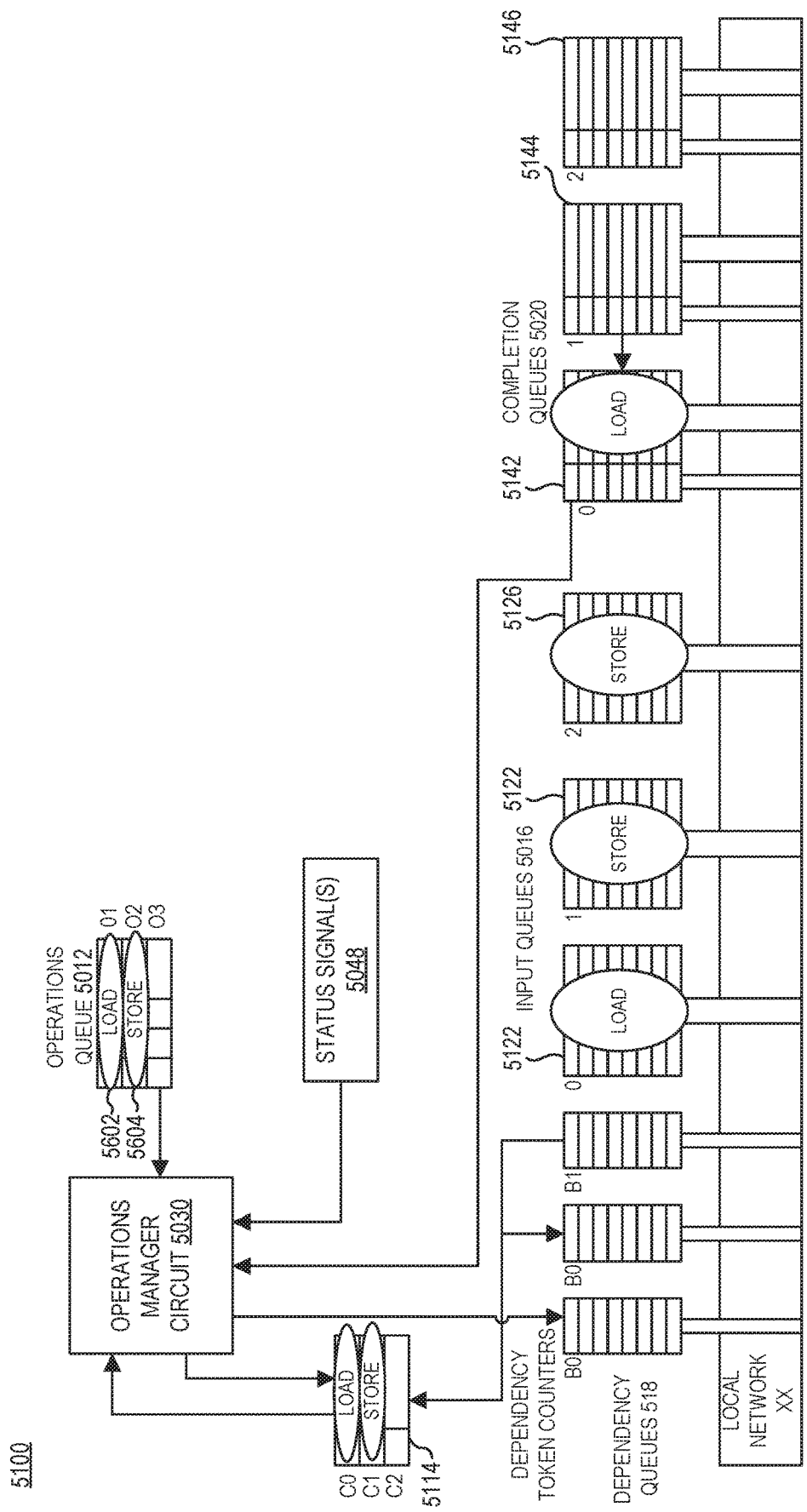
FIG. 56B is a block diagram illustrating flow of load operations and the store operations, such as those of FIG. 56A, through the microarchitecture of the memory ordering circuit of FIG. 51 according to embodiments of the disclosure.

FIG. 56B is a block diagram illustrating flow of the load operations and store operations, such as the load operation 5602 and the store 5604 operation of FIG. 55A, through the microarchitecture 5100 of the memory ordering circuit of FIG. 51, according to an embodiment of the present disclosure. For simplicity of explanation, not all of the components are displayed, but reference may be made back to the additional components displayed in FIG. 51. Various ovals indicating "Load" for the load operation 5602 and "Store" for the store operation 5604 are overlaid on some of the components of the microarchitecture 5100 as indication of how various channels of the queues are being used as the memory operations are queued and ordered through the microarchitecture 5100.

FIGS. 57A, 57B, 57C, 57D, 57E, 57F, 57G, and 57H are block diagrams illustrating functional flow of load operations and store operations for the exemplary program of FIGS. 55A and 55B through queues of the microarchitecture of FIG. 56B, according to an embodiment of the present disclosure. Each figure may correspond to a next cycle of processing by the microarchitecture 5100. Values that are italicized are incoming values (into the queues) and values that are bolded are outgoing values (out of the queues). All other values with normal fonts are retained values already existing in the queues.

Figure 57A:
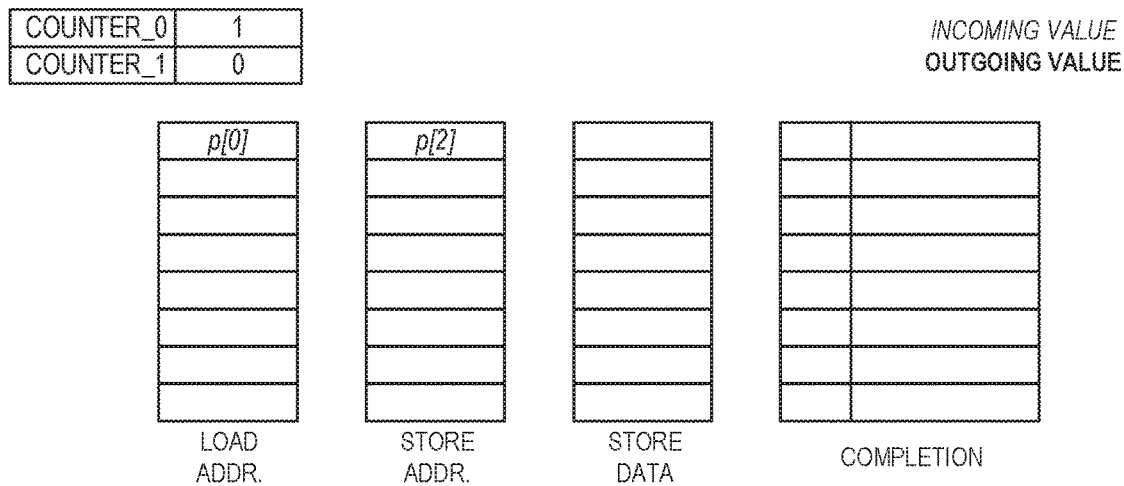

In FIG. 57A, the address p[0] is incoming into the load address queue 5122, and the address p[2] is incoming into the store address queue 5124, starting the control flow process. Note that counter C0, for dependency input for the load address queue, is "1" and counter C1, for dependency output, is zero. In contrast, the "1" of C0 indicates a dependency out value for the store operation. This indicates an incoming dependency for the load operation of p[0] and an outgoing dependency for the store operation of p[2]. These values, however, are not yet active, but will become active, in this way, in FIG. 57B.

Figure 57B:
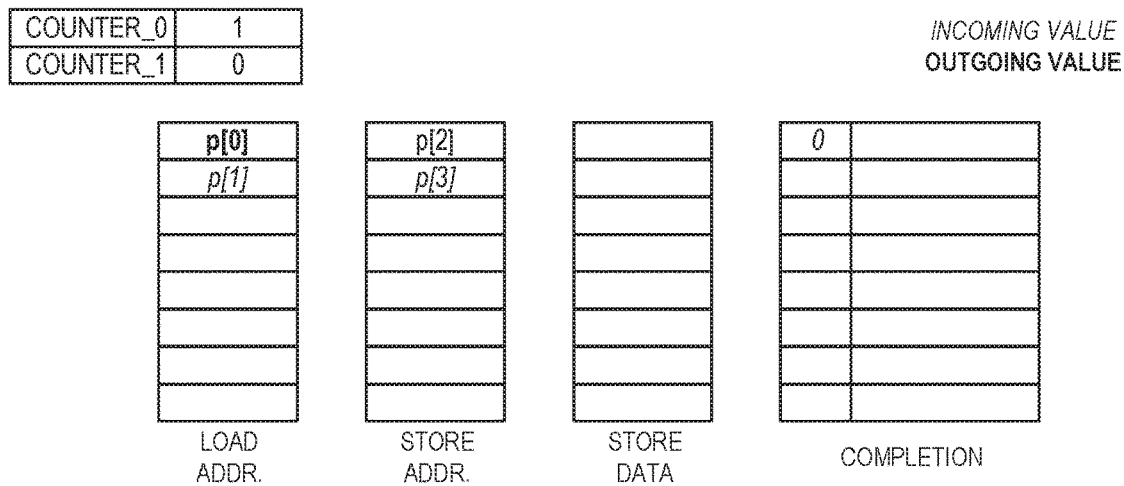

In FIG. 57B, address p[0] is bolded to indicate it is outgoing in this cycle. A new address p[1] is incoming into the load address queue and a new address p[3] is incoming into the store address queue. A zero ("0")-valued bit in the completion queue 5142 is also incoming, which indicates any data present for that indexed entry is invalid. As mentioned, the values for the counters C0 and C1 are now indicated as incoming, and are thus now active this cycle.

Figure 57C:
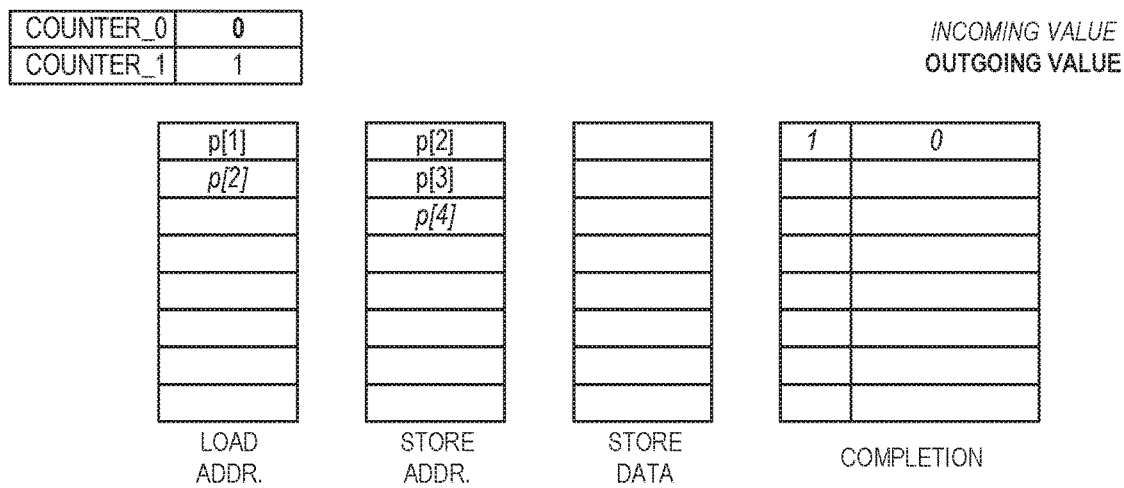

In FIG. 57C, the outgoing address p[0] has now left the load address queue and a new address p[2] is incoming into the load address queue. And, the data ("0") is incoming into the completion queue for address p[0]. The validity bit is set to "1" to indicate that the data in the completion queue is valid. Furthermore, a new address p[4] is incoming into the store address queue. The value for counter C0 is indicated as outgoing and the value for counter C1 is indicated as incoming. The value of "1" for C1 indicates an incoming dependency for store operation to address p[4].

Note that the address p[2] for the newest load operation is dependent on the value that first needs to be stored by the store operation for address p[2], which is at the top of the store address queue. Later, the indexed entry in the completion queue for the load operation from address p[2] may remain buffered until the data from the store operation to the address p[2] is completed (see FIGS. 57F-57H).

In FIG. 57D, the data ("0") is outgoing from the completion queue for address p[0], which is therefore being sent out to the acceleration hardware 4702. Furthermore, a new address p[3] is incoming into the load address queue and a new address p[5] is incoming into the store address queue. The values for the counters C0 and C1 remain unchanged.

In FIG. 57E, the value ("0") for the address p[2] is incoming into the store data queue, while a new address p[4] comes into the load address queue and a new address p[6] comes into the store address queue. The counter values for C0 and C1 remain unchanged.

In FIG. 57F, the value ("0") for the address p[2] in the store data queue, and the address p[2] in the store address queue are both outgoing values. Likewise, the value for the counter C1 is indicated as outgoing, while the value ("0") for counter C0 remain unchanged. Furthermore, a new address p[5] is incoming into the load address queue and a new address p[7] is incoming into the store address queue.

Figure 57G:
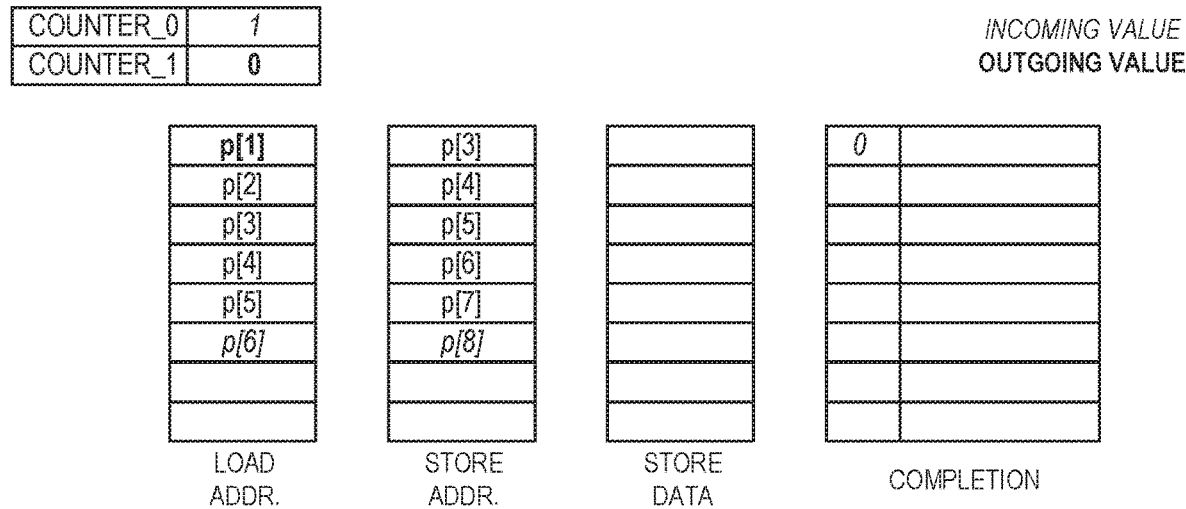

In FIG. 57G, the value ("0") is incoming to indicate the indexed value within the completion queue 5142 is invalid. The address p[1] is bolded to indicate it is outgoing from the load address queue while a new address p[6] is incoming into the load address queue. A new address p[8] is also incoming into the store address queue. The value of counter C0 is incoming as a "1," corresponding to an incoming dependency for the load operation of address p[6] and an outgoing dependency for the store operation of address p[8]. The value of counter C is now "0," and is indicated as outgoing.

Figure 57H:
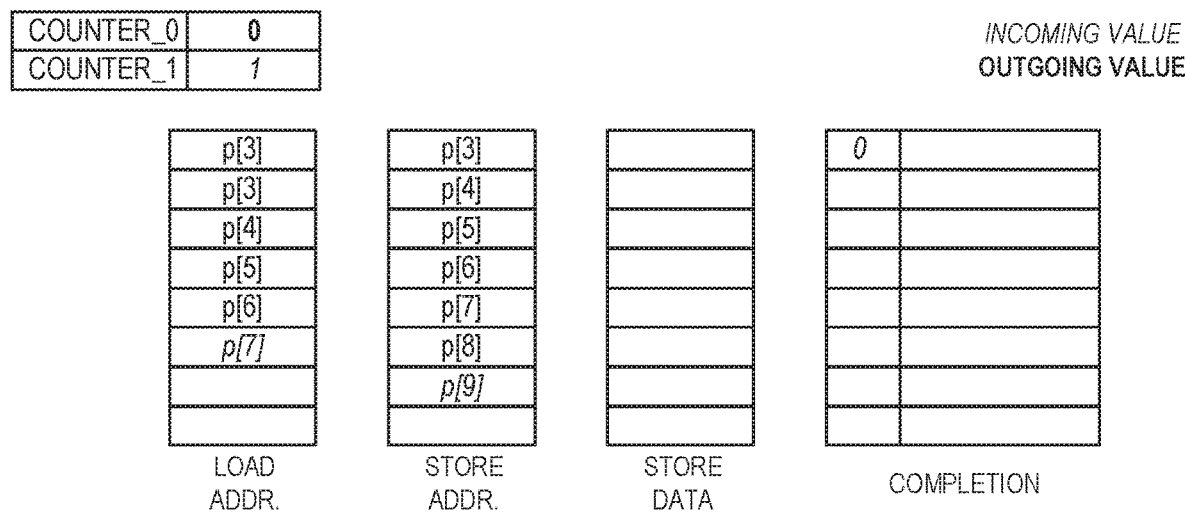

In FIG. 57H, a data value of "1" is incoming into the completion queue 5142 while the validity bit is also incoming as a "1," meaning that the buffered data is valid. This is the data needed to complete the load operation for p[2]. Recall that this data had to first be stored to address p[2], which happened in FIG. 57F. The value of "0" for counter C0 is outgoing, and a value of "1," for counter C1 is incoming. Furthermore, a new address p[7] is incoming into the load address queue and a new address p[9] is incoming into the store address queue.

In the present embodiment, the process of executing the code of FIGS. 55A and 55B may continue on with bouncing dependency tokens between "0" and "1" for the load operations and the store operations. This is due to the tight dependencies between p[i] and p[i+2]. Other code with less frequent dependencies may generate dependency tokens at a slower rate, and thus reset the counters C0 and C1 at a slower rate, causing the generation of tokens of higher values (corresponding to further semantically-separated memory operations).

Figure 58:
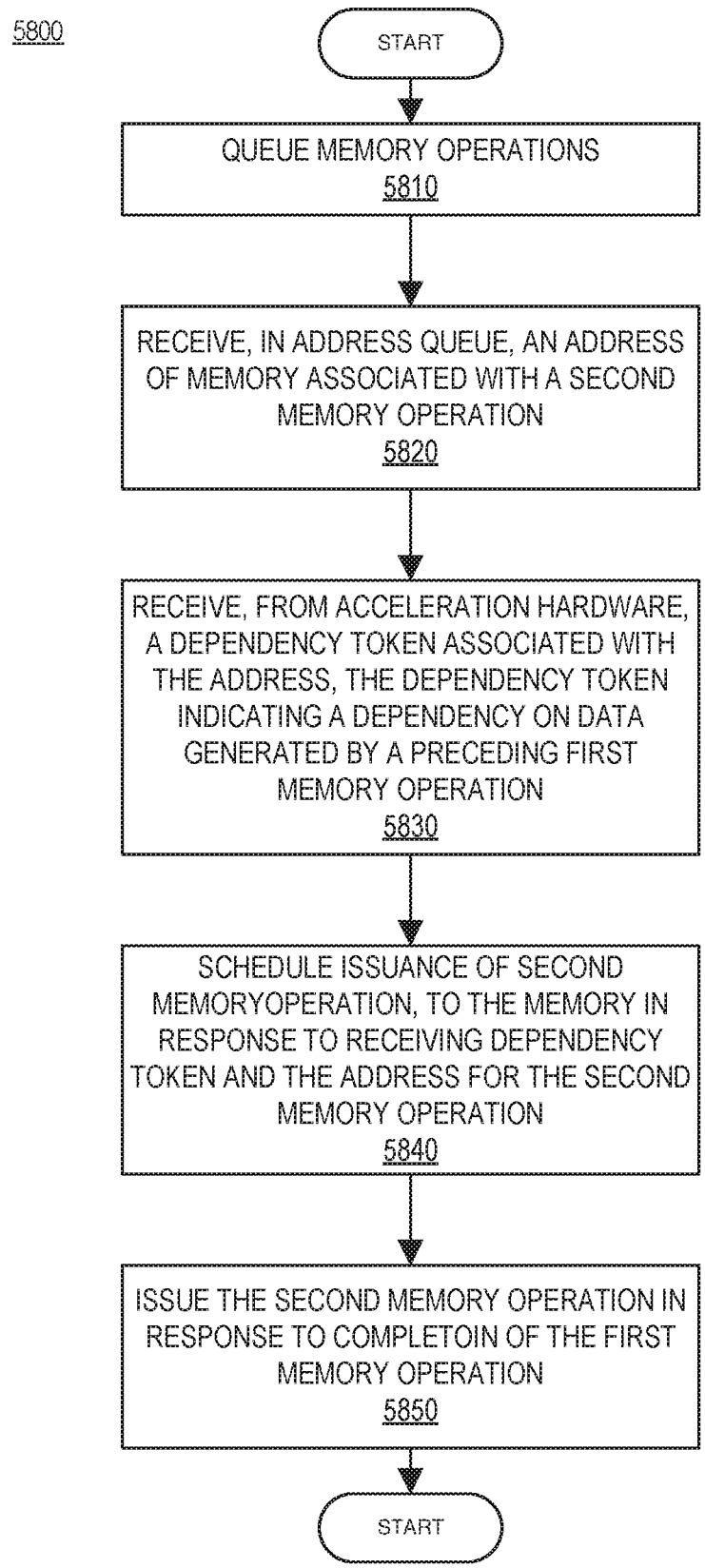
FIG. 58 is a flow chart of a method for ordering memory operations between a acceleration hardware and an out-of-order memory subsystem according to embodiments of the disclosure.

FIG. 58 is a flow chart of a method 5800 for ordering memory operations between acceleration hardware and an out-of-order memory subsystem, according to an embodiment of the present disclosure. The method 5800 may be performed by a system that may include hardware (e.g., circuitry, dedicated logic, and/or programmable logic), software (e.g., instructions executable on a computer system to perform hardware simulation), or a combination thereof. In an illustrative example, the method 5800 may be performed by the memory ordering circuit 4705 and various subcomponents of the memory ordering circuit 4705.

More specifically, referring to FIG. 58, the method 5800 may start with the memory ordering circuit queuing memory operations in an operations queue of the memory ordering circuit (5810). Memory operation and control arguments may make up the memory operations, as queued, where the memory operation and control arguments are mapped to certain queues within the memory ordering circuit as discussed previously. The memory ordering circuit may work to issue the memory operations to a memory in association with acceleration hardware, to ensure the memory operations complete in program order. The method 5800 may continue with the memory ordering circuit receiving, in set of input queues, from the acceleration hardware, an address of the memory associated with a second memory operation of the memory operations (5820). In one embodiment, a load address queue of the set of input queues is the channel to receive the address. In another embodiment, a store address queue of the set of input queues is the channel to receive the address. The method 5800 may continue with the memory ordering circuit receiving, from the acceleration hardware, a dependency token associated with the address, wherein the dependency token indicates a dependency on data generated by a first memory operation, of the memory operations, which precedes the second memory operation (5830). In one embodiment, a channel of a dependency queue is to receive the dependency token. The first memory operation may be either a load operation or a store operation.

The method 5800 may continue with the memory ordering circuit scheduling issuance of the second memory operation to the memory in response to receiving the dependency token and the address associated with the dependency token (5840). For example, when the load address queue receives the address for an address argument of a load operation and the dependency queue receives the dependency token for a control argument of the load operation, the memory ordering circuit may schedule issuance of the second memory operation as a load operation. The method 5800 may continue with the memory ordering circuit issuing the second memory operation (e.g., in a command) to the memory in response to completion of the first memory operation (5850). For example, if the first memory operation is a store, completion may be verified by acknowledgement that the data in a store data queue of the set of input queues has been written to the address in the memory. Similarly, if the first memory operation is a load operation, completion may be verified by receipt of data from the memory for the load operation.

9. Summary

Supercomputing at the ExaFLOP scale may be a challenge in high-performance computing, a challenge which is not likely to be met by conventional von Neumann architectures. To achieve ExaFLOPs, embodiments of a CSA provide a heterogeneous spatial array that targets direct execution of (e.g., compiler-produced) dataflow graphs. In addition to laying out the architectural principles of embodiments of a CSA, the above also describes and evaluates embodiments of a CSA which showed performance and energy of larger than 10× over existing products. Compiler-generated code may have significant performance and energy gains over roadmap architectures. As a heterogeneous, parametric architecture, embodiments of a CSA may be readily adapted to all computing uses. For example, a mobile version of CSA might be tuned to 32-bits, while a machine-learning focused array might feature significant numbers of vectorized 8-bit multiplication units. The main advantages of embodiments of a CSA are high performance and extreme energy efficiency, characteristics relevant to all forms of computing ranging from supercomputing and data-center to the internet-of-things.

In one embodiment, a memory circuit includes a memory interface circuit to service memory requests from a spatial array of processing elements for data stored in a plurality of cache banks; and a hazard detection circuit in each of the plurality of cache banks, wherein a first hazard detection circuit, for a speculative memory load request from the memory interface circuit, that is marked (e.g., by a compiler) with a potential dynamic data dependency, to an address within a first cache bank of the first hazard detection circuit, is to mark the address for tracking of other memory requests to the address, store data from the address in speculative completion storage, and send the data from the speculative completion storage to the spatial array of processing elements when a memory dependency token is received for the speculative memory load request. The speculative completion storage may be in the memory interface circuit, and the data may be sent to the spatial array of processing elements from the speculative completion storage on receipt of the memory dependency token by the memory interface circuit. The memory circuit may further include a second hazard detection circuit to, for (e.g., on detection of) a corresponding, logically proceeding store request that is marked with the potential dynamic data dependency, send the memory dependency token to cause the data from the speculative completion storage to be sent to the spatial array of processing elements when the corresponding, logically proceeding store request is for an address within a second cache bank of the second hazard detection circuit and not within the first cache bank of the first hazard detection circuit. Memory accesses that are not marked with a potential dynamic dependency may bypass the hazard detection circuit in each of the plurality of cache banks. The first hazard detection circuit may indicate an error is detected when a logically proceeding store request, that is marked with the potential dynamic data dependency, is for the address within the first cache bank. The first hazard detection circuit may further send updated data from the logically proceeding store request to the spatial array of processing elements in response to the speculative memory load request. The speculative completion storage may be in the memory interface circuit, and the first hazard detection circuit may replace the data in the speculative completion storage with the updated data, and send the memory dependency token to the memory interface circuit to cause the updated data to be sent to the spatial array of processing elements from the speculative completion storage. The memory interface circuit may send the updated data and the memory dependency token to a second memory interface circuit having a second, speculative memory load request that is marked with the potential dynamic data dependency. The memory circuit of claim 1 may include circuitry to detect an indication of the dynamic data dependency, e.g., wherein the dynamic data dependency is marked by a compiler before runtime of a program including the speculative memory load request.

In another embodiment, a method includes receiving, with a memory interface circuit, memory requests from a spatial array of processing elements for data stored in a plurality of cache banks having a hazard detection circuit in each of the plurality of cache banks; marking an address for tracking of other memory requests to the address with a first hazard detection circuit for a speculative memory load request from the memory interface circuit that is marked with a potential dynamic data dependency to the address within a first cache bank of the first hazard detection circuit; storing data from the address in speculative completion storage; and sending the data from the speculative completion storage to the spatial array of processing elements when a memory dependency token is received for the speculative memory load request. The speculative completion storage may be in the memory interface circuit, and the method may further include sending the data to the spatial array of processing elements from the speculative completion storage on receipt of the memory dependency token by the memory interface circuit. The method may include, for a corresponding, logically proceeding store request that is marked with the potential dynamic data dependency, sending the memory dependency token from a second hazard detection circuit to cause the data from the speculative completion storage to be sent to the spatial array of processing elements when the corresponding, logically proceeding store request is for an address within a second cache bank of the second hazard detection circuit and not within the first cache bank of the first hazard detection circuit. The method may include bypassing the hazard detection circuit in each of the plurality of cache banks for memory accesses that are not marked with a potential dynamic dependency. The method may include indicating an error is detected when a logically proceeding store request that is marked with the potential dynamic data dependency is for the address within the first cache bank. The indicating may include the first hazard detection circuit sending updated data from the logically proceeding store request to the spatial array of processing elements in response to the speculative memory load request. The speculative completion storage may be in the memory interface circuit, and the method may further include the first hazard detection circuit replacing the data in the speculative completion storage with the updated data, and sending the memory dependency token to the memory interface circuit to cause the updated data to be sent to the spatial array of processing elements from the speculative completion storage. The method may include (e.g., the memory interface circuit) sending the updated data and the memory dependency token to a second memory interface circuit having a second, speculative memory load request that is marked with the potential dynamic data dependency.

In yet another embodiment, a non-transitory machine readable medium that stores code that when executed by a machine causes the machine to perform a method including receiving, with a memory interface circuit, memory requests from a spatial array of processing elements for data stored in a plurality of cache banks having a hazard detection circuit in each of the plurality of cache banks; marking an address for tracking of other memory requests to the address with a first hazard detection circuit for a speculative memory load request from the memory interface circuit that is marked with a potential dynamic data dependency to the address within a first cache bank of the first hazard detection circuit; storing data from the address in speculative completion storage; and sending the data from the speculative completion storage to the spatial array of processing elements when a memory dependency token is received for the speculative memory load request. The speculative completion storage may be in the memory interface circuit, and the method may further include sending the data to the spatial array of processing elements from the speculative completion storage on receipt of the memory dependency token by the memory interface circuit. The method may include, for a corresponding, logically proceeding store request that is marked with the potential dynamic data dependency, sending the memory dependency token from a second hazard detection circuit to cause the data from the speculative completion storage to be sent to the spatial array of processing elements when the corresponding, logically proceeding store request is for an address within a second cache bank of the second hazard detection circuit and not within the first cache bank of the first hazard detection circuit. The method may include bypassing the hazard detection circuit in each of the plurality of cache banks for memory accesses that are not marked with a potential dynamic dependency. The method may include indicating an error is detected when a logically proceeding store request that is marked with the potential dynamic data dependency is for the address within the first cache bank. The indicating may include the first hazard detection circuit sending updated data from the logically proceeding store request to the spatial array of processing elements in response to the speculative memory load request. The speculative completion storage may be in the memory interface circuit, and the method may further include the first hazard detection circuit replacing the data in the speculative completion storage with the updated data, and sending the memory dependency token to the memory interface circuit to cause the updated data to be sent to the spatial array of processing elements from the speculative completion storage. The method may include (e.g., the memory interface circuit) sending the updated data and the memory dependency token to a second memory interface circuit having a second, speculative memory load request that is marked with the potential dynamic data dependency.

In another embodiment, a memory circuit includes means to service memory requests from a spatial array of processing elements for data stored in a plurality of cache banks; and a first means for a speculative memory load request from the memory interface circuit, that is marked (e.g., by a compiler) with a potential dynamic data dependency, to an address within a first cache bank of the first means, is to mark the address for tracking of other memory requests to the address, store data from the address in speculative completion storage, and send the data from the speculative completion storage to the spatial array of processing elements when a memory dependency token is received for the speculative memory load request.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements are to perform a second operation by a respective, incoming operand set arriving at each of the dataflow operators of the plurality of processing elements. A processing element of the plurality of processing elements may stall execution when a backpressure signal from a downstream processing element indicates that storage in the downstream processing element is not available for an output of the processing element. The processor may include a flow control path network to carry the backpressure signal according to the dataflow graph. A dataflow token may cause an output from a dataflow operator receiving the dataflow token to be sent to an input buffer of a particular processing element of the plurality of processing elements. The second operation may include a memory access and the plurality of processing elements comprises a memory-accessing dataflow operator that is not to perform the memory access until receiving a memory dependency token from a logically previous dataflow operator. The plurality of processing elements may include a first type of processing element and a second, different type of processing element.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements by a respective, incoming operand set arriving at each of the dataflow operators of the plurality of processing elements. The method may include stalling execution by a processing element of the plurality of processing elements when a backpressure signal from a downstream processing element indicates that storage in the downstream processing element is not available for an output of the processing element. The method may include sending the backpressure signal on a flow control path network according to the dataflow graph. A dataflow token may cause an output from a dataflow operator receiving the dataflow token to be sent to an input buffer of a particular processing element of the plurality of processing elements. The method may include not performing a memory access until receiving a memory dependency token from a logically previous dataflow operator, wherein the second operation comprises the memory access and the plurality of processing elements comprises a memory-accessing dataflow operator. The method may include providing a first type of processing element and a second, different type of processing element of the plurality of processing elements.

In yet another embodiment, an apparatus includes a data path network between a plurality of processing elements; and a flow control path network between the plurality of processing elements, wherein the data path network and the flow control path network are to receive an input of a dataflow graph comprising a plurality of nodes, the dataflow graph is to be overlaid into the data path network, the flow control path network, and the plurality of processing elements with each node represented as a dataflow operator in the plurality of processing elements, and the plurality of processing elements are to perform a second operation by a respective, incoming operand set arriving at each of the dataflow operators of the plurality of processing elements. The flow control path network may carry backpressure signals to a plurality of dataflow operators according to the dataflow graph. A dataflow token sent on the data path network to a dataflow operator may cause an output from the dataflow operator to be sent to an input buffer of a particular processing element of the plurality of processing elements on the data path network. The data path network may be a static, circuit switched network to carry the respective, input operand set to each of the dataflow operators according to the dataflow graph. The flow control path network may transmit a backpressure signal according to the dataflow graph from a downstream processing element to indicate that storage in the downstream processing element is not available for an output of the processing element. At least one data path of the data path network and at least one flow control path of the flow control path network may form a channelized circuit with backpressure control. The flow control path network may pipeline at least two of the plurality of processing elements in series.

In another embodiment, a method includes receiving an input of a dataflow graph comprising a plurality of nodes; and overlaying the dataflow graph into a plurality of processing elements of a processor, a data path network between the plurality of processing elements, and a flow control path network between the plurality of processing elements with each node represented as a dataflow operator in the plurality of processing elements. The method may include carrying backpressure signals with the flow control path network to a plurality of dataflow operators according to the dataflow graph. The method may include sending a dataflow token on the data path network to a dataflow operator to cause an output from the dataflow operator to be sent to an input buffer of a particular processing element of the plurality of processing elements on the data path network. The method may include setting a plurality of switches of the data path network and/or a plurality of switches of the flow control path network to carry the respective, input operand set to each of the dataflow operators according to the dataflow graph, wherein the data path network is a static, circuit switched network. The method may include transmitting a backpressure signal with the flow control path network according to the dataflow graph from a downstream processing element to indicate that storage in the downstream processing element is not available for an output of the processing element. The method may include forming a channelized circuit with backpressure control with at least one data path of the data path network and at least one flow control path of the flow control path network.

In yet another embodiment, a processor includes a core with a decoder to decode an instruction into a decoded instruction and an execution unit to execute the decoded instruction to perform a first operation; a plurality of processing elements; and a network means between the plurality of processing elements to receive an input of a dataflow graph comprising a plurality of nodes, wherein the dataflow graph is to be overlaid into the network means and the plurality of processing elements with each node represented as a dataflow operator in the plurality of processing elements, and the plurality of processing elements are to perform a second operation by a respective, incoming operand set arriving at each of the dataflow operators of the plurality of processing elements.

In another embodiment, an apparatus includes a data path means between a plurality of processing elements; and a flow control path means between the plurality of processing elements, wherein the data path means and the flow control path means are to receive an input of a dataflow graph comprising a plurality of nodes, the dataflow graph is to be overlaid into the data path means, the flow control path means, and the plurality of processing elements with each node represented as a dataflow operator in the plurality of processing elements, and the plurality of processing elements are to perform a second operation by a respective, incoming operand set arriving at each of the dataflow operators of the plurality of processing elements.

In one embodiment, a processor includes a core with a decoder to decode an instruction into a decoded instruction and an execution unit to execute the decoded instruction to perform a first operation; and an array of processing elements to receive an input of a dataflow graph comprising a plurality of nodes, wherein the dataflow graph is to be overlaid into the array of processing elements with each node represented as a dataflow operator in the array of processing elements, and the array of processing elements is to perform a second operation when an incoming operand set arrives at the array of processing elements. The array of processing element may not perform the second operation until the incoming operand set arrives at the array of processing elements and storage in the array of processing elements is available for output of the second operation. The array of processing elements may include a network (or channel(s)) to carry dataflow tokens and control tokens to a plurality of dataflow operators. The second operation may include a memory access and the array of processing elements may include a memory-accessing dataflow operator that is not to perform the memory access until receiving a memory dependency token from a logically previous dataflow operator. Each processing element may perform only one or two operations of the dataflow graph.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing elements may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing element may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In another embodiment, a processor includes a core with a decoder to decode an instruction into a decoded instruction and an execution unit to execute the decoded instruction to perform a first operation; and means to receive an input of a dataflow graph comprising a plurality of nodes, wherein the dataflow graph is to be overlaid into the means with each node represented as a dataflow operator in the means, and the means is to perform a second operation when an incoming operand set arrives at the means.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements is to perform a second operation when an incoming operand set arrives at the plurality of processing elements. The processor may further comprise a plurality of configuration controllers, each configuration controller is coupled to a respective subset of the plurality of processing elements, and each configuration controller is to load configuration information from storage and cause coupling of the respective subset of the plurality of processing elements according to the configuration information. The processor may include a plurality of configuration caches, and each configuration controller is coupled to a respective configuration cache to fetch the configuration information for the respective subset of the plurality of processing elements. The first operation performed by the execution unit may prefetch configuration information into each of the plurality of configuration caches. Each of the plurality of configuration controllers may include a reconfiguration circuit to cause a reconfiguration for at least one processing element of the respective subset of the plurality of processing elements on receipt of a configuration error message from the at least one processing element. Each of the plurality of configuration controllers may a reconfiguration circuit to cause a reconfiguration for the respective subset of the plurality of processing elements on receipt of a reconfiguration request message, and disable communication with the respective subset of the plurality of processing elements until the reconfiguration is complete. The processor may include a plurality of exception aggregators, and each exception aggregator is coupled to a respective subset of the plurality of processing elements to collect exceptions from the respective subset of the plurality of processing elements and forward the exceptions to the core for servicing. The processor may include a plurality of extraction controllers, each extraction controller is coupled to a respective subset of the plurality of processing elements, and each extraction controller is to cause state data from the respective subset of the plurality of processing elements to be saved to memory.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In another embodiment, a processor includes a core with a decoder to decode an instruction into a decoded instruction and an execution unit to execute the decoded instruction to perform a first operation; a plurality of processing elements; and means between the plurality of processing elements to receive an input of a dataflow graph comprising a plurality of nodes, wherein the dataflow graph is to be overlaid into the m and the plurality of processing elements with each node represented as a dataflow operator in the plurality of processing elements, and the plurality of processing elements is to perform a second operation when an incoming operand set arrives at the plurality of processing elements.

In yet another embodiment, an apparatus comprises a data storage device that stores code that when executed by a hardware processor causes the hardware processor to perform any method disclosed herein. An apparatus may be as described in the detailed description. A method may be as described in the detailed description.

In another embodiment, a non-transitory machine readable medium that stores code that when executed by a machine causes the machine to perform a method comprising any method disclosed herein.

An instruction set (e.g., for execution by a core) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, June 2016; and see Intel® Architecture Instruction Set Extensions Programming Reference, February 2016).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 59A:
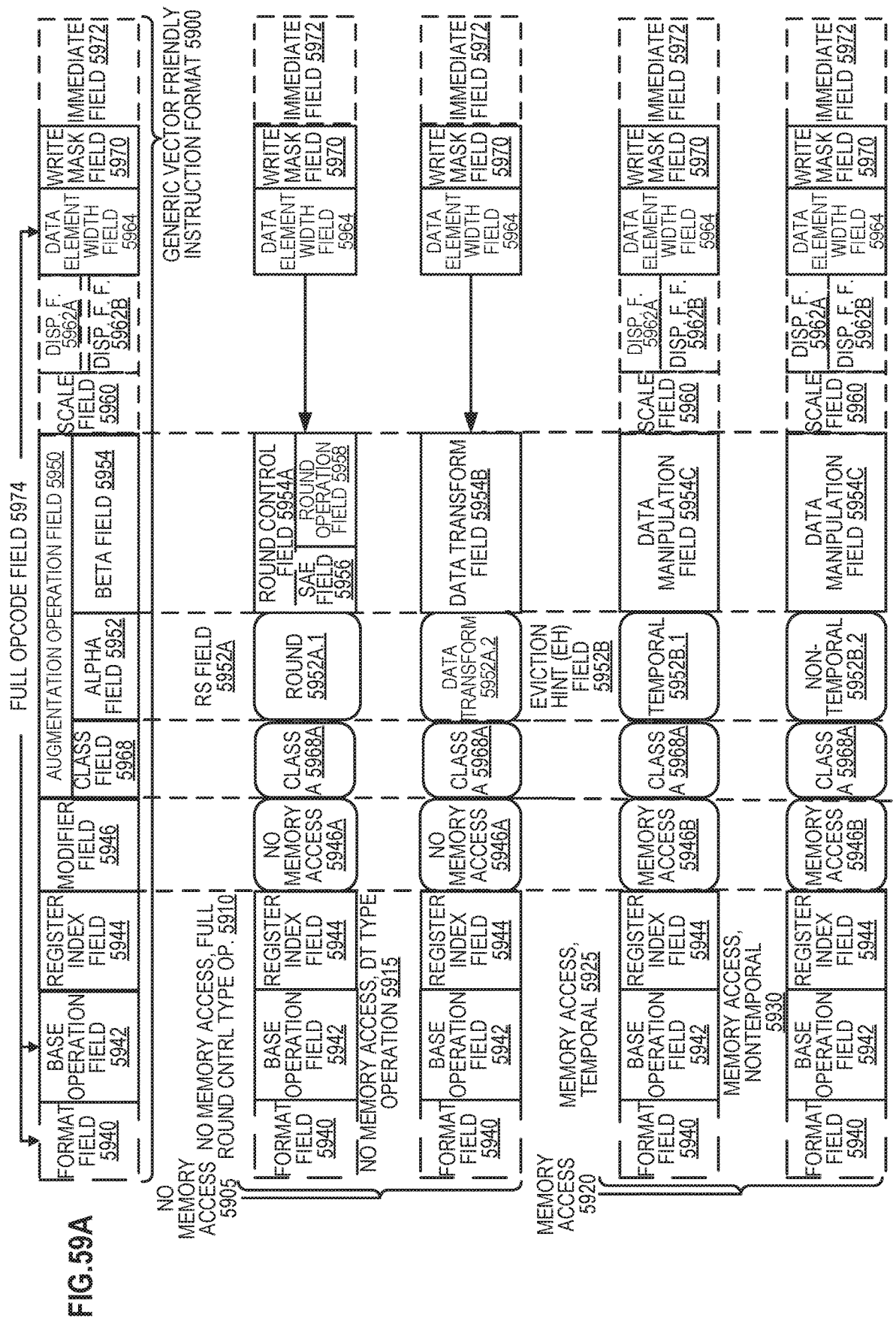
FIG. 59A is a block diagram illustrating a generic vector friendly instruction format and class A instruction templates thereof according to embodiments of the disclosure.
Figure 59B:
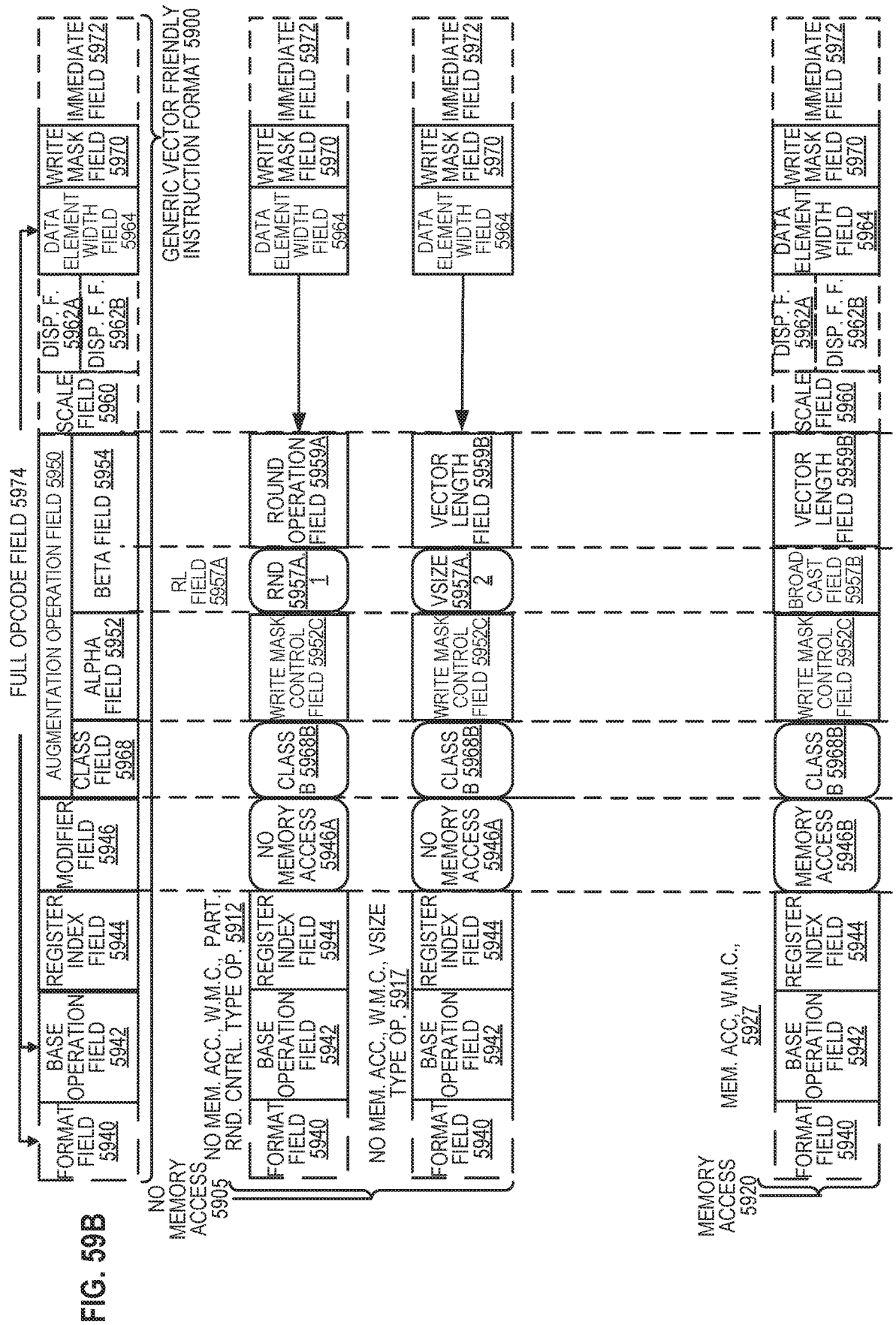
FIG. 59B is a block diagram illustrating the generic vector friendly instruction format and class B instruction templates thereof according to embodiments of the disclosure.

FIGS. 59A-59B are block diagrams illustrating a generic vector friendly instruction format and instruction templates thereof according to embodiments of the disclosure. FIG. 59A is a block diagram illustrating a generic vector friendly instruction format and class A instruction templates thereof according to embodiments of the disclosure; while FIG. 59B is a block diagram illustrating the generic vector friendly instruction format and class B instruction templates thereof according to embodiments of the disclosure. Specifically, a generic vector friendly instruction format 5900 for which are defined class A and class B instruction templates, both of which include no memory access 5905 instruction templates and memory access 5920 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 59A include: 1) within the no memory access 5905 instruction templates there is shown a no memory access, full round control type operation 5910 instruction template and a no memory access, data transform type operation 5915 instruction template; and 2) within the memory access 5920 instruction templates there is shown a memory access, temporal 5925 instruction template and a memory access, non-temporal 5930 instruction template. The class B instruction templates in FIG. 59B include: 1) within the no memory access 5905 instruction templates there is shown a no memory access, write mask control, partial round control type operation 5912 instruction template and a no memory access, write mask control, vsize type operation 5917 instruction template; and 2) within the memory access 5920 instruction templates there is shown a memory access, write mask control 5927 instruction template.

The generic vector friendly instruction format 5900 includes the following fields listed below in the order illustrated in FIGS. 59A-59B.

Format field 5940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 5942—its content distinguishes different base operations.

Register index field 5944—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 5946—its content distinguishes occurrences of instructions in the generic vector instruction format that specify memory access from those that do not; that is, between no memory access 5905 instruction templates and memory access 5920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 5950—its content distinguishes which one of a variety of different operations to be performed in addition to the base operation. This field is context specific. In one embodiment of the disclosure, this field is divided into a class field 5968, an alpha field 5952, and a beta field 5954. The augmentation operation field 5950 allows common groups of operations to be performed in a single instruction rather than 2, 3, or 4 instructions.

Scale field 5960—its content allows for the scaling of the index field's content for memory address generation (e.g., for address generation that uses $2^{scale}*$index+base).

Displacement Field 5962A—its content is used as part of memory address generation (e.g., for address generation that uses $2^{scale}*$index+base+displacement).

Displacement Factor Field 5962B (note that the juxtaposition of displacement field 5962A directly over displacement factor field 5962B indicates one or the other is used)— its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 5974 (described later herein) and the data manipulation field 5954C. The displacement field 5962A and the displacement factor field 5962B are optional in the sense that they are not used for the no memory access 5905 instruction templates and/or different embodiments may implement only one or none of the two.

Data element width field 5964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 5970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 5970 allows for partial vector operations, including loads, stores, arithmetic, logical, etc. While embodiments of the disclosure are described in which the write mask field's 5970 content selects one of a number of write mask registers that contains the write mask to be used (and thus the write mask field's 5970 content indirectly identifies that masking to be performed), alternative embodiments instead or additional allow the mask write field's 5970 content to directly specify the masking to be performed.

Immediate field 5972—its content allows for the specification of an immediate. This field is optional in the sense that is it not present in an implementation of the generic vector friendly format that does not support immediate and it is not present in instructions that do not use an immediate.

Class field 5968—its content distinguishes between different classes of instructions. With reference to FIGS. 59A-B, the contents of this field select between class A and class B instructions. In FIGS. 59A-B, rounded corner squares are used to indicate a specific value is present in a field (e.g., class A 5968A and class B 5968B for the class field 5968 respectively in FIGS. 59A-B).

Instruction Templates of Class A

In the case of the non-memory access 5905 instruction templates of class A, the alpha field 5952 is interpreted as an RS field 5952A, whose content distinguishes which one of the different augmentation operation types are to be performed (e.g., round 5952A.1 and data transform 5952A.2 are respectively specified for the no memory access, round type operation 5910 and the no memory access, data transform type operation 5915 instruction templates), while the beta field 5954 distinguishes which of the operations of the specified type is to be performed. In the no memory access 5905 instruction templates, the scale field 5960, the displacement field 5962A, and the displacement scale filed 5962B are not present.

No-Memory Access Instruction Templates—Full Round Control Type Operation

In the no memory access full round control type operation 5910 instruction template, the beta field 5954 is interpreted as a round control field 5954A, whose content(s) provide static rounding. While in the described embodiments of the disclosure the round control field 5954A includes a suppress all floating point exceptions (SAE) field 5956 and a round operation control field 5958, alternative embodiments may support may encode both these concepts into the same field or only have one or the other of these concepts/fields (e.g., may have only the round operation control field 5958).

SAE field 5956—its content distinguishes whether or not to disable the exception event reporting; when the SAE field's 5956 content indicates suppression is enabled, a given instruction does not report any kind of floating-point exception flag and does not raise any floating point exception handler.

Round operation control field 5958—its content distinguishes which one of a group of rounding operations to perform (e.g., Round-up, Round-down, Round-towards-zero and Round-to-nearest). Thus, the round operation control field 5958 allows for the changing of the rounding mode on a per instruction basis. In one embodiment of the disclosure where a processor includes a control register for specifying rounding modes, the round operation control field's 5950 content overrides that register value.

No Memory Access Instruction Templates—Data Transform Type Operation

In the no memory access data transform type operation 5915 instruction template, the beta field 5954 is interpreted as a data transform field 5954B, whose content distinguishes which one of a number of data transforms is to be performed (e.g., no data transform, swizzle, broadcast).

In the case of a memory access 5920 instruction template of class A, the alpha field 5952 is interpreted as an eviction hint field 5952B, whose content distinguishes which one of the eviction hints is to be used (in FIG. 59A, temporal 5952B.1 and non-temporal 5952B.2 are respectively specified for the memory access, temporal 5925 instruction template and the memory access, non-temporal 5930 instruction template), while the beta field 5954 is interpreted as a data manipulation field 5954C, whose content distinguishes which one of a number of data manipulation operations (also known as primitives) is to be performed (e.g., no manipulation; broadcast; up conversion of a source; and down conversion of a destination). The memory access 5920 instruction templates include the scale field 5960, and optionally the displacement field 5962A or the displacement scale field 5962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 5952 is interpreted as a write mask control (Z) field 5952C, whose content distinguishes whether the write masking controlled by the write mask field 5970 should be a merging or a zeroing.

In the case of the non-memory access 5905 instruction templates of class B, part of the beta field 5954 is interpreted as an RL field 5957A, whose content distinguishes which one of the different augmentation operation types are to be performed (e.g., round 5957A.1 and vector length (VSIZE) 5957A.2 are respectively specified for the no memory access, write mask control, partial round control type operation 5912 instruction template and the no memory access, write mask control, VSIZE type operation 5917 instruction template), while the rest of the beta field 5954 distinguishes which of the operations of the specified type is to be performed. In the no memory access 5905 instruction templates, the scale field 5960, the displacement field 5962A, and the displacement scale filed 5962B are not present.

In the no memory access, write mask control, partial round control type operation 5910 instruction template, the rest of the beta field 5954 is interpreted as a round operation field 5959A and exception event reporting is disabled (a given instruction does not report any kind of floating-point exception flag and does not raise any floating point exception handler).

Round operation control field 5959A—just as round operation control field 5958, its content distinguishes which one of a group of rounding operations to perform (e.g., Round-up, Round-down, Round-towards-zero and Round-to-nearest). Thus, the round operation control field 5959A allows for the changing of the rounding mode on a per instruction basis. In one embodiment of the disclosure where a processor includes a control register for specifying rounding modes, the round operation control field's 5950 content overrides that register value.

In the no memory access, write mask control, VSIZE type operation 5917 instruction template, the rest of the beta field 5954 is interpreted as a vector length field 5959B, whose content distinguishes which one of a number of data vector lengths is to be performed on (e.g., 128, 256, or 512 byte).

In the case of a memory access 5920 instruction template of class B, part of the beta field 5954 is interpreted as a broadcast field 5957B, whose content distinguishes whether or not the broadcast type data manipulation operation is to be performed, while the rest of the beta field 5954 is interpreted the vector length field 5959B. The memory access 5920 instruction templates include the scale field 5960, and optionally the displacement field 5962A or the displacement scale field 5962B.

With regard to the generic vector friendly instruction format 5900, a full opcode field 5974 is shown including the format field 5940, the base operation field 5942, and the data element width field 5964. While one embodiment is shown where the full opcode field 5974 includes all of these fields, the full opcode field 5974 includes less than all of these fields in embodiments that do not support all of them. The full opcode field 5974 provides the operation code (opcode).

The augmentation operation field 5950, the data element width field 5964, and the write mask field 5970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 60 is a block diagram illustrating an exemplary specific vector friendly instruction format according to embodiments of the disclosure. FIG. 60 shows a specific vector friendly instruction format 6000 that is specific in the sense that it specifies the location, size, interpretation, and order of the fields, as well as values for some of those fields. The specific vector friendly instruction format 6000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 59 into which the fields from FIG. 60 map are illustrated.

It should be understood that, although embodiments of the disclosure are described with reference to the specific vector friendly instruction format 6000 in the context of the generic vector friendly instruction format 5900 for illustrative purposes, the disclosure is not limited to the specific vector friendly instruction format 6000 except where claimed. For example, the generic vector friendly instruction format 5900 contemplates a variety of possible sizes for the various fields, while the specific vector friendly instruction format 6000 is shown as having fields of specific sizes. By way of specific example, while the data element width field 5964 is illustrated as a one bit field in the specific vector friendly instruction format 6000, the disclosure is not so limited (that is, the generic vector friendly instruction format 5900 contemplates other sizes of the data element width field 5964).

The generic vector friendly instruction format 5900 includes the following fields listed below in the order illustrated in FIG. 60A.

EVEX Prefix (Bytes 0-3) 6002—is encoded in a four-byte form.

Format Field 5940 (EVEX Byte 0, bits [7:0])—the first byte (EVEX Byte 0) is the format field 5940 and it contains 0x62 (the unique value used for distinguishing the vector friendly instruction format in one embodiment of the disclosure).

The second-fourth bytes (EVEX Bytes 1-3) include a number of bit fields providing specific capability.

REX field 6005 (EVEX Byte 1, bits [7-5])—consists of a EVEX.R bit field (EVEX Byte 1, bit [7]-R), EVEX.X bit field (EVEX byte 1, bit [6]-X), and 5957BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 2211B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 5910—this is the first part of the REX' field 5910 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 5957 (EVEX byte 1, bits [3:0]-mmmm)—its content encodes an implied leading opcode byte (0F, 0F 38, or 0F 3).

Data element width field 5964 (EVEX byte 2, bit [7]-W)—is represented by the notation EVEX.W. EVEX.W is used to define the granularity (size) of the datatype (either 32-bit data elements or 64-bit data elements).

EVEX.vvvv 6020 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 2211b. Thus, EVEX.vvvv field 6020 encodes the 4 low-order bits of the first source register specifier stored in inverted (1s complement) form. Depending on the instruction, an extra different EVEX bit field is used to extend the specifier size to 32 registers.

EVEX.U 5968 Class field (EVEX byte 2, bit [2]-U)—If EVEX.U=0, it indicates class A or EVEX.U0; if EVEX.U=1, it indicates class B or EVEX.U1.

Prefix encoding field 6025 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 5952 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 5954 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 5910—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 5970 (EVEX byte 3, bits [2:0]-kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 6030 (Byte 4) is also known as the opcode byte. Part of the opcode is specified in this field.

MOD R/M Field 6040 (Byte 5) includes MOD field 6042, Reg field 6044, and R/M field 6046. As previously described, the MOD field's 6042 content distinguishes between memory access and non-memory access operations. The role of Reg field 6044 can be summarized to two situations: encoding either the destination register operand or a source register operand, or be treated as an opcode extension and not used to encode any instruction operand. The role of R/M field 6046 may include the following: encoding the instruction operand that references a memory address, or encoding either the destination register operand or a source register operand.

Scale, Index, Base (SIB) Byte (Byte 6)—As previously described, the scale field's 5950 content is used for memory address generation. SIB.xxx 6054 and SIB.bbb 6056—the contents of these fields have been previously referred to with regard to the register indexes Xxxx and Bbbb.

Displacement field 5962A (Bytes 7-10)—when MOD field 6042 contains 10, bytes 7-10 are the displacement field 5962A, and it works the same as the legacy 32-bit displacement (disp32) and works at byte granularity.

Displacement factor field 5962B (Byte 7)—when MOD field 6042 contains 01, byte 7 is the displacement factor field 5962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 5962B is a reinterpretation of disp8; when using displacement factor field 5962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 5962B substitutes the legacy x86 instruction set 8-bit displacement. Thus, the displacement factor field 5962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 5972 operates as previously described.

Full Opcode Field

FIG. 60B is a block diagram illustrating the fields of the specific vector friendly instruction format 6000 that make up the full opcode field 5974 according to one embodiment of the disclosure. Specifically, the full opcode field 5974 includes the format field 5940, the base operation field 5942, and the data element width (W) field 5964. The base operation field 5942 includes the prefix encoding field 6025, the opcode map field 6015, and the real opcode field 6030.

Register Index Field

FIG. 60C is a block diagram illustrating the fields of the specific vector friendly instruction format 6000 that make up the register index field 5944 according to one embodiment of the disclosure. Specifically, the register index field 5944 includes the REX field 6005, the REX' field 6010, the MODR/M.reg field 6044, the MODR/M.r/m field 6046, the VVVV field 6020, xxx field 6054, and the bbb field 6056.

Augmentation Operation Field

Figure 60D:
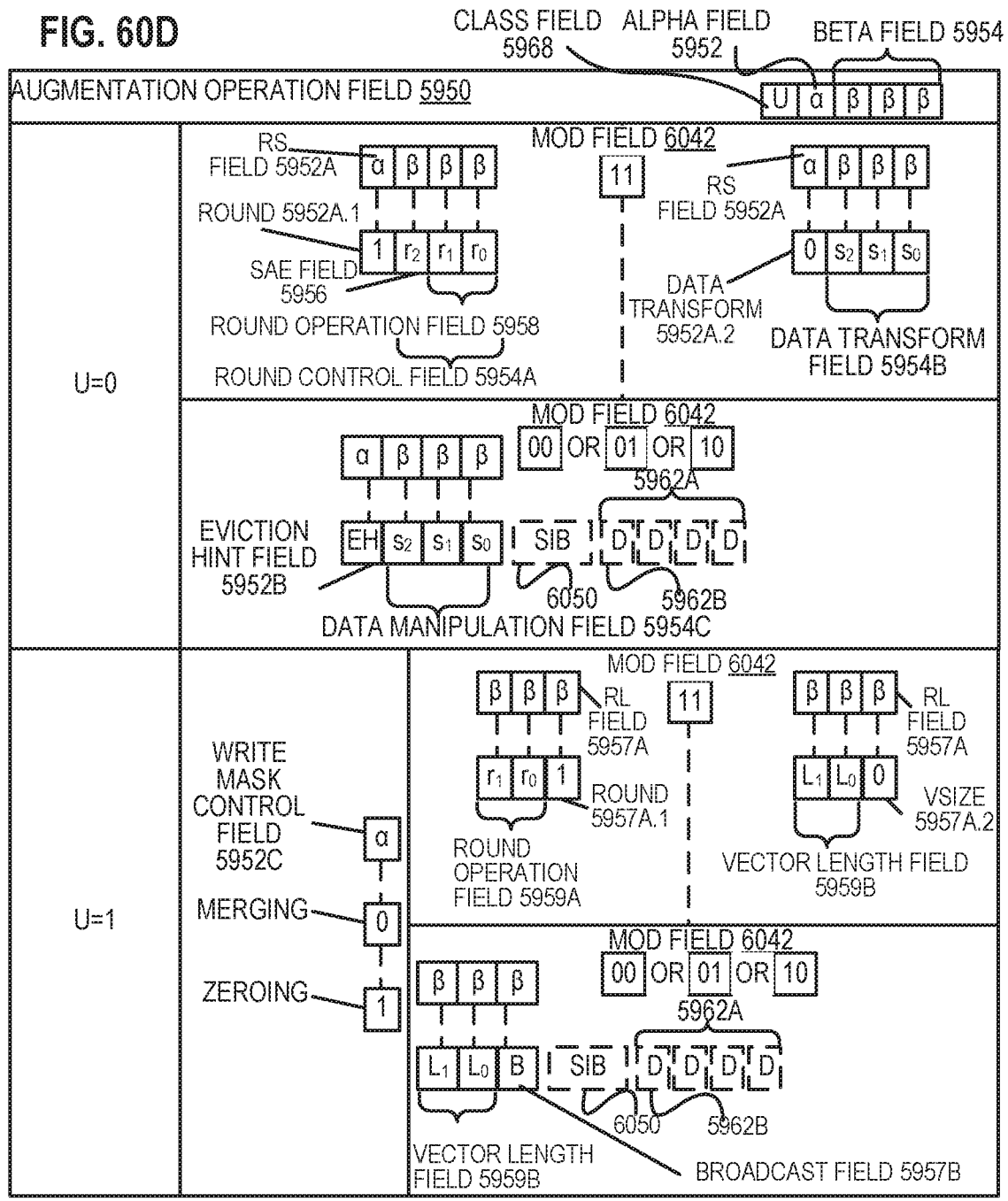
FIG. 60D is a block diagram illustrating the fields of the specific vector friendly instruction format in FIG. 60A that make up the augmentation operation field 5950 according to one embodiment of the disclosure.

FIG. 60D is a block diagram illustrating the fields of the specific vector friendly instruction format 6000 that make up the augmentation operation field 5950 according to one embodiment of the disclosure. When the class (U) field 5968 contains 0, it signifies EVEX.U0 (class A 5968A); when it contains 1, it signifies EVEX.U1 (class B 5968B). When U=0 and the MOD field 6042 contains 11 (signifying a no memory access operation), the alpha field 5952 (EVEX byte 3, bit [7]-EH) is interpreted as the rs field 5952A. When the rs field 5952A contains a 1 (round 5952A.1), the beta field 5954 (EVEX byte 3, bits [6:4]-SSS) is interpreted as the round control field 5954A. The round control field 5954A includes a one bit SAE field 5956 and a two bit round operation field 5958. When the rs field 5952A contains a 0 (data transform 5952A.2), the beta field 5954 (EVEX byte 3, bits [6:4]-SSS) is interpreted as a three bit data transform field 5954B. When U=0 and the MOD field 6042 contains 00, 01, or 10 (signifying a memory access operation), the alpha field 5952 (EVEX byte 3, bit [7]-EH) is interpreted as the eviction hint (EH) field 5952B and the beta field 5954 (EVEX byte 3, bits [6:4]-SSS) is interpreted as a three bit data manipulation field 5954C.

When U=1, the alpha field 5952 (EVEX byte 3, bit [7]-EH) is interpreted as the write mask control (Z) field 5952C. When U=1 and the MOD field 6042 contains 11 (signifying a no memory access operation), part of the beta field 5954 (EVEX byte 3, bit [4]-$S_0$) is interpreted as the RL field 5957A; when it contains a 1 (round 5957A.1) the rest of the beta field 5954 (EVEX byte 3, bit [6-5]-$S_{2-1}$) is interpreted as the round operation field 5959A, while when the RL field 5957A contains a 0 (VSIZE 5957.A2) the rest of the beta field 5954 (EVEX byte 3, bit [6-5]-$S_{2-1}$) is interpreted as the vector length field 5959B (EVEX byte 3, bit [6-5]-$L_{1-0}$). When U=1 and the MOD field 6042 contains 00, 01, or 10 (signifying a memory access operation), the beta field 5954 (EVEX byte 3, bits [6:4]-SSS) is interpreted as the vector length field 5959B (EVEX byte 3, bit [6-5]-$L_{1-0}$) and the broadcast field 5957B (EVEX byte 3, bit [4]-B).

Exemplary Register Architecture

Figure 61:
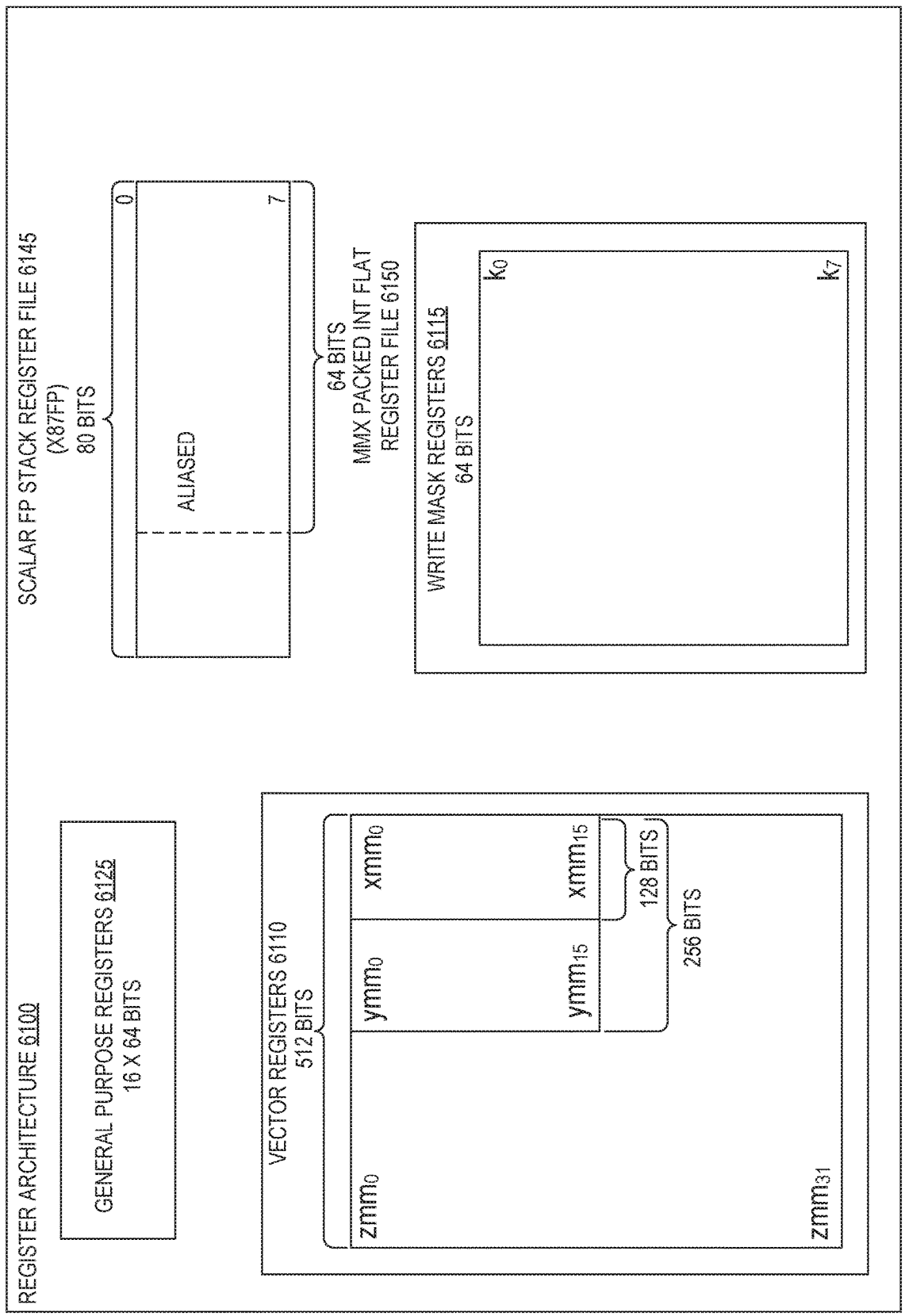
FIG. 61 is a block diagram of a register architecture according to one embodiment of the disclosure

FIG. 61 is a block diagram of a register architecture 6100 according to one embodiment of the disclosure. In the embodiment illustrated, there are 32 vector registers 6110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 6000 operates on these overlaid register file as illustrated in the below tables.

| Adjustable Vector Length | Class | Operations | Registers |
|---|---|---|---|
| Instruction Templates that do not include the vector length field 5959B | A (Figure 59A; U = 0) | 5910, 5915, 5925, 5930 | zmm registers (the vector length is 64 byte) |
| | B (Figure 59B; U = 1) | 5912 | zmm registers (the vector length is 64 byte) |
| Instruction templates that do include the vector length field 5959B | B (Figure 59B; U = 1) | 5917, 5927 | zmm, ymm, or xmm registers (the vector length is 64 byte, 32 byte, or 16 byte) depending on the vector length field 5959B |

In other words, the vector length field 5959B selects between a maximum length and one or more other shorter lengths, where each such shorter length is half the length of the preceding length; and instructions templates without the vector length field 5959B operate on the maximum vector length. Further, in one embodiment, the class B instruction templates of the specific vector friendly instruction format 6000 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 6115—in the embodiment illustrated, there are 8 write mask registers (k0 through k7), each 64 bits in size. In an alternate embodiment, the write mask registers 6115 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 6125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 6145, on which is aliased the MMX packed integer flat register file 6150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 62A is a block diagram illustrating both an exemplary in-order pipeline and an exemplary register renaming, out-of-order issue/execution pipeline according to embodiments of the disclosure. FIG. 62B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 62A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 62A, a processor pipeline 6200 includes a fetch stage 6202, a length decode stage 6204, a decode stage 6206, an allocation stage 6208, a renaming stage 6210, a scheduling (also known as a dispatch or issue) stage 6212, a register read/memory read stage 6214, an execute stage 6216, a write back/memory write stage 6218, an exception handling stage 6222, and a commit stage 6224.

FIG. 62B shows processor core 6290 including a front end unit 6230 coupled to an execution engine unit 6250, and both are coupled to a memory unit 6270. The core 6290 may be a reduced instruction set computing (RISC) core, a complex instruction set computing (CISC) core, a very long instruction word (VLIW) core, or a hybrid or alternative core type. As yet another option, the core 6290 may be a special-purpose core, such as, for example, a network or communication core, compression engine, coprocessor core, general purpose computing graphics processing unit (GPGPU) core, graphics core, or the like.

The front end unit 6230 includes a branch prediction unit 6232 coupled to an instruction cache unit 6234, which is coupled to an instruction translation lookaside buffer (TLB) 6236, which is coupled to an instruction fetch unit 6238, which is coupled to a decode unit 6240. The decode unit 6240 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 6240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 6290 includes a microcode ROM or other medium that stores microcode for certain macro-instructions (e.g., in decode unit 6240 or otherwise within the front end unit 6230). The decode unit 6240 is coupled to a rename/allocator unit 6252 in the execution engine unit 6250.

The execution engine unit 6250 includes the rename/allocator unit 6252 coupled to a retirement unit 6254 and a set of one or more scheduler unit(s) 6256. The scheduler unit(s) 6256 represents any number of different schedulers, including reservations stations, central instruction window, etc. The scheduler unit(s) 6256 is coupled to the physical register file(s) unit(s) 6258. Each of the physical register file(s) units 6258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 6258 comprises a vector registers unit, a write mask registers unit, and a scalar registers unit. These register units may provide architectural vector registers, vector mask registers, and general purpose registers. The physical register file(s) unit(s) 6258 is overlapped by the retirement unit 6254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 6254 and the physical register file(s) unit(s) 6258 are coupled to the execution cluster(s) 6260. The execution cluster(s) 6260 includes a set of one or more execution units 6262 and a set of one or more memory access units 6264. The execution units 6264 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 6256, physical register file(s) unit(s) 6258, and execution cluster(s) 6260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 6264). It should also be understood that where separate pipelines are used, one or more of these pipelines may be out-of-order issue/execution and the rest in-order.

The set of memory access units 6264 is coupled to the memory unit 6270, which includes a data TLB unit 6272 coupled to a data cache unit 6274 coupled to a level 2 (L2) cache unit 6276. In one exemplary embodiment, the memory access units 6264 may include a load unit, a store address unit, and a store data unit, each of which is coupled to the data TLB unit 6272 in the memory unit 6270. The instruction cache unit 6234 is further coupled to a level 2 (L2) cache unit 6276 in the memory unit 6270. The L2 cache unit 6276 is coupled to one or more other levels of cache and eventually to a main memory.

By way of example, the exemplary register renaming, out-of-order issue/execution core architecture may implement the pipeline 6200 as follows: 1) the instruction fetch 6238 performs the fetch and length decoding stages 6202 and 6204; 2) the decode unit 6240 performs the decode stage 6206; 3) the rename/allocator unit 6252 performs the allocation stage 6208 and renaming stage 6210; 4) the scheduler unit(s) 6256 performs the schedule stage 6212; 5) the physical register file(s) unit(s) 6258 and the memory unit 6270 perform the register read/memory read stage 6214; the execution cluster 6260 perform the execute stage 6216; 6) the memory unit 6270 and the physical register file(s) unit(s) 6258 perform the write back/memory write stage 6218; 7) various units may be involved in the exception handling stage 6222; and 8) the retirement unit 6254 and the physical register file(s) unit(s) 6258 perform the commit stage 6224.

The core 6290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 6290 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 6234/6274 and a shared L2 cache unit 6276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 63A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 63A is a block diagram of a single processor core, along with its connection to the on-die interconnect network 6302 and with its local subset of the Level 2 (L2) cache 6304, according to embodiments of the disclosure. In one embodiment, an instruction decode unit 6300 supports the x86 instruction set with a packed data instruction set extension. An L cache 6306 allows low-latency accesses to cache memory into the scalar and vector units. While in one embodiment (to simplify the design), a scalar unit 6308 and a vector unit 6310 use separate register sets (respectively, scalar registers 6312 and vector registers 6314) and data transferred between them is written to memory and then read back in from a level 1 (L1) cache 6306, alternative embodiments of the disclosure may use a different approach (e.g., use a single register set or include a communication path that allow data to be transferred between the two register files without being written and read back).

The local subset of the L2 cache 6304 is part of a global L2 cache that is divided into separate local subsets, one per processor core. Each processor core has a direct access path to its own local subset of the L2 cache 6304. Data read by a processor core is stored in its L2 cache subset 6304 and can be accessed quickly, in parallel with other processor cores accessing their own local L2 cache subsets. Data written by a processor core is stored in its own L2 cache subset 6304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 63A is an expanded view of part of the processor core in FIG. 63A according to embodiments of the disclosure. FIG. 63B includes an L1 data cache 6306A part of the L1 cache 6304, as well as more detail regarding the vector unit 6310 and the vector registers 6314. Specifically, the vector unit 6310 is a 16-wide vector processing unit (VPU) (see the 16-wide ALU 6328), which executes one or more of integer, single-precision float, and double-precision float instructions. The VPU supports swizzling the register inputs with swizzle unit 6320, numeric conversion with numeric convert units 6322A-B, and replication with replication unit 6324 on the memory input. Write mask registers 6326 allow predicating resulting vector writes.

Figure 64:
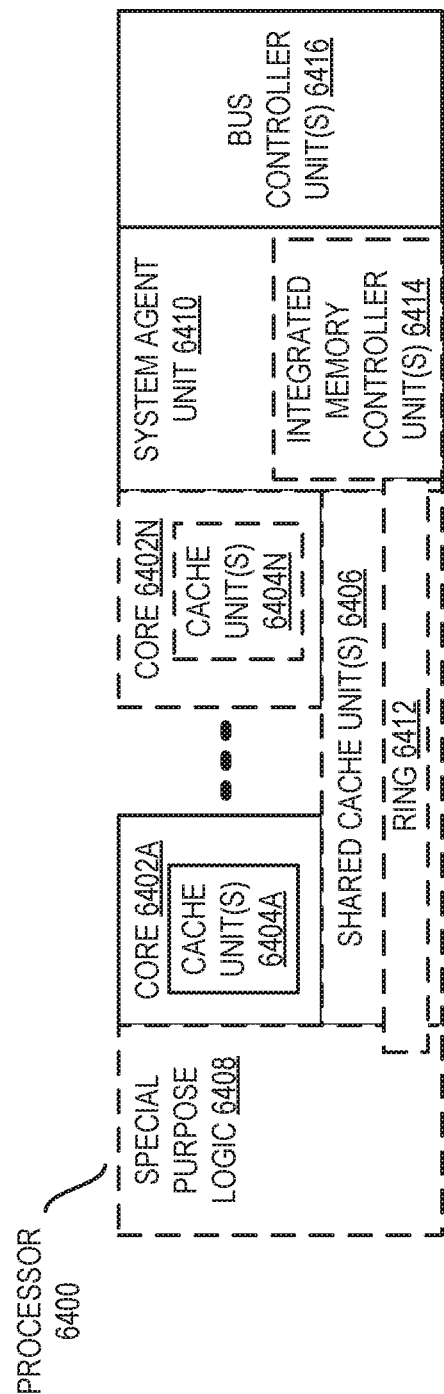
FIG. 64 is a block diagram of a processor that may have more than one core, may have an integrated memory controller, and may have integrated graphics according to embodiments of the disclosure.

FIG. 64 is a block diagram of a processor 6400 that may have more than one core, may have an integrated memory controller, and may have integrated graphics according to embodiments of the disclosure. The solid lined boxes in FIG. 64 illustrate a processor 6400 with a single core 6402A, a system agent 6410, a set of one or more bus controller units 6416, while the optional addition of the dashed lined boxes illustrates an alternative processor 6400 with multiple cores 6402A-N, a set of one or more integrated memory controller unit(s) 6414 in the system agent unit 6410, and special purpose logic 6408.

Thus, different implementations of the processor 6400 may include: 1) a CPU with the special purpose logic 6408 being integrated graphics and/or scientific (throughput) logic (which may include one or more cores), and the cores 6402A-N being one or more general purpose cores (e.g., general purpose in-order cores, general purpose out-of-order cores, a combination of the two); 2) a coprocessor with the cores 6402A-N being a large number of special purpose cores intended primarily for graphics and/or scientific (throughput); and 3) a coprocessor with the cores 6402A-N being a large number of general purpose in-order cores. Thus, the processor 6400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 6400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 6406, and external memory (not shown) coupled to the set of integrated memory controller units 6414. The set of shared cache units 6406 may include one or more mid-level caches, such as level 2 (L2), level 3 (L3), level 4 (L4), or other levels of cache, a last level cache (LLC), and/or combinations thereof. While in one embodiment a ring based interconnect unit 6412 interconnects the integrated graphics logic 6408, the set of shared cache units 6406, and the system agent unit 6410/integrated memory controller unit(s) 6414, alternative embodiments may use any number of well-known techniques for interconnecting such units. In one embodiment, coherency is maintained between one or more cache units 6406 and cores 6402-A-N.

In some embodiments, one or more of the cores 6402A-N are capable of multi-threading. The system agent 6410 includes those components coordinating and operating cores 6402A-N. The system agent unit 6410 may include for example a power control unit (PCU) and a display unit. The PCU may be or include logic and components needed for regulating the power state of the cores 6402A-N and the integrated graphics logic 6408. The display unit is for driving one or more externally connected displays.

The cores 6402A-N may be homogenous or heterogeneous in terms of architecture instruction set; that is, two or more of the cores 6402A-N may be capable of execution the same instruction set, while others may be capable of executing only a subset of that instruction set or a different instruction set.

Exemplary Computer Architectures

FIGS. 65-68 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 65:
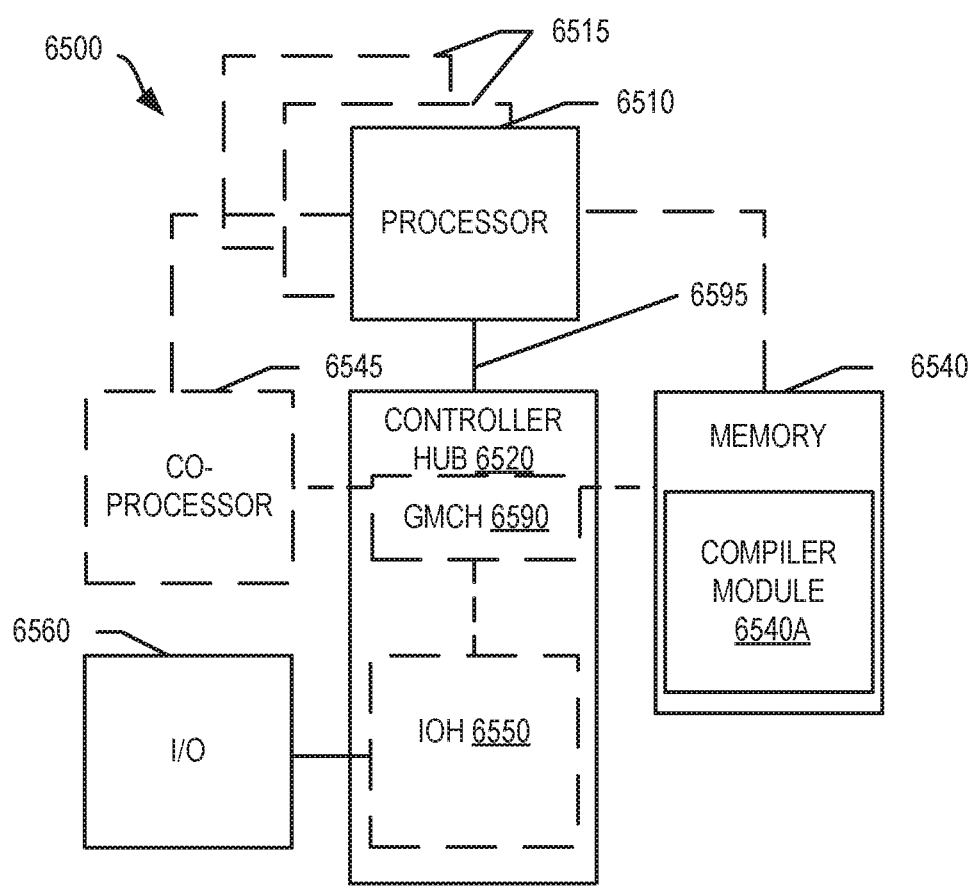
FIG. 65 is a block diagram of a system in accordance with one embodiment of the present disclosure.

Referring now to FIG. 65, shown is a block diagram of a system 6500 in accordance with one embodiment of the present disclosure. The system 6500 may include one or more processors 6510, 6515, which are coupled to a controller hub 6520. In one embodiment the controller hub 6520 includes a graphics memory controller hub (GMCH) 6590 and an Input/Output Hub (IOH) 6550 (which may be on separate chips); the GMCH 6590 includes memory and graphics controllers to which are coupled memory 6540 and a coprocessor 6545; the IOH 6550 is couples input/output (I/O) devices 6560 to the GMCH 6590. Alternatively, one or both of the memory and graphics controllers are integrated within the processor (as described herein), the memory 6540 and the coprocessor 6545 are coupled directly to the processor 6510, and the controller hub 6520 in a single chip with the IOH 6550. Memory 6540 may include a compiler moudle 6540A, for example, to store code that when executed causes a processor to perform any method of this disclosure.

The optional nature of additional processors 6515 is denoted in FIG. 65 with broken lines. Each processor 6510,

6515 may include one or more of the processing cores described herein and may be some version of the processor 6400.

The memory 6540 may be, for example, dynamic random access memory (DRAM), phase change memory (PCM), or a combination of the two. For at least one embodiment, the controller hub 6520 communicates with the processor(s) 6510, 6515 via a multi-drop bus, such as a frontside bus (FSB), point-to-point interface such as QuickPath Interconnect (QPI), or similar connection 6595.

In one embodiment, the coprocessor 6545 is a special-purpose processor, such as, for example, a high-throughput MIC processor, a network or communication processor, compression engine, graphics processor, GPGPU, embedded processor, or the like. In one embodiment, controller hub 6520 may include an integrated graphics accelerator.

There can be a variety of differences between the physical resources 6510, 6515 in terms of a spectrum of metrics of merit including architectural, microarchitectural, thermal, power consumption characteristics, and the like.

In one embodiment, the processor 6510 executes instructions that control data processing operations of a general type. Embedded within the instructions may be coprocessor instructions. The processor 6510 recognizes these coprocessor instructions as being of a type that should be executed by the attached coprocessor 6545. Accordingly, the processor 6510 issues these coprocessor instructions (or control signals representing coprocessor instructions) on a coprocessor bus or other interconnect, to coprocessor 6545. Coprocessor(s) 6545 accept and execute the received coprocessor instructions.

Figure 66:
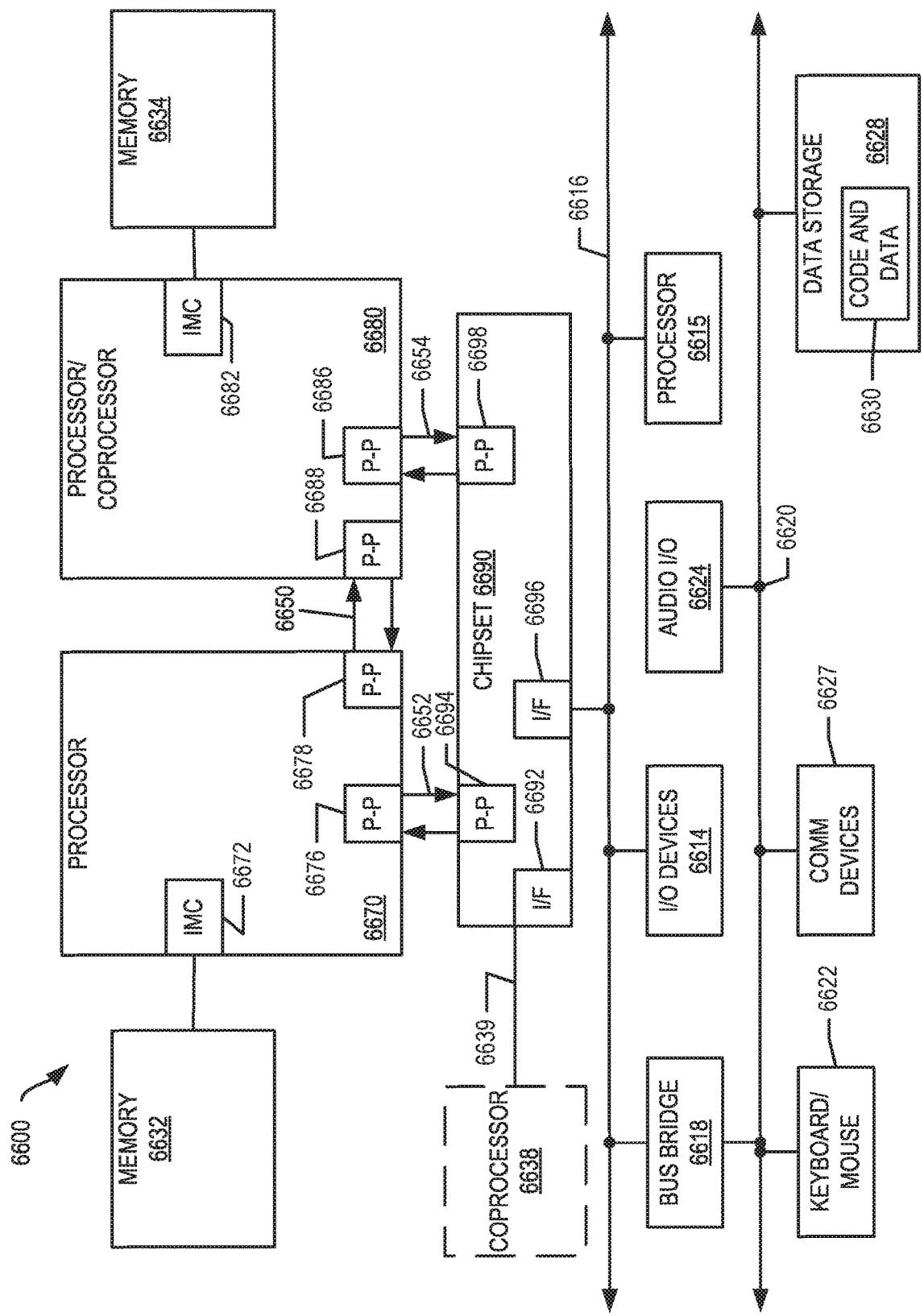
FIG. 66 is a block diagram of a more specific exemplary system in accordance with an embodiment of the present disclosure.

Referring now to FIG. 66, shown is a block diagram of a first more specific exemplary system 6600 in accordance with an embodiment of the present disclosure. As shown in FIG. 66, multiprocessor system 6600 is a point-to-point interconnect system, and includes a first processor 6670 and a second processor 6680 coupled via a point-to-point interconnect 6650. Each of processors 6670 and 6680 may be some version of the processor 6400. In one embodiment of the disclosure, processors 6670 and 6680 are respectively processors 6510 and 6515, while coprocessor 6638 is coprocessor 6545. In another embodiment, processors 6670 and 6680 are respectively processor 6510 coprocessor 6545.

Processors 6670 and 6680 are shown including integrated memory controller (IMC) units 6672 and 6682, respectively. Processor 6670 also includes as part of its bus controller units point-to-point (P-P) interfaces 6676 and 6678; similarly, second processor 6680 includes P-P interfaces 6686 and 6688. Processors 6670, 6680 may exchange information via a point-to-point (P-P) interface 6650 using P-P interface circuits 6678, 6688. As shown in FIG. 66, IMCs 6672 and 6682 couple the processors to respective memories, namely a memory 6632 and a memory 6634, which may be portions of main memory locally attached to the respective processors.

Processors 6670, 6680 may each exchange information with a chipset 6690 via individual P-P interfaces 6652, 6654 using point to point interface circuits 6676, 6694, 6686, 6698. Chipset 6690 may optionally exchange information with the coprocessor 6638 via a high-performance interface 6639. In one embodiment, the coprocessor 6638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 6690 may be coupled to a first bus 6616 via an interface 6696. In one embodiment, first bus 6616 may be a Peripheral Component Interconnect (PCI) bus, or a bus such as a PCI Express bus or another third generation I/O interconnect bus, although the scope of the present disclosure is not so limited.

As shown in FIG. 66, various I/O devices 6614 may be coupled to first bus 6616, along with a bus bridge 6618 which couples first bus 6616 to a second bus 6620. In one embodiment, one or more additional processor(s) 6615, such as coprocessors, high-throughput MIC processors, GPGPU's, accelerators (such as, e.g., graphics accelerators or digital signal processing (DSP) units), field programmable gate arrays, or any other processor, are coupled to first bus 6616. In one embodiment, second bus 6620 may be a low pin count (LPC) bus. Various devices may be coupled to a second bus 6620 including, for example, a keyboard and/or mouse 6622, communication devices 6627 and a storage unit 6628 such as a disk drive or other mass storage device which may include instructions/code and data 6630, in one embodiment. Further, an audio I/O 6624 may be coupled to the second bus 6620. Note that other architectures are possible. For example, instead of the point-to-point architecture of FIG. 66, a system may implement a multi-drop bus or other such architecture.

Figure 67:
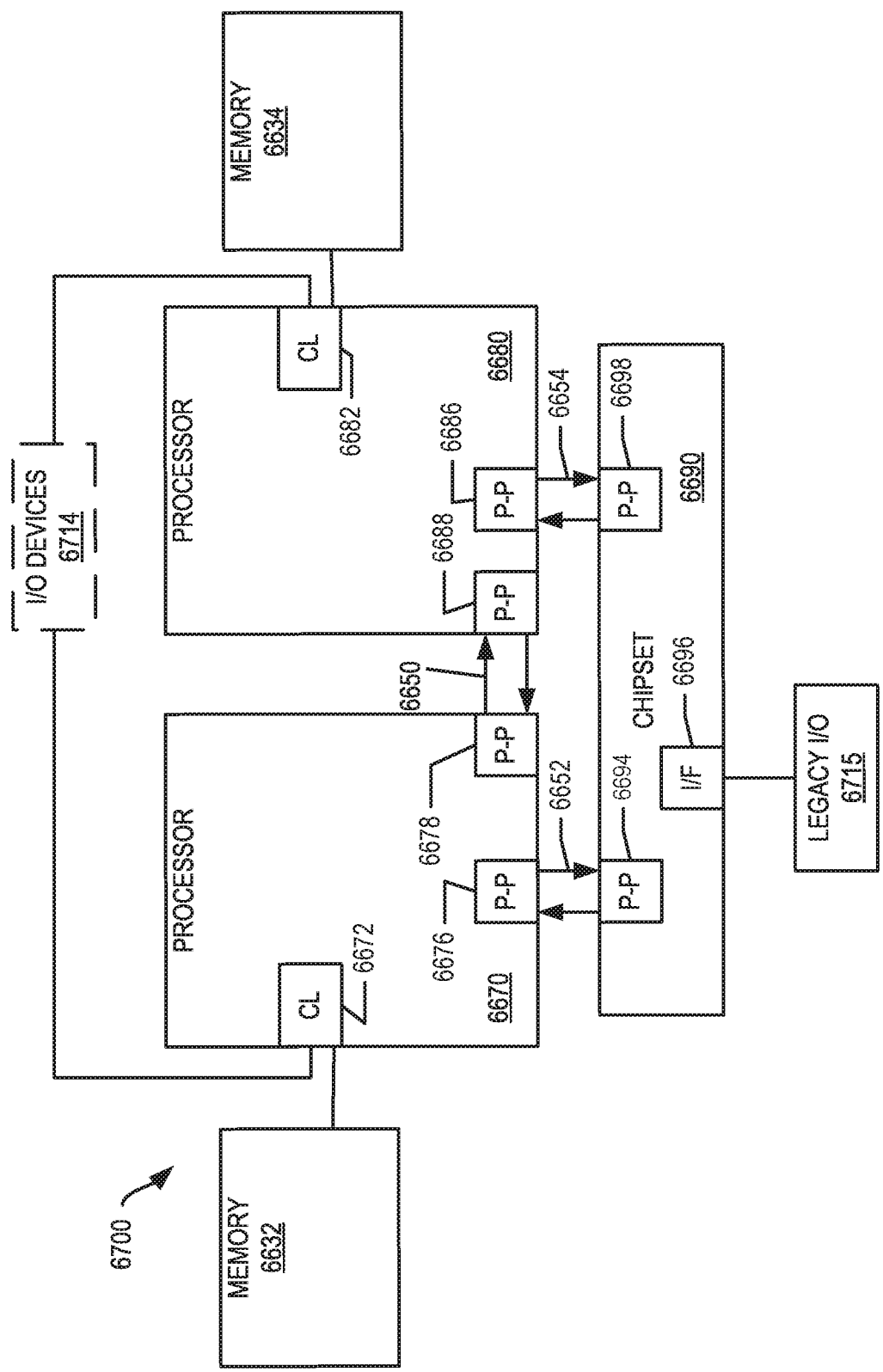
FIG. 67, shown is a block diagram of a second more specific exemplary system in accordance with an embodiment of the present disclosure.

Referring now to FIG. 67, shown is a block diagram of a second more specific exemplary system 6700 in accordance with an embodiment of the present disclosure. Like elements in FIGS. 66 and 67 bear like reference numerals, and certain aspects of FIG. 66 have been omitted from FIG. 67 in order to avoid obscuring other aspects of FIG. 67.

FIG. 67 illustrates that the processors 6670, 6680 may include integrated memory and I/O control logic ("CL") 6672 and 6682, respectively. Thus, the CL 6672, 6682 include integrated memory controller units and include I/O control logic. FIG. 67 illustrates that not only are the memories 6632, 6634 coupled to the CL 6672, 6682, but also that I/O devices 6714 are also coupled to the control logic 6672, 6682. Legacy I/O devices 6715 are coupled to the chipset 6690.

Figure 68:
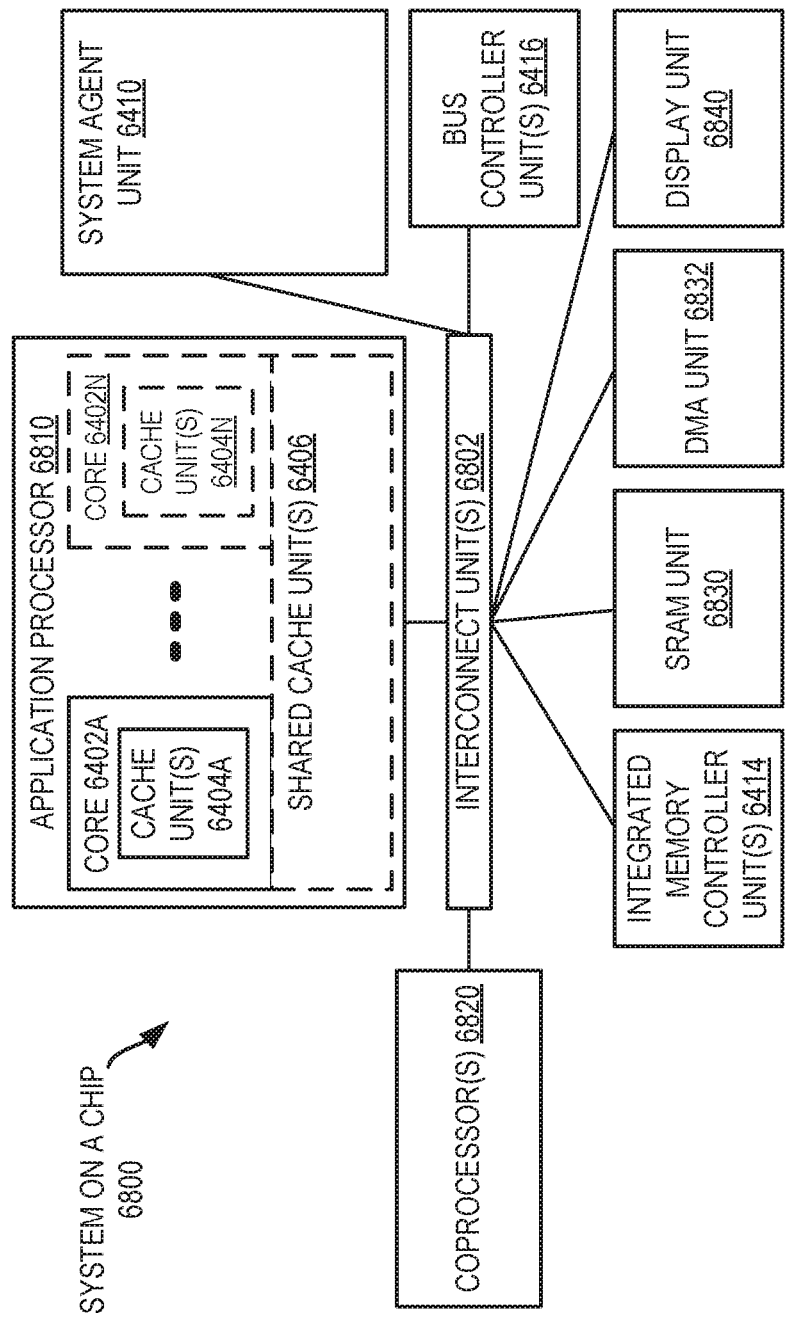
FIG. 68, shown is a block diagram of a system on a chip (SoC) in accordance with an embodiment of the present disclosure.

Referring now to FIG. 68, shown is a block diagram of a SoC 6800 in accordance with an embodiment of the present disclosure. Similar elements in FIG. 64 bear like reference numerals. Also, dashed lined boxes are optional features on more advanced SoCs. In FIG. 68, an interconnect unit(s) 6802 is coupled to: an application processor 6810 which includes a set of one or more cores 202A-N and shared cache unit(s) [6406; a system agent unit 6410; a bus controller unit(s) 6416; an integrated memory controller unit(s) 6414; a set or one or more coprocessors 6820 which may include integrated graphics logic, an image processor, an audio processor, and a video processor; an static random access memory (SRAM) unit 6830; a direct memory access (DMA) unit 6832; and a display unit 6840 for coupling to one or more external displays. In one embodiment, the coprocessor(s) 6820 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 6630 illustrated in FIG. 66, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 69:
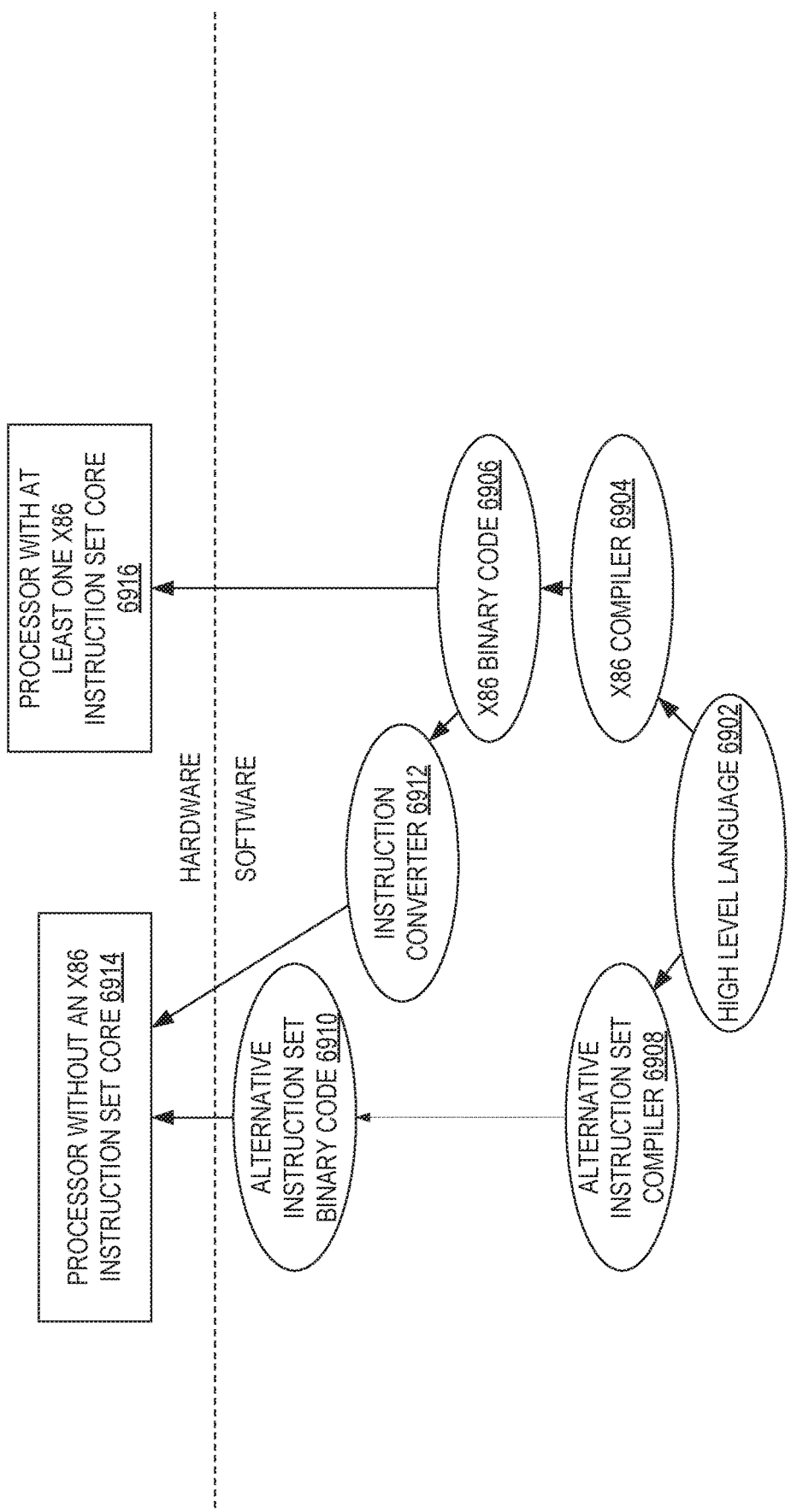
FIG. 69 is a block diagram contrasting the use of a software instruction converter to convert binary instructions in a source instruction set to binary instructions in a target instruction set according to embodiments of the disclosure.

FIG. 69 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 69 shows a program in a high level language 6902 may be compiled using an x86 compiler 6904 to generate x86 binary code 6906 that may be natively executed by a processor with at least one x86 instruction set core 6916. The processor with at least one x86 instruction set core 6916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 6904 represents a compiler that is operable to generate x86 binary code 6906 (e.g., object code) that can, with or without additional linkage processing, be executed on the processor with at least one x86 instruction set core 6916. Similarly, FIG. 69 shows the program in the high level language 6902 may be compiled using an alternative instruction set compiler 6908 to generate alternative instruction set binary code 6910 that may be natively executed by a processor without at least one x86 instruction set core 6914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 6912 is used to convert the x86 binary code 6906 into code that may be natively executed by the processor without an x86 instruction set core 6914. This converted code is not likely to be the same as the alternative instruction set binary code 6910 because an instruction converter capable of this is difficult to make; however, the converted code will accomplish the general operation and be made up of instructions from the alternative instruction set. Thus, the instruction converter 6912 represents software, firmware, hardware, or a combination thereof that, through emulation, simulation or any other process, allows a processor or other electronic device that does not have an x86 instruction set processor or core to execute the x86 binary code 6906.

What is claimed is:

1. A memory circuit comprising:
   a memory interface circuit to service memory requests from a spatial array of processing elements for data stored in a plurality of cache banks; and
   a hazard detection circuit in each of the plurality of cache banks, wherein a first hazard detection circuit, for a speculative memory load request from the memory interface circuit, that is marked with a potential dynamic data dependency, to an address within a first cache bank of the first hazard detection circuit, is to mark the address for tracking of memory requests to the address, store data from the address in a speculative completion storage, and send the data from the speculative completion storage to the spatial array of processing elements when a memory dependency token is received for the speculative memory load request.

2. The memory circuit of claim 1, wherein the speculative completion storage is in the memory interface circuit, and the data is to be sent to the spatial array of processing elements from the speculative completion storage on receipt of the memory dependency token by the memory interface circuit.

3. The memory circuit of claim 1, further comprising a second hazard detection circuit to, for a corresponding, logically proceeding store request that is marked with the potential dynamic data dependency, send the memory dependency token to cause the data from the speculative completion storage to be sent to the spatial array of processing elements when the corresponding, logically proceeding store request is for an address within a second cache bank of the second hazard detection circuit and not within the first cache bank of the first hazard detection circuit.

4. The memory circuit of claim 1, wherein memory accesses that are not marked with a potential dynamic dependency bypass the hazard detection circuit in each of the plurality of cache banks.

5. The memory circuit of claim 1, wherein the first hazard detection circuit is to indicate an error is detected when a logically proceeding store request, that is marked with the potential dynamic data dependency, is for the address within the first cache bank.

6. The memory circuit of claim 5, wherein the first hazard detection circuit is to further send updated payload data from the logically proceeding store request to the spatial array of processing elements in response to the speculative memory load request.

7. The memory circuit of claim 6, wherein the speculative completion storage is in the memory interface circuit, and the first hazard detection circuit is to replace the data in the speculative completion storage with the updated payload data, and send the memory dependency token to the memory interface circuit to cause the updated payload data to be sent to the spatial array of processing elements from the speculative completion storage.

8. The memory circuit of claim 7, wherein the memory interface circuit is to send the updated payload data and the memory dependency token to a second memory interface circuit having a second, speculative memory load request that is marked with the potential dynamic data dependency.

9. A method comprising:
receiving, with a memory interface circuit, memory requests from a spatial array of processing elements for data stored in a plurality of cache banks having a hazard detection circuit in each of the plurality of cache banks;
marking an address for tracking of memory requests to the address with a first hazard detection circuit for a speculative memory load request from the memory interface circuit that is marked with a potential dynamic data dependency to the address within a first cache bank of the first hazard detection circuit;
storing data from the address in a speculative completion storage; and
sending the data from the speculative completion storage to the spatial array of processing elements when a memory dependency token is received for the speculative memory load request.

10. The method of claim 9, wherein the speculative completion storage is in the memory interface circuit, and further comprising sending the data to the spatial array of processing elements from the speculative completion storage on receipt of the memory dependency token by the memory interface circuit.

11. The method of claim 9, further comprising, for a corresponding, logically proceeding store request that is marked with the potential dynamic data dependency, sending the memory dependency token from a second hazard detection circuit to cause the data from the speculative completion storage to be sent to the spatial array of processing elements when the corresponding, logically proceeding store request is for an address within a second cache bank of the second hazard detection circuit and not within the first cache bank of the first hazard detection circuit.

12. The method of claim 9, further comprising bypassing the hazard detection circuit in each of the plurality of cache banks for memory accesses that are not marked with a potential dynamic dependency.

13. The method of claim 9, further comprising indicating an error is detected when a logically proceeding store request that is marked with the potential dynamic data dependency is for the address within the first cache bank.

14. The method of claim 13, wherein the indicating comprises the first hazard detection circuit sending updated payload data from the logically proceeding store request to the spatial array of processing elements in response to the speculative memory load request.

15. The method of claim 14, wherein the speculative completion storage is in the memory interface circuit, and further comprising the first hazard detection circuit replacing the data in the speculative completion storage with the updated payload data, and sending the memory dependency token to the memory interface circuit to cause the updated payload data to be sent to the spatial array of processing elements from the speculative completion storage.

16. The method of claim 15, further comprising the memory interface circuit sending the updated payload data and the memory dependency token to a second memory interface circuit having a second, speculative memory load request that is marked with the potential dynamic data dependency.

17. A non-transitory machine readable medium that stores code that when executed by a machine causes the machine to perform a method comprising:
receiving, with a memory interface circuit, memory requests from a spatial array of processing elements for data stored in a plurality of cache banks having a hazard detection circuit in each of the plurality of cache banks;
marking an address for tracking of memory requests to the address with a first hazard detection circuit for a speculative memory load request from the memory interface circuit that is marked with a potential dynamic data dependency to the address within a first cache bank of the first hazard detection circuit;
storing data from the address in a speculative completion storage; and
sending the data from the speculative completion storage to the spatial array of processing elements when a memory dependency token is received for the speculative memory load request.

18. The non-transitory machine readable medium of claim 17, wherein the speculative completion storage is in the memory interface circuit, and wherein the method further comprises sending the data to the spatial array of processing elements from the speculative completion storage on receipt of the memory dependency token by the memory interface circuit.

19. The non-transitory machine readable medium of claim 17, wherein the method further comprises, for a corresponding, logically proceeding store request that is marked with the potential dynamic data dependency, sending the memory dependency token from a second hazard detection circuit to cause the data from the speculative completion storage to be sent to the spatial array of processing elements when the corresponding, logically proceeding store request is for an address within a second cache bank of the second hazard detection circuit and not within the first cache bank of the first hazard detection circuit.

20. The non-transitory machine readable medium of claim 17, wherein the method further comprises bypassing the hazard detection circuit in each of the plurality of cache banks for memory accesses that are not marked with a potential dynamic dependency.

21. The non-transitory machine readable medium of claim 17, wherein the method further comprises indicating an error is detected when a logically proceeding store request that is marked with the potential dynamic data dependency is for the address within the first cache bank of the first hazard detection circuit.

22. The non-transitory machine readable medium of claim 21, wherein the indicating comprises the first hazard detection circuit sending updated payload data from the logically proceeding store request to the spatial array of processing elements in response to the speculative memory load request.

23. The non-transitory machine readable medium of claim 22, wherein the speculative completion storage is in the memory interface circuit, and the method further comprises the first hazard detection circuit replacing the data in the speculative completion storage with the updated payload data, and sending the memory dependency token to the memory interface circuit to cause the updated payload data to be sent to the spatial array of processing elements from the speculative completion storage.

24. The non-transitory machine readable medium of claim 23, wherein the method further comprises the memory interface circuit sending the updated payload data and the memory dependency token to a second memory interface circuit having a second, speculative memory load request that is marked with the potential dynamic data dependency.

* * * * *